US012559674B2

(12) United States Patent
Imaizumi et al.

(10) Patent No.: US 12,559,674 B2
(45) Date of Patent: Feb. 24, 2026

(54) LIGHT EMITTING ELEMENT AND AMINE COMPOUND FOR THE SAME

(71) Applicant: Samsung Display Co., Ltd., Yongin-si (KR)

(72) Inventors: Taku Imaizumi, Yokohama (JP); Takao Sakuma, Yokohama (JP)

(73) Assignee: Samsung Display Co., Ltd., Yongin-si (KR)

( * ) Notice: Subject to any disclaimer, the term of this patent is extended or adjusted under 35 U.S.C. 154(b) by 642 days.

(21) Appl. No.: 17/933,726

(22) Filed: Sep. 20, 2022

(65) Prior Publication Data

US 2023/0193123 A1 Jun. 22, 2023

(30) Foreign Application Priority Data

Dec. 20, 2021 (KR) ........................ 10-2021-0183145

(51) Int. Cl.
*C09K 11/06* (2006.01)

(52) U.S. Cl.
CPC ....... *C09K 11/06* (2013.01); *C09K 2211/1011* (2013.01); *C09K 2211/1022* (2013.01); *C09K 2211/1088* (2013.01)

(58) Field of Classification Search
CPC ........................ C09K 11/06; C09K 2211/1022
See application file for complete search history.

(56) References Cited

U.S. PATENT DOCUMENTS 8,614,010 B2 12/2013 Yabunouchi et al.
9,614,170 B2 4/2017 Ogiwara et al.
(Continued)

FOREIGN PATENT DOCUMENTS

CN 108084124 A 5/2018
CN 108341795 A 7/2018
(Continued)

OTHER PUBLICATIONS

Extended European search report for corresponding EP Application No. 22211335.9, dated May 2, 2023, 7pp.
(Continued)

*Primary Examiner* — Peter F Godenschwager
(74) *Attorney, Agent, or Firm* — Womble Bond Dickinson (US) LLP

(57) ABSTRACT

An amine compound is represented by Formula 1. A light emitting element of an embodiment includes a first electrode, a second electrode and at least one functional layer between the first electrode and the second electrode and including the amine compound represented by Formula 1 below, thereby showing high efficiency and long-life characteristics.

Formula 1

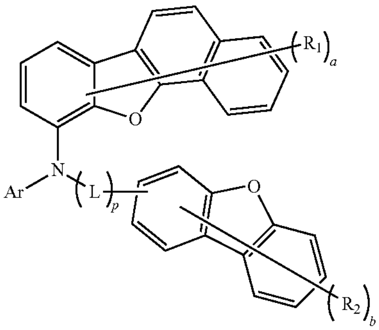

15 Claims, 8 Drawing Sheets

(56) References Cited

U.S. PATENT DOCUMENTS

| | | | | |
|---|---|---|---|---|
| 10,270,040 | B2 | 4/2019 | Ikeda et al. | |
| 10,424,741 | B2 | 9/2019 | Lee et al. | |
| 11,133,470 | B2 | 9/2021 | Suganuma et al. | |
| 2011/0278561 | A1* | 11/2011 | Hosokawa ............. | C09K 11/06 252/301.16 |
| 2020/0321530 | A1 | 10/2020 | Lee et al. | |
| 2020/0403157 | A1 | 12/2020 | Kim et al. | |
| 2021/0269445 | A1 | 9/2021 | Kang et al. | |
| 2023/0083073 | A1* | 3/2023 | Lee ...................... | H10K 85/615 257/40 |
| 2024/0341175 | A1* | 10/2024 | Kim ..................... | H10K 85/626 |

FOREIGN PATENT DOCUMENTS

| | | | |
|---|---|---|---|
| CN | 110885338 | A | 3/2020 |
| CN | 110577523 | B | 7/2021 |
| CN | 114805266 | A | 7/2022 |
| EP | 3 757 095 | A2 | 12/2020 |
| EP | 3 909 946 | A2 | 11/2021 |
| EP | 4 019 505 | A1 | 6/2022 |
| KR | 10-2013-0136359 | A | 12/2013 |
| KR | 10-2015-0060976 | A | 6/2015 |
| KR | 10-2016-0054374 | A | 5/2016 |
| KR | 10-2016-0148437 | A | 12/2016 |
| KR | 10-2018-0042943 | A | 4/2018 |
| KR | 10-2018-0096458 | A | 8/2018 |
| KR | 10-2019-0007789 | A | 1/2019 |
| KR | 10-2076958 | B1 | 2/2020 |
| KR | 10-2020-0089891 | A | 7/2020 |
| KR | 10-2216472 | B1 | 2/2021 |
| KR | 10-2021-0036237 | A | 4/2021 |
| KR | 10-2021-0100352 | A | 8/2021 |
| KR | 10-2021-0145002 | A | 12/2021 |
| WO | WO 2010/061824 | A1 | 6/2010 |
| WO | WO 2014/104144 | A1 | 7/2014 |
| WO | WO 2015/194791 | A2 | 12/2015 |
| WO | WO 2016/122150 | A2 | 8/2016 |
| WO | WO 2019/021146 | A1 | 1/2019 |
| WO | WO 2021/060723 | A1 | 4/2021 |

OTHER PUBLICATIONS

Examination report dated Feb. 13, 2025 for corresponding European Patent Application EP 22211335.9, 6pp.

* cited by examiner

LIGHT EMITTING ELEMENT AND AMINE COMPOUND FOR THE SAME

CROSS-REFERENCE TO RELATED APPLICATION

This application claims priority to and the benefit of Korean Patent Application No. 10-2021-0183145, filed on Dec. 20, 2021, the entire contents of which are hereby incorporated by reference.

BACKGROUND

Embodiments of the present disclosure herein relate to an amine compound and a light emitting element including the same, and, for example, to a light emitting element including an amine compound in a hole transport region.

Recently, the development of an organic electroluminescence display device as an image display device is being actively conducted. The organic electroluminescence display device is a display device of a self-luminescent-type of light emitting element in which holes and electrons injected from a first electrode and a second electrode recombine in an emission layer so that a light emitting material in the emission layer emits light to achieve a display.

In the application of a light emitting element to a display device, the decrease of a driving voltage and the increase of emission efficiency and life are beneficial, and development of materials for a light emitting element, stably achieving desirable features is being consistently investigated.

In addition, in order to accomplish a light emitting element having high efficiency, development of materials for a hole transport region for suppressing or reducing the diffusion of the exciton energy of an emission layer is being conducted.

SUMMARY

Embodiments of the present disclosure provide a light emitting element that exhibits excellent emission efficiency and long-life characteristics.

Embodiments of the present disclosure also provide an amine compound which is a material for a light emitting element having high efficiency and long-life characteristics.

An embodiment provides an amine compound represented by Formula 1 below.

Formula 1

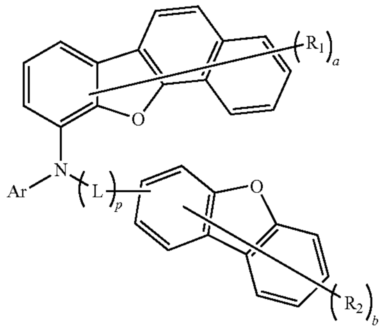

In Formula 1, Ar is a substituted or unsubstituted alkyl group of 1 to 20 carbon atoms, a substituted or unsubstituted alkenyl group of 2 to 20 carbon atoms, a substituted or unsubstituted alkynyl group of 2 to 20 carbon atoms, a substituted or unsubstituted oxy group, a substituted or unsubstituted aryl group of 6 to 40 ring-forming carbon atoms, or a substituted or unsubstituted oxygen-containing heteroaryl group of 5 to 40 ring-forming carbon atoms, "p" is an integer of 0 to 3, L is a direct linkage, a substituted or unsubstituted arylene group of 6 to 40 ring-forming carbon atoms, or a substituted or unsubstituted heteroarylene group of 5 to 40 ring-forming carbon atoms, "a" is an integer of 0 to 9, "b" is an integer of 0 to 7, and $R_1$ and $R_2$ are each independently a hydrogen atom, a deuterium atom, a substituted or unsubstituted alkyl group of 1 to 20 carbon atoms, a substituted or unsubstituted alkenyl group of 2 to 20 carbon atoms, a substituted or unsubstituted alkynyl group of 2 to 20 carbon atoms, a substituted or unsubstituted oxy group, a substituted or unsubstituted aryl group of 6 to 40 ring-forming carbon atoms, or a substituted or unsubstituted heteroaryl group of 5 to 40 ring-forming carbon atoms. Formula 1 includes a structure in which an optional hydrogen atom is substituted with a deuterium atom.

In an embodiment, Formula 1 may be represented by any one selected from among Formula 1-1 to Formula 1-4 below.

Formula 1-1

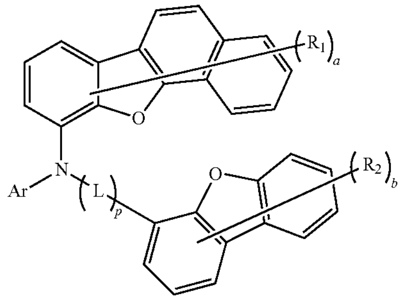

Formula 1-2

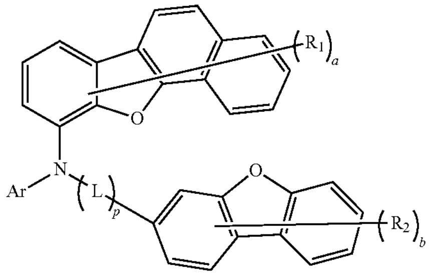

Formula 1-3

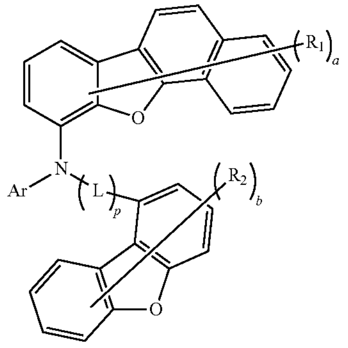

-continued

Formula 1-4

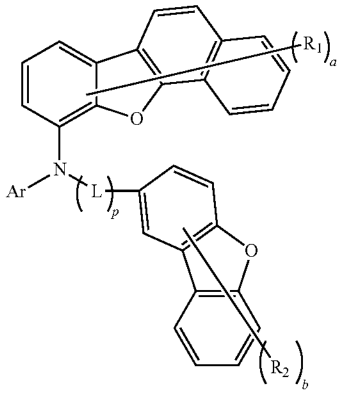

In Formula 1-1 to Formula 1-4, Ar, "p", L, "a", "b", $R_1$ and $R_2$ are the same as defined with respect to Formula 1.

In an embodiment, Formula 1 may be represented by Formula 1A or Formula 1B below.

Formula 1A

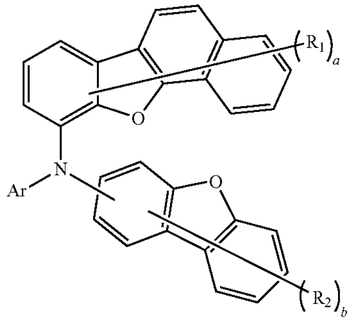

Formula 1B

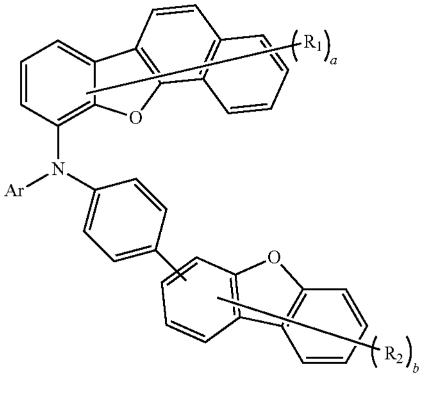

In Formula 1A and Formula 1B, Ar, "a", "b", $R_1$ and $R_2$ are the same as defined with respect to Formula 1.

In an embodiment, L may be a direct linkage, or an unsubstituted phenylene group.

In an embodiment, Ar may be a substituted or unsubstituted aryl group of 6 to 40 ring-forming carbon atoms.

In an embodiment, Ar may be a substituted or unsubstituted phenyl group, a substituted or unsubstituted biphenyl group, a substituted or unsubstituted terphenyl group, a substituted or unsubstituted naphthyl group, a substituted or unsubstituted phenanthrenyl group, or a substituted or unsubstituted dibenzofuranyl group.

In an embodiment, at least one selected from among Ar, L, $R_1$, and $R_2$ of Formula 1 may include a deuterium atom, or a substituent including a deuterium atom.

In an embodiment, the compound represented by Formula 1 may be a monoamine compound.

According to another embodiment, there is provided a light emitting element including a first electrode; a second electrode on the first electrode; and at least one functional layer between the first electrode and the second electrode, and including the amine compound according to an embodiment.

In an embodiment, the at least one functional layer may include an emission layer, a hole transport region between the first electrode and the emission layer, and an electron transport region between the emission layer and the second electrode, and the hole transport region may include the amine compound according to an embodiment.

In an embodiment, the hole transport region may include at least one selected from among a hole injection layer, a hole transport layer, and an electron blocking layer, and at least one selected from among the hole injection layer, the hole transport layer, and the electron blocking layer may include the amine compound according to an embodiment.

BRIEF DESCRIPTION OF THE FIGURES

The accompanying drawings are included to provide a further understanding of the subject matter of the present disclosure and are incorporated in and constitute a part of this specification. The drawings illustrate embodiments of the present disclosure and, together with the description, serve to explain principles of the present disclosure. In the drawings.

DETAILED DESCRIPTION

Figure 1:
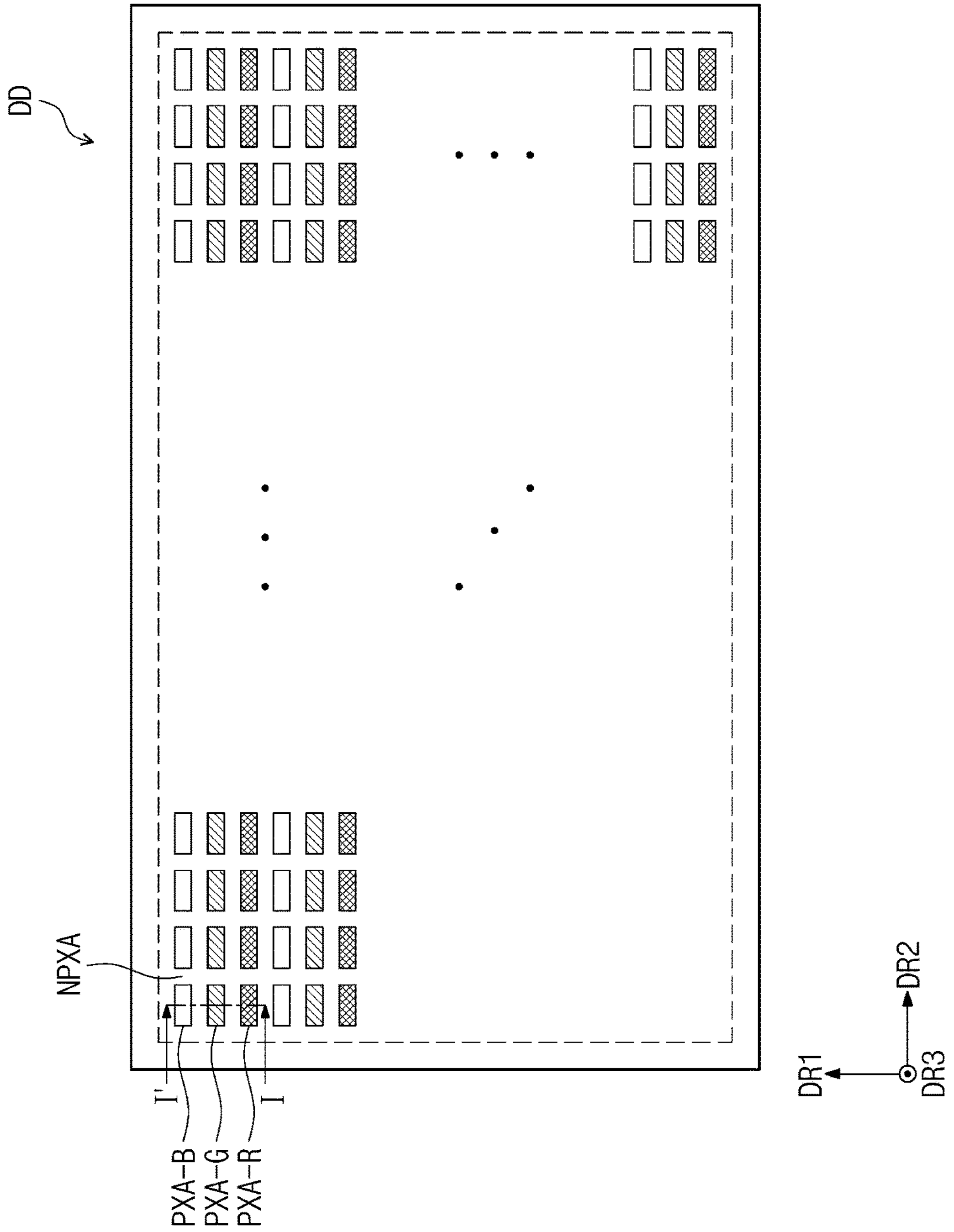
FIG. 1 is a plan view showing a display apparatus according to an embodiment.

The subject matter of the present disclosure may have various modifications and may be embodied in different forms, and example embodiments will be explained in more detail with reference to the accompany drawings. The subject matter of the present disclosure may, however, be embodied in different forms and should not be construed as limited to the embodiments set forth herein. Rather, all modifications, equivalents, and substituents which are included in the spirit and technical scope of the present disclosure should be included in the present disclosure.

Like reference numerals refer to like elements throughout. In the drawings, the dimensions of structures may be exaggerated for clarity of illustration. It will be understood that, although the terms first, second, etc. may be used herein to describe various elements, these elements should not be limited by these terms. These terms are only used to distinguish one element from another element. Thus, a first element could be termed a second element without departing from the spirit and scope of the present disclosure. Similarly, a second element could be termed a first element. As used herein, the singular forms are intended to include the plural forms as well, unless the context clearly indicates otherwise.

In the present description, it will be further understood that the terms "comprises" and/or "comprising," when used in this specification, specify the presence of stated features, numerals, steps, operations, elements, parts, or the combination thereof, but do not preclude the presence or addition of one or more other features, numerals, steps, operations, elements, parts, or the combination thereof.

In the present description, when a layer, a film, a region, a plate, etc. is referred to as being "on" or "above" another part, it can be "directly on" the other part, or intervening layers may also be present. On the contrary, when a layer, a film, a region, a plate, etc. is referred to as being "under" or "below" another part, it can be "directly under" the other part, or intervening layers may also be present. Also, when an element is referred to as being "on" another element, it can be under the other element.

In the present description, the term "substituted or unsubstituted" corresponds to substituted or unsubstituted with at least one substituent selected from the group consisting of a deuterium atom, a halogen atom, a cyano group, a nitro group, an amino group, a silyl group, an oxy group, a thio group, a sulfinyl group, a sulfonyl group, a carbonyl group, a boron group, a phosphine oxide group, a phosphine sulfide group, an alkyl group, an alkenyl group, an alkynyl group, an alkoxy group, a hydrocarbon ring group, an aryl group, and a heterocyclic group. In addition, each of the described substituents may be substituted or unsubstituted. For example, a biphenyl group may be interpreted as an aryl group or a phenyl group substituted with a phenyl group.

In the present description, the term "forming a ring via the combination with an adjacent group" may mean forming a substituted or unsubstituted hydrocarbon ring, or a substituted or unsubstituted heterocycle via the combination with an adjacent group. The hydrocarbon ring may include an aliphatic hydrocarbon ring and/or an aromatic hydrocarbon ring. The heterocycle includes an aliphatic heterocycle and an aromatic heterocycle. The hydrocarbon ring and the heterocycle may be monocycles or polycycles. In addition, the ring formed via the combination with an adjacent group may be combined with another ring to form a spiro structure.

In the present description, the term "adjacent group" may mean a substituent substituted for an atom which is directly combined with an atom substituted with a corresponding substituent, another substituent substituted for an atom which is substituted with a corresponding substituent, or a substituent sterically positioned at the nearest position to a corresponding substituent. For example, in 1,2-dimethylbenzene, two methyl groups may be interpreted as "adjacent groups" to each other, and in 1,1-diethylcyclopentene, two ethyl groups may be interpreted as "adjacent groups" to each other. In addition, in 4,5-dimethylphenanthrene, two methyl groups may be interpreted as "adjacent groups" to each other.

In the present description, a halogen atom may be a fluorine atom, a chlorine atom, a bromine atom, or an iodine atom.

In the present description, an alkyl group may be a linear, branched, or cyclic type (e.g., a linear alkyl group, a branched alkyl group, or a cyclic alkyl group). The carbon number of the alkyl group may be 1 to 50, 1 to 30, 1 to 20, 1 to 10, or 1 to 6. Examples of the alkyl group may include methyl, ethyl, n-propyl, isopropyl, n-butyl, s-butyl, t-butyl, i-butyl, 2-ethylbutyl, 3,3-dimethylbutyl, n-pentyl, i-pentyl, neopentyl, t-pentyl, cyclopentyl, 1-methylpentyl, 3-methylpentyl, 2-ethylpentyl, 4-methyl-2-pentyl, n-hexyl, 1-methylhexyl, 2-ethylhexyl, 2-butylhexyl, cyclohexyl, 4-methylcyclohexyl, 4-t-butylcyclohexyl, n-heptyl, 1-methylheptyl, 2,2-dimethylheptyl, 2-ethylheptyl, 2-butylheptyl, n-octyl, t-octyl, 2-ethyloctyl, 2-butyloctyl, 2-hexyloctyl, 3,7-dimethyloctyl, cyclooctyl, n-nonyl, n-decyl, adamantyl, 2-ethyldecyl, 2-butyldecyl, 2-hexyldecyl, 2-octyldecyl, n-undecyl, n-dodecyl, 2-ethyldodecyl, 2-butyldodecyl, 2-hexyldocecyl, 2-octyldodecyl, n-tridecyl, n-tetradecyl, n-pentadecyl, n-hexadecyl, 2-ethylhexadecyl, 2-butylhexadecyl, 2-hexylhexadecyl, 2-octylhexadecyl, n-heptadecyl, n-octadecyl, n-nonadecyl, n-eicosyl, 2-ethyleicosyl, 2-butyleicosyl, 2-hexyleicosyl, 2-octyleicosyl, n-henicosyl, n-docosyl, n-tricosyl, n-tetracosyl, n-pentacosyl, n-hexacosyl, n-heptacosyl, n-octacosyl, n-nonacosyl, n-triacontyl, etc., without limitation.

In the present description, an alkenyl group may include a hydrocarbon group including one or more carbon double bonds at a main chain (e.g., in the middle) or at a terminal end (e.g., a terminus) of an alkyl group having a carbon number of 2 or more. The alkenyl group may be a linear chain or a branched chain. The carbon number is not specifically limited, but may be 2 to 30, 2 to 20, or 2 to 10. Examples of the alkenyl group include a vinyl group, a 1-butenyl group, a 1-pentenyl group, a 1,3-butadienyl aryl group, a styrenyl group, a styrylvinyl group, etc., without limitation.

In the present description, an alkynyl group may include a hydrocarbon group including one or more carbon triple bonds at a main chain (e.g., in the middle) or at a terminal end (e.g., a terminus) of an alkyl group having a carbon number of 2 or more. The alkynyl group may be a linear chain or a branched chain. The carbon number is not specifically limited, but may be 2 to 30, 2 to 20, or 2 to 10. Examples of the alkynyl group include an ethynyl group, a propynyl group, etc., without limitation.

In the present description, a hydrocarbon ring group may include an optional functional group or substituent derived from an aliphatic hydrocarbon ring. The hydrocarbon ring group may be a saturated hydrocarbon ring group of 5 to 20 ring-forming carbon atoms.

In the present description, an aryl group may include an optional functional group or substituent derived from an aromatic hydrocarbon ring. The aryl group may be a monocyclic aryl group or a polycyclic aryl group. The carbon number for forming rings in the aryl group may be 6 to 30, 6 to 20, or 6 to 15. Examples of the aryl group may include phenyl, naphthyl, fluorenyl, anthracenyl, phenanthryl, biphenyl, terphenyl, quaterphenyl, quinquephenyl, sexiphenyl, triphenylenyl, pyrenyl, benzofluoranthenyl, chrysenyl, etc., without limitation.

In the present description, a fluorenyl group may be substituted, and two substituents may be combined with each other to form a spiro structure. Examples of a substituted fluorenyl group are as follows, but embodiments of the present disclosure are not limited thereto.

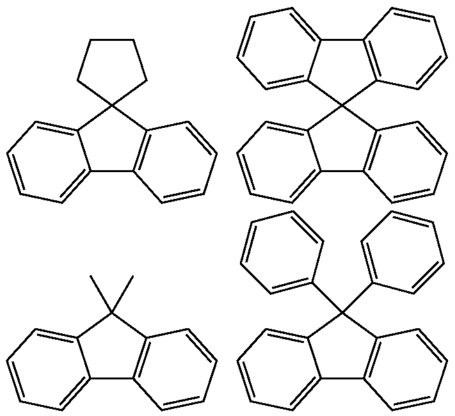

In the present description, a heterocyclic group may include an optional functional group or substituent derived from a ring including one or more among B, O, N, P, Si, and S as heteroatoms. The heterocyclic group may include an aliphatic heterocyclic group and/or an aromatic heterocyclic group. The aromatic heterocyclic group may be a heteroaryl group. The aliphatic heterocyclic group and the aromatic heterocyclic group may be a monocycle or a polycycle.

In the present description, a heterocyclic group may include one or more among B, O, N, P, Si and S as heteroatoms. If the heterocyclic group includes two or more heteroatoms, two or more heteroatoms may be the same or different. In the present description, the heterocyclic group may be a monocyclic heterocyclic group or polycyclic heterocyclic group and has concept including a heteroaryl group. The carbon number for forming rings of the heterocyclic group may be 2 to 30, 2 to 20, or 2 to 10.

In the present description, an aliphatic heterocyclic group may include one or more among B, O, N, P, Si, and S as heteroatoms. The number of ring-forming carbon atoms of the aliphatic heterocyclic group may be 2 to 30, 2 to 20, or 2 to 10. Examples of the aliphatic heterocyclic group may include an oxirane group, a thiirane group, a pyrrolidine group, a piperidine group, a tetrahydrofuran group, a tetrahydrothiophene group, a thiane group, a tetrahydropyran group, a 1,4-dioxane group, etc., without limitation.

In the present description, a heteroaryl group may include one or more among B, O, N, P, Si, and S as heteroatoms. If the heteroaryl group includes two or more heteroatoms, two or more heteroatoms may be the same or different. The heteroaryl group may be a monocyclic heterocyclic group or polycyclic heterocyclic group. The carbon number for forming rings of the heteroaryl group may be 2 to 30, 2 to 20, or 2 to 10. Examples of the heteroaryl group may include thiophene, furan, pyrrole, imidazole, triazole, pyridine, bipyridine, pyrimidine, triazine, triazole, acridyl, pyridazine, pyrazinyl, quinoline, quinazoline, quinoxaline, phenoxazine, phthalazine, pyrido pyrimidine, pyrido pyrazine, pyrazino pyrazine, isoquinoline, indole, carbazole, N-arylcarbazole, N-heteroarylcarbazole, N-alkylcarbazole, benzoxazole, benzoimidazole, benzothiazole, benzocarbazole, benzothiophene, dibenzothiophene, thienothiophene, benzofuran, phenanthroline, thiazole, isoxazole, oxazole, oxadiazole, thiadiazole, phenothiazine, dibenzosilole, dibenzofuran, etc., without limitation.

In the present description, the same explanation of the above-described aryl group may be applied to an arylene group except that the arylene group is a divalent group. The same explanation of the above-described heteroaryl group may be applied to a heteroarylene group except that the heteroarylene group is a divalent group.

In the present description, a boryl group may include an alkyl boryl group and/or an aryl boryl group. Examples of the boryl group include a dimethylboryl group, a diethylboryl group, a t-butylboryl group, a diphenylboryl group, a phenylboryl group, and/or the like, without limitation. For example, the alkyl group in the alkyl boryl group may be the same as the above-described alkyl group, and the aryl group in the aryl boryl group may be the same as the above-described aryl group.

In the present description, a silyl group may include an alkyl silyl group and/or an aryl silyl group. Examples of the silyl group include a trimethylsilyl group, a triethylsilyl group, a t-butyldimethylsilyl group, a vinyldimethylsilyl group, a propyldimethylsilyl group, a triphenylsilyl group, a diphenylsilyl group, a phenylsilyl group, etc., without limitation.

In the present description, the carbon number of a carbonyl group is not specifically limited, but the carbon number may be 1 to 40, 1 to 30, or 1 to 20. For example, the carbonyl group may have the structures below, but is not limited thereto.

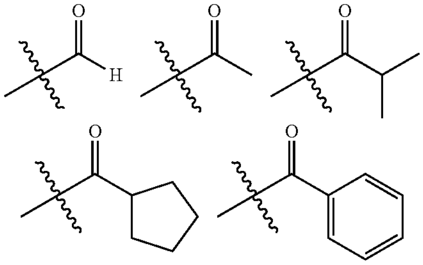

In the present description, the carbon number of a sulfinyl group and sulfonyl group is not specifically limited, but may be 1 to 30. The sulfinyl group may include an alkyl sulfinyl group and/or an aryl sulfinyl group. The sulfonyl group may include an alkyl sulfonyl group and/or an aryl sulfonyl group.

In the present description, a thio group may include an alkyl thio group and/or an aryl thio group. The thio group may mean the above-defined alkyl group or aryl group combined with a sulfur atom. Examples of the thio group include a methylthio group, an ethylthio group, a propylthio group, a pentylthio group, a hexylthio group, an octylthio group, a dodecylthio group, a cyclopentylthio group, a cyclohexylthio group, a phenylthio group, a naphthylthio group, etc., without limitation.

In the present description, an oxy group may include the above-defined alkyl group and/or aryl group which is combined with an oxygen atom. The oxy group may include an alkoxy group and/or an aryl oxy group. The alkoxy group may be a linear, branched or cyclic chain (e.g., a linear alkoxy group, a branched alkoxy group, or a cyclic alkoxy group). The carbon number of the alkoxy group is not specifically limited but may be, for example, 1 to 20 or 1 to 10. Examples of the oxy group may include methoxy, ethoxy, n-propoxy, isopropoxy, butoxy, pentyloxy, hexyloxy, octyloxy, nonyloxy, decyloxy, benzyloxy, etc. However, embodiments of the present disclosure are not limited thereto.

In the present description, the carbon number of an amine group is not specifically limited, but may be 1 to 30. The amine group may include an alkyl amine group and an aryl amine group. Examples of the amine group include a methylamine group, a dimethylamine group, a phenylamine group, a diphenylamine group, a naphthylamine group, a 9-methyl-anthracenylamine group, a triphenylamine group, etc., without limitation.

In the present description, alkyl groups in an alkylthio group, alkylsulfoxy group, alkylaryl group, alkylamino group, alkylboron group, alkyl silyl group, and alkyl amine group may be the same as the examples of the above-described alkyl group.

In the present description, aryl groups in an aryloxy group, arylthio group, arylsulfoxy group, aryl amino group, arylboron group, and aryl silyl group may be the same as the examples of the above-described aryl group.

In the present description, a direct linkage may mean a single bond (e.g., a single covalent bond).

In the present description,

“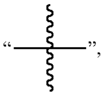”, and “” mean positions to be connected.

Hereinafter, the light emitting element of an embodiment will be further explained referring to the drawings.

Figure 2:
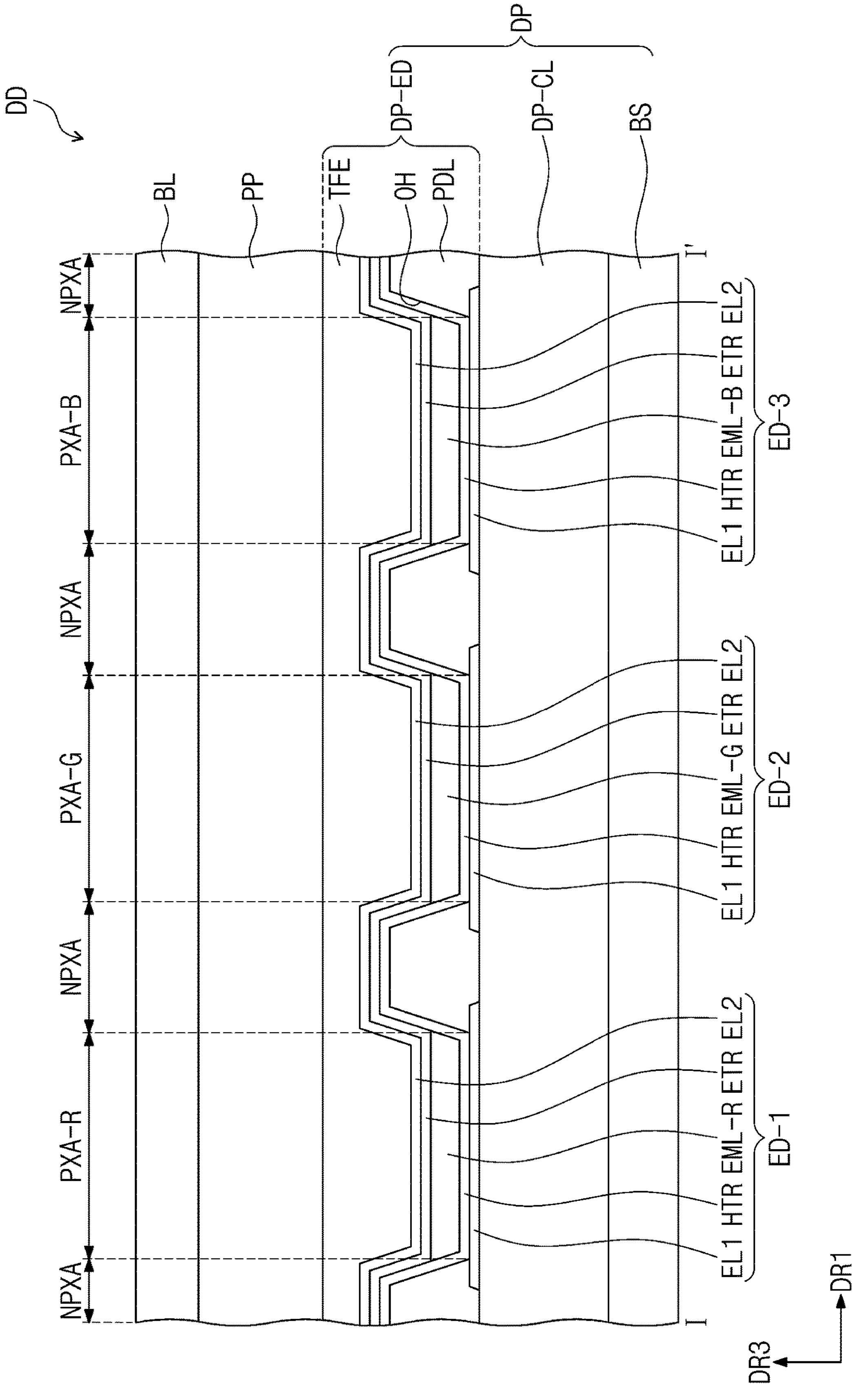
FIG. 2 is a cross-sectional view of a display apparatus according to an embodiment.

FIG. 1 is a plan view of an embodiment of a display apparatus DD. FIG. 2 is a cross-sectional view of a portion of the display apparatus DD of FIG. 1 taken along a line I-I' of FIG. 1.

The display apparatus DD may include a display panel DP and an optical layer PP on the display panel DP. The display panel DP may include light emitting elements ED-1, ED-2 and ED-3. The display apparatus DD may include a plurality of light emitting elements ED-1, ED-2 and ED-3. The optical layer PP may be on the display panel DP and control reflected light by external light at the display panel DP. The optical layer PP may include, for example, a polarization layer and/or a color filter layer. In some embodiments, different from the drawings, the optical layer PP may be omitted from the display apparatus DD.

A base substrate BL may be on the optical layer PP. The base substrate BL may be a member providing a base surface that the optical layer PP is on. The base substrate BL may be a glass substrate, a metal substrate, a plastic substrate, etc. However, embodiments of the present disclosure are not limited thereto, and the base substrate BL may be an inorganic layer, an organic layer or a composite material layer. Different from the drawings, the base substrate BL may be omitted from an embodiment.

The display apparatus DD according to an embodiment may further include a plugging layer. The plugging layer may be between a display element layer DP-ED and a base substrate BL. The plugging layer may be an organic layer. The plugging layer may include at least one selected from among an acrylic resin, a silicon-based resin and an epoxy-based resin.

The display panel DP may include a base layer BS, a circuit layer DP-CL provided on the base layer BS and a display element layer DP-ED. The display element layer DP-ED may include a pixel definition layer PDL, light emitting elements ED-1, ED-2 and ED-3 in the pixel definition layer PDL, and an encapsulating layer TFE on the light emitting elements ED-1, ED-2 and ED-3.

The base layer BS may be a member providing a base surface that the display element layer DP-ED is on. The base layer BS may be a glass substrate, a metal substrate, a plastic substrate, etc. However, embodiments of the present disclosure are not limited thereto, and the base layer BS may be an inorganic layer, an organic layer or a composite material layer.

In an embodiment, the circuit layer DP-CL is on the base layer BS, and the circuit layer DP-CL may include a plurality of transistors. Each of the transistors may include a control electrode, an input electrode, and an output electrode. For example, the circuit layer DP-CL may include switching transistors and/or driving transistors for driving the light emitting elements ED-1, ED-2 and ED-3 of the display element layer DP-ED.

The light emitting elements ED-1, ED-2 and ED-3 may have the structures of the light emitting elements ED of embodiments according to FIG. 3 to FIG. 6, which will be further explained herein below. The light emitting elements ED-1, ED-2 and ED-3 may include a first electrode EL1, a hole transport region HTR, emission layers EML-R, EML-G and EML-B, an electron transport region ETR and a second electrode EL2.

In FIG. 2, the emission layers EML-R, EML-G and EML-B of light emitting elements ED-1, ED-2 and ED-3 are in opening portions OH defined in a pixel definition layer PDL, and a hole transport region HTR, an electron transport region ETR and a second electrode EL2 are provided as common layers in all light emitting elements ED-1, ED-2 and ED-3. However, embodiments of the present disclosure are not limited thereto. Different from FIG. 2, in an embodiment, the hole transport region HTR and the electron transport region ETR may be patterned and provided in the opening portions OH defined in the pixel definition layer PDL. For example, in an embodiment, the hole transport region HTR, the emission layers EML-R, EML-G and EML-B, and the electron transport region ETR of the light emitting elements ED-1, ED-2 and ED-3 may be patterned by an ink jet printing method and provided.

An encapsulating layer TFE may cover the light emitting elements ED-1, ED-2 and ED-3. The encapsulating layer TFE may encapsulate the display element layer DP-ED. The encapsulating layer TFE may be a thin film encapsulating layer. The encapsulating layer TFE may be one layer or a stacked layer of a plurality of layers. The encapsulating layer TFE includes at least one insulating layer. The encapsulating layer TFE according to an embodiment may include at least one inorganic layer (hereinafter, encapsulating inorganic layer). In addition, the encapsulating layer TFE according to an embodiment may include at least one organic layer (hereinafter, encapsulating organic layer) and at least one encapsulating inorganic layer.

The encapsulating inorganic layer protects the display element layer DP-ED from moisture/oxygen, and the encapsulating organic layer protects the display element layer DP-ED from foreign materials such as dust particles. The encapsulating inorganic layer may include silicon nitride, silicon oxy nitride, silicon oxide, titanium oxide, and/or aluminum oxide, without specific limitation. The encapsulating organic layer may include an acrylic compound, an epoxy-based compound, etc. The encapsulating organic layer may include a photopolymerizable organic material, without specific limitation.

The encapsulating layer TFE may be on the second electrode EL2 and may be provided while filling the opening portion OH.

Referring to FIG. 1 and FIG. 2, the display apparatus DD may include a non-emissive area NPXA and emissive areas PXA-R, PXA-G and PXA-B. The emissive areas PXA-R, PXA-G and PXA-B may be areas that emit light produced from the light emitting elements ED-1, ED-2 and ED-3, respectively. The emissive areas PXA-R, PXA-G and PXA-B may be separated from (spaced apart from) each other on a plane.

The emissive areas PXA-R, PXA-G and PXA-B may be areas separated by the pixel definition layer PDL. The non-emissive areas NPXA may be areas between neighboring emissive areas PXA-R, PXA-G and PXA-B and may be areas corresponding to the pixel definition layer PDL. In some embodiments, each of the emissive areas PXA-R, PXA-G and PXA-B may correspond to each pixel. The pixel definition layer PDL may divide the light emitting elements ED-1, ED-2 and ED-3. The emission layers EML-R, EML-G and EML-B of the light emitting elements ED-1, ED-2 and ED-3 may be provided and divided in the opening portions OH defined in the pixel definition layer PDL.

The emissive areas PXA-R, PXA-G and PXA-B may be divided into a plurality of groups according to the color of light produced from the light emitting elements ED-1, ED-2 and ED-3. In the display apparatus DD of an embodiment, shown in FIG. 1 and FIG. 2, three emissive areas PXA-R, PXA-G and PXA-B emitting red light, green light and blue light are illustrated as an embodiment. For example, the display apparatus DD of an embodiment may include a red emissive area PXA-R, a green emissive area PXA-G and a blue emissive area PXA-B, which are separated from (spaced apart from) each other.

In the display apparatus DD according to an embodiment, a plurality of light emitting elements ED-1, ED-2 and ED-3 may emit light having different wavelength regions. For example, in an embodiment, the display apparatus DD may include a first light emitting element ED-1 emitting red light, a second light emitting element ED-2 emitting green light, and a third light emitting element ED-3 emitting blue light. In some embodiments, each of the red emissive area PXA-R, the green emissive area PXA-G, and the blue emissive area PXA-B of the display apparatus DD may correspond to the first light emitting element ED-1, the second light emitting element ED-2, and the third light emitting element ED-3.

However, embodiments of the present disclosure are not limited thereto, and the first to third light emitting elements ED-1, ED-2 and ED-3 may emit light in the same wavelength region, or at least one thereof may emit light in a different wavelength region. For example, all the first to third light emitting elements ED-1, ED-2 and ED-3 may emit blue light.

The emissive areas PXA-R, PXA-G and PXA-B in the display apparatus DD according to an embodiment may be arranged in a stripe shape. Referring to FIG. 1, a plurality of red emissive areas PXA-R, a plurality of green emissive areas PXA-G and a plurality of blue emissive areas PXA-B may be arranged along a second directional axis DR2. In addition, the red emissive area PXA-R, the green emissive area PXA-G and the blue emissive area PXA-B may be arranged by turns (e.g., successively or alternatingly) along a first directional axis DR1.

In FIG. 1 and FIG. 2, the areas of the emissive areas PXA-R, PXA-G and PXA-B are shown similar, but embodiments of the present disclosure are not limited thereto. The areas of the emissive areas PXA-R, PXA-G and PXA-B may be different from each other according to the wavelength region of light emitted. In some embodiments, the areas of the emissive areas PXA-R, PXA-G and PXA-B may mean areas on a plane defined by the first directional axis DR1 and the second directional axis DR2.

The arrangement type (or pattern) of the emissive areas PXA-R, PXA-G and PXA-B is not limited to the configuration shown in FIG. 1, and the arrangement order of the red emissive areas PXA-R, the green emissive areas PXA-G and the blue emissive areas PXA-B may be provided in various suitable combinations according to the properties of display quality required for the display apparatus DD. For example, the arrangement type (or pattern) of the emissive areas PXA-R, PXA-G and PXA-B may be a PENTILE® arrangement type (e.g., an arrangement structure such as an RGBG matrix, RGBG structure, or RGBG matrix structure), or a diamond arrangement type (or pattern). PENTILE® is a duly registered trademark of Samsung Display Co., Ltd.

In addition, the areas of the emissive areas PXA-R, PXA-G and PXA-B may be different from each other. For example, in an embodiment, the area of the green emissive area PXA-G may be smaller than the area of the blue emissive area PXA-B, but embodiments of the present disclosure are not limited thereto.

Hereinafter, FIG. 3 to FIG. 6 are cross-sectional views schematically showing light emitting elements according to embodiments. The light emitting element ED according to an embodiment may include a first electrode EL1, a second electrode EL2 opposite to the first electrode EL1, and at least one functional layer between the first electrode EL1 and the second electrode EL2. The light emitting element ED of an embodiment may include an amine compound of an embodiment, which will be further explained herein below, in the at least one functional layer.

Figure 3:
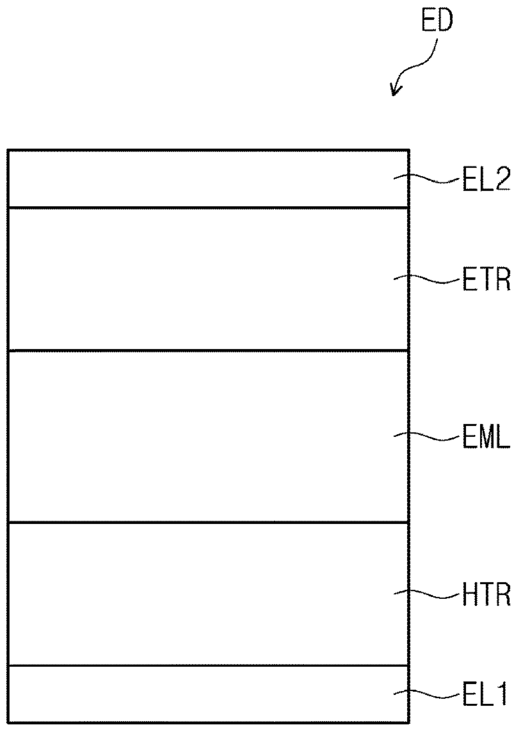
FIG. 3 is a schematic cross-sectional view of a light emitting element of an embodiment.

The light emitting element ED may include a hole transport region HTR, an emission layer EML, an electron transport region ETR, or the like, stacked in order, as the at least one functional layer. Referring to FIG. 3, the light emitting element ED of an embodiment may include a first electrode EL1, a hole transport region HTR, an emission layer EML, an electron transport region ETR, and a second electrode EL2, stacked in order.

Figure 4:
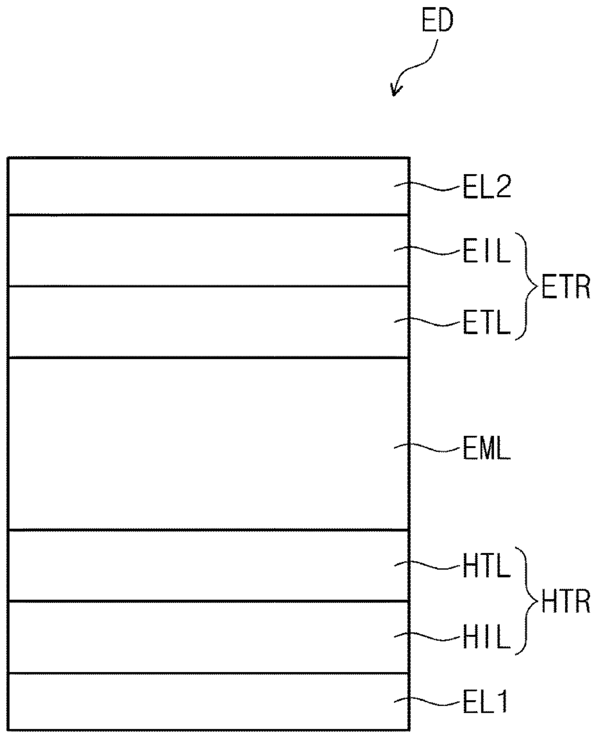
FIG. 4 is a schematic cross-sectional view of a light emitting element of an embodiment.
Figure 5:
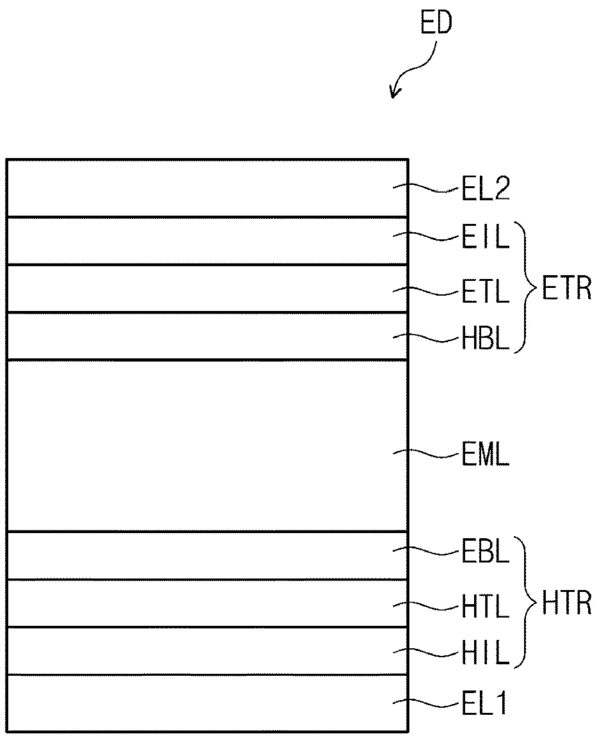
FIG. 5 is a schematic cross-sectional view of a light emitting element of an embodiment.
Figure 6:
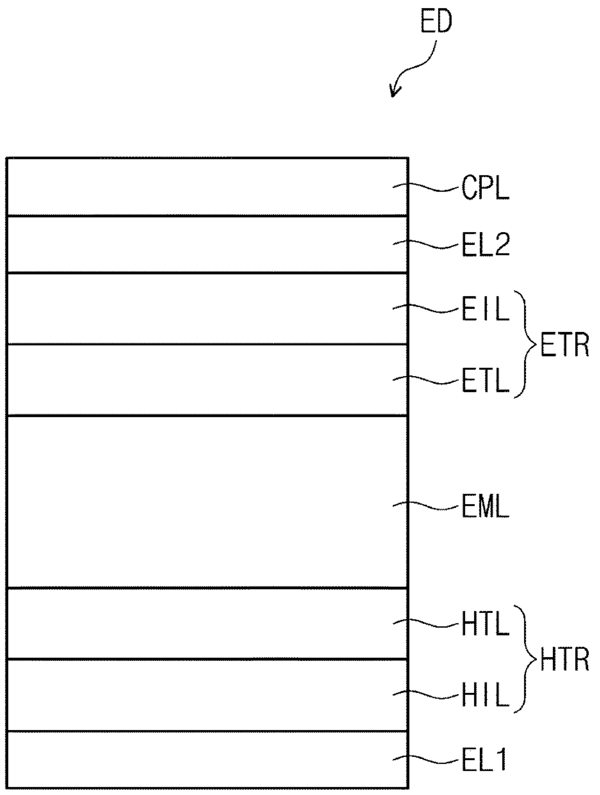
FIG. 6 is a schematic cross-sectional view of a light emitting element of an embodiment.

When compared with FIG. 3, FIG. 4 shows the cross-sectional view of a light emitting element ED of an embodiment, wherein a hole transport region HTR includes a hole injection layer HIL and a hole transport layer HTL, and an electron transport region ETR includes an electron injection layer EIL and an electron transport layer ETL. In addition, when compared with FIG. 3, FIG. 5 shows the cross-sectional view of a light emitting element ED of an embodiment, wherein a hole transport region HTR includes a hole injection layer HIL, a hole transport layer HTL, and an electron blocking layer EBL, and an electron transport region ETR includes an electron injection layer EIL, an electron transport layer ETL, and a hole blocking layer HBL. When compared with FIG. 4, FIG. 6 shows the cross-sectional view of a light emitting element ED of an embodiment, including a capping layer CPL on the second electrode EL2.

The light emitting element ED of an embodiment may include an amine compound of an embodiment, which will be further explained herein below, in a hole transport region HTR. The light emitting element ED of an embodiment may include an amine compound of an embodiment in at least one selected from among the hole injection layer HIL, hole transport layer HTL and electron blocking layer EBL of the hole transport region HTR.

In the light emitting element ED according to an embodiment, the first electrode EL1 has conductivity (e.g., electrical conductivity). The first electrode EL1 may be formed using a metal material, a metal alloy and/or a conductive compound. The first electrode EL1 may be an anode or a cathode. However, embodiments of the present disclosure are not limited thereto. In addition, the first electrode EL1 may be a pixel electrode. The first electrode EL1 may be a transmissive electrode, a transflective electrode, or a reflective electrode. The first electrode EL1 may include at least one selected from among Ag, Mg, Cu, Al, Pt, Pd, Au, Ni, Nd, Ir, Cr, Li, Ca, LiF, Mo, Ti, W, In, Sn, Zn, compounds of two or more selected therefrom, mixtures of two or more selected therefrom, and oxides thereof.

If the first electrode EL1 is the transmissive electrode, the first electrode EL1 may include a transparent metal oxide such as indium tin oxide (ITO), indium zinc oxide (IZO), zinc oxide (ZnO), and/or indium tin zinc oxide (ITZO). If the first electrode EL1 is the transflective electrode or the reflective electrode, the first electrode EL1 may include Ag, Mg, Cu, Al, Pt, Pd, Au, Ni, Nd, Ir, Cr, Li, Ca, LiF/Ca (a stacked structure of LiF and Ca), LiF/Al (a stacked structure of LiF and Al), Mo, Ti, W, compounds thereof, and/or mixtures thereof (for example, a mixture of Ag and Mg). Also, the first electrode EL1 may have a structure including a plurality of layers including a reflective layer or a transflective layer formed using the above materials, and a transmissive conductive layer formed using ITO, IZO, ZnO, or ITZO. For example, the first electrode EL1 may have a three-layer structure of ITO/Ag/ITO. However, embodiments of the present disclosure are not limited thereto. The first electrode EL1 may include the above-described metal materials, combinations of two or more metal materials selected from the above-described metal materials, and/or oxides of the above-described metal materials. The thickness of the first electrode EL1 may be from about 700 Å to about 10,000 Å. For example, the thickness of the first electrode EL1 may be from about 1,000 Å to about 3,000 Å.

The hole transport region HTR is provided on the first electrode EL1. The hole transport region HTR may have a single layer formed using a single material, a single layer formed using a plurality of different materials, or a multilayer structure including a plurality of layers formed using a plurality of different materials.

The hole transport region HTR may include at least one of a hole injection layer HIL, a hole transport layer HTL, or an electron blocking layer EBL. In some embodiments, the hole transport region HTR may include a plurality of hole transport layers stacked.

In some embodiments, the hole transport region HTR may have the structure of a single layer of a hole injection layer HIL or a hole transport layer HTL, and may have a structure of a single layer formed using a hole injection material and a hole transport material. In an embodiment, the hole transport region HTR may have a structure of a single layer formed using a plurality of different materials, or a structure stacked from the first electrode EL1 of hole injection layer HIL/hole transport layer HTL, hole injection layer HIL/hole transport layer HTL/buffer layer, hole injection layer HIL/buffer layer, or hole transport layer HTL/buffer layer, without limitation.

The thickness of the hole transport region HTR may be, for example, about 50 Å to about 15,000 Å. The hole transport region HTR may be formed using various suitable methods such as a vacuum deposition method, a spin coating method, a cast method, a Langmuir-Blodgett (LB) method, an inkjet printing method, a laser printing method, and/or a laser induced thermal imaging (LITI) method.

The light emitting element ED of an embodiment may include the amine compound of an embodiment, represented by Formula 1 in a hole transport region HTR. In the light emitting element ED of an embodiment, a hole transport layer HTL may include the amine compound of an embodiment, represented by Formula 1 below.

Formula 1

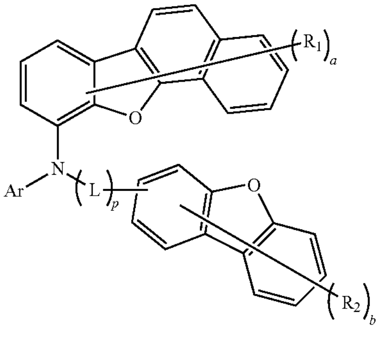

The amine compound of an embodiment may include a benzonaphthofuran moiety directly linked to a nitrogen atom, and a dibenzofuran moiety bonded via a linker or directly to the nitrogen atom. In addition, in the amine compound of an embodiment, the oxygen atom of the benzonaphthofuran moiety bonded to the nitrogen atom may be bonded at an ortho position with respect to the nitrogen atom.

In Formula 1, Ar may be a substituted or unsubstituted alkyl group of 1 to 20 carbon atoms, a substituted or unsubstituted alkenyl group of 2 to 20 carbon atoms, a substituted or unsubstituted alkynyl group of 2 to 20 carbon atoms, a substituted or unsubstituted oxy group, a substituted or unsubstituted aryl group of 6 to 40 ring-forming carbon atoms, or a substituted or unsubstituted oxygen-containing heteroaryl group of 5 to 40 ring-forming carbon atoms. In the amine compound of some embodiments, if Ar includes a heteroatom, the heteroatom may be an oxygen atom. In the amine compound of some embodiments, Ar may not include a nitrogen atom or a sulfur atom as the heteroatom. As used herein, in the "substituted or unsubstituted" among the definition of Ar of Formula 1, a substituent may include a deuterium atom.

In the amine compound of an embodiment, Ar may be a substituted or unsubstituted aryl group of 6 to 40 ring-forming carbon atoms. For example, Ar may be a substituted or unsubstituted phenyl group, a substituted or unsubstituted biphenyl group, a substituted or unsubstituted terphenyl group, a substituted or unsubstituted naphthyl group, a substituted or unsubstituted phenanthrenyl group, or a substituted or unsubstituted dibenzofuranyl group. However, embodiments of the present disclosure are not limited thereto.

In Formula 1, "p" may be an integer of 0 to 3. If "p" is 0, the dibenzofuran moiety may be directly bonded to the nitrogen atom of the amine. If "p" is an integer of 2 or more, a plurality of L may be all the same, or at least one may be different from the remainder. For example, "p" may be 0 or 1.

In Formula 1, L may be a direct linkage, a substituted or unsubstituted arylene group of 6 to 40 ring-forming carbon atoms, or a substituted or unsubstituted heteroarylene group of 5 to 40 ring-forming carbon atoms. If L is a substituted or unsubstituted heteroarylene group of 5 to 40 ring-forming carbon atoms, the heteroarylene group may include an oxygen atom as a heteroatom. In the amine compound of some embodiments, L may be a direct linkage or an unsubstituted phenylene group. However, embodiments of the present disclosure are not limited thereto. As used herein, in the "substituted or unsubstituted" among the definition of L of Formula 1, a substituent may include a deuterium atom.

In Formula 1, "a" may be an integer of 0 to 9, and "b" may be an integer of 0 to 7. $R_1$ and $R_2$ may be each independently a hydrogen atom, a deuterium atom, a substituted or unsubstituted alkyl group of 1 to 20 carbon atoms, a substituted or unsubstituted alkenyl group of 2 to 20 carbon atoms, a substituted or unsubstituted alkynyl group of 2 to 20 carbon atoms, a substituted or unsubstituted oxy group, a substituted or unsubstituted aryl group of 6 to 40 ring-forming carbon atoms, or a substituted or unsubstituted heteroaryl group of 5 to 40 ring-forming carbon atoms. In some embodiments, if $R_1$ or $R_2$ is a substituted or unsubstituted heteroaryl group of 5 to 40 ring-forming carbon atoms, the heteroaryl group may include an oxygen atom as a heteroatom.

In some embodiments, if "a" is an integer of 2 or more, a plurality of $R_1$ may be all the same, or at least one may be different from the remainder. In some embodiments, if "a" is 0, the benzonaphthofuran moiety may be unsubstituted. If "b" is an integer of 2 or more, a plurality of $R_2$ may be all the same, or at least one may be different from the remainder. In some embodiments, if "b" is 0, the dibenzofuran moiety may be unsubstituted.

In some embodiments, at least one selected from among Ar, L, $R_1$, and $R_2$ of Formula 1 may include a deuterium atom, or a substituent including a deuterium atom. In the amine compound of some embodiments, an optional hydrogen atom may be deuterated. The amine compound of some embodiments may include at least one deuterium atom as a substituent.

In some embodiments, the amine compound may be a monoamine compound. The amine compound of some embodiments may not include an amine group as a substituent. For example, in the amine compound of some embodiments, represented by Formula 1, Ar, $R_1$, and $R_2$ may not include a substituted or unsubstituted amine group. In addition, the amine compound of some embodiments may not include a heterocyclic group other than an oxygen-containing heterocyclic group.

In some embodiments, Formula 1 may be represented by any one selected from among Formula 1-1 to Formula 1-4 below. Formula 1-1 to Formula 1-4 correspond to cases where the bonding positions of dibenzofuran moieties are different. In Formula 1-1 to Formula 1-4, the same explanation on Ar, "p", L, "a", "b", $R_1$ and $R_2$ referring to Formula 1 may be applied.

Formula 1-1

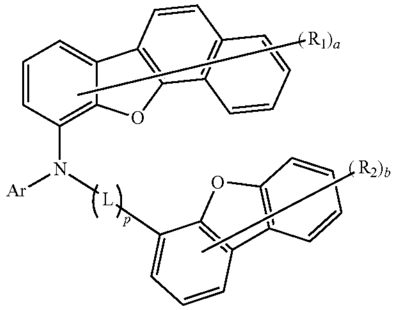

-continued

Formula 1-2

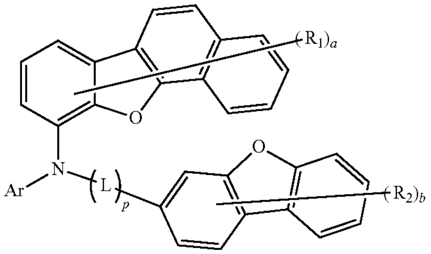

Formula 1-3

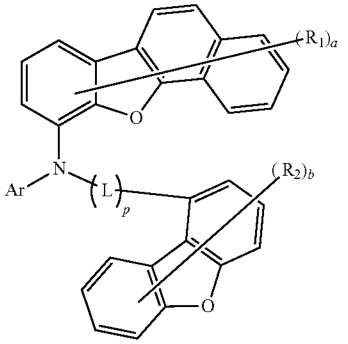

Formula 1-4

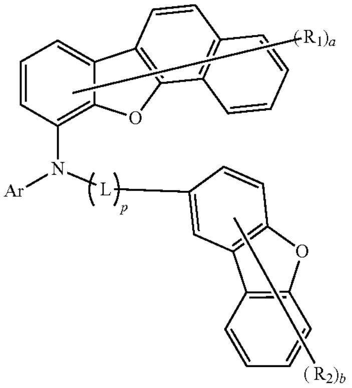

In the amine compound of some embodiments, represented by Formula 1 may be represented by Formula 1A or Formula 1B below. In Formula 1A or Formula 1B, the same explanation on Ar, "a", "b", $R_1$ and $R_2$ referring to Formula 1 may be applied.

Formula 1A

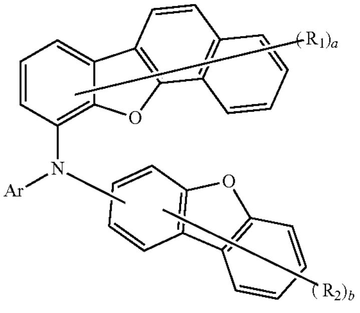

-continued

Formula 1B

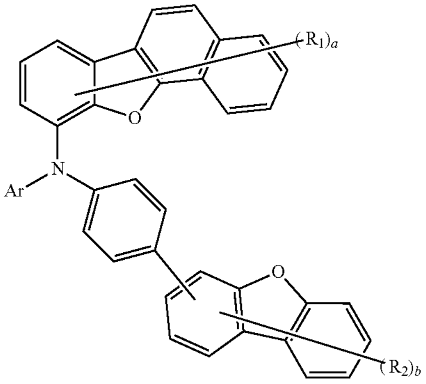

The amine compound of some embodiments, represented by Formula 1 may be represented by any one selected from among the compounds in Compound Group 1 below. The hole transport region HTR of the light emitting element ED of some embodiments may include at least one selected from among the amine compounds shown in Compound Group 1 below. In Compound Group 1 below, D is a deuterium atom.

Compound Group 1

A1

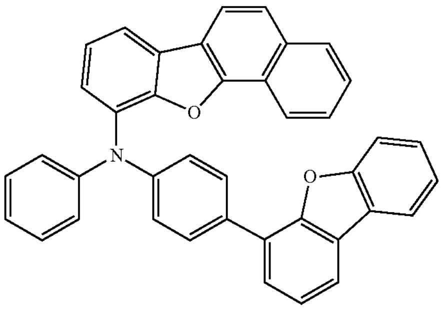

A2

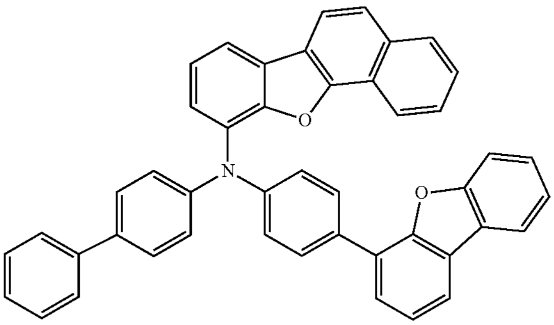

-continued

A3

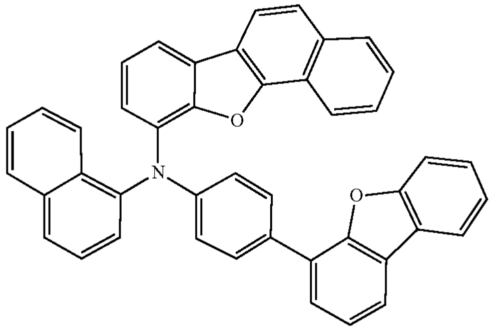

A4

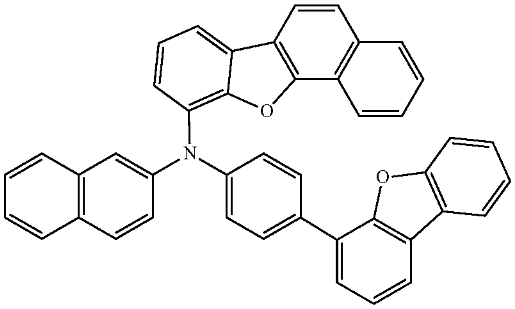

A5

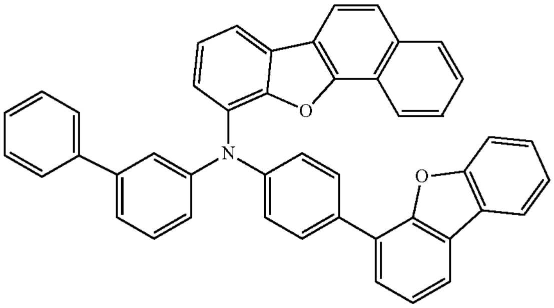

A6

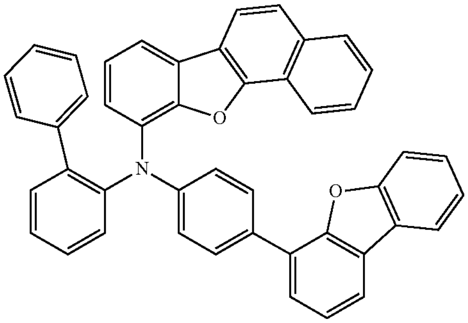

-continued
A7
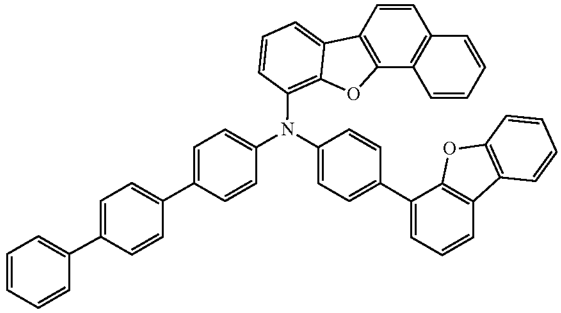
A8
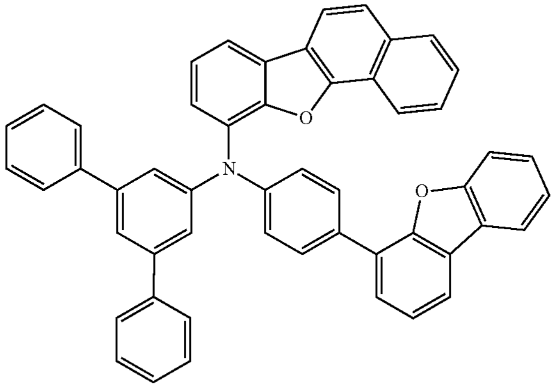
A9
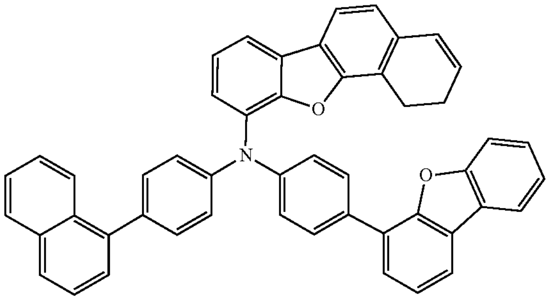
A10
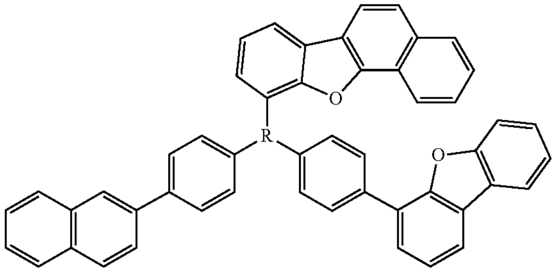
-continued
A11
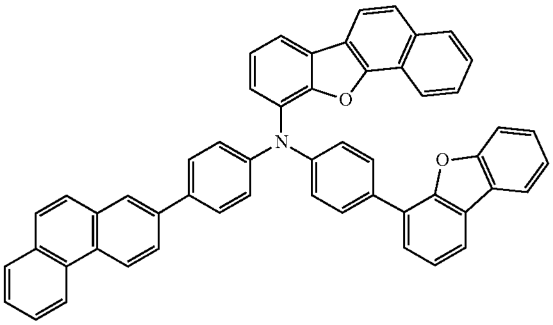
A12
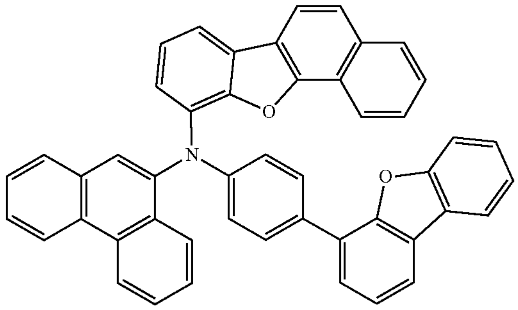
A13
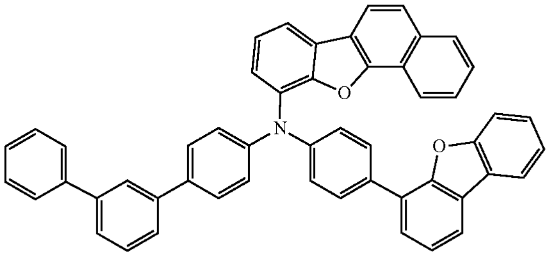
A14
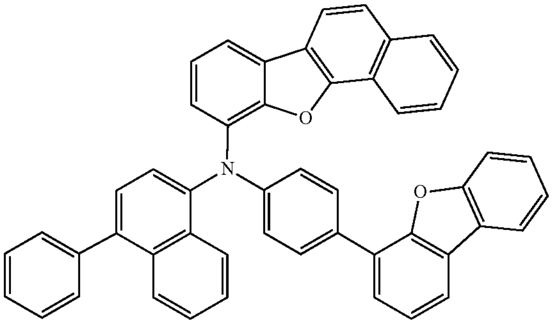
A15
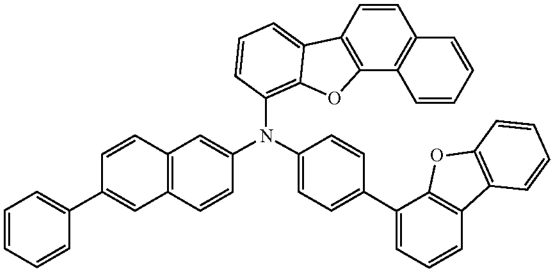

-continued
A16
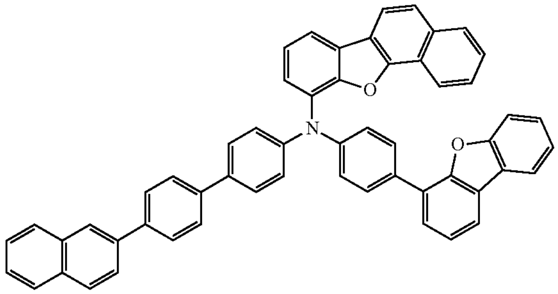
A17
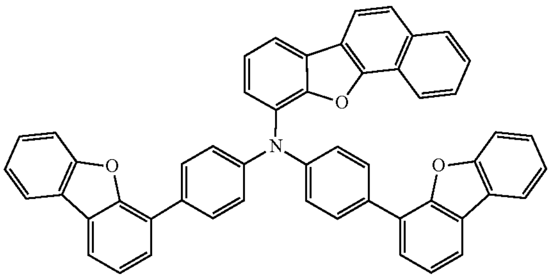
A18
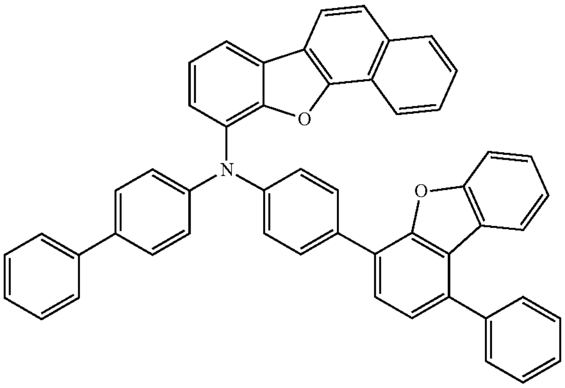
A19
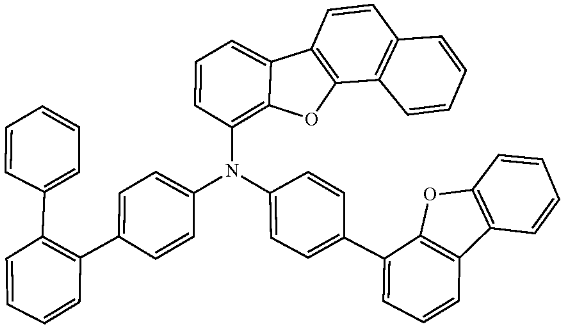
-continued
A20
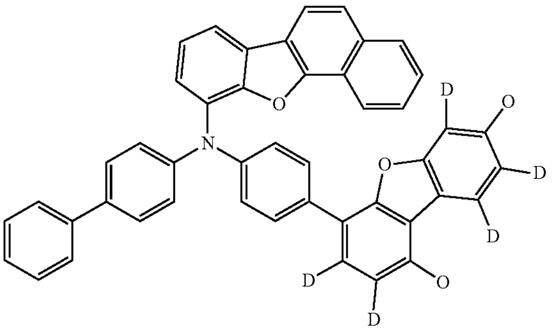
B1
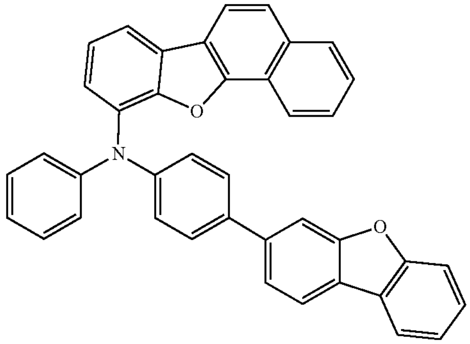
B2
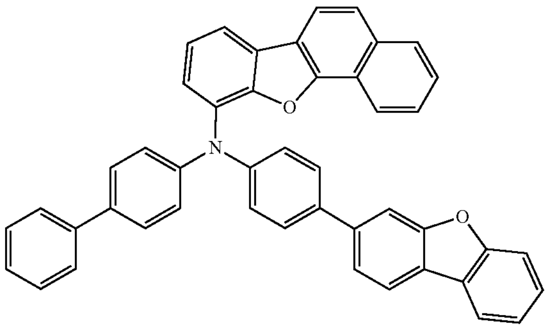
B3
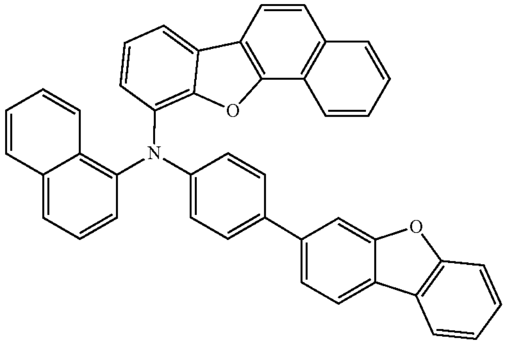

-continued
B4
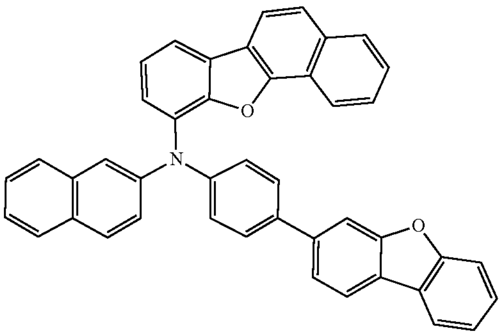
B5
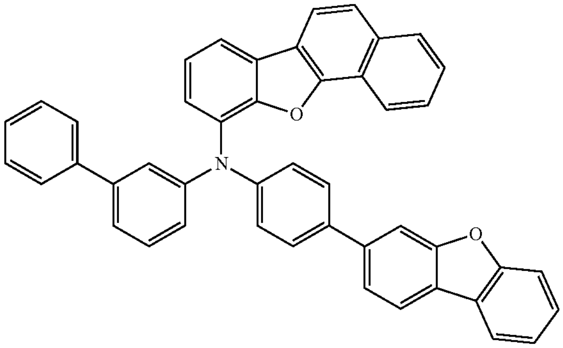
B6
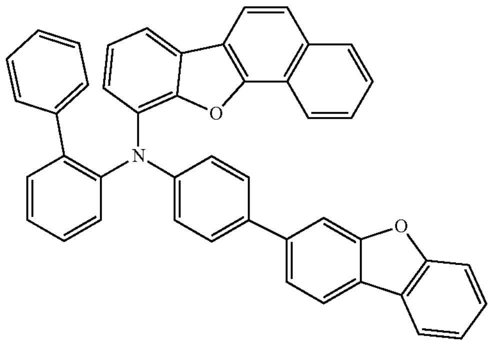
B7
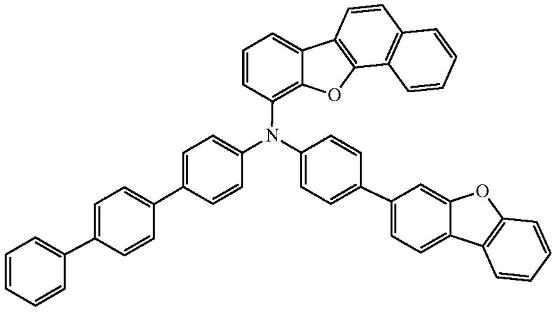
-continued
B8
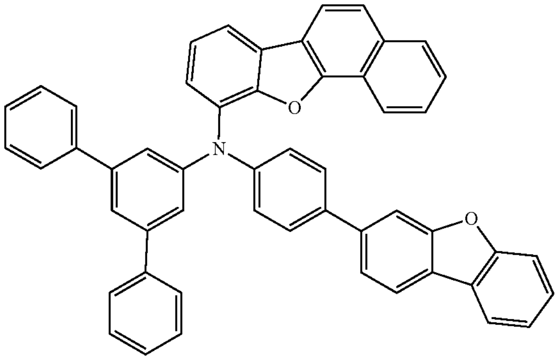
B9
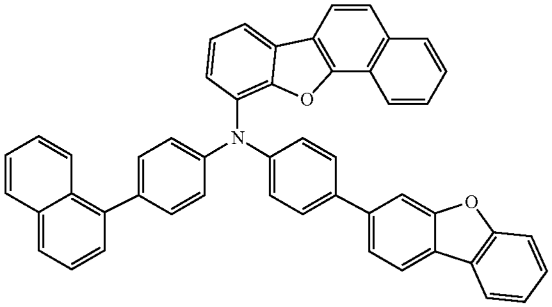
B10
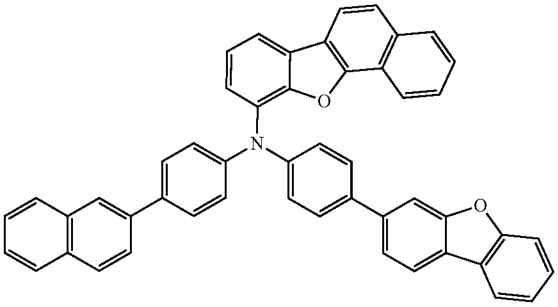
B11
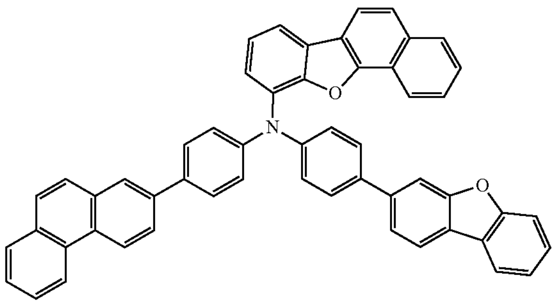

-continued
B12
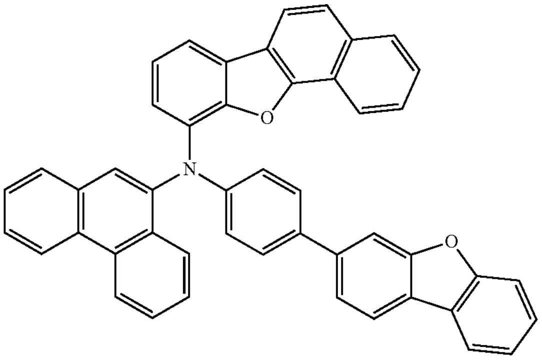
B13
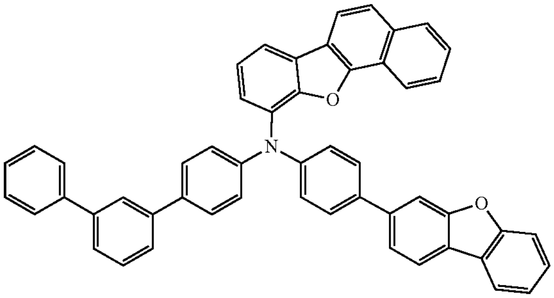
B14
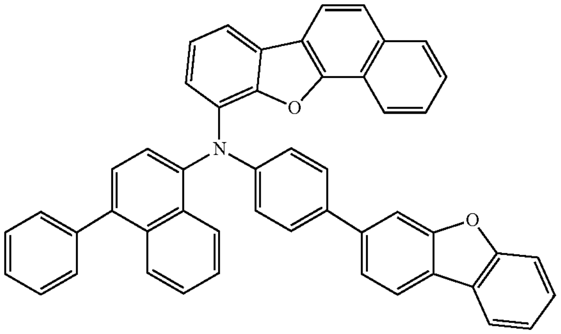
B15
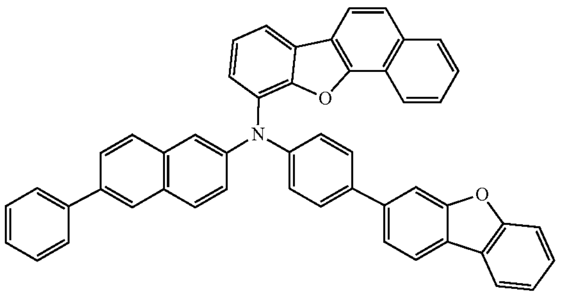
-continued
B16
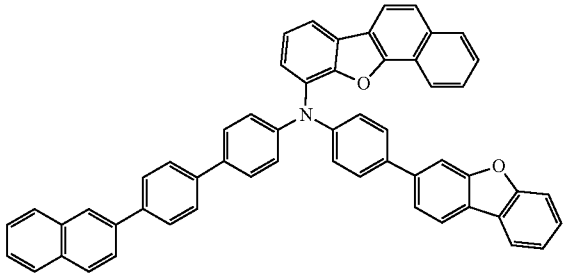
B17
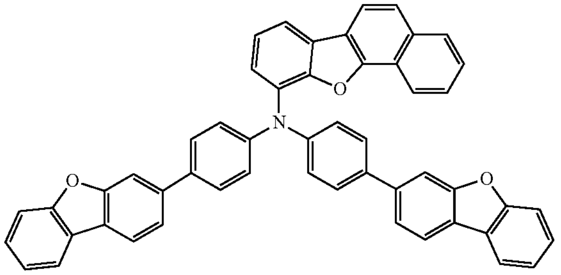
B18
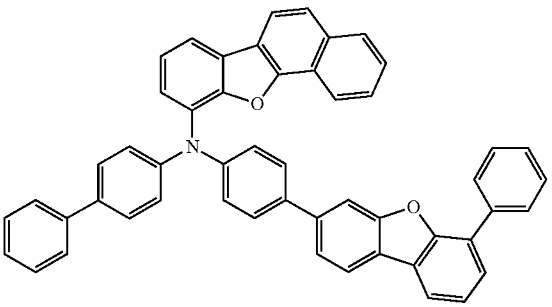
B19
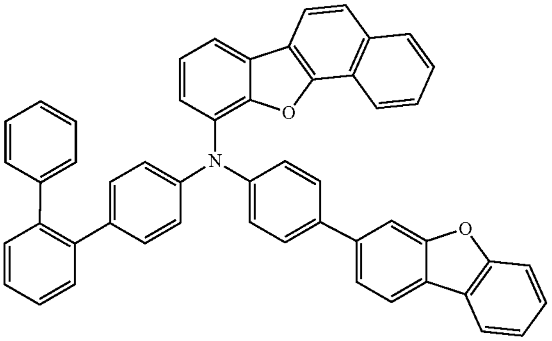

-continued
B20
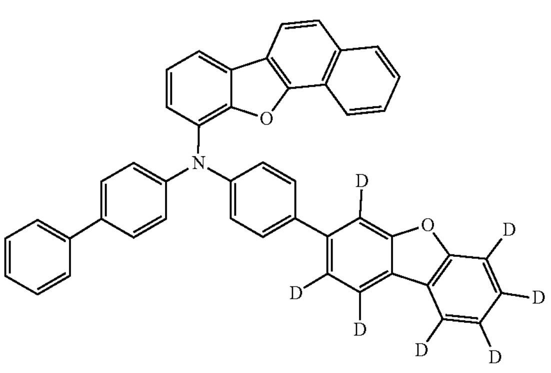
C1
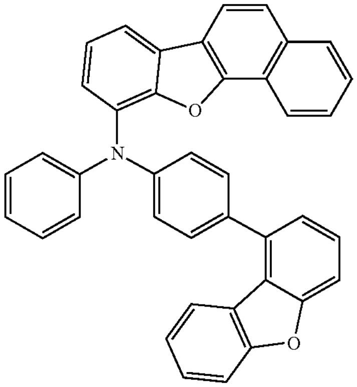
C2
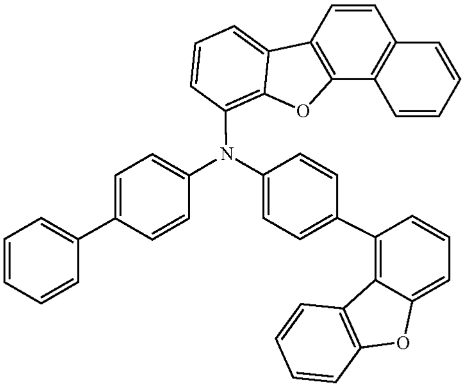
C3
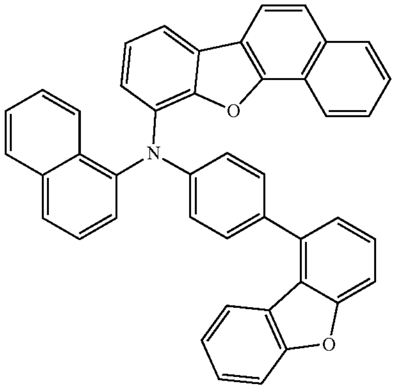
-continued
C4
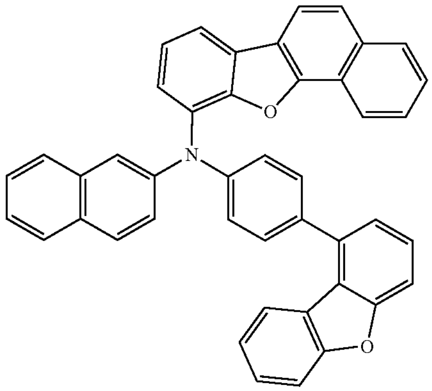
C5
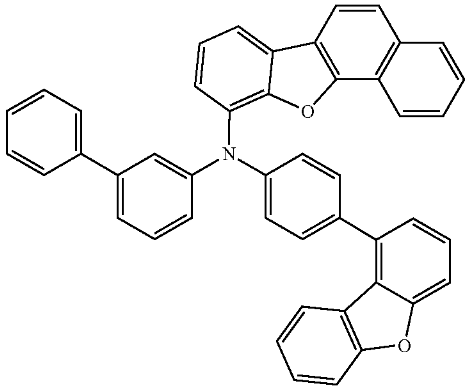
C6
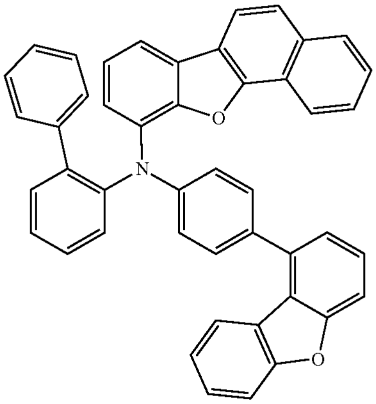
C7
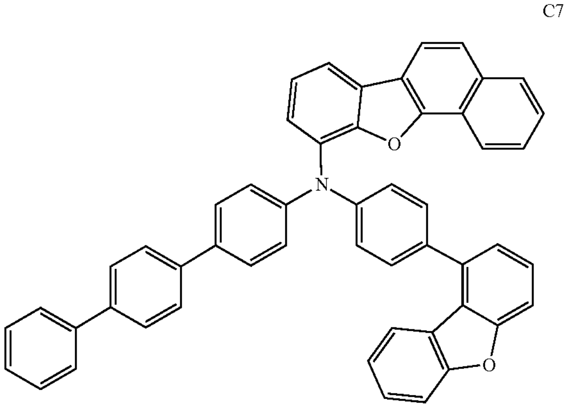

-continued
C8
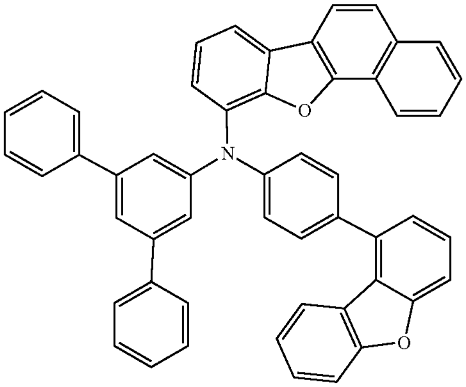
C9
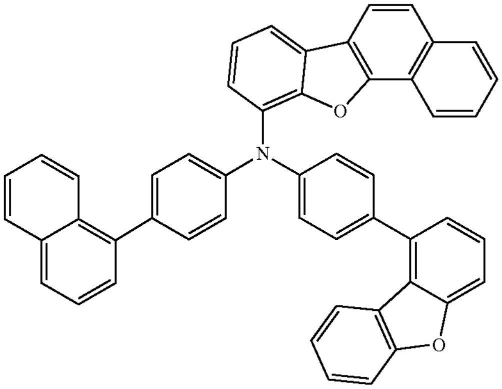
C10
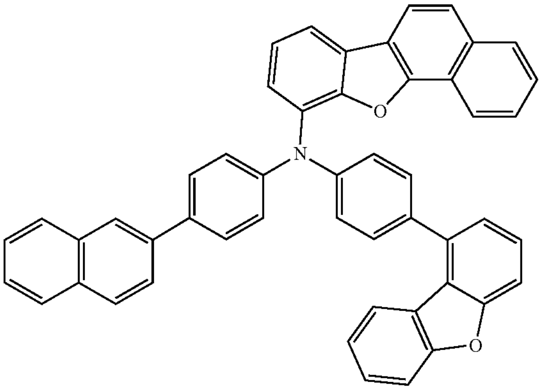
C11
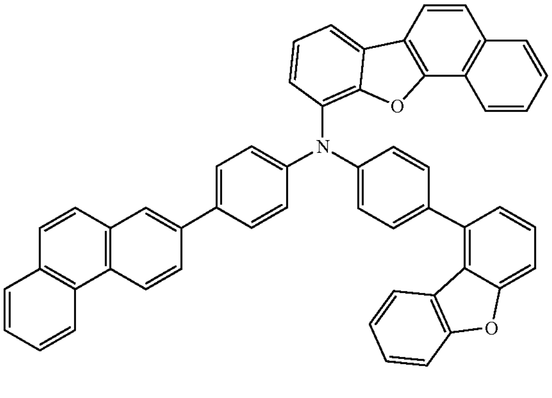
-continued
C12
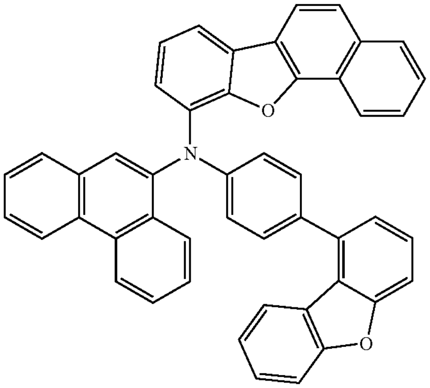
C13
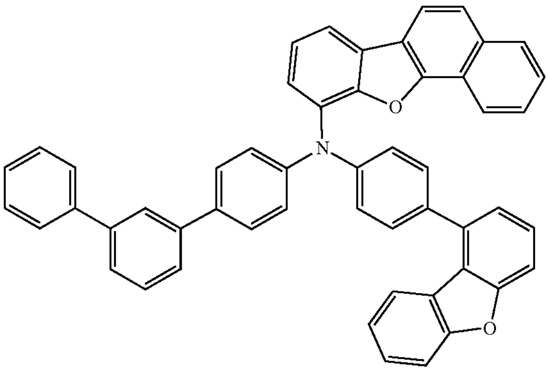
C14
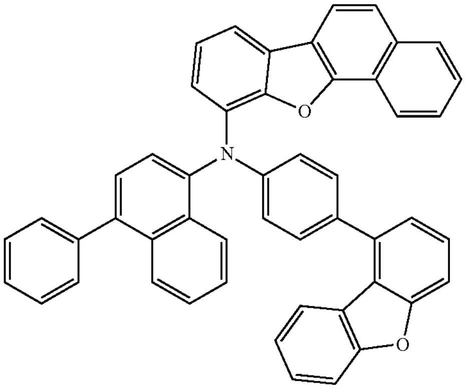
C15
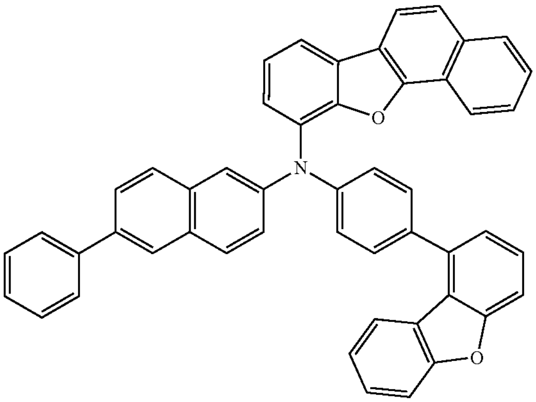

-continued
C16
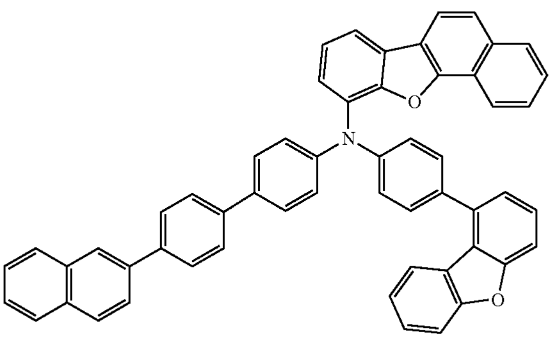
C17
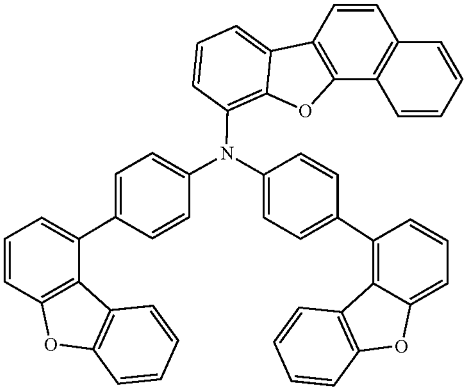
C18
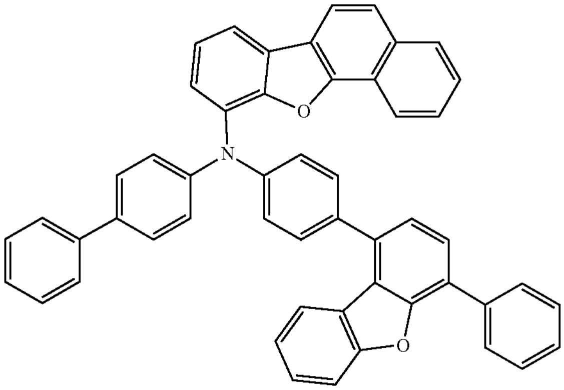
C19
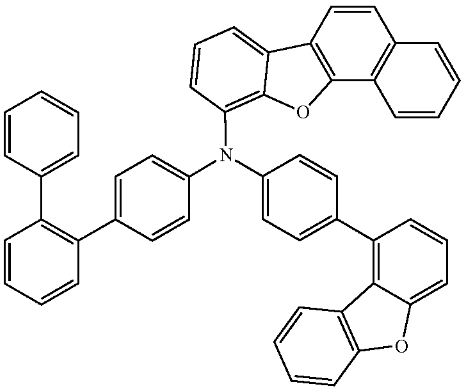
-continued
C20
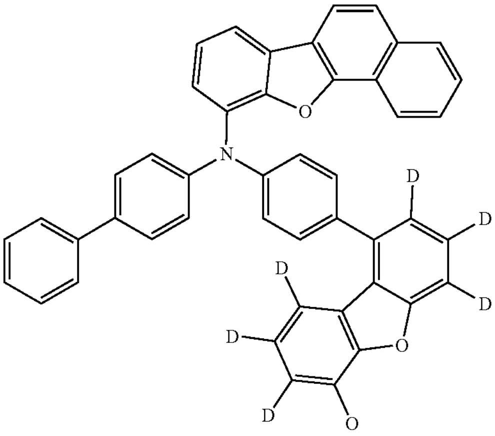
D1
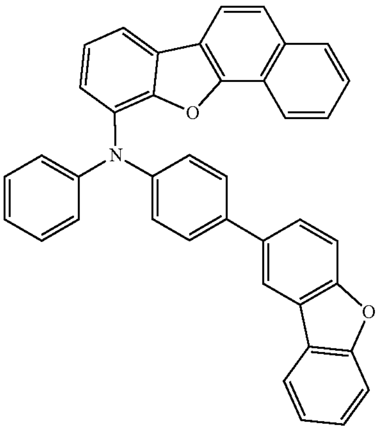
D2
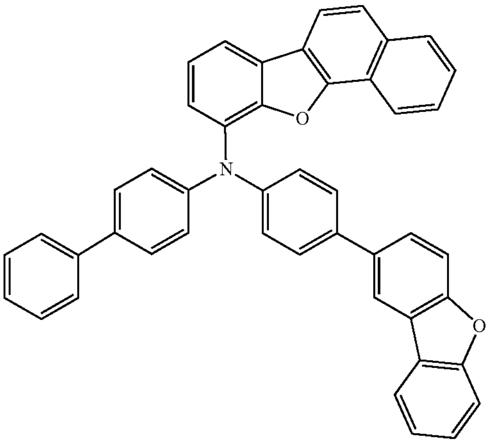

-continued
D3
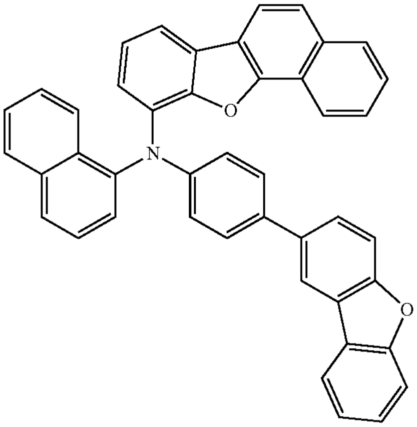
D4
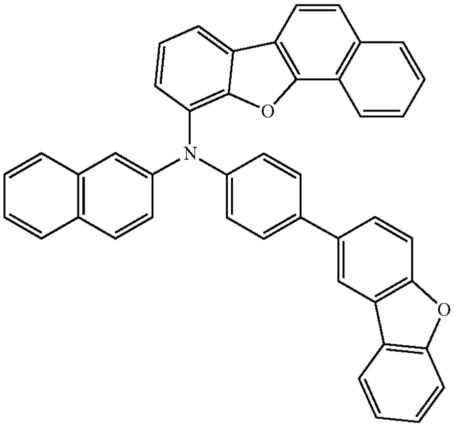
D5
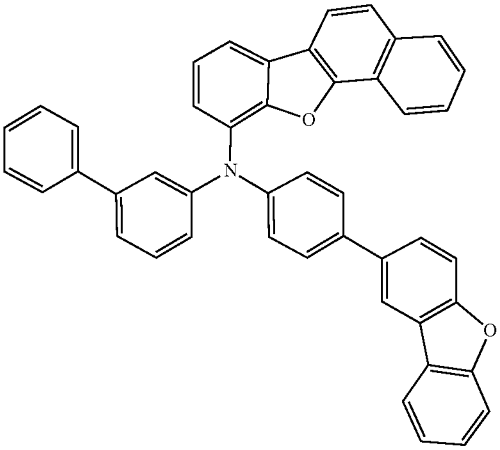
-continued
D6
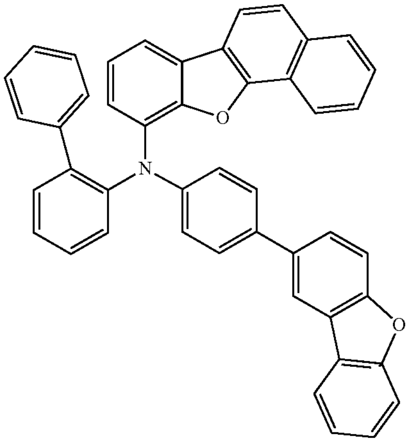
D7
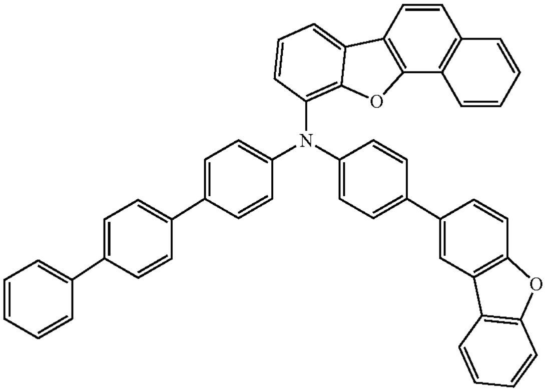
D8
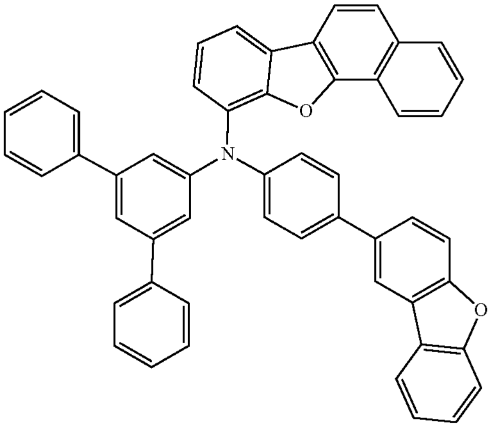

-continued
D9
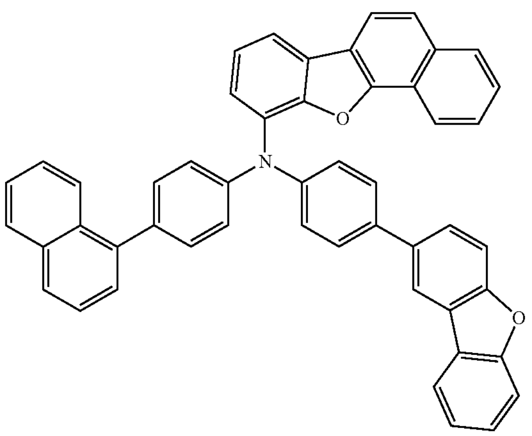
D10
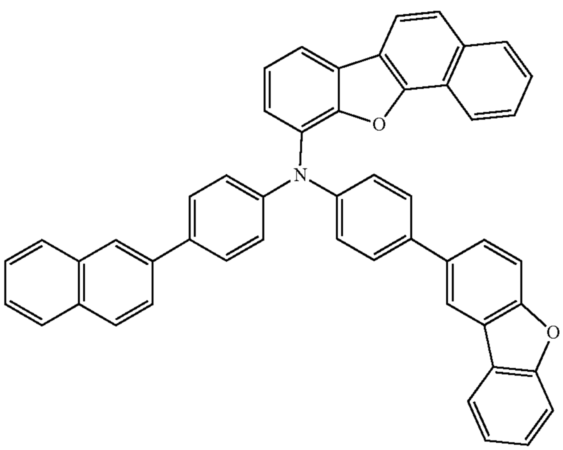
D11
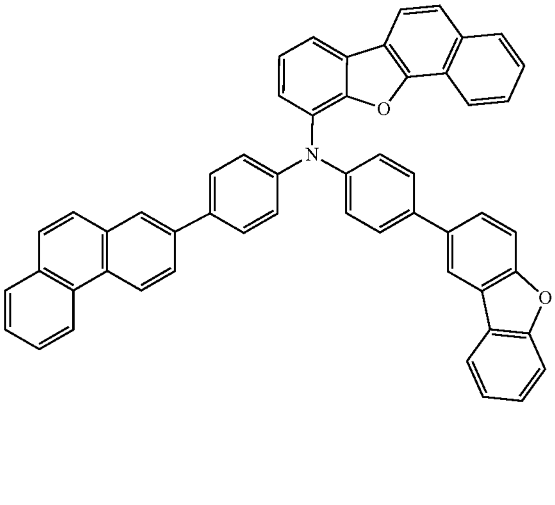
-continued
D12
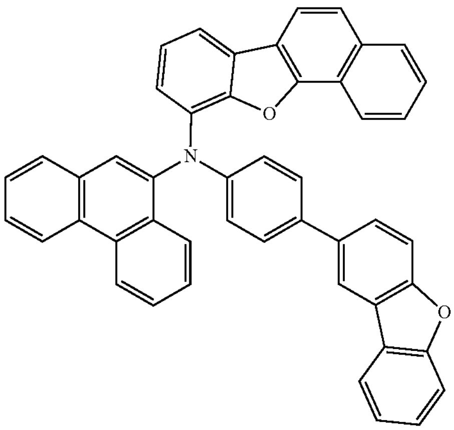
D13
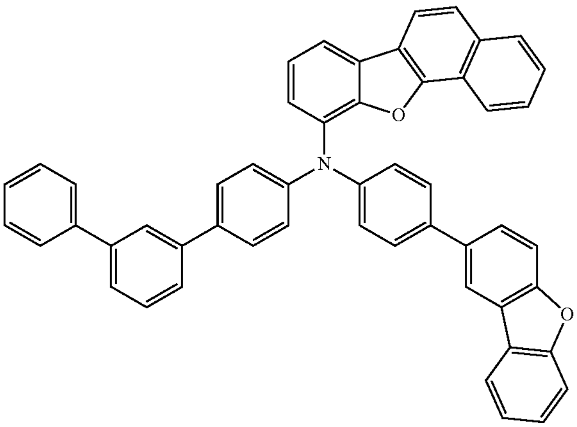
D14
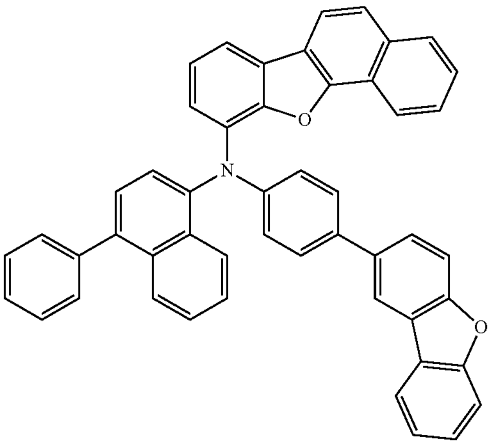

-continued
D15
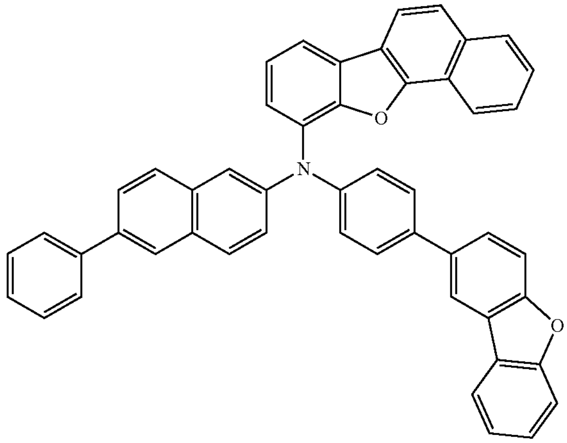
D16
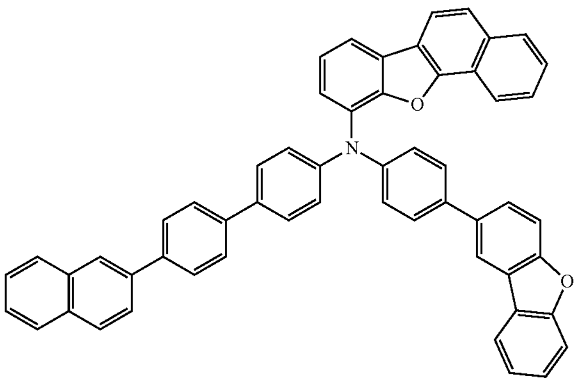
D17
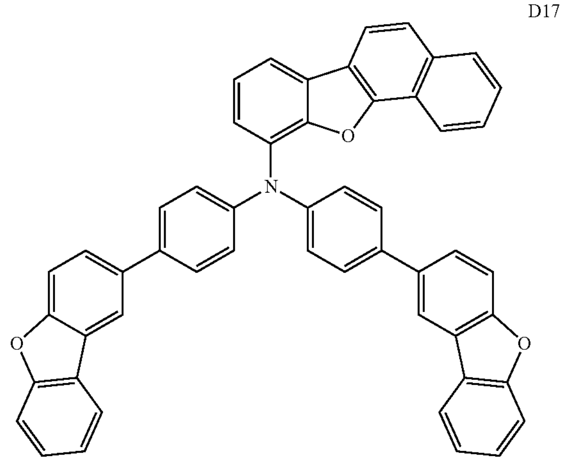
-continued
D18
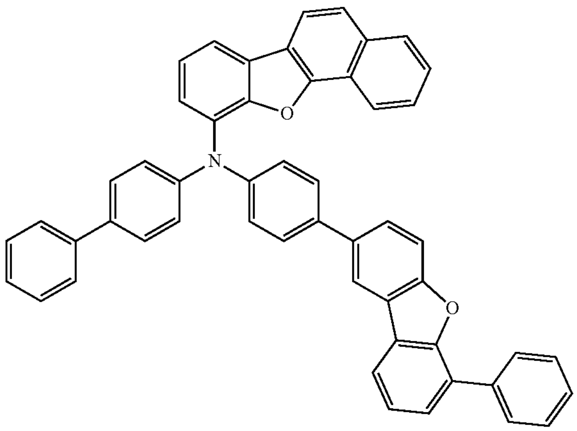
D19
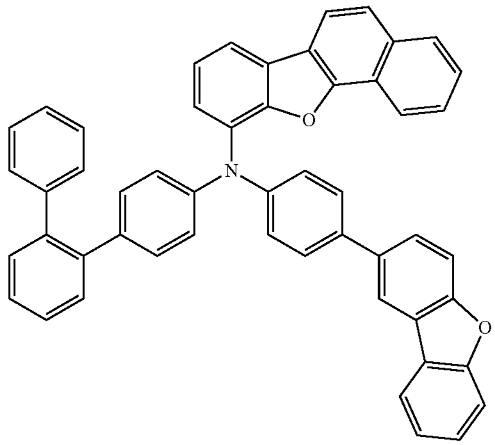
D20
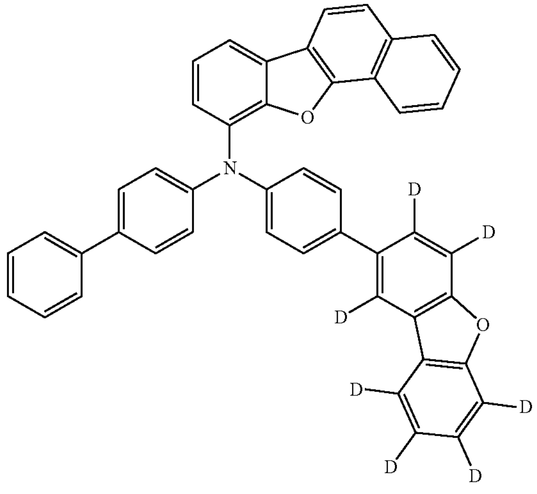

-continued
E1
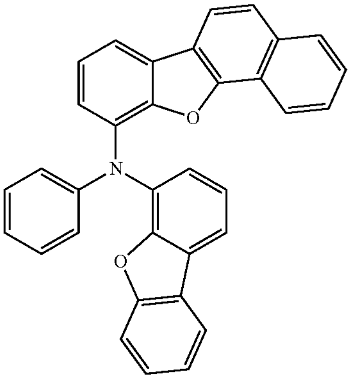
E2
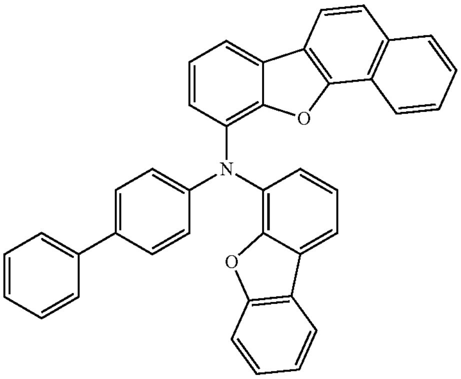
E3
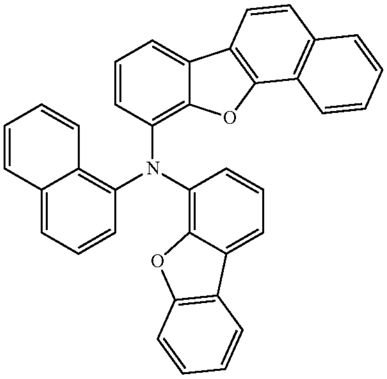
E4
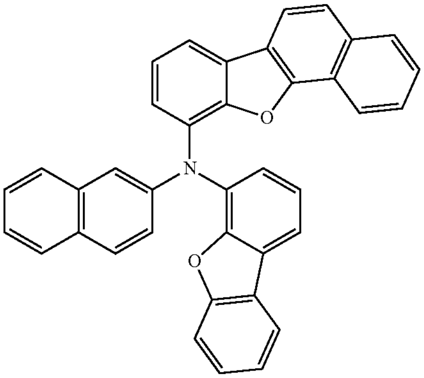
-continued
E5
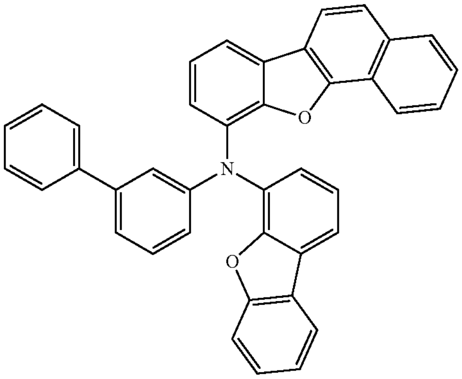
E6
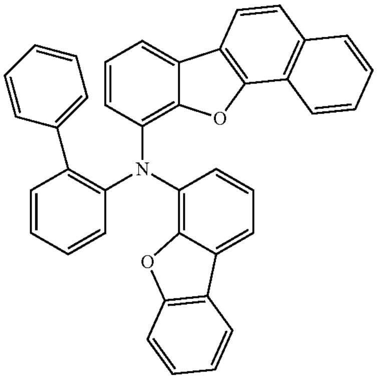
E7
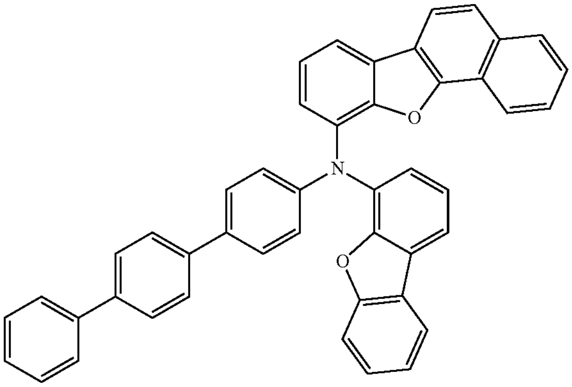
E8
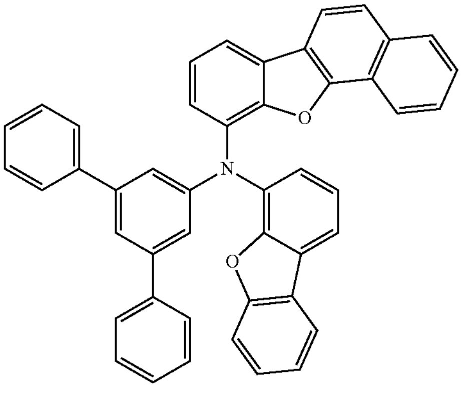

-continued
E9
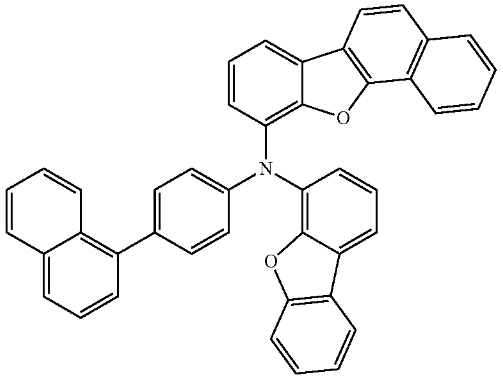
E10
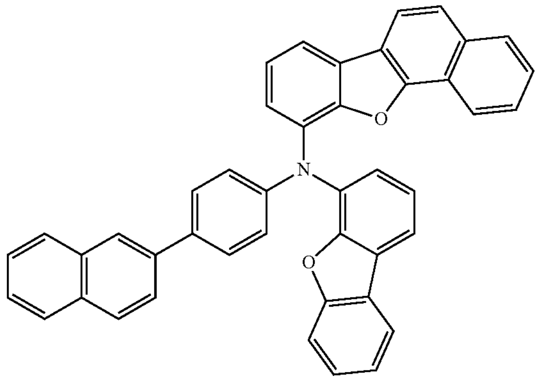
E11
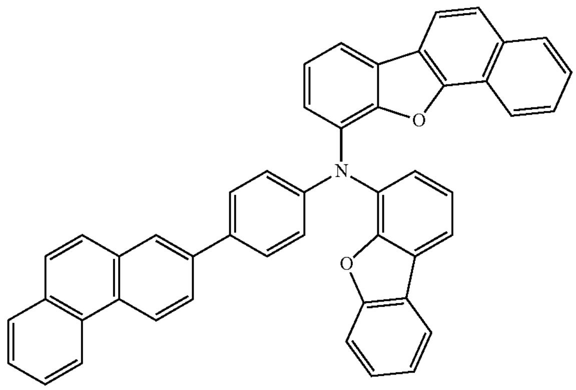
E12
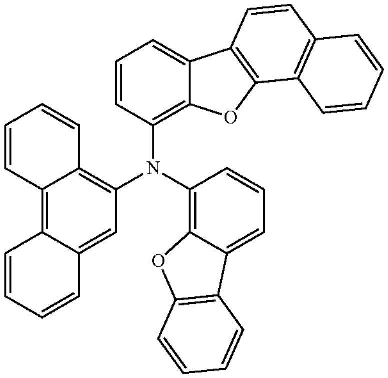
-continued
E13
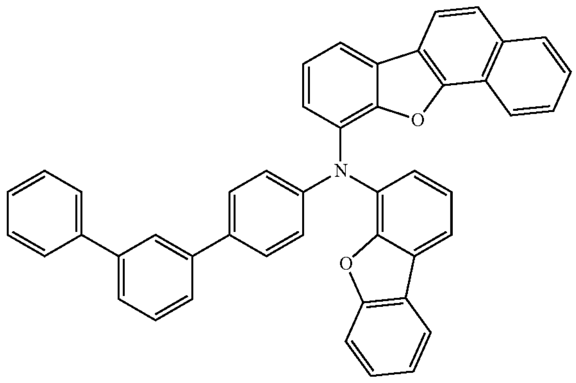
E14
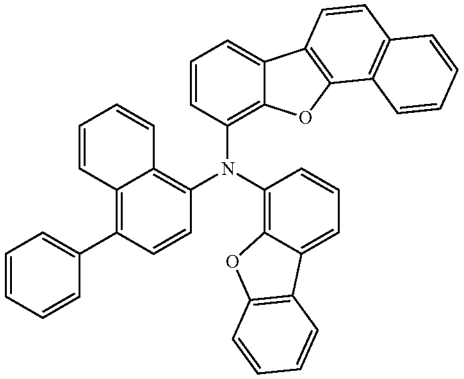
E15
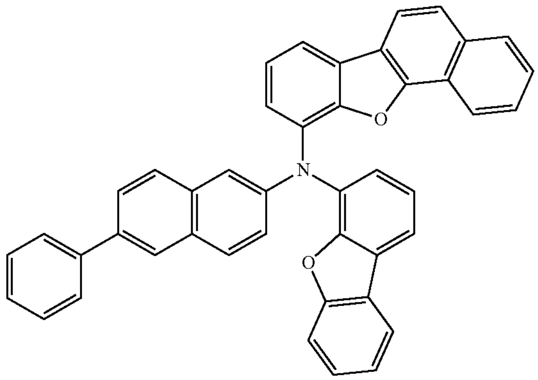
E16
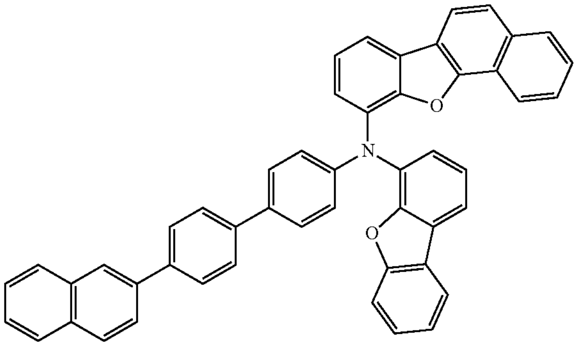

-continued
E17
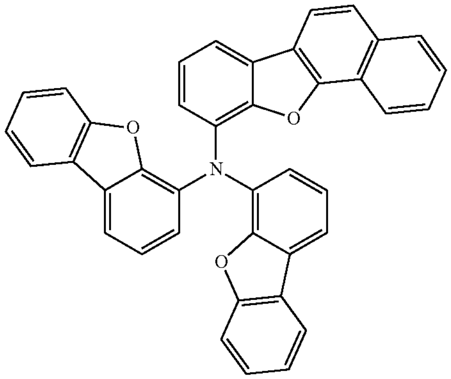
E18
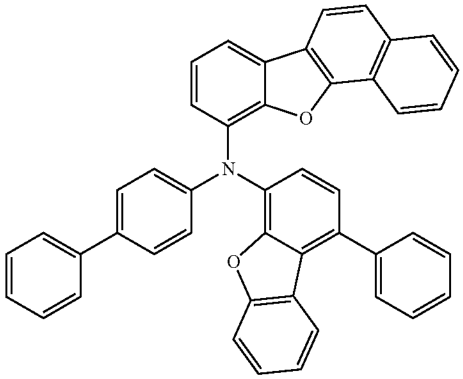
E19
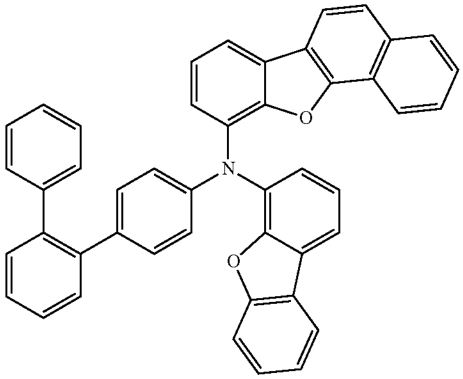
E20
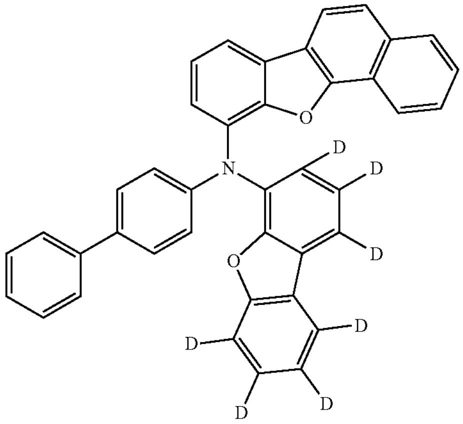
-continued
F1
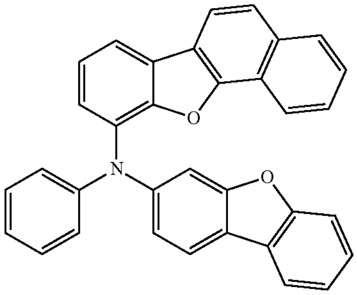
F2
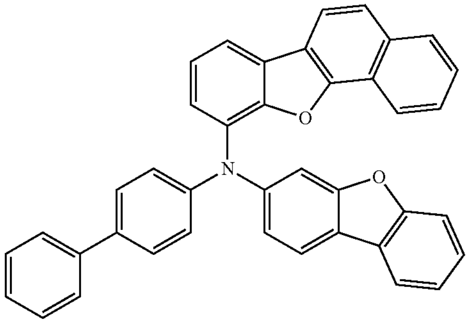
F3
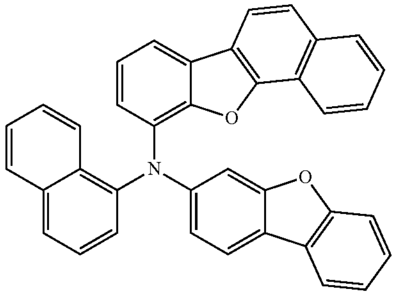
F4
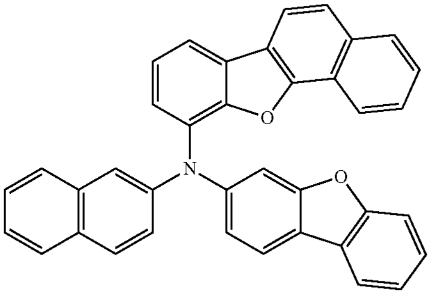
F5
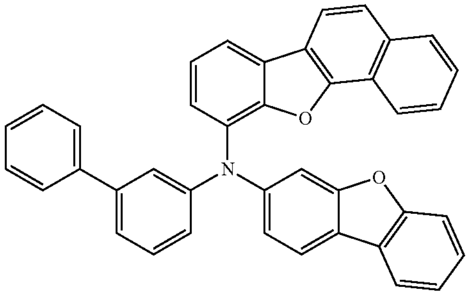

-continued
F6
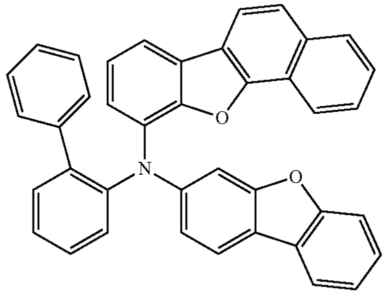
F7
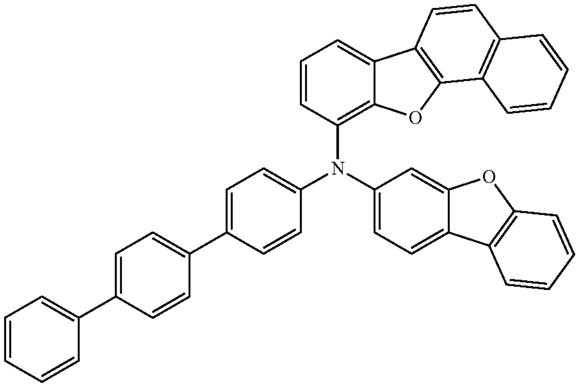
F8
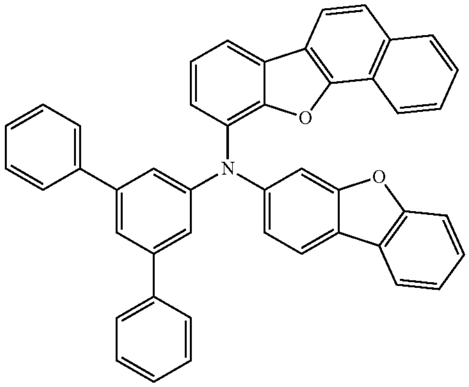
F9
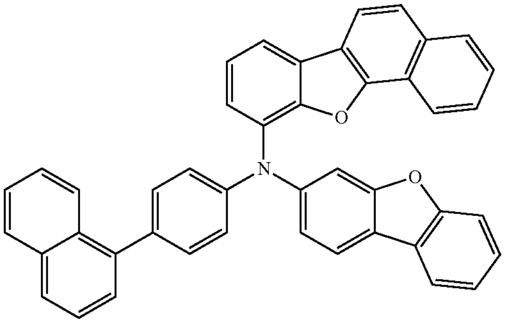
-continued
F10
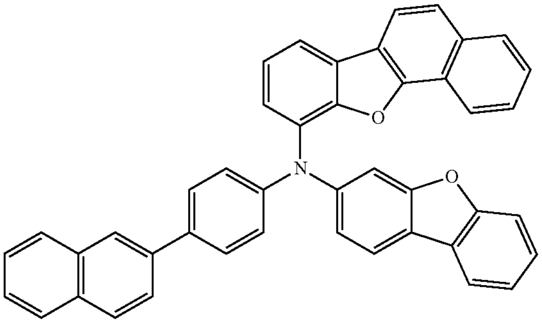
F11
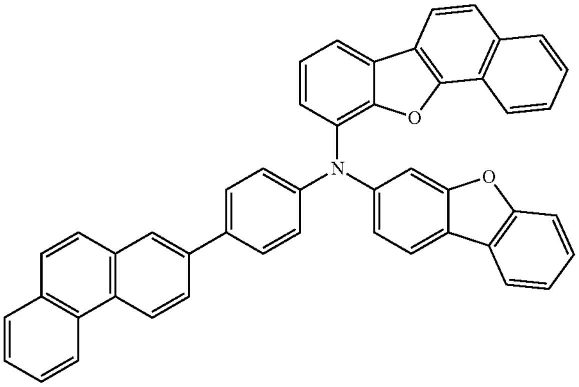
F12
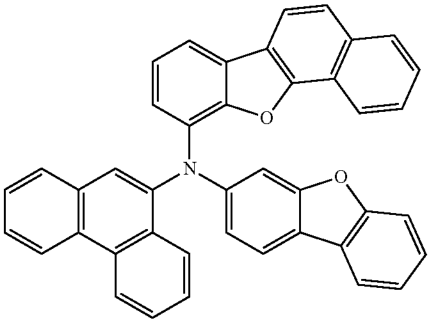
F13
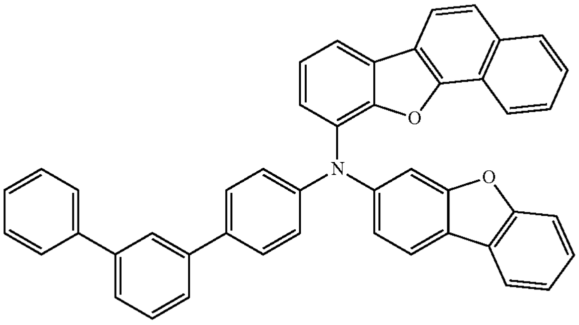

-continued
F14
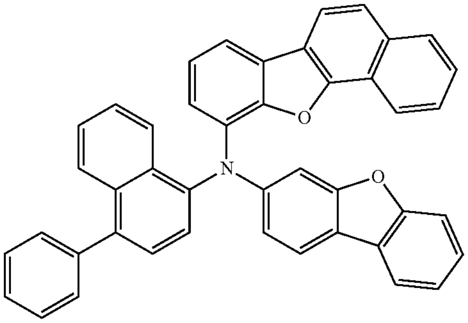
F15
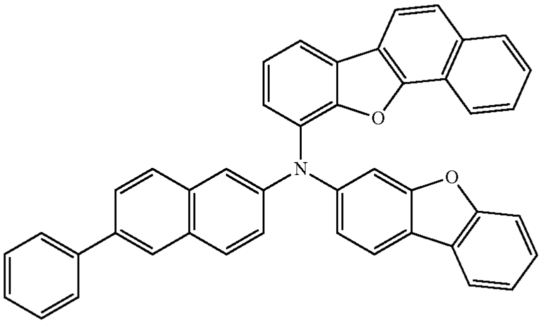
F16
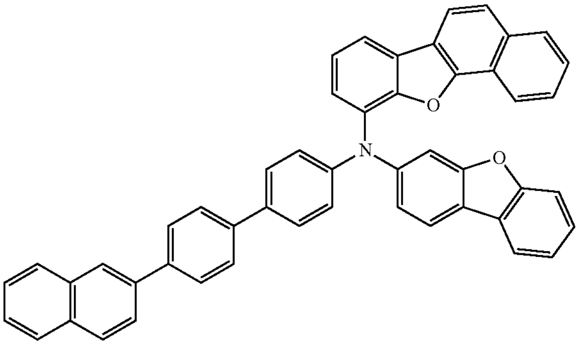
F17
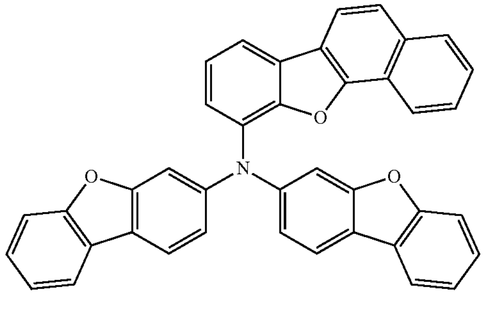
-continued
F18
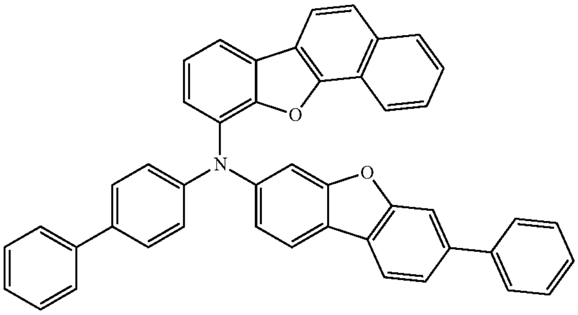
F19
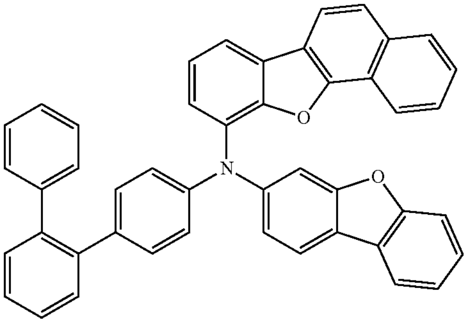
F20
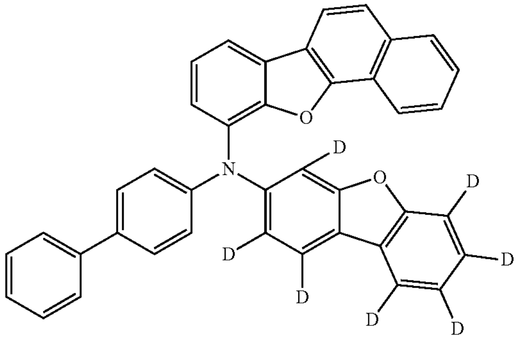
G1
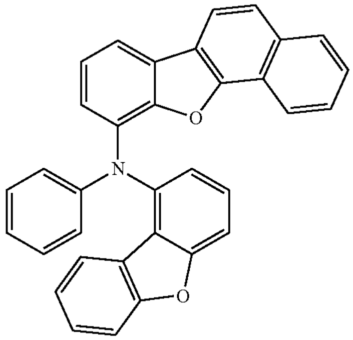

-continued
G2
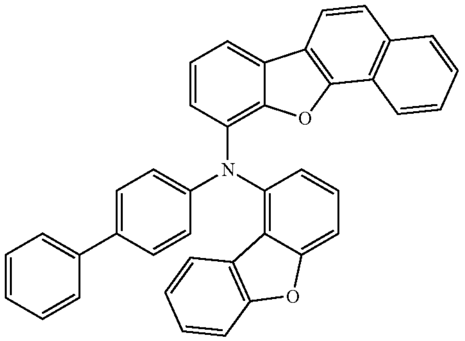
G3
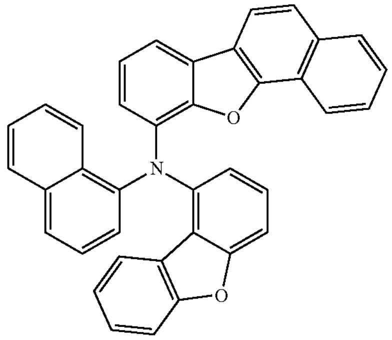
G4
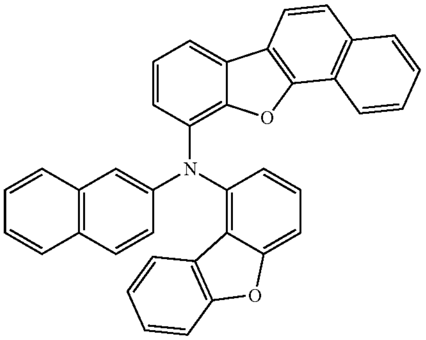
G5
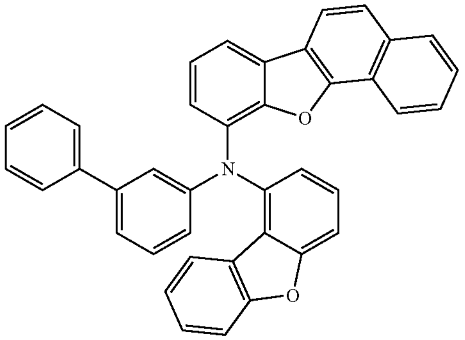
-continued
G6
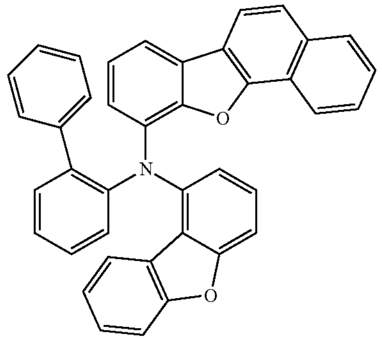
G7
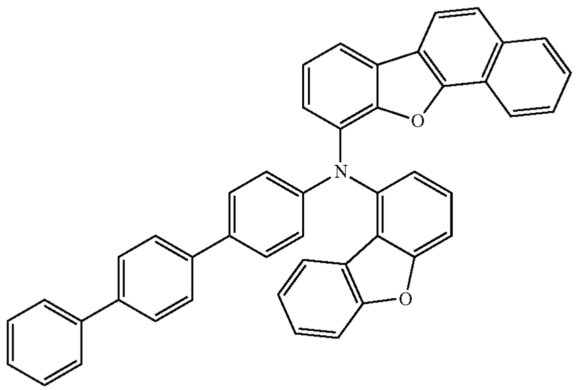
G8
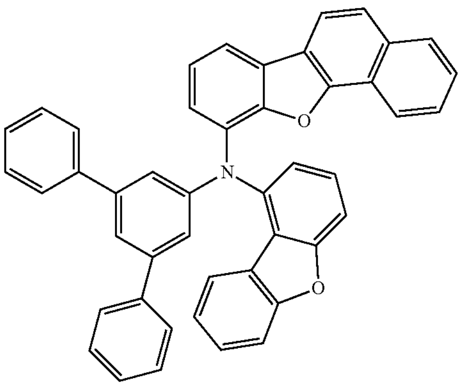
G9
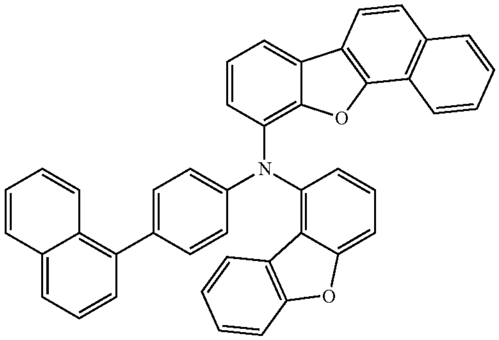

-continued
G10
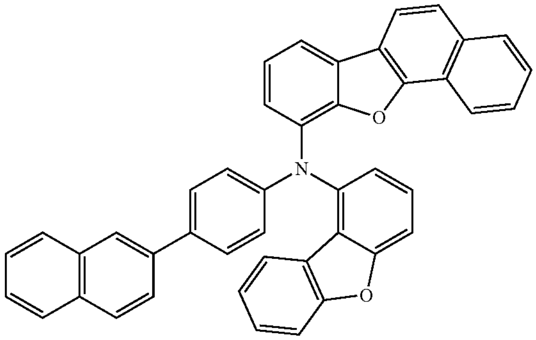
G11
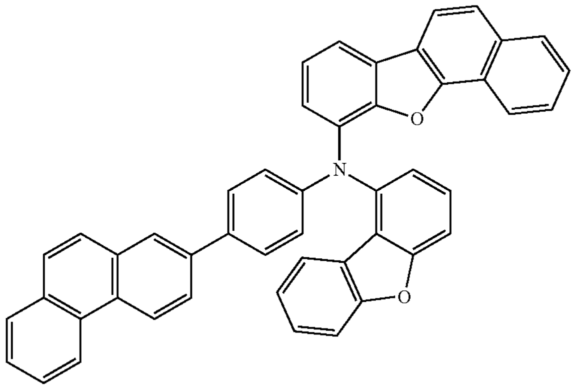
G12
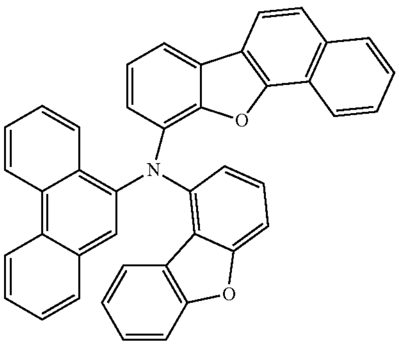
G13
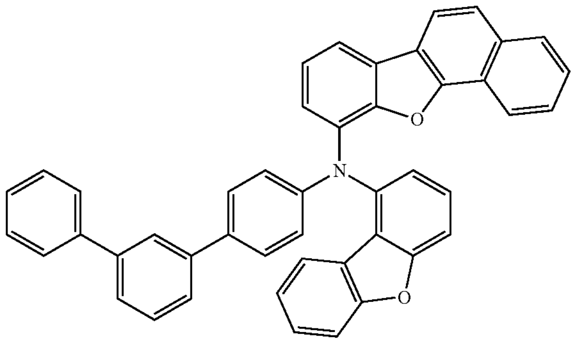
-continued
G14
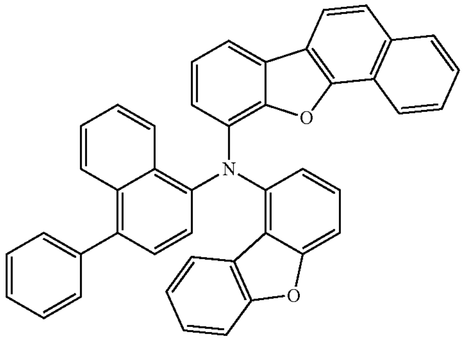
G15
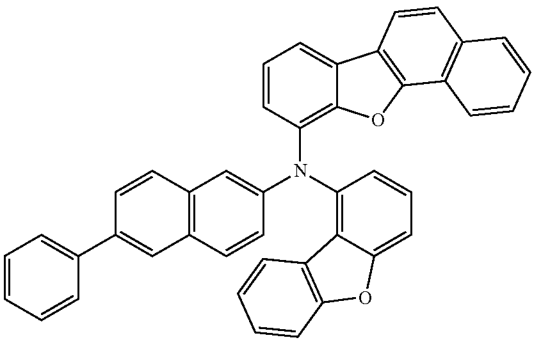
G16
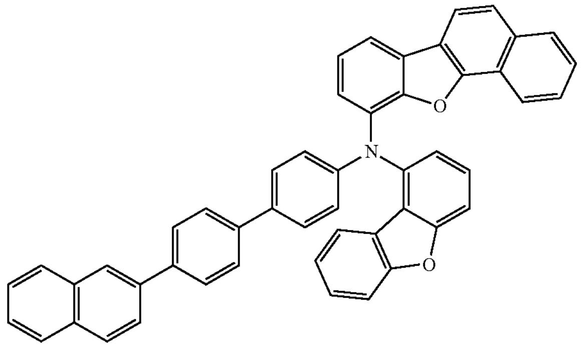
G17
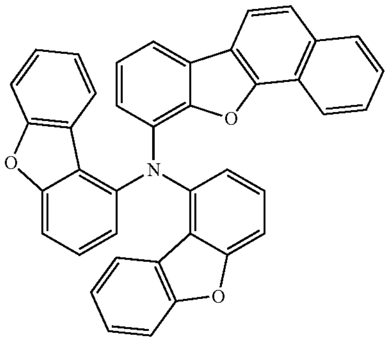

-continued
G18
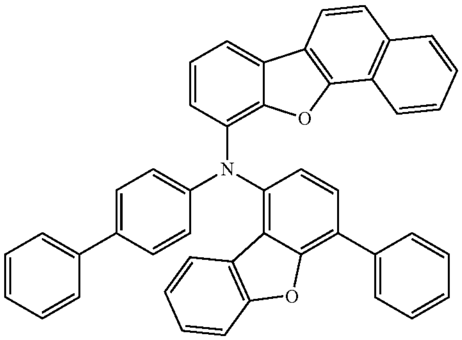
G19
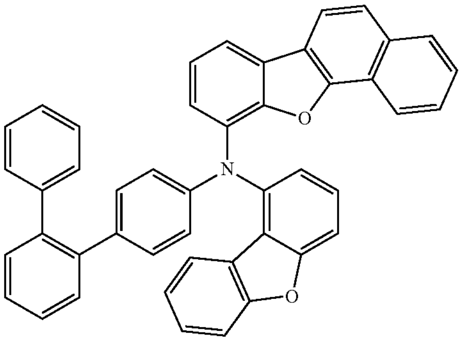
G20
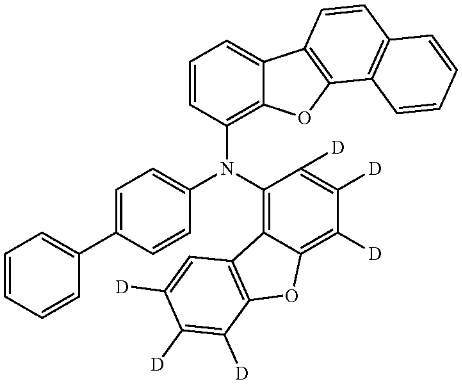
H1
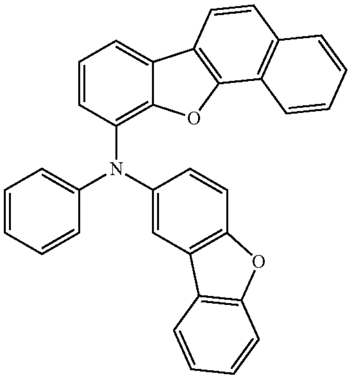
-continued
H2
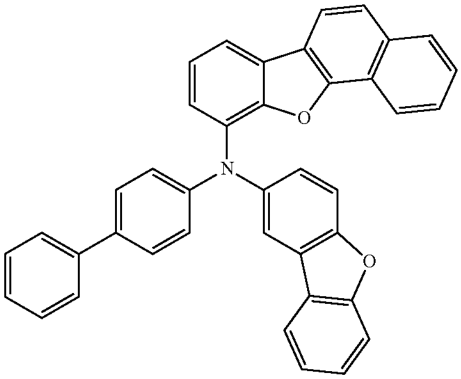
H3
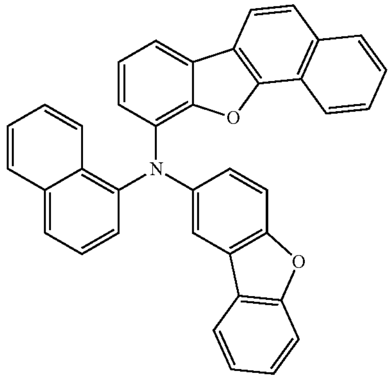
H4
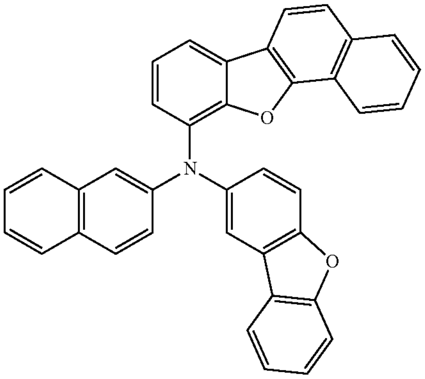
H5
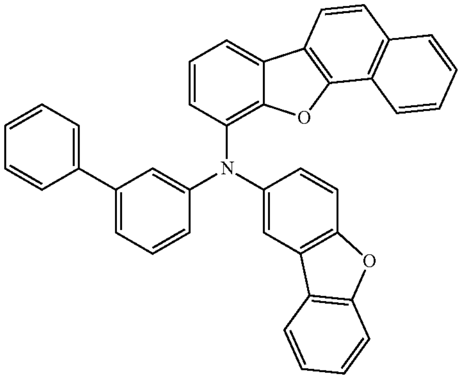

-continued
H6
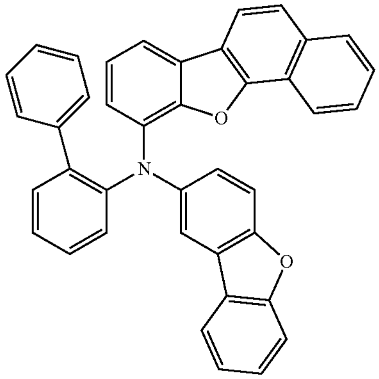
H7
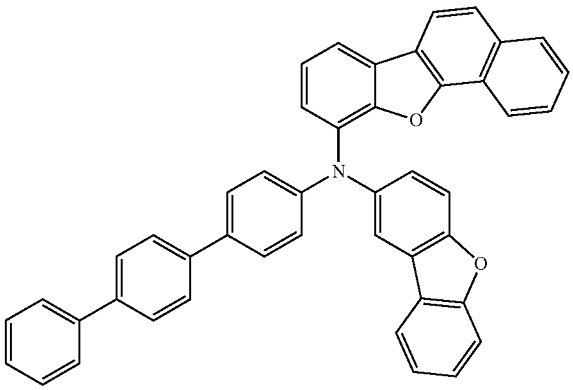
H8
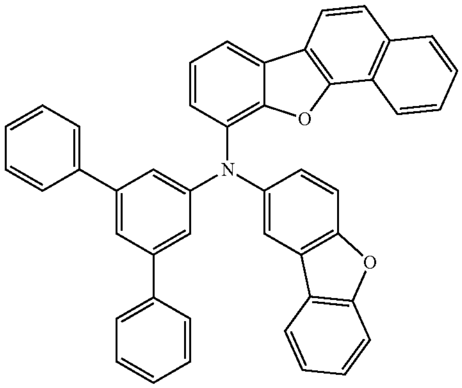
H9
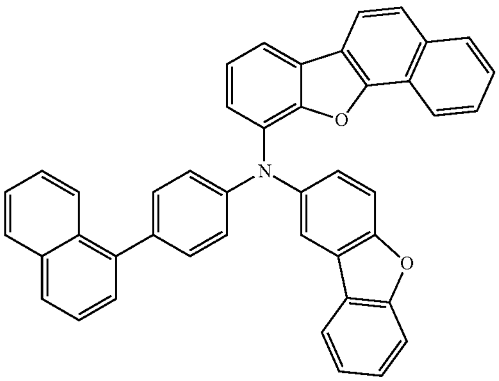
-continued
H10
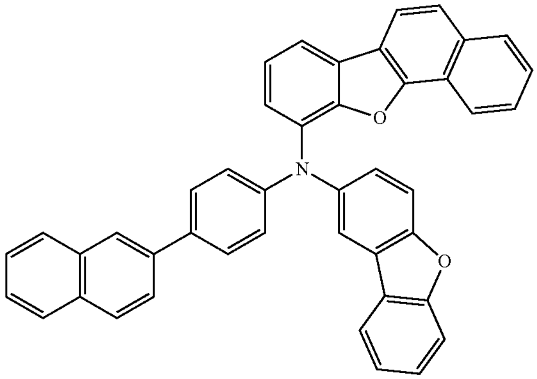
H11
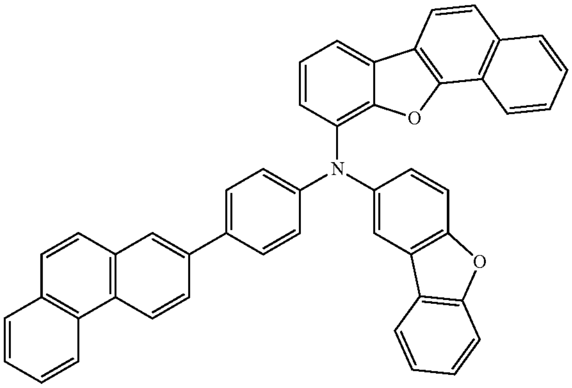
H12
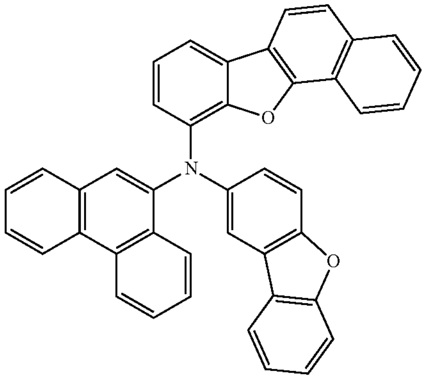
H13
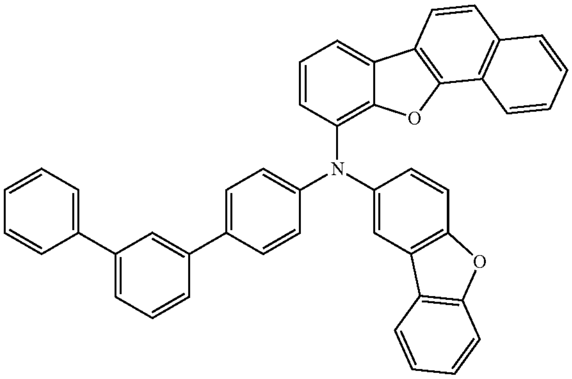

-continued

H14

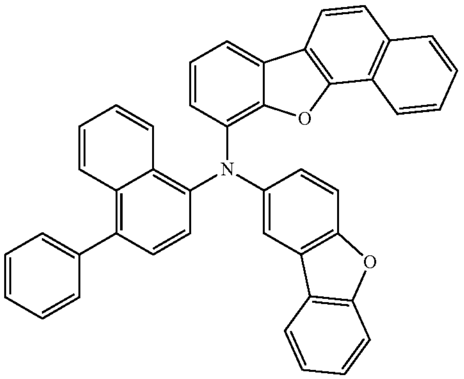

H15

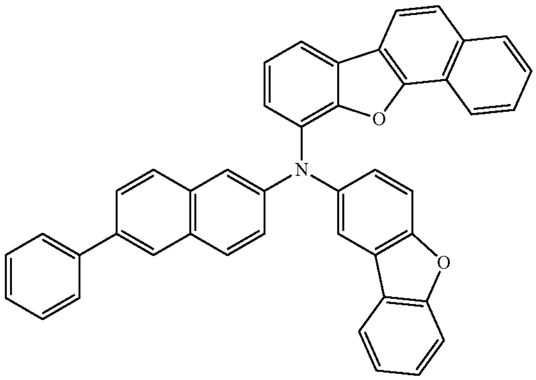

H16

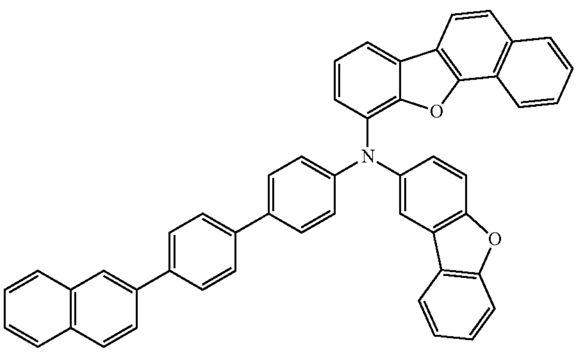

H17

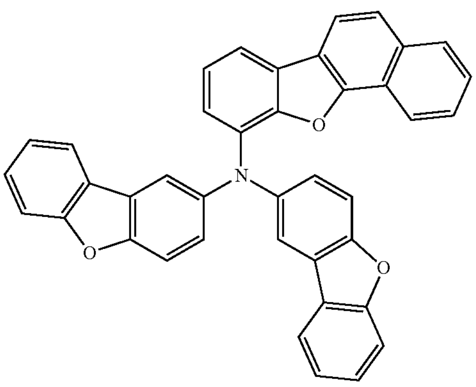

-continued

H18

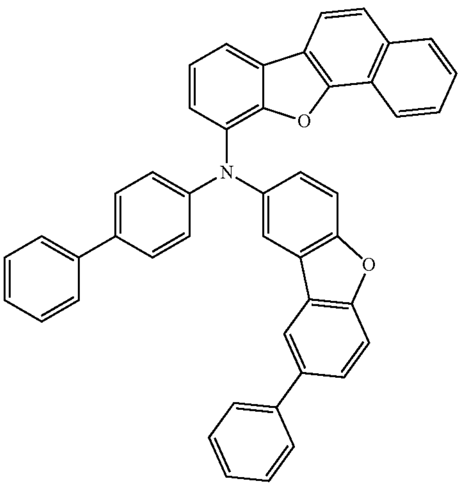

H19

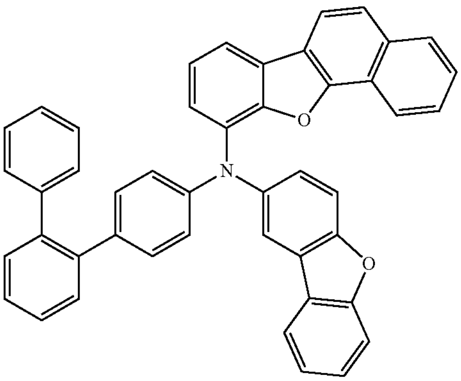

H20

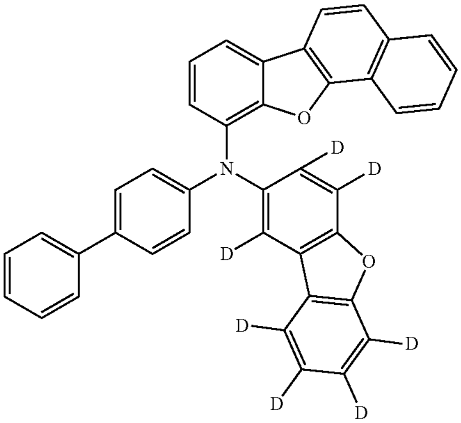

The amine compound of some embodiments, represented by Formula 1 includes a benzonaphthofuran moiety and a dibenzofuran moiety, and is characterized in that the oxygen atom of the benzonaphthofuran is bonded at an ortho position with respect to the nitrogen atom of the amine. In addition, if the amine compound of an embodiment includes a heterocycle as a substituent, an oxygen atom may be included as a heteroatom, and a nitrogen atom or a sulfur atom may not be included as a heteroatom. The amine compound of an embodiment may have excellent electrical stability and high charge transport capacity due to the introduction of such a substituent and the specification (e.g., placement or location) of a substitution position. Accordingly, the life of the amine compound of an embodiment may be improved. In addition, the emission efficiency and life of the light emitting element of an embodiment, including the amine compound of an embodiment may be improved.

In the light emitting element ED of an embodiment, the hole transport region HTR may further include a compound represented by Formula H-1 below.

Formula H-1

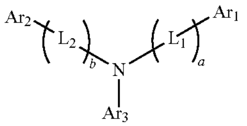

In Formula H-1 above, $L_1$ and $L_2$ may be each independently a direct linkage, a substituted or unsubstituted arylene group of 6 to 30 ring-forming carbon atoms, or a substituted or unsubstituted heteroarylene group of 2 to 30 ring-forming carbon atoms. "a" and "b" may be each independently an integer of 0 to 10. If "a" or "b" is an integer of 2 or more, a plurality of $L_1$ and $L_2$ may be each independently a substituted or unsubstituted arylene group of 6 to 30 ring-forming carbon atoms, or a substituted or unsubstituted heteroarylene group of 2 to 30 ring-forming carbon atoms.

In Formula H-1, $Ar_1$ and $Ar_2$ may be each independently a substituted or unsubstituted aryl group of 6 to 30 ring-forming carbon atoms, or a substituted or unsubstituted heteroaryl group of 2 to 30 ring-forming carbon atoms. In addition, in Formula H-1, $Ar_3$ may be a substituted or unsubstituted aryl group of 6 to 30 ring-forming carbon atoms, or a substituted or unsubstituted heteroaryl group of 2 to 30 ring-forming carbon atoms.

The compound represented by Formula H-1 may be a monoamine compound. Otherwise, the compound represented by Formula H-1 may be a diamine compound in which at least one selected from among $Ar_1$ to $Ar_3$ includes an amine group as a substituent. In addition, the compound represented by Formula H-1 may be a carbazole-based compound in which at least one selected from among $Ar_1$ and $Ar_2$ includes a substituted or unsubstituted carbazole group, or a fluorene-based compound in which at least one selected from among $Ar_1$ and Are includes a substituted or unsubstituted fluorene group.

The compound represented by Formula H-1 may be represented by any one selected from among the compounds in Compound Group H below. However, the compounds listed in Compound Group H are only illustrations, and the compound represented by Formula H-1 is not limited to the compounds represented in Compound Group H below.

Compound Group H

H-1-1

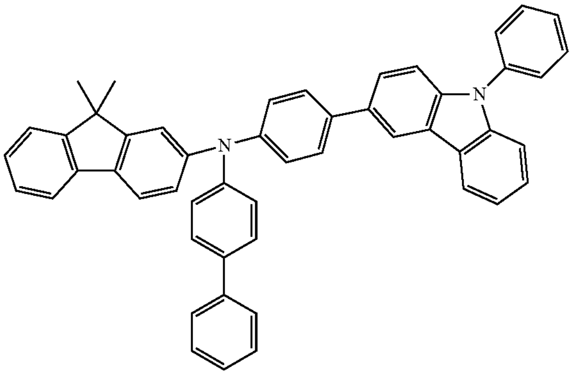

H-1-2

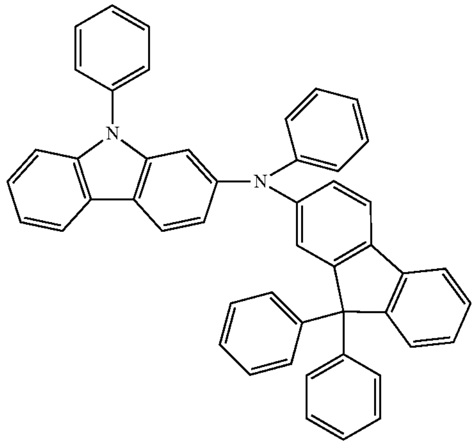

H-1-3

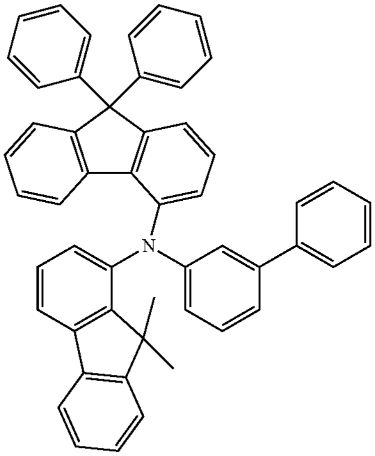

H-1-4

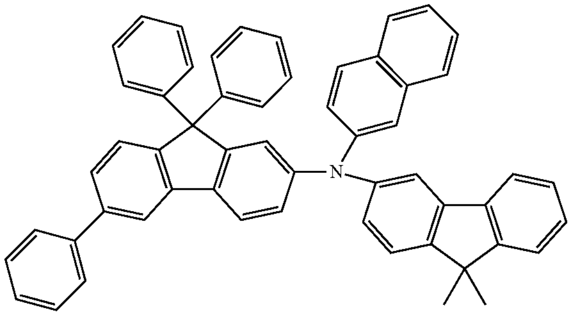

-continued
H-1-5
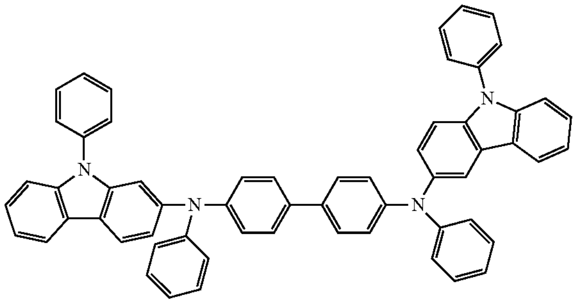
H-1-6
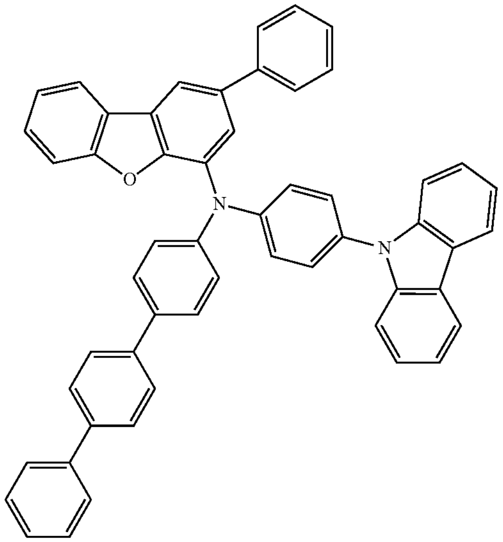
H-1-7
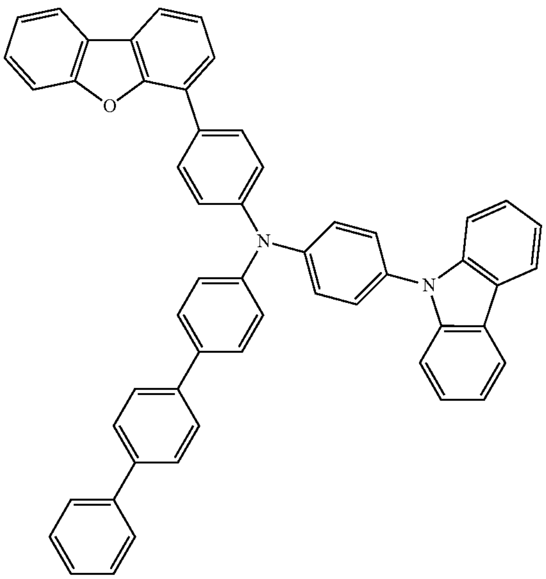
-continued
H-1-8
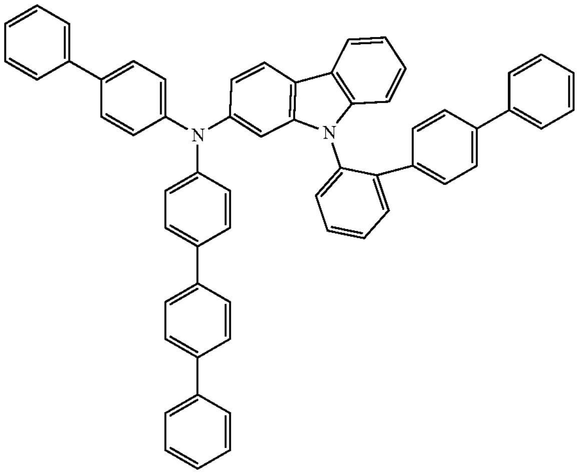
H-1-9
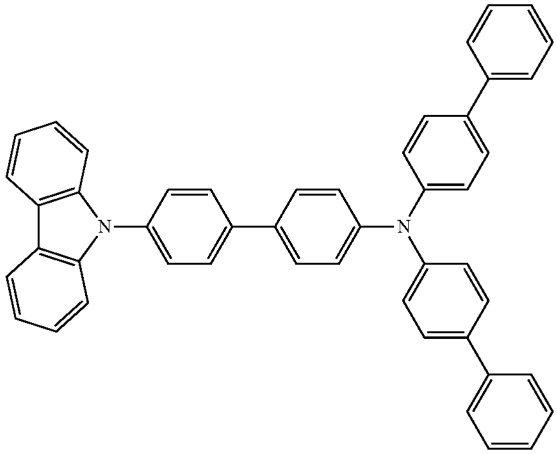
H-1-10
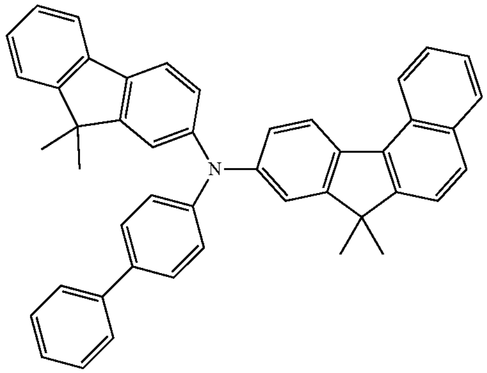

-continued
H-1-11
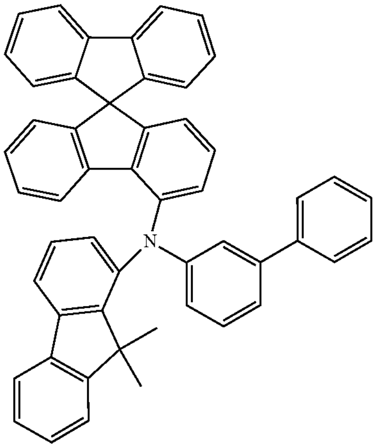
H-1-12
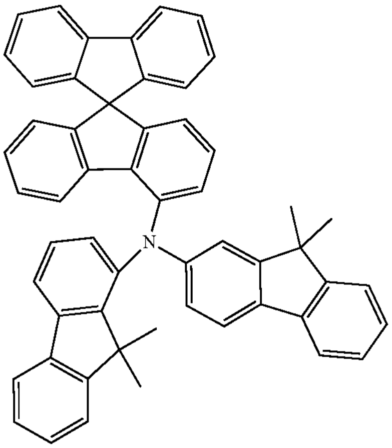
H-1-13
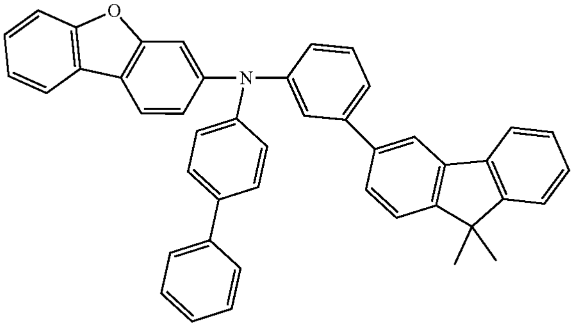
H-1-14
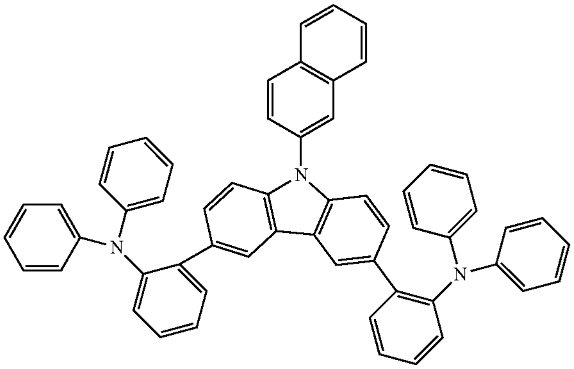
-continued
H-1-15
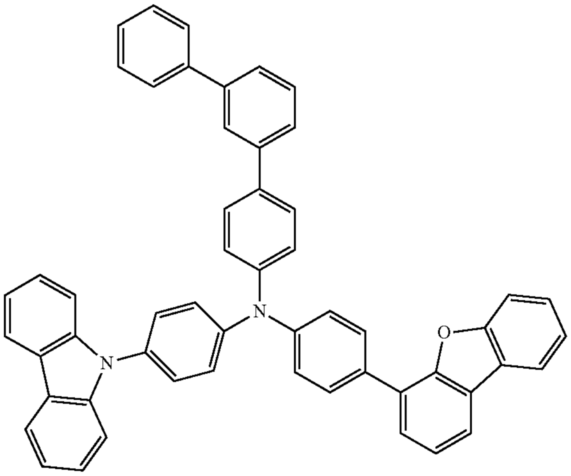
H-1-16
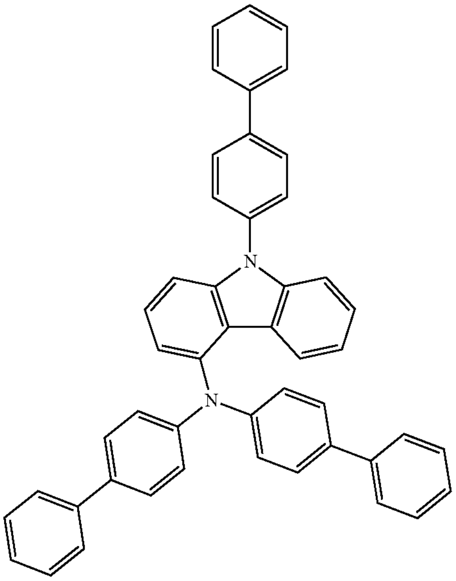
H-1-17
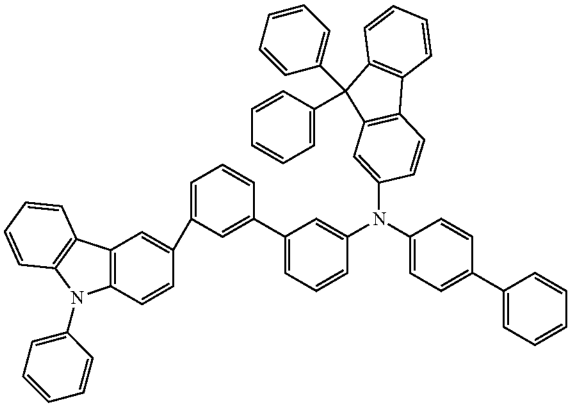

-continued

H-1-18

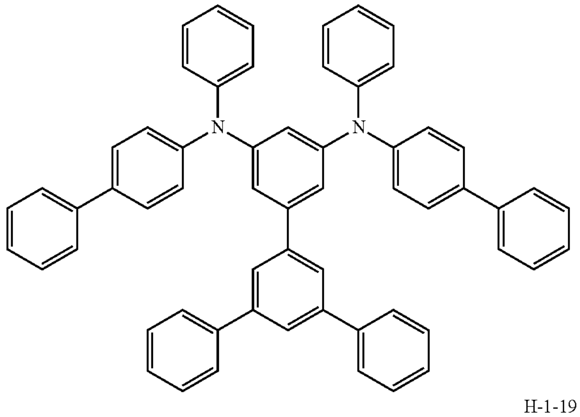

H-1-19

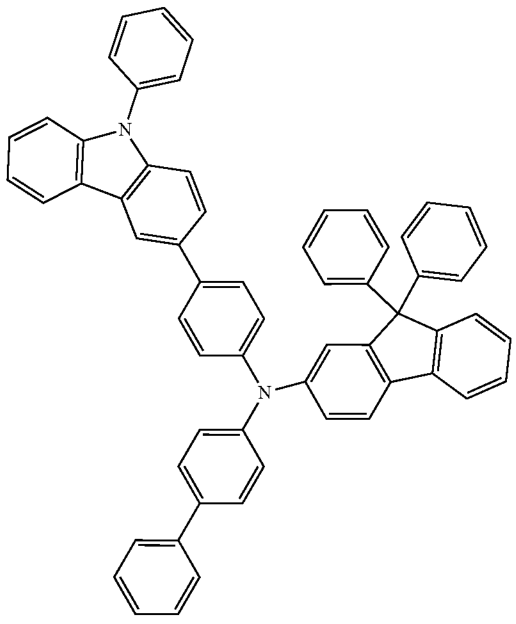

The hole transport region HTR may include a phthalocyanine compound such as copper phthalocyanine, $N^1,N^{1'}$-([1,1'-biphenyl]-4,4'-diyl)bis($N^1$-phenyl-$N^4,N^4$-di-m-tolyl-benzene-1,4-diamine) (DNTPD), 4,4',4"-[tris(3-methylphenyl)phenylamino] triphenylamine (m-MTDATA), 4,4',4"-tris(N,N-diphenylamino)triphenylamine (TDATA), 4,4',4"-tris[N(2-naphthyl)-N-phenylamino]-triphenylamine (2-TNATA), poly(3,4-ethylenedioxythiophene)/poly(4-styrenesulfonate) (PEDOT/PSS), polyaniline/dodecylbenzenesulfonic acid (PANI/DBSA), polyaniline/camphor sulfonic acid (PANI/CSA), polyaniline/poly(4-styrenesulfonate) (PANI/PSS), N,N'-di(1-naphthalene-1-yl)-N,N'-diphenyl-benzidine (NPB or NPD), triphenylamine-containing polyetherketone (TPAPEK), 4-isopropyl-4'-methyldiphenyliodonium [tetrakis(pentafluorophenyl)borate], and/or dipyrazino[2,3-f:2',3'-h] quinoxaline-2,3,6,7,10,11-hexacarbonitrile (HAT-CN).

The hole transport region HTR may include carbazole derivatives such as N-phenyl carbazole and/or polyvinyl carbazole, fluorene-based derivatives, triphenylamine-based derivatives such as 4,4',4"-tris(N-carbazolyl)triphenylamine (TCTA), N,N'-bis(3-methylphenyl)-N,N'-diphenyl-[1,1'-biphenyl]-4,4'-diamine (TPD), N,N'-di(1-naphthalene-1-yl)-N,N'-diphenyl-benzidine (NPB), 4,4'-cyclohexylidene bis [N,N-bis(4-methylphenyl)benzeneamine] (TAPC), 4,4'-bis [N,N'-(3-tolyl)amino]-3,3'-dimethylbiphenyl (HMTPD), 1,3-bis(N-carbazolyl)benzene (mCP), etc.

In addition, the hole transport region HTR may include 9-(4-tert-butylphenyl)-3,6-bis(triphenylsilyl)-9H-carbazole (CzSi), 9-phenyl-9H-3,9'-bicarbazole (CCP), 1,3-bis(1,8-dimethyl-9H-carbazol-9-yl)benzene (mDCP), etc.

The hole transport region HTR may include the compounds of the hole transport region in at least one selected from among the hole injection layer HIL, hole transport layer HTL, and electron blocking layer EBL.

The thickness of the hole transport region HTR may be from about 100 Å to about 10,000 Å, for example, from about 100 Å to about 5,000 Å. In a case where the hole transport region HTR includes a hole injection layer HIL, the thickness of the hole injection region HIL may be, for example, from about 30 Å to about 1,000 Å. In case where the hole transport region HTR includes a hole transport layer HTL, the thickness of the hole transport layer HTL may be from about 30 Å to about 1,000 Å. For example, in a case where the hole transport region HTR includes an electron blocking layer EBL, the thickness of the electron blocking layer EBL may be from about 10 Å to about 1,000 Å. If the thicknesses of the hole transport region HTR, the hole injection layer HIL, the hole transport layer HTL and the electron blocking layer EBL satisfy the above-described ranges, suitable or satisfactory hole transport properties may be achieved without substantial increase of a driving voltage.

The hole transport region HTR may further include a charge generating material to increase conductivity (e.g., electrical conductivity) in addition to the above-described materials. The charge generating material may be dispersed uniformly or non-uniformly in the hole transport region HTR. The charge generating material may be, for example, a p-dopant. The p-dopant may include at least one selected from metal halide compounds, quinone derivatives, metal oxides, and cyano group-containing compounds, without limitation. For example, the p-dopant may include metal halide compounds such as CuI and/or RbI, quinone derivatives such as tetracyanoquinodimethane (TCNQ) and/or 2,3,5,6-tetrafluoro-7,7',8,8-tetracyanoquinodimethane (F4-TCNQ), metal oxides such as tungsten oxide and/or molybdenum oxide, cyano group-containing compounds such as dipyrazino[2,3-f: 2',3'-h] quinoxaline-2,3,6,7,10,11-hexacarbonitrile (HATCN) and/or 4-[[2,3-bis[cyano-(4-cyano-2,3,5,6-tetrafluorophenyl)methylidene]cyclopropylidene]-cyanomethyl]-2,3,5,6-tetrafluorobenzonitrile (NDP9), etc., without limitation.

As described above, the hole transport region HTR may further include at least one selected from among a buffer layer and an electron blocking layer EBL in addition to the hole injection layer HIL and the hole transport layer HTL. The buffer layer may compensate for a resonance distance according to a wavelength of light emitted from an emission layer EML and may increase emission efficiency. As materials included in the buffer layer, materials which may be included in the hole transport region HTR may be used. The electron blocking layer EBL is a layer blocks or reduces the injection of electrons from the electron transport region ETR to the hole transport region HTR.

The emission layer EML is provided on the hole transport region HTR. The emission layer EML may have a thickness of, for example, about 100 Å to about 1,000 Å or about 100 Å to about 300 Å. The emission layer EML may have a single layer formed using a single material, a single layer formed using a plurality of different materials, or a multi-layer structure having a plurality of layers formed using a plurality of different materials.

In the light emitting element ED of an embodiment, the emission layer EML may emit blue light. The light emitting element ED of an embodiment may include the amine compound of an embodiment in a hole transport region HTR and may show high efficiency and long-life characteristics in a blue emission region. However, embodiments of the present disclosure are not limited thereto.

In the light emitting element ED of an embodiment, the emission layer EML may include anthracene derivatives, pyrene derivatives, fluoranthene derivatives, chrysene derivatives, dihydrobenzanthracene derivatives, and/or tri-phenylene derivatives. In some embodiments, the emission layer EML may include anthracene derivatives and/or pyrene derivatives.

In the light emitting elements ED of embodiments, shown in FIG. 3 to FIG. 6, the emission layer EML may include a host and a dopant, and the emission layer EML may include a compound represented by Formula E-1 below. The compound represented by Formula E-1 below may be used as a fluorescence host material.

Formula E-1

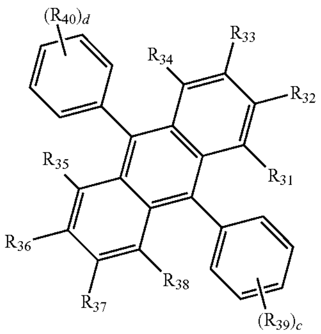

In Formula E-1, $R_{31}$ to $R_{40}$ may be each independently a hydrogen atom, a deuterium atom, a halogen atom, a substituted or unsubstituted silyl group, a substituted or unsubstituted thio group, a substituted or unsubstituted oxy group, a substituted or unsubstituted alkyl group of 1 to 10 carbon atoms, a substituted or unsubstituted alkenyl group of 2 to 10 carbon atoms, a substituted or unsubstituted aryl group of 6 to 30 ring-forming carbon atoms, or a substituted or unsubstituted heteroaryl group of 2 to 30 ring-forming carbon atoms, or may be combined with an adjacent group to form a ring. In some embodiments, $R_{31}$ to $R_{40}$ may be combined with an adjacent group to form a saturated hydrocarbon ring, an unsaturated hydrocarbon ring, a saturated heterocycle, or an unsaturated heterocycle.

In Formula E-1, "c" and "d" may be each independently an integer of 0 to 5.

Formula E-1 may be represented by any one selected from among Compound E1 to Compound E19 below.

E1

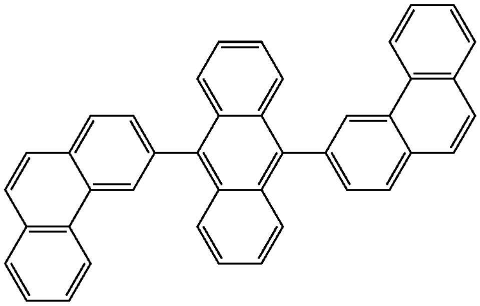

E2

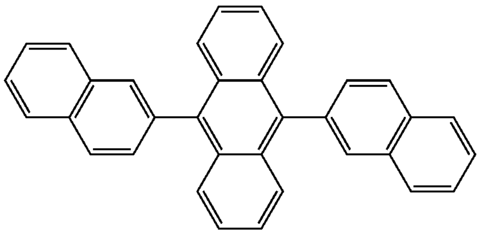

E3

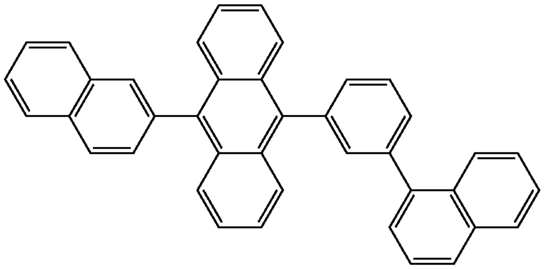

E4

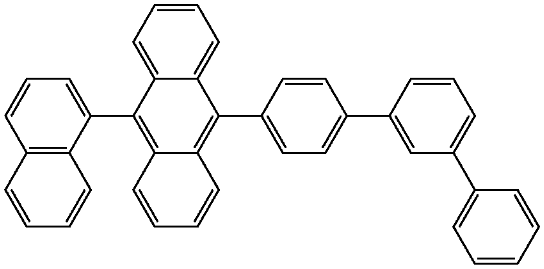

E5

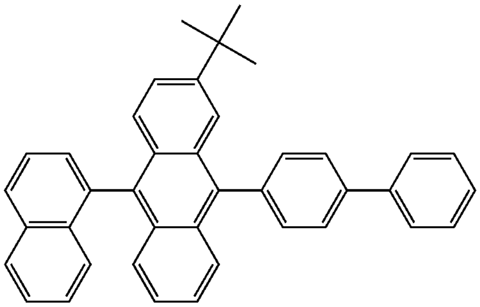

-continued
E6
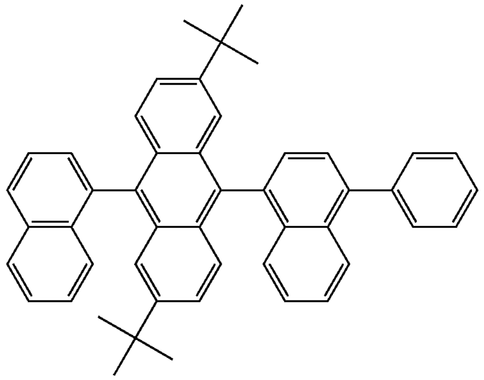
E7
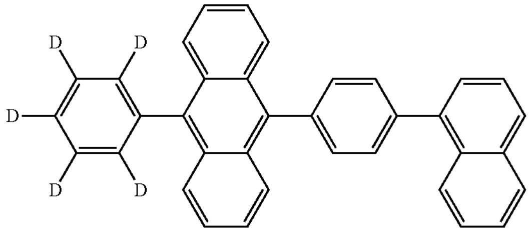
E8
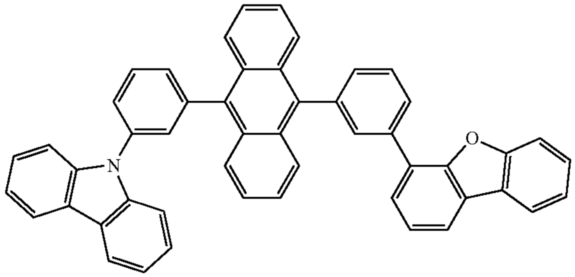
E9
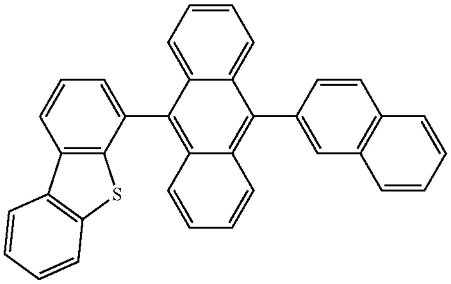
E10
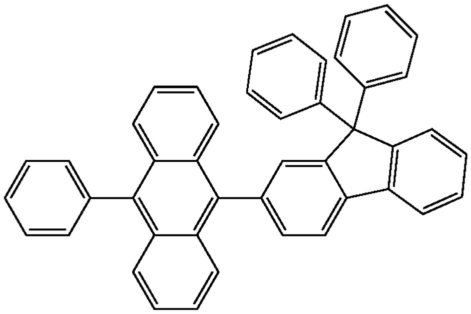
-continued
E11
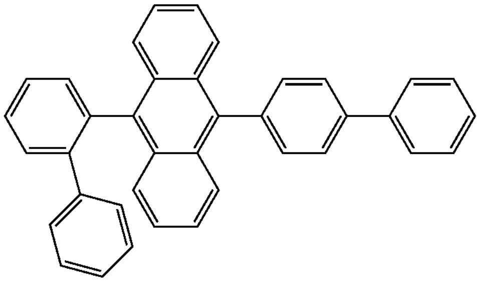
E12
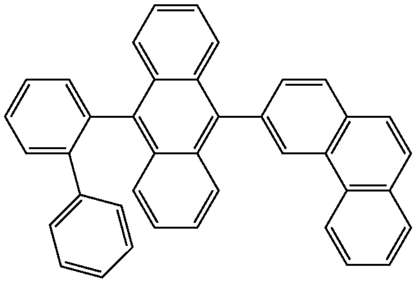
E13
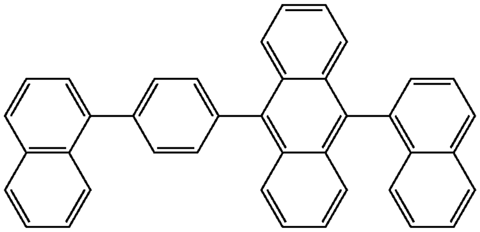
E14
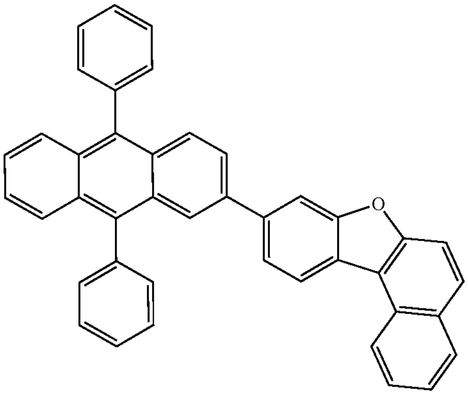

-continued

E15

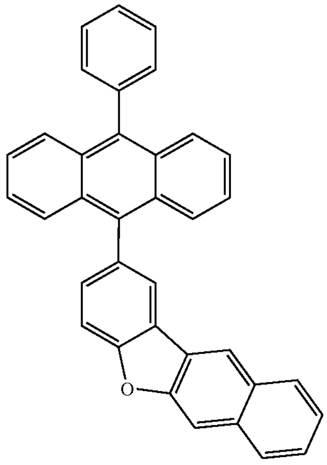

E16

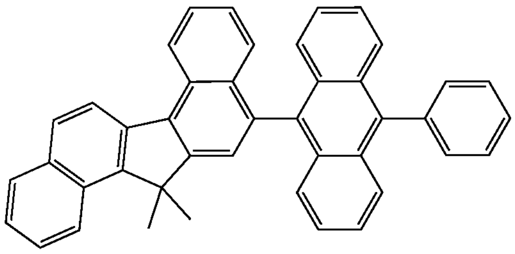

E17

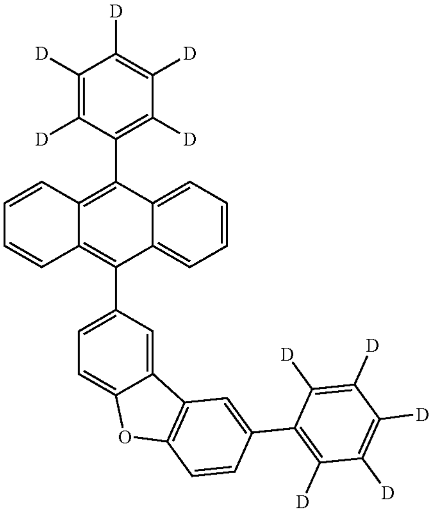

E18

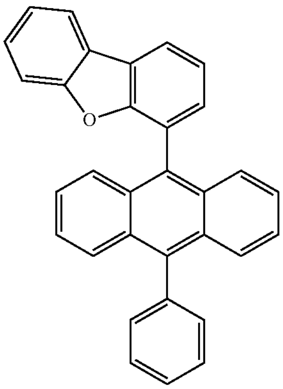

-continued

E19

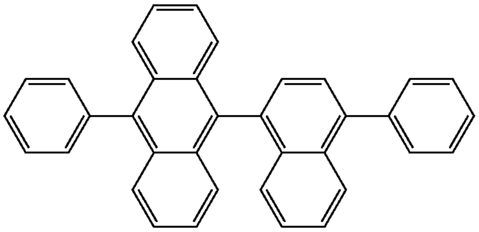

In an embodiment, the emission layer EML may include a compound represented by Formula E-2a or Formula E-2b below. The compound represented by Formula E-2a or Formula E-2b below may be used as a phosphorescence host material.

Formula E-2a

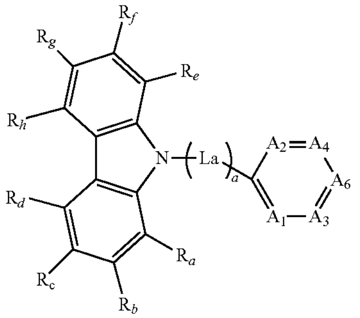

In Formula E-2a, "a" may be an integer of 0 to 10, $L_a$ may be a direct linkage, a substituted or unsubstituted arylene group of 6 to 30 ring-forming carbon atoms, or a substituted or unsubstituted heteroarylene group of 2 to 30 ring-forming carbon atoms. If "a" is an integer of 2 or more, a plurality of $L_a$ may be each independently a substituted or unsubstituted arylene group of 6 to 30 ring-forming carbon atoms, or a substituted or unsubstituted heteroarylene group of 2 to 30 ring-forming carbon atoms.

In addition, in Formula E-2a, $A_1$ to $A_5$ may be each independently N or CRi. $R_a$ to $R_i$ may be each independently a hydrogen atom, a deuterium atom, a substituted or unsubstituted amine group, a substituted or unsubstituted thio group, a substituted or unsubstituted oxy group, a substituted or unsubstituted alkyl group of 1 to 20 carbon atoms, a substituted or unsubstituted alkenyl group of 2 to 20 carbon atoms, a substituted or unsubstituted aryl group of 6 to 30 ring-forming carbon atoms, or a substituted or unsubstituted heteroaryl group of 2 to 30 ring-forming carbon atoms, or may be combined with an adjacent group to form a ring. $R_a$ to $R_i$ may be combined with an adjacent group to form a hydrocarbon ring or a heterocycle including N, O, S, etc. as a ring-forming atom.

In some embodiments, in Formula E-2a, two or three selected from $A_1$ to $A_5$ may be N, and the remainder may be $CR_i$.

Formula E-2b $$(Cbz1)-(L_b)_b-(Cbz2)$$

In Formula E-2b, Cbz1 and Cbz2 may be each independently an unsubstituted carbazole group, or a carbazole group substituted with an aryl group of 6 to 30 ring-forming carbon atoms. $L_b$ may be a direct linkage, a substituted or unsubstituted arylene group of 6 to 30 ring-forming carbon atoms, or a substituted or unsubstituted heteroarylene group of 2 to 30 ring-forming carbon atoms. "b" is an integer of 0 to 10, and if "b" is an integer of 2 or more, a plurality of $L_b$ may be each independently a substituted or unsubstituted arylene group of 6 to 30 ring-forming carbon atoms, or a substituted or unsubstituted heteroarylene group of 2 to 30 ring-forming carbon atoms.

The compound represented by Formula E-2a or Formula E-2b may be represented by any one selected from among the compounds in Compound Group E-2 below. However, the compounds listed in Compound Group E-2 below are only illustrations, and the compound represented by Formula E-2a or Formula E-2b is not limited to the compounds represented in Compound Group E-2 below.

Compound Group E-2

E-2-1

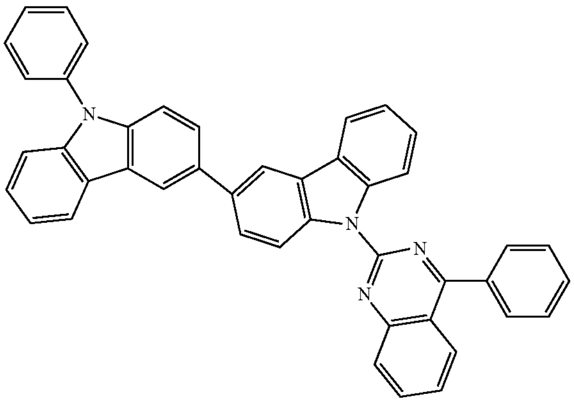

E-2-2

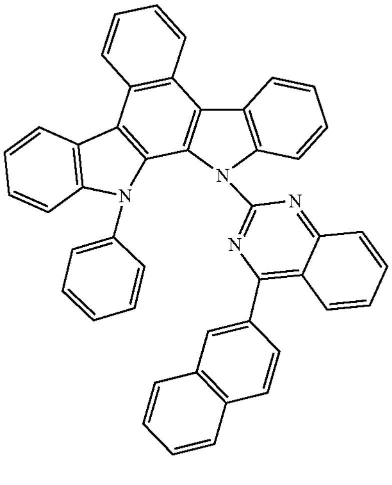

-continued

E-2-3

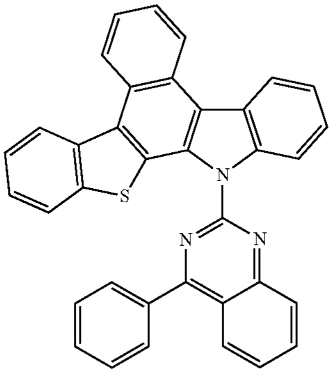

E-2-4

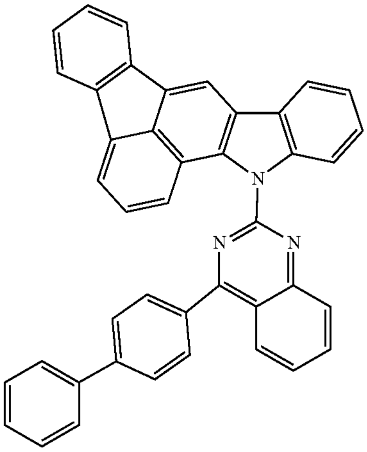

E-2-5

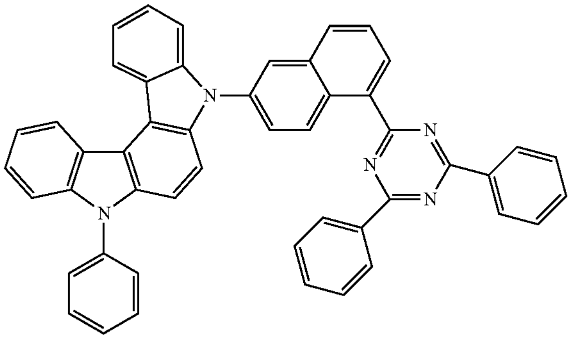

E-2-6

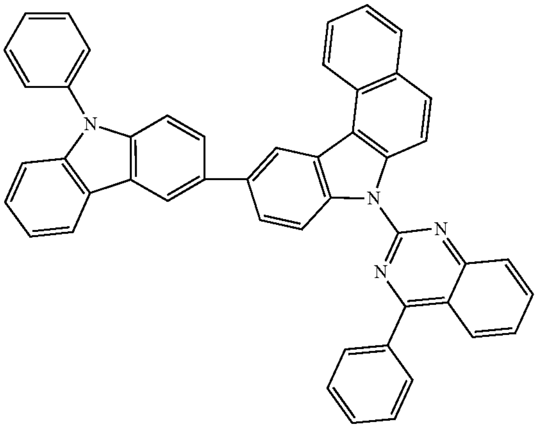

-continued
E-2-7
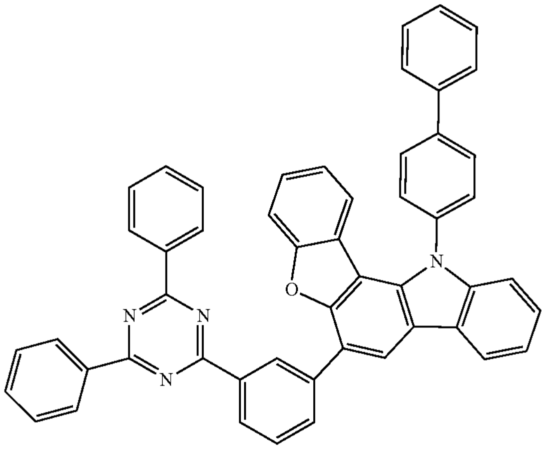
E-2-8
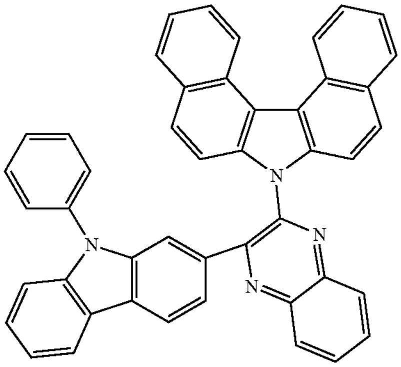
E-2-9
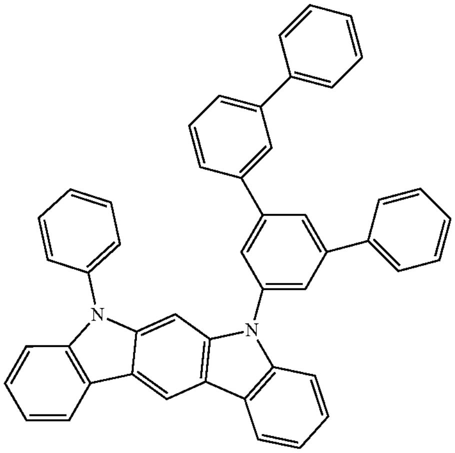
-continued
E-2-10
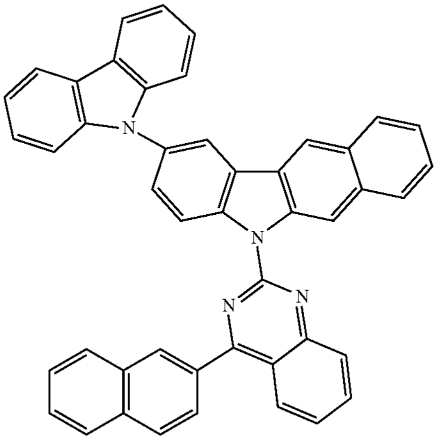
E-2-11
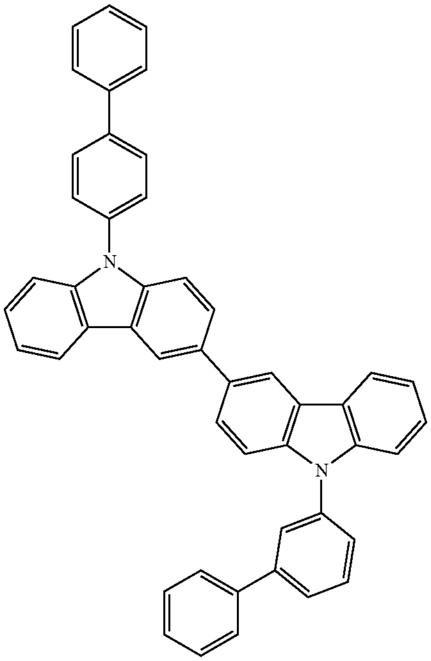
E-2-12
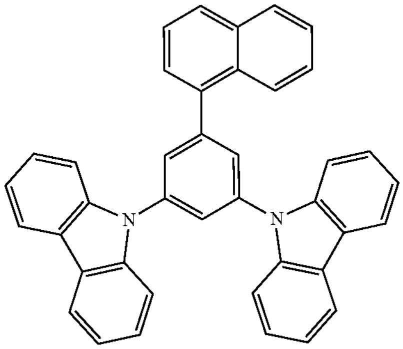

-continued
E-2-13
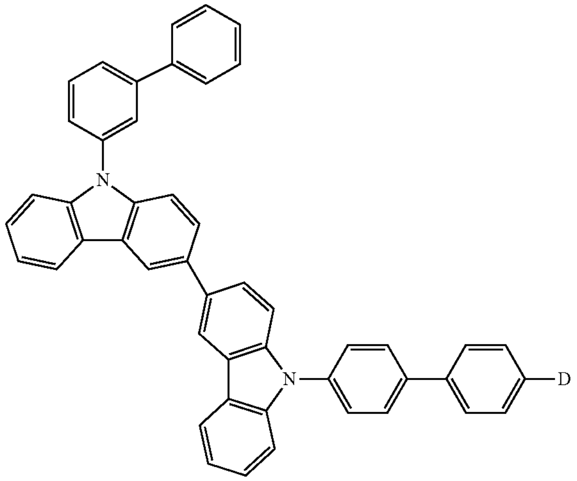
E-2-14
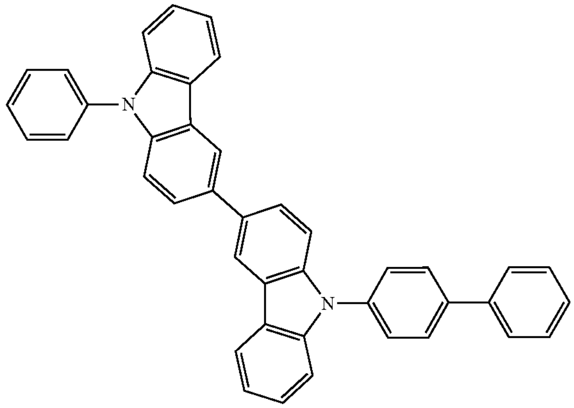
E-2-15
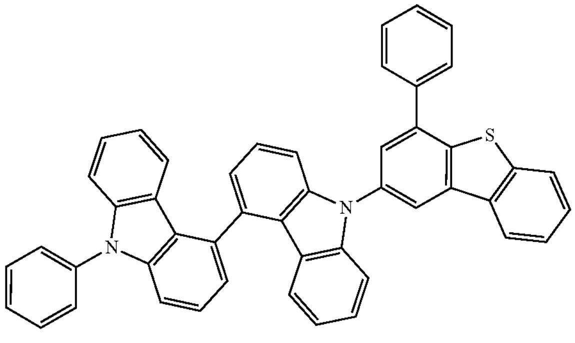
-continued
E-2-16
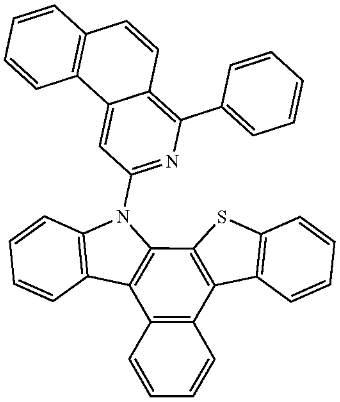
E-2-17
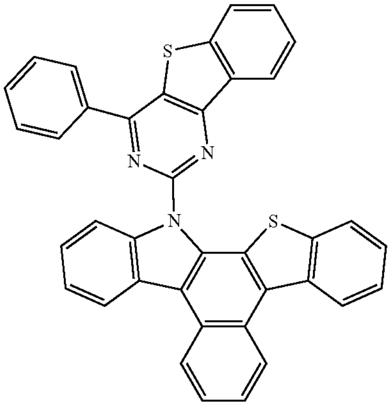
E-2-18
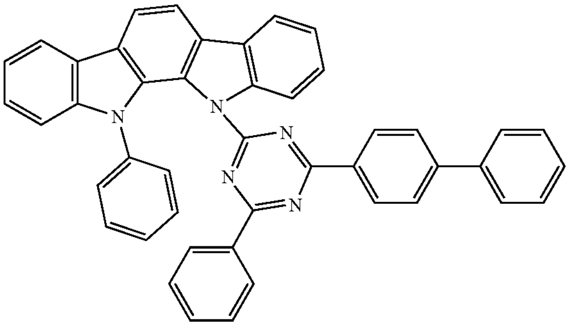
E-2-19
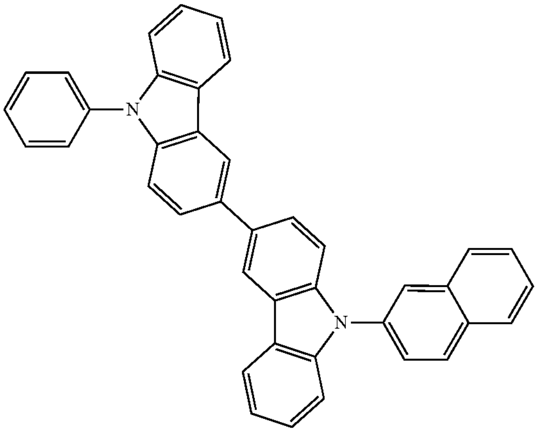

-continued

E-2-20

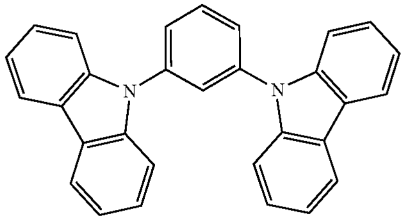

E-2-21

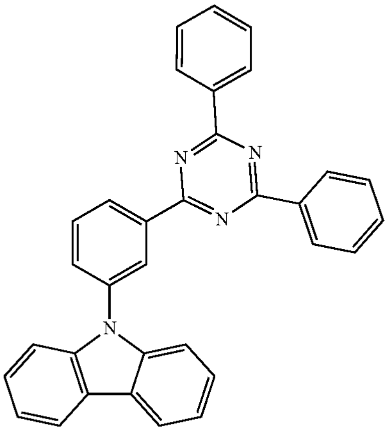

E-2-22

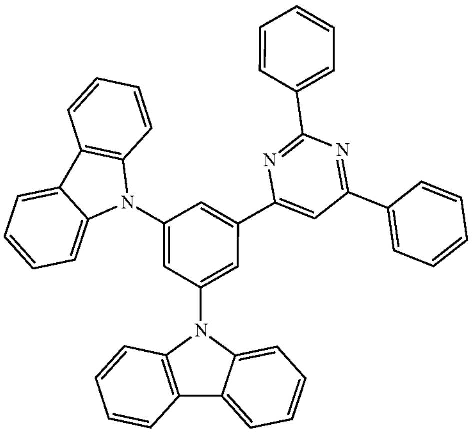

E-2-23

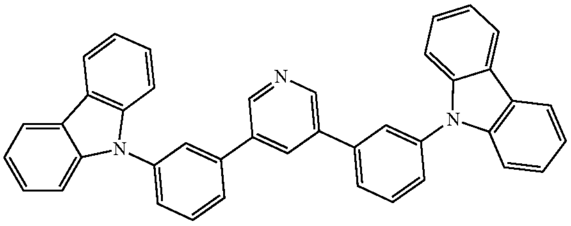

-continued

E-2-24

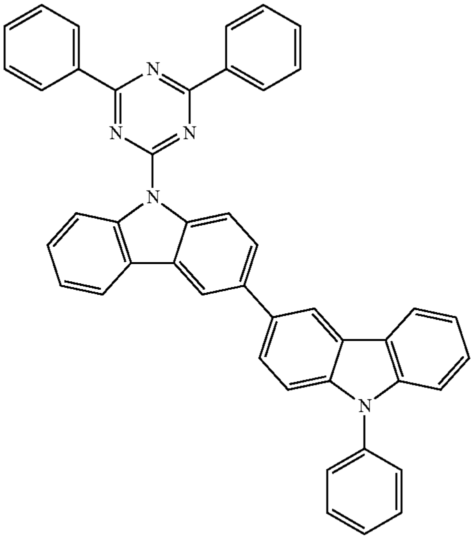

The emission layer EML may further include any suitable material generally used in the art as a host material. For example, the emission layer EML may include as a host material, at least one of bis (4-(9H-carbazol-9-yl) phenyl) diphenylsilane (BCPDS), (4-(1-(4-(diphenylamino) phenyl) cyclohexyl) phenyl) diphenyl-phosphine oxide (POPCPA), bis[2-(diphenylphosphino)phenyl] ether oxide (DPEPO), 4,4'-bis(carbazol-9-yl)biphenyl (CBP), 1,3-bis(carbazol-9-yl)benzene (mCP), 2,8-bis(diphenylphosphoryl)dibenzo[b,d]furan (PPF), 4,4',4"-tris(carbazol-9-yl)-triphenylamine (TCTA), or 1,3,5-tris(1-phenyl-1H-benzo[d]imidazole-2-yl) benzene (TPBi). However, embodiments of the present disclosure are not limited thereto. For example, tris(8-hydroxyquinolino)aluminum ($Alq_3$), 9,10-di(naphthalene-2-yl)anthracene (ADN), 2-tert-butyl-9,10-di(naphth-2-yl)anthracene (TBADN), distyrylarylene (DSA), 4,4'-bis(9-carbazolyl)-2,2'-dimethyl-biphenyl (CDBP), 2-methyl-9,10-bis(naphthalen-2-yl)anthracene (MADN), hexaphenyl cyclotriphosphazene (CP1), 1,4-bis(triphenylsilyl)benzene (UGH2), hexaphenylcyclotrisiloxane ($DPSiO_3$), octaphenylcyclotetra siloxane ($DPSiO_4$), etc. may be used as the host material.

The emission layer EML may include a compound represented by Formula M-a or Formula M-b below. The compound represented by Formula M-a or Formula M-b may be used as a phosphorescence dopant material. In addition, in an embodiment, the compound represented by Formula M-a or Formula M-b may be used as an auxiliary dopant material.

Formula M-a

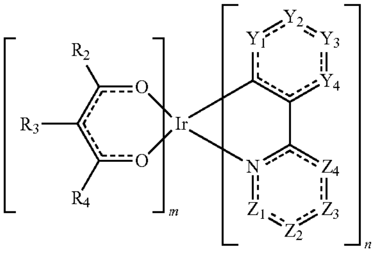

In Formula M-a, $Y_1$ to $Y_4$, and $Z_1$ to $Z_4$ may be each independently $CR_1$ or N, and $R_1$ to $R_4$ may be each independently a hydrogen atom, a deuterium atom, a substituted or unsubstituted amine group, a substituted or unsubstituted thio group, a substituted or unsubstituted oxy group, a substituted or unsubstituted alkyl group of 1 to 20 carbon atoms, a substituted or unsubstituted alkenyl group of 2 to 20 carbon atoms, a substituted or unsubstituted aryl group of 6 to 30 ring-forming carbon atoms, or a substituted or unsubstituted heteroaryl group of 2 to 30 ring-forming carbon atoms, or may be combined with an adjacent group to form a ring. In Formula M-a, "m" is 0 or 1, and "n" is 2 or 3. In Formula M-a, if "m" is 0, "n" is 3, and if "m" is 1, "n" is 2.

The compound represented by Formula M-a may be represented by any one selected from among Compounds M-a1 to M-a25 below. However, Compounds M-a1 to M-a25 below are illustrations, and the compound represented by Formula M-a is not limited to the compounds represented by Compounds M-a1 to M-a25 below.

M-a1

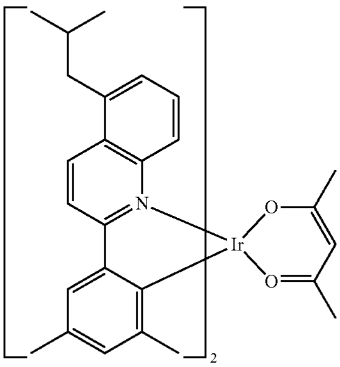

M-a2

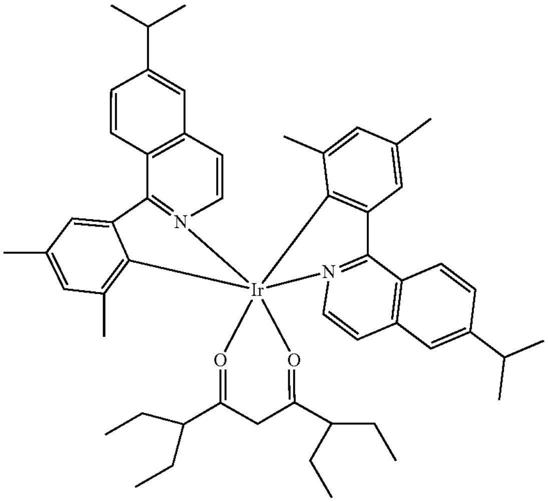

-continued

M-a3

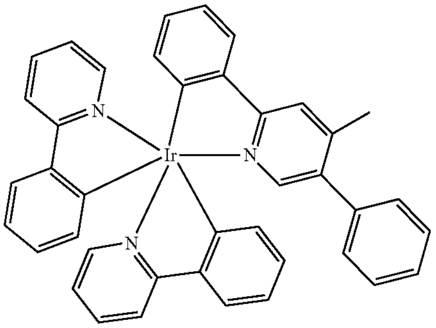

M-a4

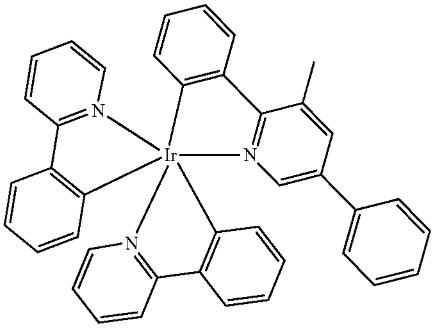

M-a5

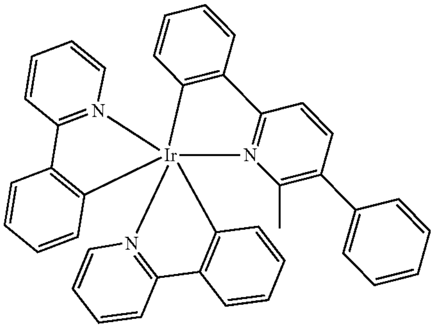

M-a6

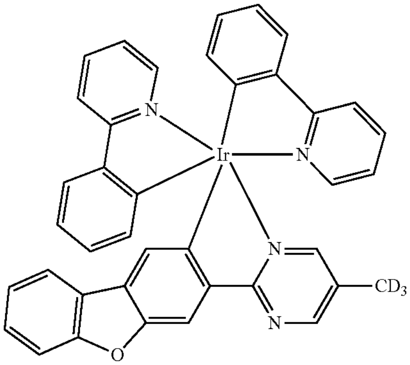

-continued
M-a7
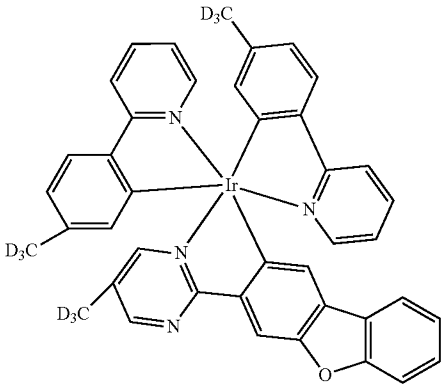
M-a8
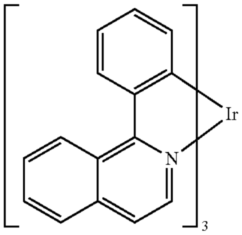
M-a9
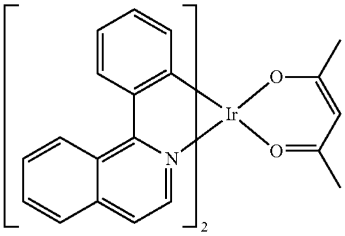
M-a10
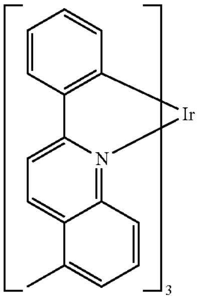
M-a11
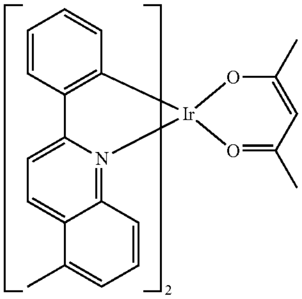
-continued
M-a12
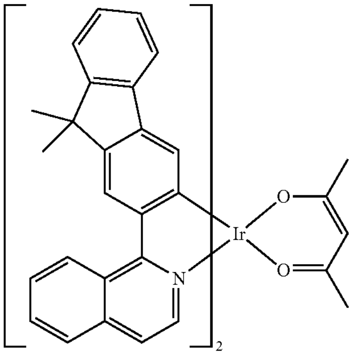
M-a13
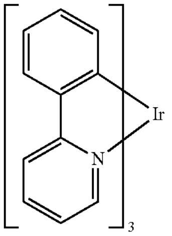
M-a14
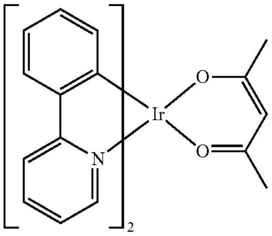
M-a15
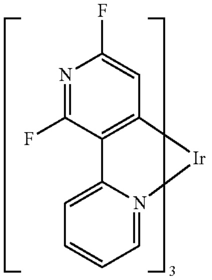
M-a16
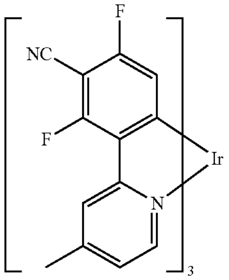

-continued
M-a17
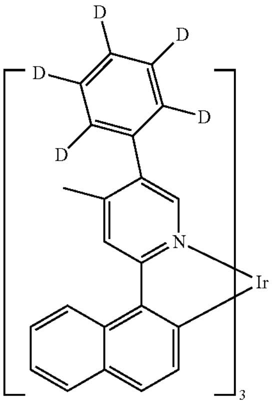
M-a18
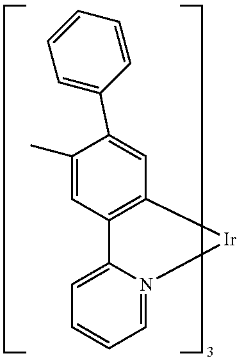
M-a19
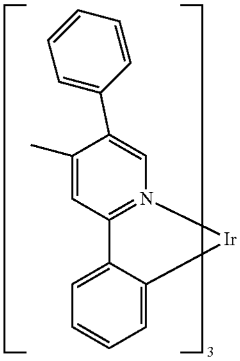
M-a20
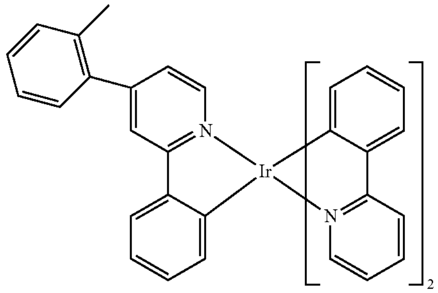
-continued
M-a21
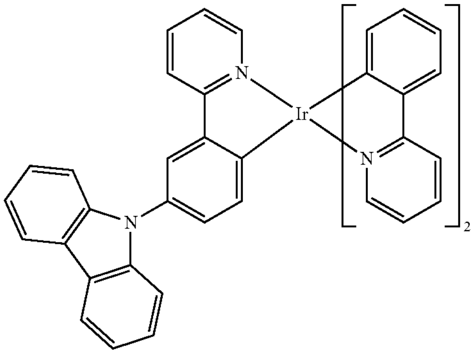
M-a22
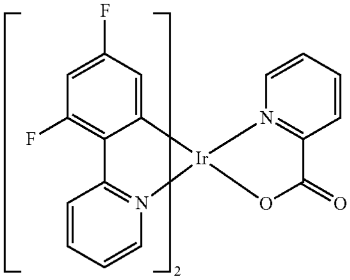
M-a23
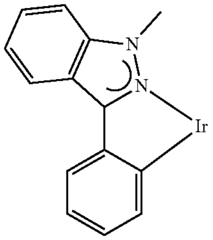
M-a24
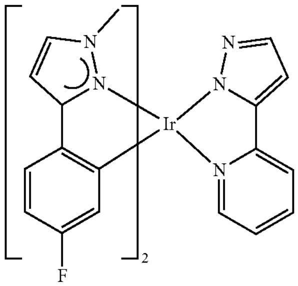
M-a25
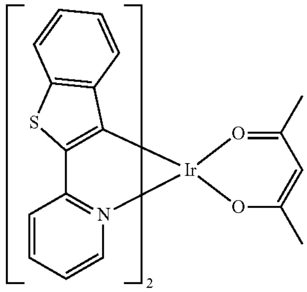
Compound M-a1 and Compound M-a2 may be used as red dopant materials, and Compound M-a3 to Compound M-a7 may be used as green dopant materials.

Formula M-b

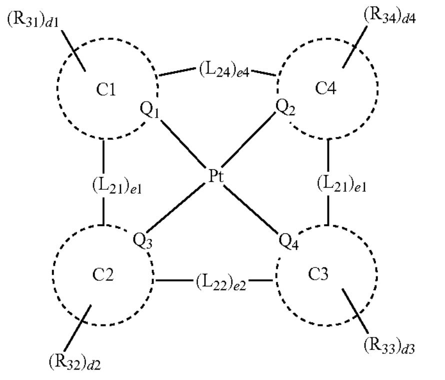

In Formula M-b, $Q_1$ to $Q_4$ are each independently C or N, C1 to C4 are each independently a substituted or unsubstituted hydrocarbon ring of 5 to 30 ring-forming carbon atoms, or a substituted or unsubstituted heterocycle of 2 to 30 ring-forming carbon atoms. $L_{21}$ to $L_{24}$ are each independently a direct linkage,

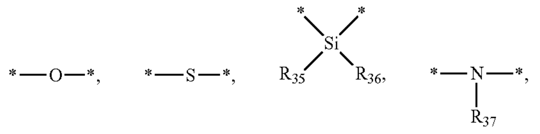

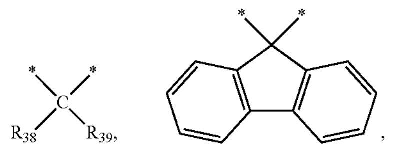

a substituted or unsubstituted divalent alkyl group of 1 to 20 carbon atoms, a substituted or unsubstituted arylene group of 6 to 30 ring-forming carbon atoms, or a substituted or unsubstituted heteroarylene group of 2 to 30 ring-forming carbon atoms, and e1 to e4 are each independently 0 or 1. $R_{31}$ to $R_{39}$ are each independently a hydrogen atom, a deuterium atom, a halogen atom, a cyano group, a substituted or unsubstituted amine group, a substituted or unsubstituted alkyl group of 1 to 20 carbon atoms, a substituted or unsubstituted aryl group of 6 to 30 ring-forming carbon atoms, or a substituted or unsubstituted heteroaryl group of 2 to 30 ring-forming carbon atoms, or combined with an adjacent group to form a ring, and d1 to d4 are each independently an integer of 0 to 4.

The compound represented by Formula M-b may be used as a blue phosphorescence dopant or a green phosphorescence dopant. In addition, the compound represented by Formula M-b may be an auxiliary dopant in an embodiment and may be further included in the emission layer EML.

The compound represented by Formula M-b may be represented by any one selected from among the compounds below. However, the compounds below are illustrations, and the compound represented by Formula M-b is not limited to the compounds represented below.

M-b-1

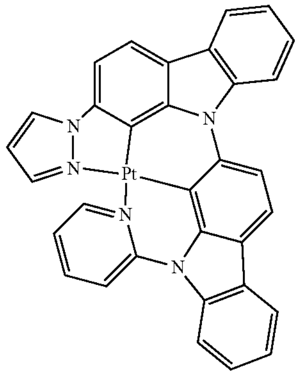

M-b-2

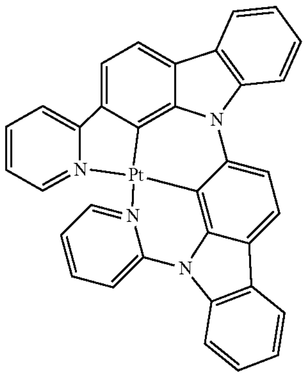

M-b-3

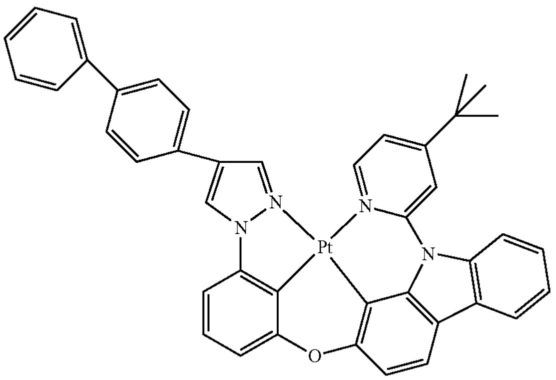

M-b-4

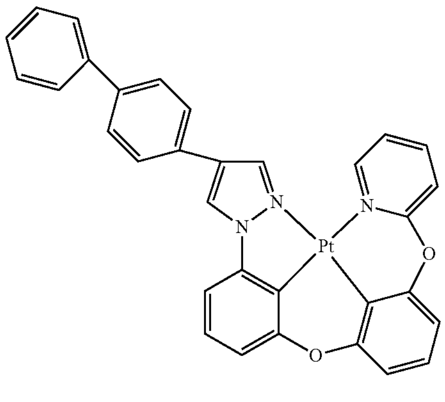

-continued

M-b-5

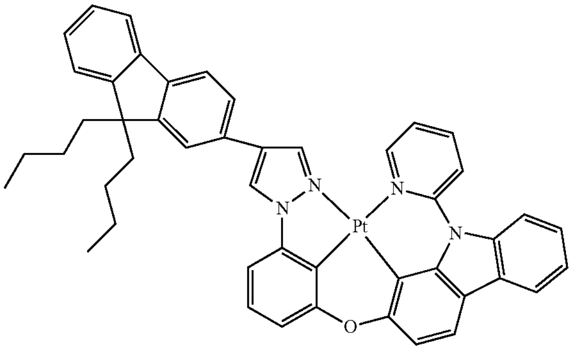

M-b-6

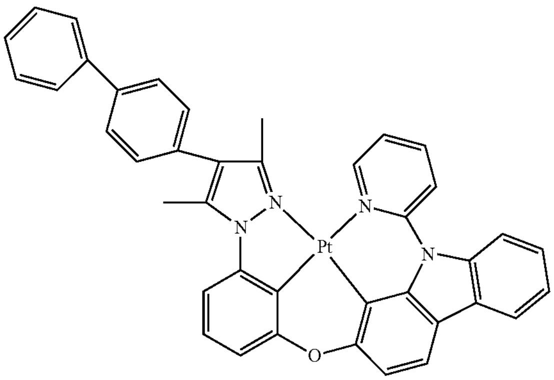

M-b-7

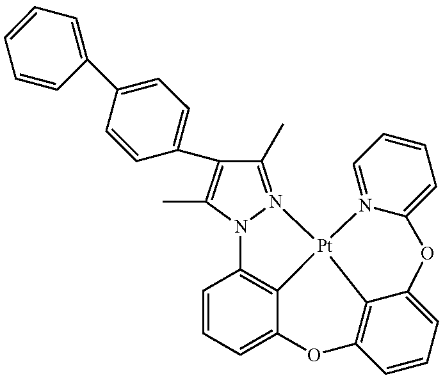

M-b-8

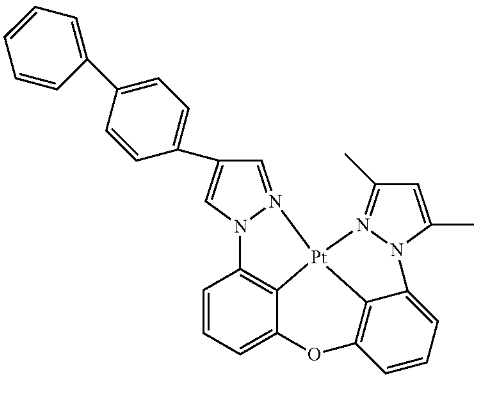

-continued

M-b-9

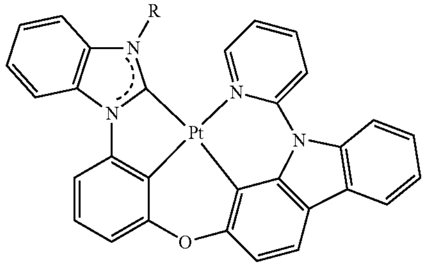

M-b-10

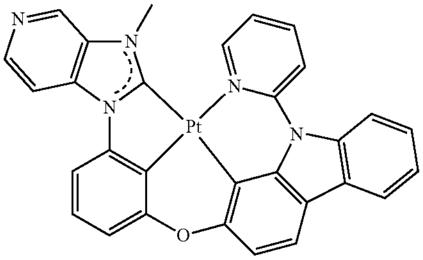

M-b-11

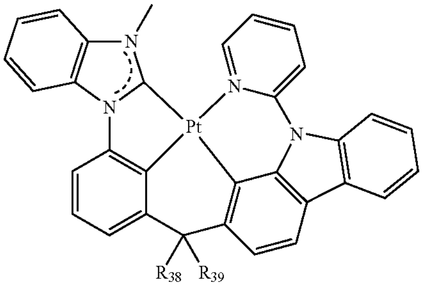

In the compounds above, R, $R_{38}$, and $R_{39}$ may be each independently a hydrogen atom, a deuterium atom, a halogen atom, a cyano group, a substituted or unsubstituted amine group, a substituted or unsubstituted alkyl group of 1 to 20 carbon atoms, a substituted or unsubstituted aryl group of 6 to 30 ring-forming carbon atoms, or a substituted or unsubstituted heteroaryl group of 2 to 30 ring-forming carbon atoms.

The emission layer EML may include any one selected from among Formula F-a to Formula F-c below. The compounds represented by Formula F-a to Formula F-c below may be used as fluorescence dopant materials.

Formula F-a

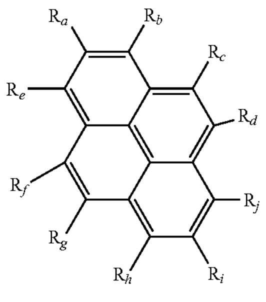

In Formula F-a, two selected from $R_a$ to $R_j$ may be each independently substituted with *—$NAr_1Ar_2$. The remainder not substituted with *—$NAr_1Ar_2$ among $R_a$ to $R_j$ may be each independently a hydrogen atom, a deuterium atom, a halogen atom, a cyano group, a substituted or unsubstituted amine group, a substituted or unsubstituted alkyl group of 1 to 20 carbon atoms, a substituted or unsubstituted aryl group of 6 to 30 ring-forming carbon atoms, or a substituted or unsubstituted heteroaryl group of 2 to 30 ring-forming carbon atoms.

In *—$NAr_1Ar_2$, $Ar_1$ and $Ar_2$ may be each independently a substituted or unsubstituted aryl group of 6 to 30 ring-forming carbon atoms, or a substituted or unsubstituted heteroaryl group of 2 to 30 ring-forming carbon atoms. For example, at least one selected from among $Ar_1$ and $Ar_2$ may be a heteroaryl group including O or S as a ring-forming atom.

Formula F-b

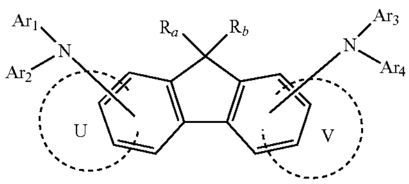

In Formula F-b, $R_a$ and $R_b$ may be each independently a hydrogen atom, a deuterium atom, a substituted or unsubstituted alkyl group of 1 to 20 carbon atoms, a substituted or unsubstituted alkenyl group of 2 to 20 carbon atoms, a substituted or unsubstituted aryl group of 6 to 30 ring-forming carbon atoms, or a substituted or unsubstituted heteroaryl group of 2 to 30 ring-forming carbon atoms, or may be combined with an adjacent group to form a ring. $Ar_1$ to $Ar_4$ may be each independently a substituted or unsubstituted aryl group of 6 to 30 ring-forming carbon atoms, or a substituted or unsubstituted heteroaryl group of 2 to 30 ring-forming carbon atoms.

In Formula F-b, U and V may be each independently a substituted or unsubstituted hydrocarbon ring of 5 to 30 ring-forming carbon atoms, or a substituted or unsubstituted heterocycle of 2 to 30 ring-forming carbon atoms.

In Formula F-b, the number of rings represented by U and V may be each independently 0 or 1. For example, in Formula F-b, if the number of U or V is 1, one ring forms a fused ring at the designated part by U or V, and if the number of U or V is 0, a ring is not present at the designated part by U or V. In some embodiments, if the number of U is 0, and the number of V is 1, or if the number of U is 1, and the number of V is 0, a fused ring having the fluorene core of Formula F-b may be a ring compound having four rings. In addition, if the number of both U and V is 0, the fused ring of Formula F-b may be a ring compound having three rings. In addition, if the number of both U and V is 1, a fused ring having the fluorene core of Formula F-b may be a ring compound having five rings.

Formula F-c

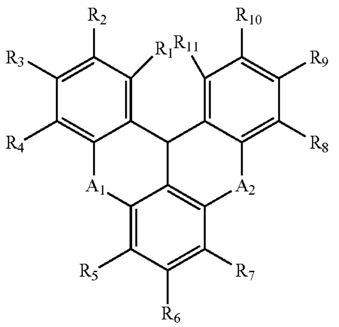

In Formula F-c, $A_1$ and $A_2$ may be each independently O, S, Se, or $NR_m$, and $R_m$ may be a hydrogen atom, a deuterium atom, a substituted or unsubstituted alkyl group of 1 to 20 carbon atoms, a substituted or unsubstituted aryl group of 6 to 30 ring-forming carbon atoms, or a substituted or unsubstituted heteroaryl group of 2 to 30 ring-forming carbon atoms. $R_1$ to $R_{11}$ are each independently a hydrogen atom, a deuterium atom, a halogen atom, a cyano group, a substituted or unsubstituted amine group, a substituted or unsubstituted boryl group, a substituted or unsubstituted oxy group, a substituted or unsubstituted thio group, a substituted or unsubstituted alkyl group of 1 to 20 carbon atoms, a substituted or unsubstituted aryl group of 6 to 30 ring-forming carbon atoms, or a substituted or unsubstituted heteroaryl group of 2 to 30 ring-forming carbon atoms, or combined with an adjacent group to form a ring.

In Formula F-c, $A_1$ and $A_2$ may be each independently combined with the substituents of an adjacent ring to form a fused ring. For example, if $A_1$ and $A_2$ may be each independently $NR_m$, $A_1$ may be combined with $R_4$ or $R_5$ to form a ring. In addition, $A_2$ may be combined with $R_7$ or $R_8$ to form a ring.

In an embodiment, the emission layer EML may include any suitable dopant material generally used in the art. In some embodiments, the emission layer EML may include styryl derivatives (for example, 1,4-bis[2-(3-N-ethylcarbazoryl)vinyl]benzene (BCzVB), 4-(di-p-tolylamino)-4'-[(di-p-tolylamino)styryl]stilbene (DPAVB), N-(4-((E)-2-(6-((E)-4-(diphenylamino)styryl)naphthalen-2-yl)vinyl)phenyl)-N-phenylbenzenamine (N-BDAVBi), and/or 4,4'-bis[2-(4-(N,N-diphenylamino)phenyl)vinyl]biphenyl (DPAVBi)), perylene and/or the derivatives thereof (for example, 2,5,8,11-tetra-t-butylperylene (TBP)), pyrene and/or the derivatives thereof (for example, 1,1-dipyrene, 1,4-dipyrenylbenzene, and/or 1,4-bis(N,N-diphenylamino)pyrene), etc.

In an embodiment, if a plurality of emission layers EML are included, at least one emission layer EML may include any suitable phosphorescence dopant material generally used in the art. For example, the phosphorescence dopant may use a metal complex including iridium (Ir), platinum (Pt), osmium (Os), gold (Au), titanium (Ti), zirconium (Zr), hafnium (Hf), europium (Eu), terbium (Tb), and/or thulium (Tm). In some embodiments, iridium(III) bis(4,6-difluorophenylpyridinato-N,C2')picolinate (Flrpic), bis(2,4-difluorophenylpyridinato)-tetrakis(1-pyrazolyl)borate iridium(III) (Fir6), and/or platinum octaethyl porphyrin (PtOEP) may be used as the phosphorescence dopant. However, embodiments of the present disclosure are limited thereto.

In one or more embodiments, the emission layer EML may include a hole transport host and an electron transport host. In addition, the emission layer EML may include an auxiliary dopant and a light emitting dopant. In some embodiments, the auxiliary dopant may include a phosphorescence dopant material and/or a thermally activated delayed fluorescence dopant. In some embodiments, the emission layer EML may include a hole transport host, an electron transport host, an auxiliary dopant, and a light emitting dopant.

An exciplex may be formed by the hole transport host and the electron transport host in the emission layer EML. In this case, the triplet energy of the exciplex formed by the hole transport host and the electron transport host may correspond to a triplet energy (T1) which is a gap between the LUMO energy level of the electron transport host and the HOMO energy level of the hole transport host.

In some embodiments, the triplet energy (T1) of the exciplex formed by the hole transport host and the electron transport host may be about 2.4 eV to about 3.0 eV. In some embodiments, the triplet energy (T1) of the exciplex may be a value smaller than the energy gap of each host material. Accordingly, the exciplex may have a triplet energy (T1) of about 3.0 eV or less, which is the energy gap between the hole transport host and the electron transport host.

In some embodiments, at least one emission layer EML may include a quantum dot material. The core of the quantum dot may be selected from Group II-VI compounds, Group III-VI compounds, Group I-III-VI compounds, Group III-V compounds, Group III-II-V compounds, Group IV-VI compounds, Group IV elements, Group IV compounds, and combinations thereof.

The Group II-VI compound may be selected from the group consisting of: a binary compound selected from the group consisting of CdSe, CdTe, CdS, ZnS, ZnSe, ZnTe, ZnO, HgS, HgSe, HgTe, MgSe, MgS, and mixtures thereof; a ternary compound selected from the group consisting of CdSeS, CdSeTe, CdSTe, ZnSeS, ZnSeTe, ZnSTe, HgSeS, HgSeTe, HgSTe, CdZnS, CdZnSe, CdZnTe, CdHgS, CdHgSe, CdHgTe, HgZnS, HgZnSe, HgZnTe, MgZnSe, MgZnS, and mixtures thereof; and a quaternary compound selected from the group consisting of HgZnTeS, CdZnSeS, CdZnSeTe, CdZnSTe, CdHgSeS, CdHgSeTe, CdHgSTe, HgZnSeS, HgZnSeTe, HgZnSTe, and mixtures thereof.

The Group III-V compound may include a binary compound such as $In_2S_3$, and/or $In_2Se_3$, a ternary compound such as $InGaS_3$, and/or $InGaSe_3$, or optional combinations thereof.

The Group I-III-VI compound may be selected from a ternary compound selected from the group consisting of AgInS, $AgInS_2$, CuInS, $CuInS_2$, $AgGaS_2$, $CuGaS_2$, $CuGaO_2$, $AgGaO_2$, $AgAlO_2$ and mixtures thereof, and/or a quaternary compound such as $AgInGaS_2$, and/or $CuInGaS_2$.

The Group III-V compound may be selected from the group consisting of a binary compound selected from the group consisting of GaN, GaP, GaAs, GaSb, AlN, AlP, AlAs, AlSb, InN, InP, InAs, InSb, and mixtures thereof, a ternary compound selected from the group consisting of GaNP, GaNAs, GaNSb, GaPAs, GaPSb, AlNP, AlNAs, AlNSb, AlPAs, AlPSb, InGaP, InAlP, InNP, InNAs, InNSb, InPAs, InPSb, and mixtures thereof, and a quaternary compound selected from the group consisting of GaAlNP, GaAlNAs, GaAlNSb, GaAlPAs, GaAlPSb, GaInNP, GaInNAs, GaInNSb, GaInPAs, GaInPSb, InAlNP, InAlNAs, InAlNSb, InAlPAs, InAlPSb, and mixtures thereof. In some embodiments, the Group III-V compound may further include a Group II metal. For example, InZnP, etc. may be selected as a Group III-II-V compound.

The Group IV-VI compound may be selected from the group consisting of a binary compound selected from the group consisting of SnS, SnSe, SnTe, PbS, PbSe, PbTe, and mixtures thereof, a ternary compound selected from the group consisting of SnSeS, SnSeTe, SnSTe, PbSeS, PbSeTe, PbSTe, SnPbS, SnPbSe, SnPbTe, and mixtures thereof, and a quaternary compound selected from the group consisting of SnPbSSe, SnPbSeTe, SnPbSTe, and mixtures thereof. The Group IV element may be selected from the group consisting of Si, Ge, and a mixture thereof. The Group IV compound may be a binary compound selected from the group consisting of SiC, SiGe, and a mixture thereof.

In this case, the binary compound, the ternary compound or the quaternary compound may be present at uniform (e.g., substantially uniform) concentration in a particle or may be present at a partially different concentration distribution state in the same particle. In addition, a core/shell structure in which one quantum dot wraps another quantum dot may be possible. The interface of the core and the shell may have a concentration gradient in which the concentration of an element present in the shell decreases along a direction toward the center core and/or shell.

In some embodiments, the quantum dot may have the above-described core-shell structure including a core including a nanocrystal and a shell wrapping the core. The shell of the quantum dot may play the role of a protection layer for preventing or reducing the chemical deformation of the core to maintain semiconductor properties and/or a charging layer for imparting the quantum dot with electrophoretic properties. The shell may have a single layer or a multilayer. Examples of the shell of the quantum dot may include a metal and/or non-metal oxide, a semiconductor compound, or combinations thereof.

For example, the metal and/or non-metal oxide may include a binary compound such as $SiO_2$, $Al_2O_3$, $TiO_2$, ZnO, MnO, $Mn_2O_3$, $Mn_3O_4$, CuO, FeO, $Fe_2O_3$, $Fe_3O_4$, CoO, $Co_3O_4$ and/or NiO, and/or a ternary compound such as $MgAl_2O_4$, $CoFe_2O_4$, $NiFe_2O_4$ and/or $CoMn_2O_4$, but embodiments of the present disclosure are not limited thereto.

Also, the semiconductor compound may include CdS, CdSe, CdTe, ZnS, ZnSe, ZnTe, ZnSeS, ZnTeS, GaAs, GaP, GaSb, HgS, HgSe, HgTe, InAs, InP, InGaP, InSb, AlAs, AlP, AlSb, etc., but embodiments of the present disclosure are not limited thereto.

The quantum dot may have a full width of half maximum (FWHM) of emission wavelength spectrum of about 45 nm or less, about 40 nm or less, or, for example, about 30 nm or less. Within this range, color purity and/or color reproducibility may be improved. In addition, light emitted via such quantum dot is emitted in all directions (e.g., substantially all directions, and light view angle properties may be improved.

In addition, the shape of the quantum dot may be any suitable shapes generally used in the art, without specific limitation. For example, the shape of spherical, pyramidal, multi-arm, and/or cubic nanoparticle, nanotube, nanowire, nanofiber, nanoplate particle, etc. may be used.

The quantum dot may control the color of light emitted according to the particle size, and accordingly, the quantum dot may have various suitable emission colors such as blue, red and green.

In the light emitting elements ED of embodiments, as shown in FIG. 3 to FIG. 6, the electron transport region ETR is provided on the emission layer EML. The electron transport region ETR may include at least one of a hole blocking layer HBL, an electron transport layer ETL, or an electron injection layer EIL. However, embodiments of the present disclosure are not limited thereto.

The electron transport region ETR may have a single layer formed using a single material, a single layer formed using a plurality of different materials, or a multilayer structure having a plurality of layers formed using a plurality of different materials.

For example, the electron transport region ETR may have a single layer structure of an electron injection layer EIL or an electron transport layer ETL, or a single layer structure formed using an electron injection material and an electron transport material. Further, the electron transport region ETR may have a single layer structure formed using a plurality of different materials, or a structure stacked from the emission layer EML of electron transport layer ETL/electron injection layer EIL, hole blocking layer HBL/electron transport layer ETL/electron injection layer EIL, electron transport layer ETL/buffer layer/electron injection layer EIL, without limitation. The thickness of the electron transport region ETR may be, for example, from about 1,000 Å to about 1,500 Å.

The electron transport region ETR may be formed using various suitable methods such as a vacuum deposition method, a spin coating method, a cast method, a Langmuir-Blodgett (LB) method, an inkjet printing method, a laser printing method, and/or a laser induced thermal imaging (LITI) method.

The electron transport region ETR may include a compound represented by Formula ET-1 below.

Formula ET-1

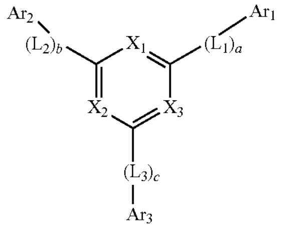

In Formula ET-1, at least one selected from among $X_1$ to $X_3$ is N, and the remainder are $CR_a$. $R_a$ may be a hydrogen atom, a deuterium atom, a substituted or unsubstituted alkyl of 1 to 20 carbon atoms, a substituted or unsubstituted aryl group of 6 to 30 ring-forming carbon atoms, or a substituted or unsubstituted heteroaryl group of 2 to 30 ring-forming carbon atoms. $Ar_1$ to Ara may be each independently a hydrogen atom, a deuterium atom, a substituted or unsubstituted alkyl group of 1 to 20 carbon atoms, a substituted or unsubstituted aryl group of 6 to 30 ring-forming carbon atoms, or a substituted or unsubstituted heteroaryl group of 2 to 30 ring-forming carbon atoms.

In Formula ET-1, "a" to "c" may be each independently an integer of 0 to 10. In Formula ET-1, $L_1$ to L3 may be each independently a direct linkage, a substituted or unsubstituted arylene group of 6 to 30 ring-forming carbon atoms, or a substituted or unsubstituted heteroarylene group of 2 to 30 ring-forming carbon atoms. If "a" to "c" are integers of 2 or more, $L_1$ to L3 may be each independently a substituted or unsubstituted arylene group of 6 to 30 ring-forming carbon atoms, or a substituted or unsubstituted heteroarylene group of 2 to 30 ring-forming carbon atoms.

The electron transport region ETR may include an anthracene-based compound. However, embodiments of the present disclosure are not limited thereto, and the electron transport region ETR may include, for example, tris(8-hydroxyquinolinato)aluminum ($Alq_3$), 1,3,5-tri[(3-pyridyl)-phen-3-yl]benzene, 2,4,6-tris(3'-(pyridin-3-yl)biphenyl-3-yl)-1,3,5-triazine, 2-(4-(N-phenylbenzoimidazolyl-1-ylphenyl)-9,10-dinaphthylanthracene, 1,3,5-tri(1-phenyl-1H-benzo[d]imidazol-2-yl)benzene (TPBi), 2,9-dimethyl-4,7-diphenyl-1,10-phenanthroline (BCP), 4,7-diphenyl-1,10-phenanthroline (Bphen), 3-(4-biphenylyl)-4-phenyl-5-tert-butylphenyl-1,2,4-triazole (TAZ), 4-(naphthalen-1-yl)-3,5-diphenyl-4H-1,2,4-triazole (NTAZ), 2-(4-biphenylyl)-5-(4-tert-butylphenyl)-1,3,4-oxadiazole (tBu-PBD), bis(2-methyl-8-quinolinolato-N1,O8)-(1,1'-biphenyl-4-olato) aluminum (BAlq), berylliumbis(benzoquinolin-10-olate (Bebq2), 9,10-di(naphthalene-2-yl)anthracene (ADN), 1,3-bis[3,5-di(pyridin-3-yl)phenyl]benzene (BmPyPhB), diphenyl(4-(triphenylsilyl)phenyl)phosphine oxide (TSPO1), and/or mixtures thereof, without limitation.

The electron transport region ETR may include at least one selected from among Compounds ET1 to ET36 below.

ET1

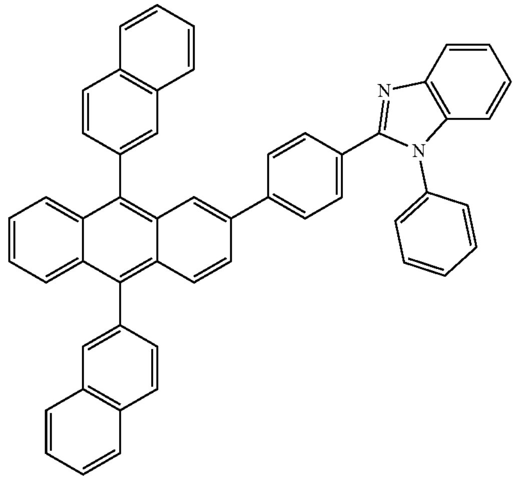

ET2

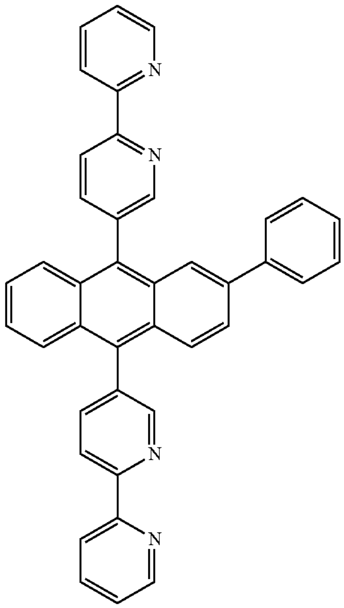

-continued
ET3
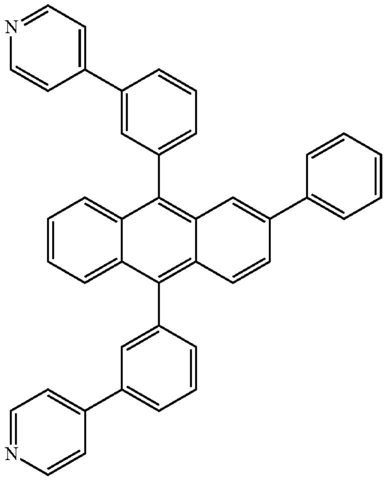
ET4
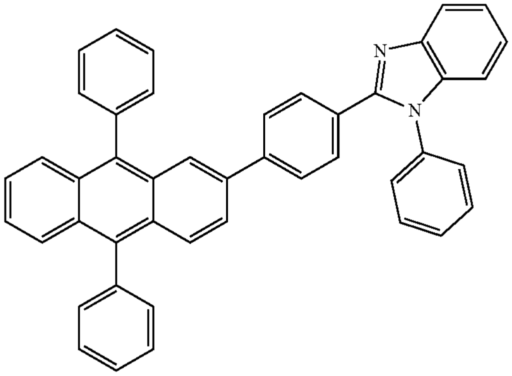
ET5
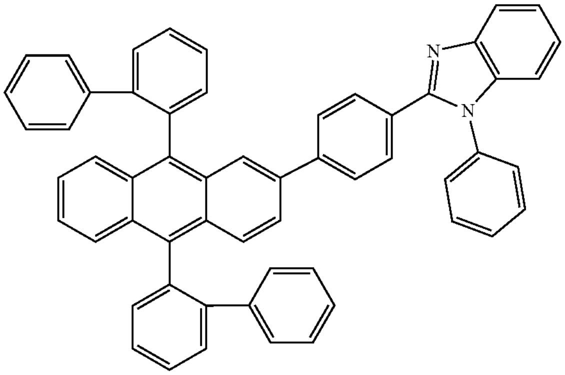
ET6
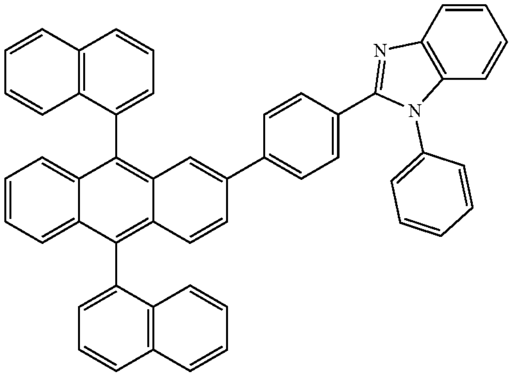
-continued
ET7
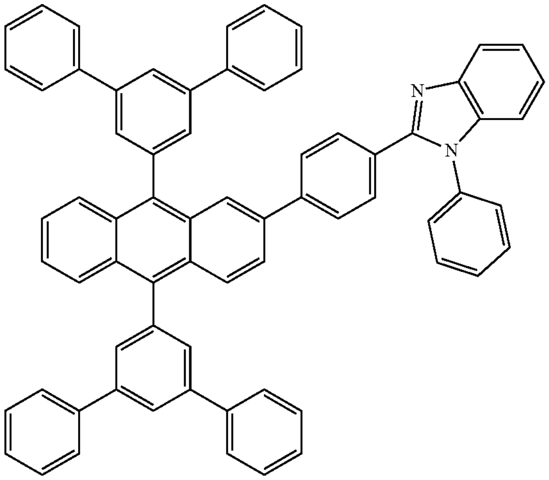
ET8
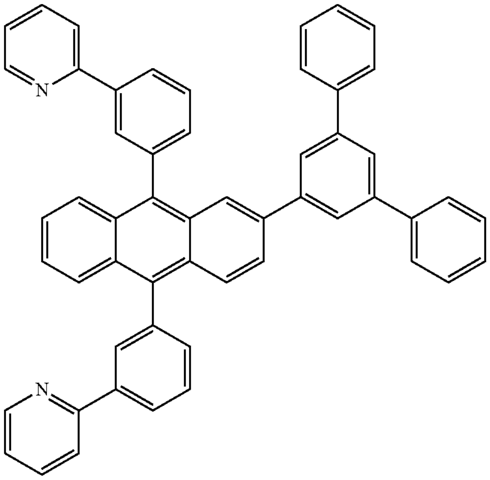
ET9
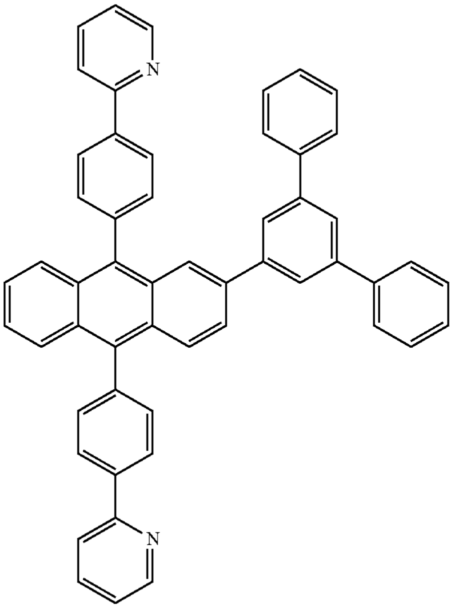

-continued
ET10
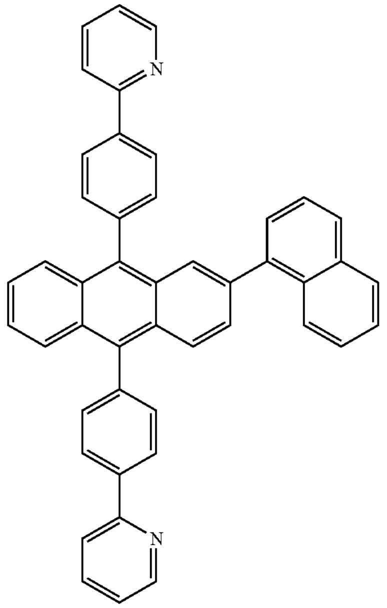
ET11
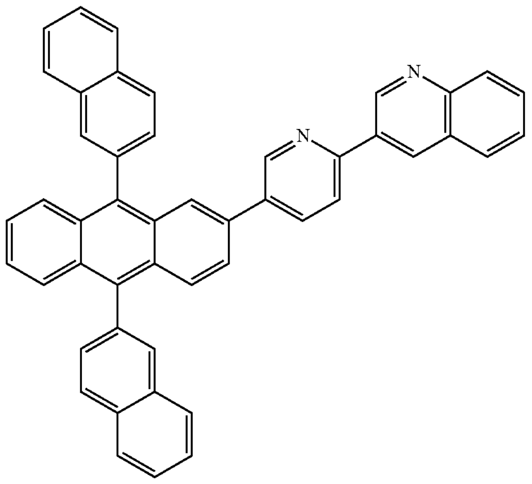
ET12
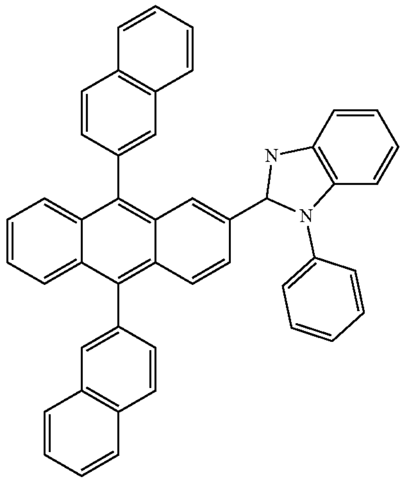
-continued
ET13
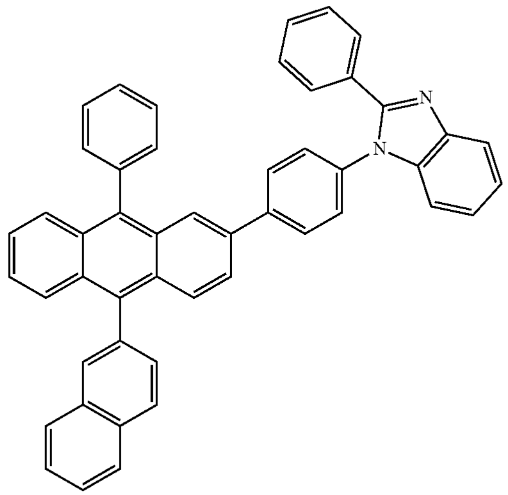
ET14
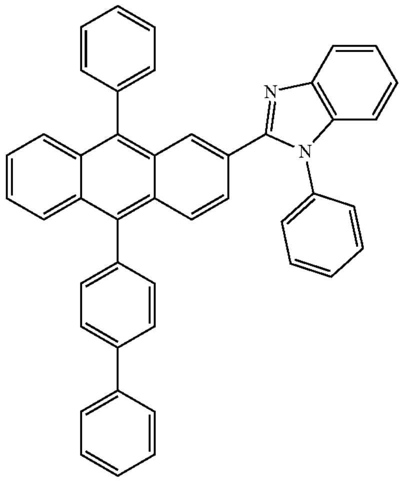
ET15
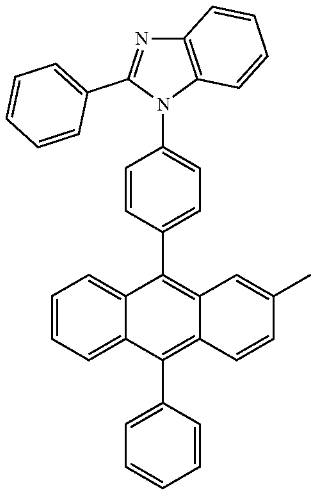

-continued
ET16
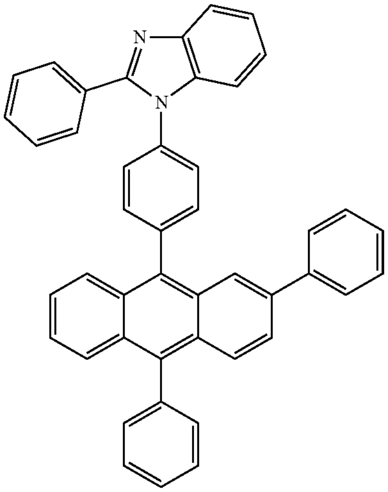
ET17
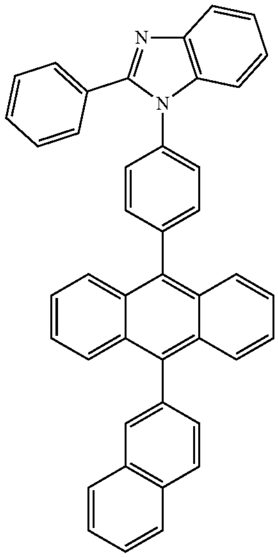
ET18
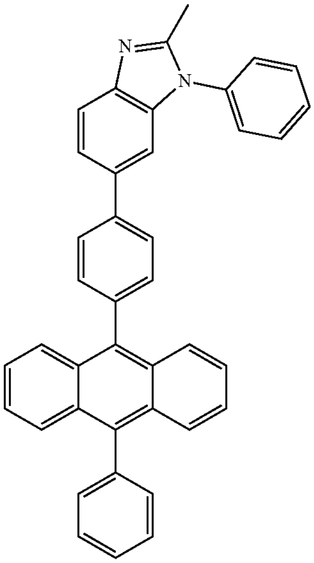
-continued
ET19
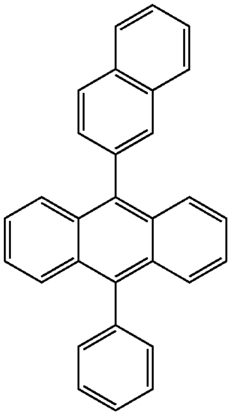
ET20
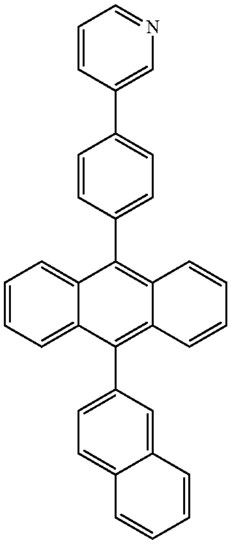
ET21
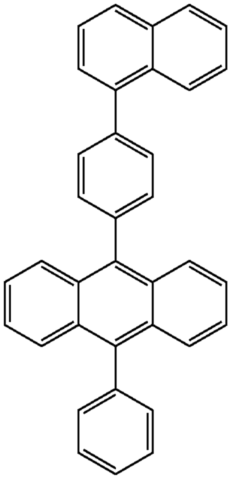

-continued
ET22
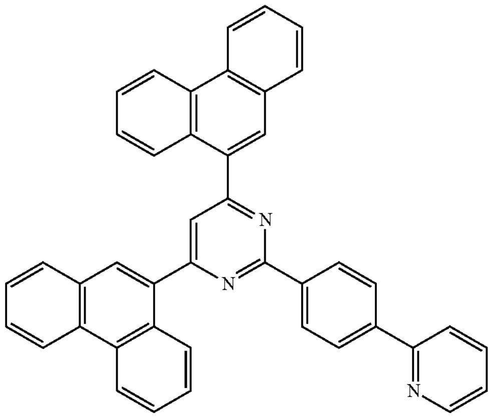
ET23
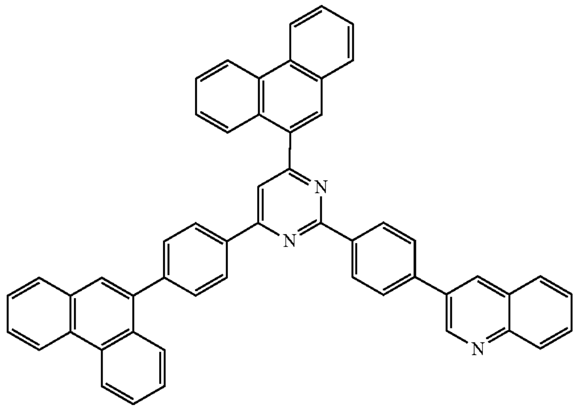
ET24
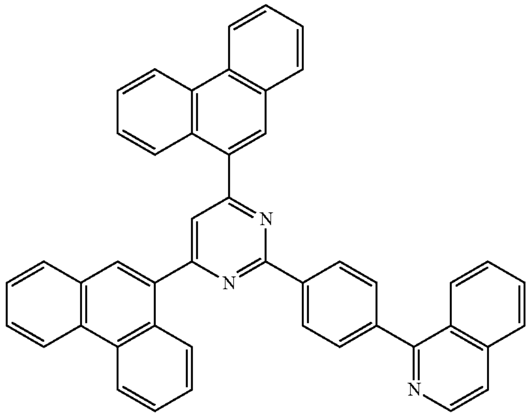
-continued
ET25
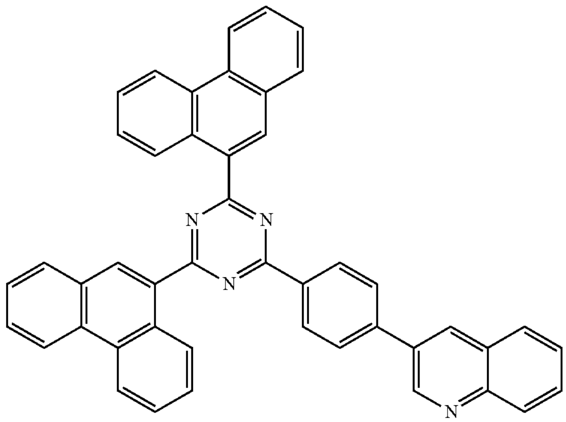
ET26
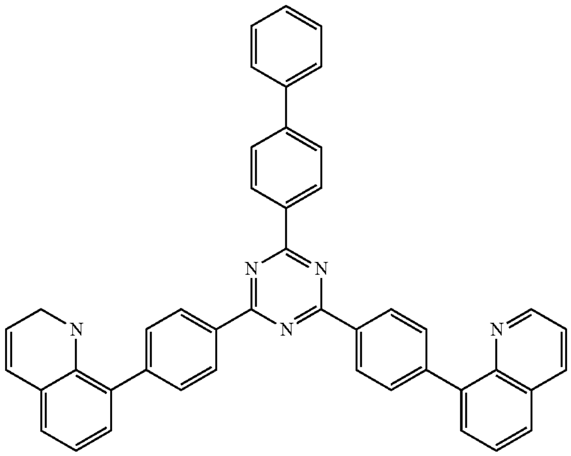
ET27
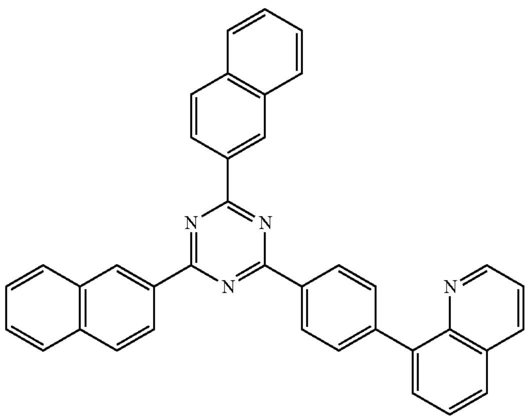

-continued
ET28
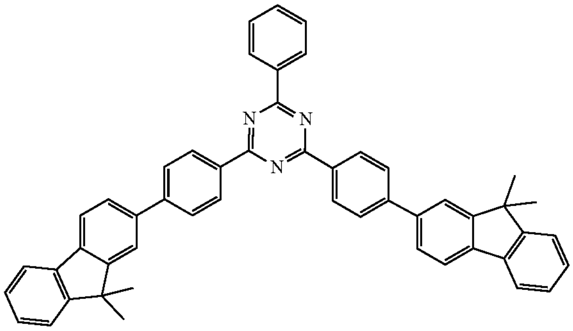
ET29
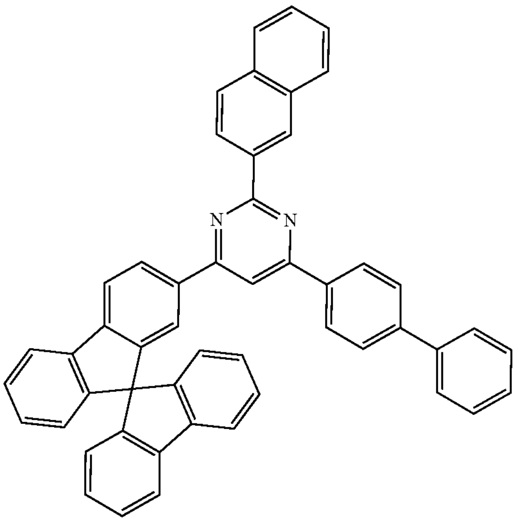
ET30
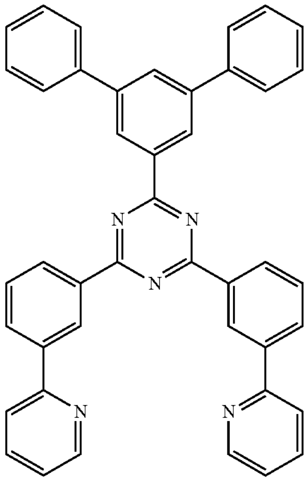
-continued
ET31
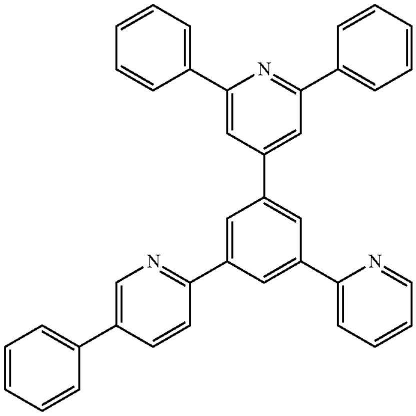
E32
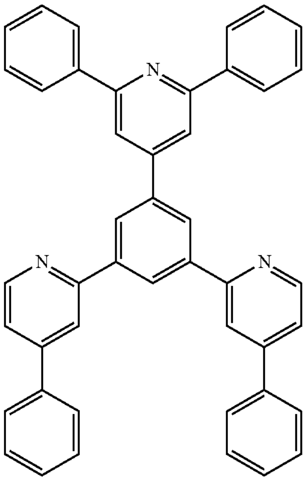
ET33
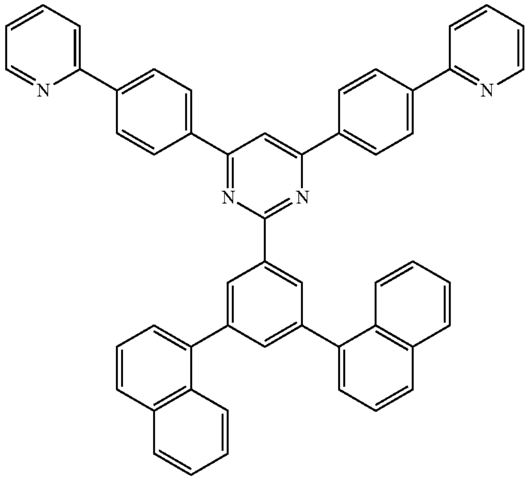

-continued

ET34

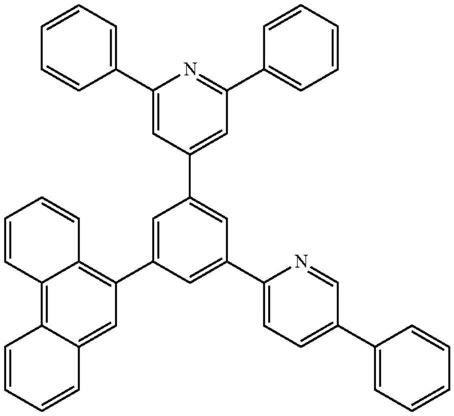

ET35

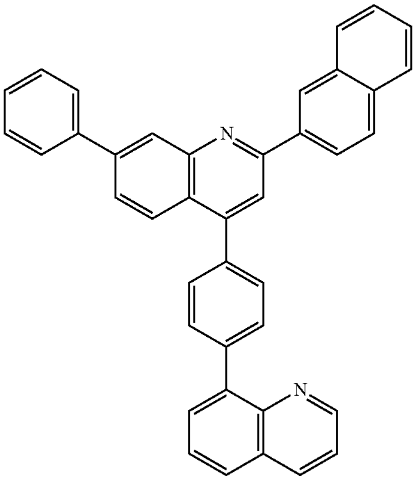

ET36

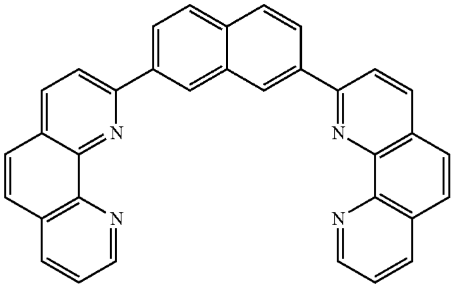

In addition, the electron transport region ETR may include a metal halide such as LiF, NaCl, CsF, RbCl, RbI, CuI and/or KI, a metal in lanthanoides such as Yb, and/or a co-depositing material of the metal halide and the metal in lanthanoides. For example, the electron transport region ETR may include KI:Yb, RbI:Yb, LiF:Yb, etc., as the co-depositing material. In some embodiments, the electron transport region ETR may use a metal oxide such as $Li_2O$ and/or BaO, and/or 8-hydroxy-lithium quinolate (Liq). However, embodiments of the present disclosure are not limited thereto. The electron transport region ETR also may be formed using a mixture material of an electron transport material and an insulating organo metal salt. The organo metal salt may be a material having an energy band gap of about 4 eV or more. In some embodiments, the organo metal salt may include, for example, metal acetates, metal benzoates, metal acetoacetates, metal acetylacetonates, and/or metal stearates.

The electron transport region ETR may include at least one of 2,9-dimethyl-4,7-diphenyl-1,10-phenanthroline (BCP), diphenyl(4-(triphenylsilyl)phenyl)phosphine oxide (TSPO1), or 4,7-diphenyl-1,10-phenanthroline (Bphen) in addition to the aforementioned materials. However, embodiments of the present disclosure are not limited thereto.

The electron transport region ETR may include the compounds of the electron transport region in at least one selected from among an electron injection layer EIL, an electron transport layer ETL, and a hole blocking layer HBL.

If the electron transport region ETR includes the electron transport layer ETL, the thickness of the electron transport layer ETL may be from about 100 Å to about 1,000 Å, for example, from about 150 Å to about 500 Å. If the thickness of the electron transport layer ETL satisfies the above-described range, suitable or satisfactory electron transport properties may be obtained without substantial increase of a driving voltage. If the electron transport region ETR includes the electron injection layer EIL, the thickness of the electron injection layer EIL may be from about 1 Å to about 100 Å, and from about 3 Å to about 90 Å. If the thickness of the electron injection layer EIL satisfies the above-described range, suitable or satisfactory electron injection properties may be obtained without inducing substantial increase of a driving voltage.

The second electrode EL2 is provided on the electron transport region ETR. The second electrode EL2 may be a common electrode. The second electrode EL2 may be a cathode or an anode, but embodiments of the present disclosure are not limited thereto. For example, if the first electrode EL1 is an anode, the second cathode EL2 may be a cathode, and if the first electrode EL1 is a cathode, the second electrode EL2 may be an anode. The second electrode EL2 may include at least one selected from among Ag, Mg, Cu, Al, Pt, Pd, Au, Ni, Nd, Ir, Cr, Li, Ca, LiF, Mo, Ti, W, In, Sn, and Zn, compounds of two or more selected therefrom, mixtures of two or more selected therefrom, and oxides thereof.

The second electrode EL2 may be a transmissive electrode, a transflective electrode or a reflective electrode. If the second electrode EL2 is the transmissive electrode, the second electrode EL2 may include a transparent metal oxide, for example, ITO, IZO, ZnO, ITZO, etc.

If the second electrode EL2 is the transflective electrode or the reflective electrode, the second electrode EL2 may include Ag, Mg, Cu, Al, Pt, Pd, Au, Ni, Nd, Ir, Cr, Li, Ca, LiF/Ca (stacked structure of LiF and Ca), LiF/Al (stacked structure of LiF and Al), Mo, Ti, Yb, W, compounds thereof, and/or mixtures thereof (for example, AgMg, AgYb, and/or MgAg). In some embodiments, the second electrode EL2 may have a multilayered structure including a reflective layer or a transflective layer formed using the above-described materials and a transparent conductive layer formed using ITO, IZO, ZnO, ITZO, etc. For example, the second electrode EL2 may include the aforementioned metal materials, combinations of two or more metal materials selected from the aforementioned metal materials, and/or oxides of the aforementioned metal materials.

In some embodiments, the second electrode EL2 may be connected with an auxiliary electrode. If the second electrode EL2 is connected with the auxiliary electrode, the resistance of the second electrode EL2 may decrease.

In the light emitting element ED of an embodiment, a capping layer CPL may be further on the second electrode EL2. The capping layer CPL may include a multilayer or a single layer.

In an embodiment, the capping layer CPL may be an organic layer or an inorganic layer. For example, if the capping layer CPL includes an inorganic material, the inorganic material may include an alkali metal compound such as LiF, an alkaline earth metal compound such as SiON, SiNx, SiOy, etc.

For example, if the capping layer CPL includes an organic material, the organic material may include α-NPD, NPB, TPD, m-MTDATA, $Alq_3$, CuPc, N4,N4,N4',N4'-tetra(biphenyl-4-yl) biphenyl-4,4'-diamine (TPD15), 4,4',4"-tris(carbazol sol-9-yl) triphenylamine (TCTA), etc., and/or include an epoxy resin, and/or acrylate such as methacrylate. In addition, a capping layer CPL may include at least one selected from among Compounds P1 to P5 below, but embodiments of the present disclosure are not limited thereto.

P1

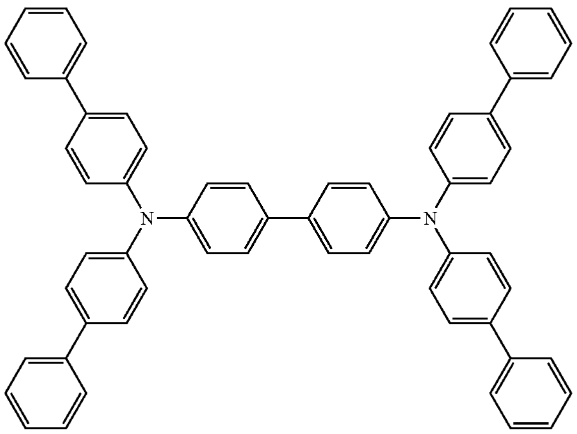

P2

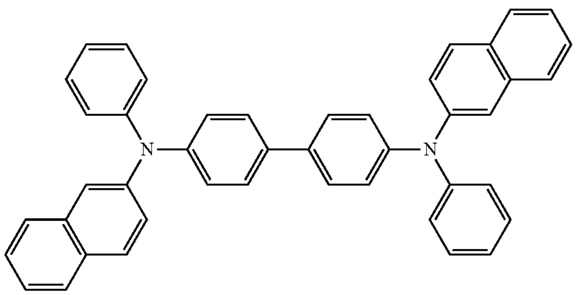

-continued

P3

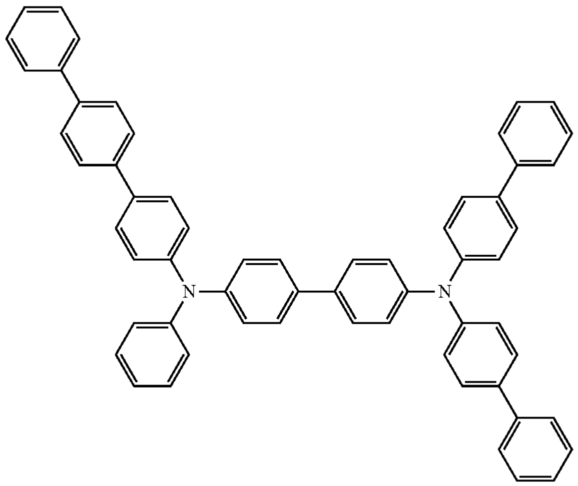

P4

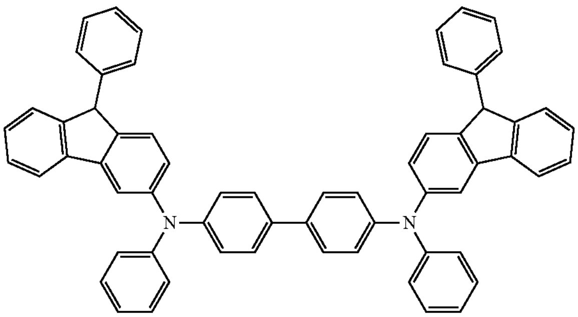

P5

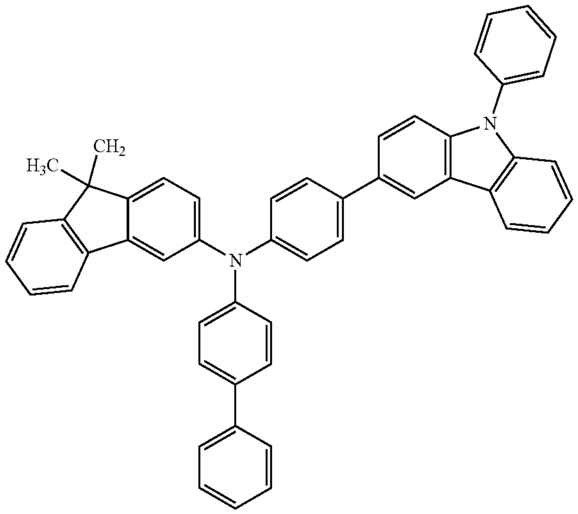

In some embodiments, the refractive index of the capping layer CPL may be about 1.6 or more. For example, the refractive index of the capping layer CPL with respect to light in a wavelength range of about 550 nm to about 660 nm may be about 1.6 or more.

FIG. 7 to FIG. 10 are cross-sectional views on display apparatuses according to embodiments. In the explanation on the display apparatuses of embodiments, referring to FIG. 7 to FIG. 10, descriptions provided with respect to FIG. 1 to FIG. 6 will not be repeated here, and the different features will be explained chiefly.

Figure 7:
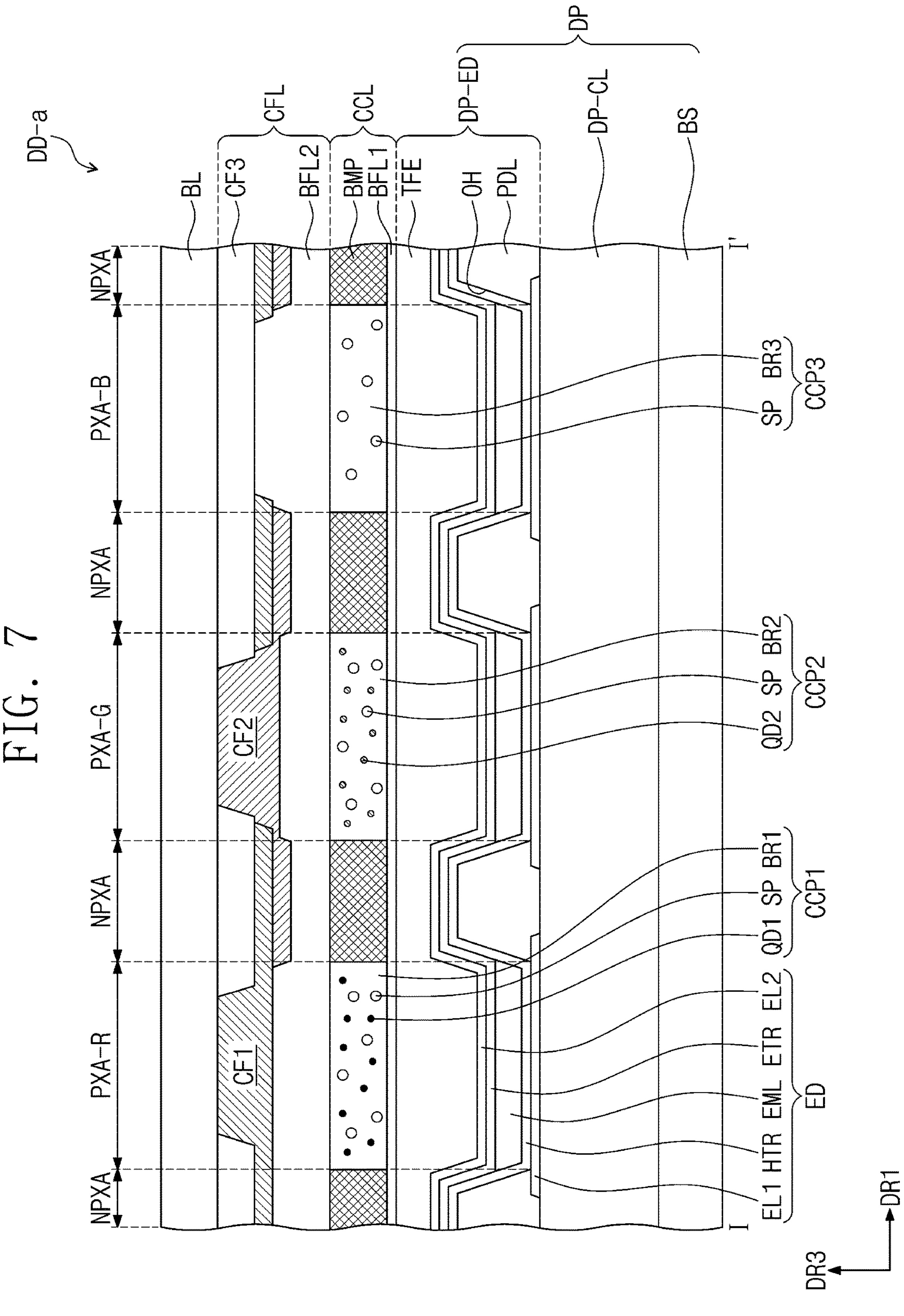
FIG. 7 is a cross-sectional view of a display apparatus according to an embodiment.

Referring to FIG. 7, a display apparatus DD-a according to an embodiment may include a display panel DP including a display element layer DP-ED, a light controlling layer CCL on the display panel DP, and a color filter layer CFL.

In an embodiment shown in FIG. 7, the display panel DP includes a base layer BS, a circuit layer DP-CL provided on the base layer BS and a display element layer DP-ED, and the display element layer DP-ED may include a light emitting element ED.

The light emitting element ED may include a first electrode EL1, a hole transport region HTR on the first electrode EL1, an emission layer EML on the hole transport region HTR, an electron transport region ETR on the emission layer EML, and a second electrode EL2 on the electron transport region ETR. The same structures of the light emitting elements of FIG. 3 to FIG. 6 may be applied to the structure of the light emitting element ED shown in FIG. 7.

The hole transport region HTR of the light emitting element ED included in the display apparatus DD-a according to an embodiment may include the amine compound of an embodiment, described above.

Referring to FIG. 7, the emission layer EML may be in an opening part OH defined in a pixel definition layer PDL. For example, the emission layer EML divided by the pixel definition layer PDL and correspondingly provided to each of luminous areas PXA-R, PXA-G and PXA-B may emit light in the same wavelength region. In the display apparatus DD-a of an embodiment, the emission layer EML may emit blue light. In some embodiments, different from the drawings, the emission layer EML may be provided as a common layer for all luminous areas PXA-R, PXA-G and PXA-B.

The light controlling layer CCL may be on the display panel DP. The light controlling layer CCL may include a light converter. The light converter may be a quantum dot and/or a phosphor. The light converter may transform the wavelength of light provided and then emit light. In some embodiments, the light controlling layer CCL may be a layer including a quantum dot and/or a layer including a phosphor.

The light controlling layer CCL may include a plurality of light controlling parts CCP1, CCP2 and CCP3. The light controlling parts CCP1, CCP2 and CCP3 may be separated from (spaced apart from) one another.

Figure 8:
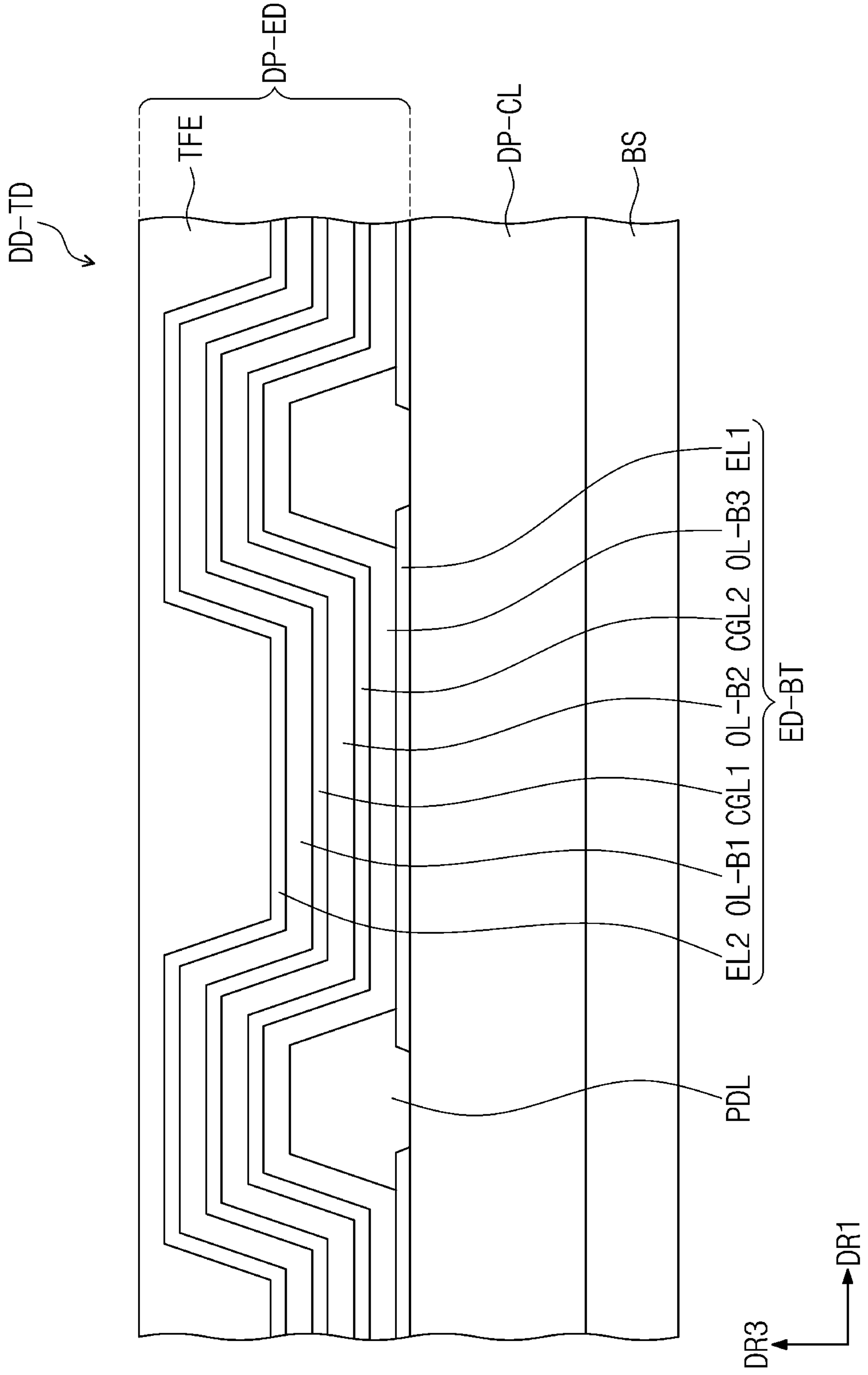
FIG. 8 is a cross-sectional view of a display apparatus according to an embodiment.

Referring to FIG. 7, a partition pattern BMP may be between the separated light controlling parts CCP1, CCP2 and CCP3, but embodiments of the present disclosure are not limited thereto. In FIG. 8, the partition pattern BMP is shown not to be overlapped with the light controlling parts CCP1, CCP2 and CCP3, but at least a portion of the edge of the light controlling parts CCP1, CCP2 and CCP3 may be overlapped with the partition pattern BMP.

The light controlling layer CCL may include a first light controlling part CCP1 including a first quantum dot QD1 that converts a first color light provided from the light emitting element ED into a second color light, a second light controlling part CCP2 including a second quantum dot QD2 that converts the first color light into a third color light, and a third light controlling part CCP3 that transmits the first color light.

In an embodiment, the first light controlling part CCP1 may provide red light which is the second color light, and the second light controlling part CCP2 may provide green light which is the third color light. The third color controlling part CCP3 may transmit and provide blue light which is the first color light provided from the light emitting element ED. For example, the first quantum dot QD1 may be a red quantum dot, and the second quantum dot QD2 may be a green quantum dot. On the quantum dots QD1 and QD2, the same contents as those described above may be applied.

In addition, the light controlling layer CCL may further include a scatterer SP (e.g., a light scatterer SP). The first light controlling part CCP1 may include the first quantum dot QD1 and the scatterer SP, the second light controlling part CCP2 may include the second quantum dot QD2 and the scatterer SP, and the third light controlling part CCP3 may not include a quantum dot but include the scatterer SP.

The scatterer SP may be an inorganic particle. For example, the scatterer SP may include at least one selected from among $TiO_2$, ZnO, $Al_2O_3$, $SiO_2$, and hollow silica. The scatterer SP may include at least one selected from among $TiO_2$, ZnO, $Al_2O_3$, $SiO_2$, and hollow silica, and/or may be a mixture of two or more materials selected from among $TiO_2$, ZnO, $Al_2O_3$, $SiO_2$, and hollow silica.

Each of the first light controlling part CCP1, the second light controlling part CCP2, and the third light controlling part CCP3 may include base resins BR1, BR2 and BR3 in which the quantum dots QD1 and QD2 and the scatterer SP are dispersed. In an embodiment, the first light controlling part CCP1 may include the first quantum dot QD1 and the scatterer SP dispersed in the first base resin BR1, the second light controlling part CCP2 may include the second quantum dot QD2 and the scatterer SP dispersed in the second base resin BR2, and the third light controlling part CCP3 may include the scatterer particle SP dispersed in the third base resin BR3. The base resins BR1, BR2 and BR3 are mediums in which the quantum dots QD1 and QD2 and the scatterer SP are dispersed, and may be composed of various suitable resin compositions which may be generally referred to as a binder. For example, the base resins BR1, BR2 and BR3 may be acrylic resins, urethane-based resins, silicone-based resins, epoxy-based resins, etc. The base resins BR1, BR2 and BR3 may be transparent resins. In an embodiment, the first base resin BR1, the second base resin BR2 and the third base resin BR3 may be the same or different from each other.

The light controlling layer CCL may include a barrier layer BFL1. The barrier layer BFL1 may block or reduce the penetration of moisture and/or oxygen (hereinafter, will be referred to as “humidity/oxygen”). The barrier layer BFL1 may be on the light controlling parts CCP1, CCP2 and CCP3 to block or reduce the exposure of the light controlling parts CCP1, CCP2 and CCP3 to humidity/oxygen. In some embodiments, the barrier layer BFL1 may cover the light controlling parts CCP1, CCP2 and CCP3. In addition, the barrier layer BFL2 may be provided between the light controlling parts CCP1, CCP2 and CCP3 and a color filter layer CFL.

The barrier layers BFL1 and BFL2 may include at least one inorganic layer. In some embodiments, the barrier layers BFL1 and BFL2 may be formed by including an inorganic material. For example, the barrier layers BFL1 and BFL2 may be formed by including silicon nitride, aluminum nitride, zirconium nitride, titanium nitride, hafnium nitride, tantalum nitride, silicon oxide, aluminum oxide, titanium oxide, tin oxide, cerium oxide and/or silicon oxynitride and/or a metal thin film securing light transmittance. In some embodiments, the barrier layers BFL1 and BFL2 may further include an organic layer. The barrier layers BFL1 and BFL2 may be composed of a single layer of a plurality of layers.

In the display apparatus DD of an embodiment, the color filter layer CFL may be on the light controlling layer CCL. For example, the color filter layer CFL may be directly on (e.g., physically contacting) the light controlling layer CCL. In this case, the barrier layer BFL2 may be omitted.

The color filter layer CFL may include filters CF1, CF2 and CF3. The color filter layer CFL may include a first filter CF1 that transmits the second color light, a second filter CF2 that transmits the third color light, and a third filter CF3 that transmits the first color light. For example, the first filter CF1 may be a red filter, the second filter CF2 may be a green filter, and the third filter CF3 may be a blue filter. Each of the filters CF1, CF2 and CF3 may include a polymer photosensitive resin and a pigment and/or dye. The first filter CF1 may include a red pigment and/or dye, the second filter CF2 may include a green pigment and/or dye, and the third filter CF3 may include a blue pigment and/or dye. Embodiments of the present disclosure are not limited thereto, however, and the third filter CF3 may not include the pigment and/or dye. The third filter CF3 may include a polymer photosensitive resin and not include a pigment and/or dye. The third filter CF3 may be transparent. The third filter CF3 may be formed using a transparent photosensitive resin.

In addition, in an embodiment, the first filter CF1 and the second filter CF2 may be yellow filters. The first filter CF1 and the second filter CF2 may be provided in one body without distinction. Each of the first to third filters CF1, CF2 and CF3 may be correspond to each of a red luminous area PXA-R, green luminous area PXA-G, and blue luminous area PXA-B.

In some embodiments, the color filter layer CFL may include a light blocking part. The color filter layer CFL may include the light blocking part so as to overlap with the boundaries of the neighboring filters CF1, CF2 and CF3. The light blocking part may be a black matrix. The light blocking part may be formed by including an organic light blocking material and/or an inorganic light blocking material, including a black pigment and/or black dye. The light blocking part may divide the boundaries among adjacent filters CF1, CF2 and CF3. In addition, in an embodiment, the light blocking part may be formed as a blue filter.

A base substrate BL may be on the color filter layer CFL. The base substrate BL may be a member providing a base surface that the color filter layer CFL, the light controlling layer CCL, etc. are on. The base substrate BL may be a glass substrate, a metal substrate, a plastic substrate, etc. However, embodiments of the present disclosure are not limited thereto, and the base substrate BL may be an inorganic layer, an organic layer or a composite material layer. In addition, different from the drawing, the base substrate BL may be omitted in an embodiment.

FIG. 8 is a cross-sectional view showing a portion of the display apparatus according to an embodiment. In FIG. 8, the cross-sectional view of a portion corresponding to the display panel DP in FIG. 7 is shown. In a display apparatus DD-TD of an embodiment, the light emitting element ED-BT may include a plurality of light emitting structures OL-B1, OL-B2 and OL-B3. The light emitting element ED-BT may include a first electrode EL1 and a second electrode EL2 opposite to each other, and the plurality of light emitting structures OL-B1, OL-B2 and OL-B3 stacked in order in a thickness direction and provided between the first electrode EL1 and the second electrode EL2. Each of the light emitting structures OL-B1, OL-B2 and OL-B3 may include an emission layer EML (FIG. 7), a hole transport region HTR and an electron transport region ETR together with the emission layer EML (FIG. 7) therebetween.

In some embodiments, the light emitting element ED-BT included in the display apparatus DD-TD of an embodiment may be a light emitting element of a tandem structure including a plurality of emission layers.

In an embodiment shown in FIG. 8, light emitted from the light emitting structures OL-B1, OL-B2 and OL-B3 may be all blue light. However, embodiments of the present disclosure are not limited thereto, and the wavelength regions of light emitted from the light emitting structures OL-B1, OL-B2 and OL-B3 may be different from each other. For example, the light emitting element ED-BT including the plurality of light emitting structures OL-B1, OL-B2 and OL-B3 emitting light in different wavelength regions may emit white light.

Charge generating layers CGL1 and CGL2 may be respectively between neighboring light emitting structures OL-B1, OL-B2 and OL-B3. The charge generating layers CGL1 and CGL2 may include a p-type charge generating layer and/or an n-type charge generating layer.

In at least one selected from among the light emitting structures OL-B1, OL-B2 and OL-B3, included in the display apparatus DD-TD of an embodiment, the amine compound of an embodiment may be included.

Figure 9:
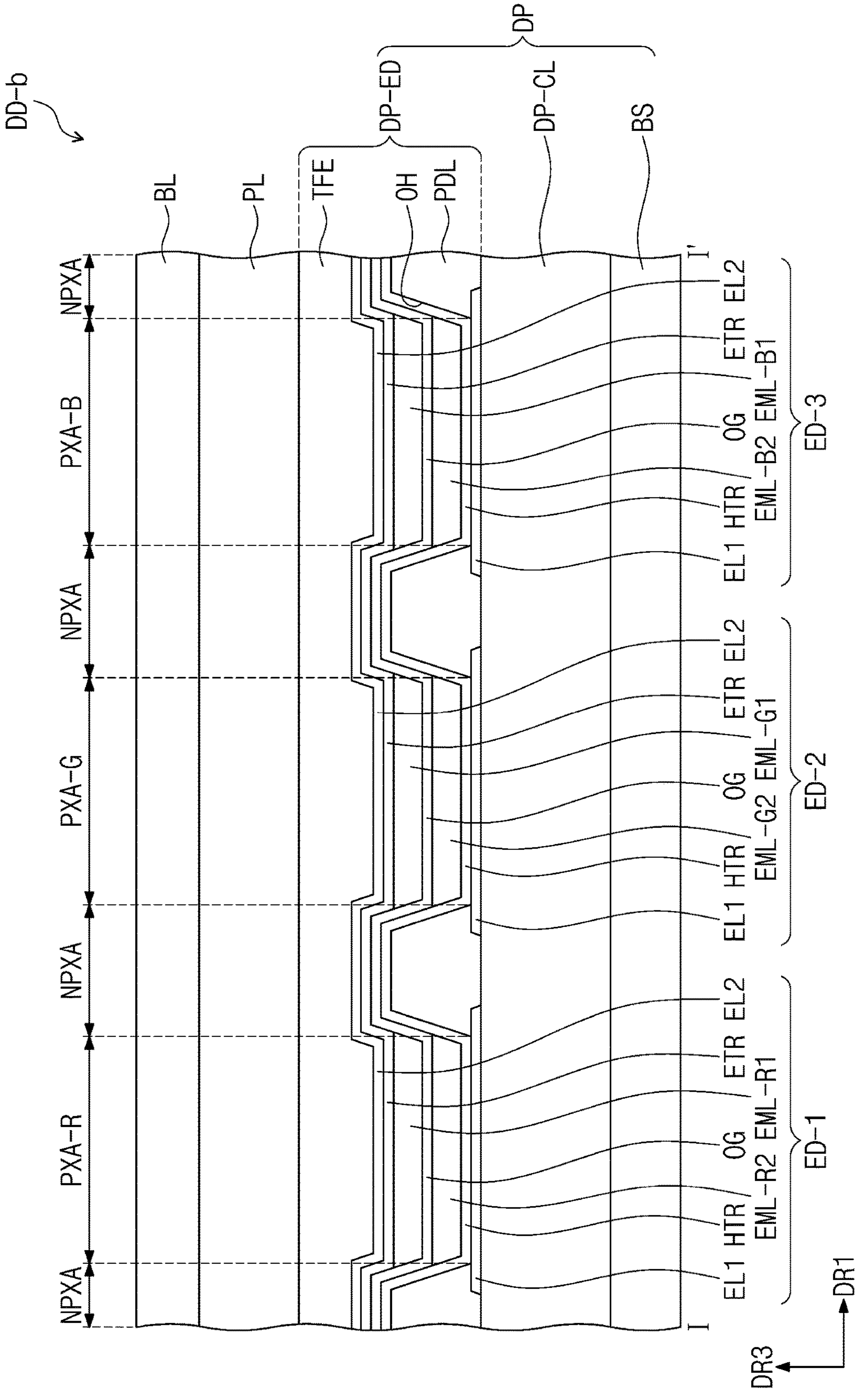
FIG. 9 is a cross-sectional view of a display apparatus according to an embodiment.

Referring to FIG. 9, a display apparatus DD-b according to an embodiment may include light emitting elements ED-1, ED-2 and ED-3, formed by stacking two emission layers. Compared to the display apparatus DD of an embodiment, shown in FIG. 2, an embodiment shown in FIG. 9 is different in that first to third light emitting elements ED-1, ED-2 and ED-3 include two emission layers stacked in a thickness direction, each. In the first to third light emitting elements ED-1, ED-2 and ED-3, two emission layers may emit light in the same wavelength region.

The first light emitting element ED-1 may include a first red emission layer EML-R1 and a second red emission layer EML-R2. The second light emitting element ED-2 may include a first green emission layer EML-G1 and a second green emission layer EML-G2. In addition, the third light emitting element ED-3 may include a first blue emission layer EML-B1 and a second blue emission layer EML-B2. An emission auxiliary part OG may be between the first red emission layer EML-R1 and the second red emission layer EML-R2, between the first green emission layer EML-G1 and the second green emission layer EML-G2, and between the first blue emission layer EML-B1 and the second blue emission layer EML-B2.

The emission auxiliary part OG may include a single layer or a multilayer. The emission auxiliary part OG may include a charge generating layer. In some embodiments, the emission auxiliary part OG may include an electron transport region, a charge generating layer, and a hole transport region stacked in order. The emission auxiliary part OG may be provided as a common layer in all of the first to third light emitting elements ED-1, ED-2 and ED-3. However, embodiments of the present disclosure are not limited thereto, and the emission auxiliary part OG may be patterned and provided in an opening part OH defined in a pixel definition layer PDL.

The first red emission layer EML-R1, the first green emission layer EML-G1 and the first blue emission layer EML-B1 may be between the hole transport region HTR and the emission auxiliary part OG. The second red emission layer EML-R2, the second green emission layer EML-G2 and the second blue emission layer EML-B2 may be between the emission auxiliary part OG and the electron transport region ETR.

In some embodiments, the first light emitting element ED-1 may include a first electrode EL1, a hole transport region HTR, a second red emission layer EML-R2, an emission auxiliary part OG, a first red emission layer EML-R1, an electron transport region ETR, and a second electrode EL2, stacked in order. The second light emitting element ED-2 may include a first electrode EL1, a hole transport region HTR, a second green emission layer EML-G2, an emission auxiliary part OG, a first green emission layer EML-G1, an electron transport region ETR, and a second electrode EL2, stacked in order. The third light emitting element ED-3 may include a first electrode EL1, a hole transport region HTR, a second blue emission layer EML-B2, an emission auxiliary part OG, a first blue emission layer EML-B1, an electron transport region ETR, and a second electrode EL2, stacked in order.

In some embodiments, an optical auxiliary layer PL may be on a display element layer DP-ED. The optical auxiliary layer PL may include a polarization layer. The optical auxiliary layer PL may be on a display panel DP and may control reflected light at the display panel DP by external light. Different from the drawings, the optical auxiliary layer PL may be omitted from the display apparatus according to some embodiments.

Figure 10:
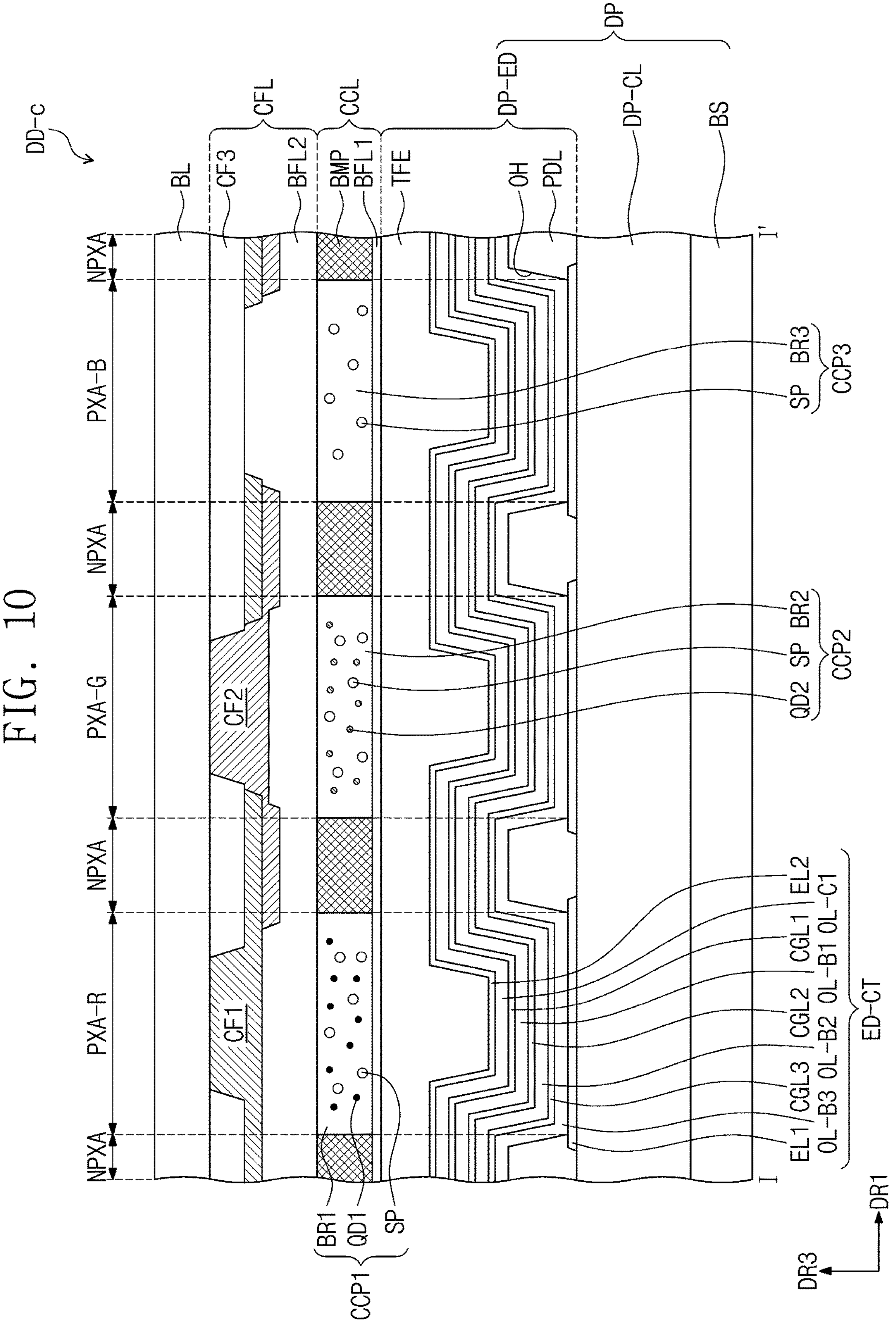
FIG. 10 is a cross-sectional view of a display apparatus according to an embodiment.

Different from FIG. 8 and FIG. 9, a display apparatus DD-c in FIG. 10 is shown to include four light emitting structures OL-B1, OL-B2, OL-B3 and OL-C1. A light emitting element ED-CT may include a first electrode EL1 and a second electrode EL2 opposite to each other, and first to fourth light emitting structures OL-B1, OL-B2, OL-B3 and OL-C1 stacked in order in a thickness direction between the first electrode EL1 and the second electrode EL2. Charge generating layers CGL1, CGL2 and CGL3 may be respectively between the first to fourth light emitting structures OL-B1, OL-B2, OL-B3 and OL-C1. Among the four light emitting structures, the first to third light emitting structures OL-B1, OL-B2 and OL-B3 may emit blue light, and the fourth light emitting structure OL-C1 may emit green light. However, embodiments of the present disclosure are not limited thereto, and the first to fourth light emitting structures OL-B1, OL-B2, OL-B3 and OL-C1 may emit different wavelengths of light.

Charge generating layers CGL1, CGL2 and CGL3 respectively between neighboring light emitting structures OL-B1, OL-B2, OL-B3 and OL-C1 may include a p-type charge generating layer and/or an n-type charge generating layer.

In at least one selected from among the light emitting structures OL-B1, OL-B2, OL-B3 and OL-C1, included in the display apparatus DD-c of an embodiment, the amine compound of an embodiment may be included.

The light emitting element ED according to an embodiment of the present disclosure may include the amine compound of an embodiment in at least one functional layer between the first electrode EL1 and the second electrode EL2 to show improved emission efficiency and improved life characteristics. The light emitting element ED according to an embodiment may include the amine compound of an embodiment in at least one selected from among a hole transport region HTR, an emission layer EML, and an electron transport region ETR, between the first electrode EL1 and the second electrode EL2, or in a capping layer CPL.

For example, the amine compound according to an embodiment may be included in the hole transport region HTR of the light emitting element ED of an embodiment, and the light emitting element of an embodiment may show excellent emission efficiency and long-life characteristics.

The amine compound of an embodiment includes a benzonaphthofuran moiety directly bonded to a nitrogen atom, and a dibenzofuran moiety bonded via a linker or directly to the nitrogen atom, and may show high efficiency and improved life characteristics.

Hereinafter, referring to embodiments and comparative embodiments, the amine compound according to an embodiment and the light emitting element according to an embodiment of the present disclosure will be explained in more detail. In addition, the embodiments below are illustrations to assist the understanding of the subject matter of the present disclosure, but the scope of the present disclosure is not limited thereto.

EXAMPLES

1. Synthesis of Amine Compounds

First, the synthetic methods of the amine compounds according to embodiments will be explained in more detail by illustrating the synthetic methods of Compound A2, Compound B5, Compound C3, Compound D10, Compound E7, and Compound F6. In addition, the synthetic methods of the amine compounds explained hereinafter are embodiments, and the synthetic method of the amine compound according to embodiments of the present disclosure are not limited to the embodiments below.

(1) Synthesis of Compound A2

Amine Compound A2 according to an embodiment may be synthesized, for example, by the steps of Reaction 1 below.

Reaction 1

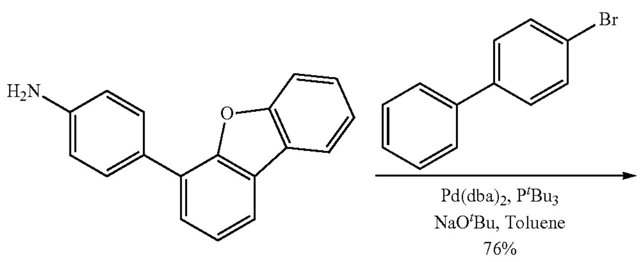

-continued

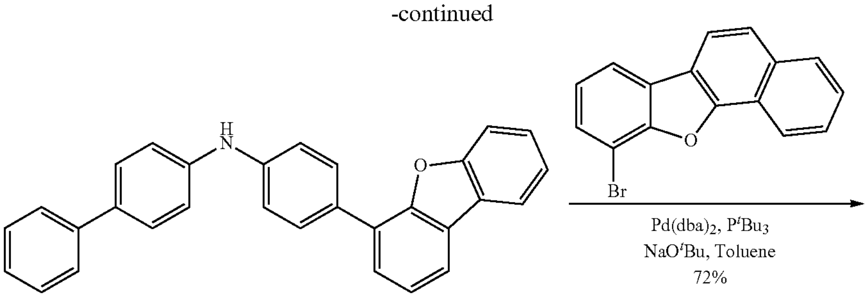

IM-1

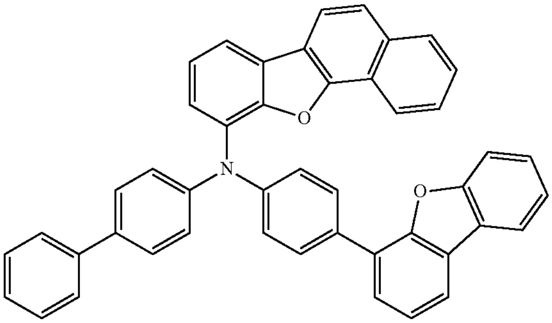

A2

Synthesis of Intermediate Compound IM-1

Under an argon (Ar) atmosphere, to a 1000 mL, three-neck flask, 4-(4-dibenzofuranyl)benzenamine (10.00 g, 38.56 mmol), $Pd(dba)_2$ (1.11 g, 0.05 equivalent (equiv), 1.93 mmol), $NaO^tBu$ (3.71 g, 1.0 equiv, 38.6 mmol), toluene (380 mL), 4-bromo-1,1'-biphenyl (8.99 g, 1.0 equiv, 38.6 mmol) and $P^tBu_3$ (1.56 g, 0.2 equiv, 7.71 mmol) were added in order, followed by heating, refluxing and stirring. After cooling to room temperature, water was added to the resultant reaction solution, and an organic layer was extracted therefrom. Then, toluene was added to the remaining aqueous layer, and another organic layer was further extracted therefrom. The organic layers were collected, washed with a saline solution, and dried over $MgSO_4$. $MgSO_4$ was filtered, an organic layer was concentrated, and the crude product thus obtained was separated to obtain Intermediate Compound IM-1 (12.10 g, yield 76%).

By measuring utilizing fast atom bombardment-mass spectrometry (FAB-MS), a mass number of m/z=411 was observed as a molecular ion peak, and Intermediate Compound IM-1 was confirmed.

Synthesis of Compound A2

Under an argon atmosphere, to a 1000 mL, three-neck flask, Intermediate Compound IM-1 (12.10 g, 29.40 mmol), $Pd(dba)_2$ (0.85 g, 0.05 equiv, 1.5 mmol), $NaO^tBu$ (3.11 g, 1.1 equiv, 32.4 mmol), toluene (300 mL), 10-bromobenzo[b]naphtho[2,1-d]furan (8.74 g, 1.0 equiv, 29.4 mmol) and $P^tBu_3$ (1.19 g, 0.2 equiv, 5.88 mmol) were added in order, followed by heating, refluxing and stirring. After cooling to room temperature, water was added to the resultant reaction solution, and an organic layer was extracted therefrom. Then, toluene was added to the remaining aqueous layer, and another organic layer was further extracted therefrom. The organic layers were collected, washed with a saline solution, and dried over $MgSO_4$. $MgSO_4$ was filtered, an organic layer was concentrated, and the crude product thus obtained was separated to obtain Compound A2 (13.25 g, yield 72%).

By measuring utilizing FAB-MS, a mass number of m/z=627 was observed as a molecular ion peak, and Compound A2 was confirmed.

(2) Synthesis of Compound B5

Amine Compound B5 according to an embodiment may be synthesized, for example, by the steps of Reaction 2 below.

Reaction 2

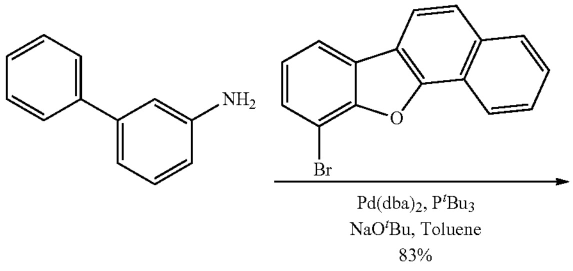

-continued

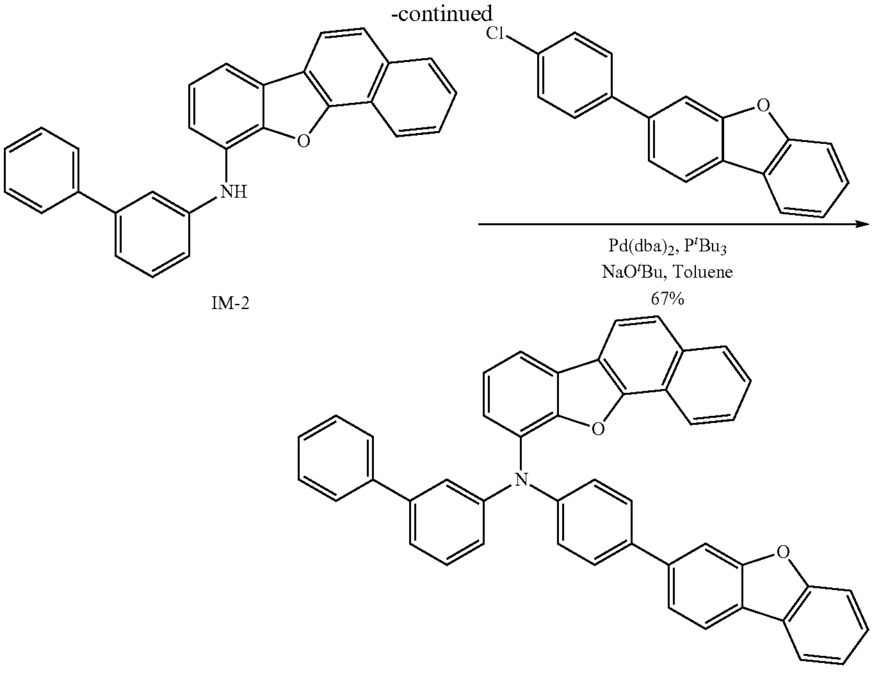

IM-2

B5

Synthesis of Intermediate Compound IM-2

Under an argon atmosphere, to a 2000 mL, three-neck flask, [1,1'-biphenyl]-3-amine (10.00 g, 59.09 mmol), $Pd(dba)_2$ (1.70 g, 0.05 equiv, 2.95 mmol), $NaO^tBu$ (5.68 g, 1.0 equiv, 59.1 mmol), toluene (590 mL), 10-bromobenzo[b]naphtho[2,1-d]furan (17.56 g, 1.0 equiv, 59.09 mmol) and $P^tBu_3$ (2.39 g, 0.2 equiv, 11.8 mmol) were added in order, followed by heating, refluxing and stirring. After cooling to room temperature, water was added to the resultant reaction solution, and an organic layer was extracted therefrom. Then, toluene was added to the remaining aqueous layer, and another organic layer was further extracted therefrom. Organic layers were collected, washed with a saline solution, and dried over $MgSO_4$. $MgSO_4$ was filtered, an organic layer was concentrated, and the crude product thus obtained was separated to obtain Intermediate Compound IM-2 (18.92 g, yield 83%).

By measuring FAB-MS, a mass number of m/z=385 was observed as a molecular ion peak, and Intermediate Compound IM-2 was confirmed.

Synthesis of Compound B5

Under an argon atmosphere, to a 2000 mL, three-neck flask, Intermediate Compound IM-2 (18.92 g, 49.08 mmol), $Pd(dba)_2$ (1.41 g, 0.05 equiv, 2.45 mmol), $NaO^tBu$ (4.72 g, 1.0 equiv, 49.1 mmol), toluene (500 mL), 3-(4-chlorophenyl)dibenzo[b,d]furan (13.68 g, 1.0 equiv, 49.08 mmol) and $P^tBu_3$ (1.99 g, 0.2 equiv, 9.82 mmol) were added in order, followed by heating, refluxing and stirring. After cooling to room temperature, water was added to the resultant reaction solution, and an organic layer was extracted therefrom. Then, toluene was added to the remaining aqueous layer, and another organic layer was further extracted therefrom. The organic layers were collected, washed with a saline solution, and dried over $MgSO_4$. $MgSO_4$ was filtered, an organic layer was concentrated, and the crude product thus obtained was separated to obtain Compound B5 (20.67 g, yield 67%).

By measuring utilizing FAB-MS, a mass number of m/z=627 was observed as a molecular ion peak, and Compound B5 was confirmed.

(3) Synthesis of Compound C3

Amine Compound C3 according to an embodiment may be synthesized, for example, by the steps of Reaction 3 below.

Reaction 3

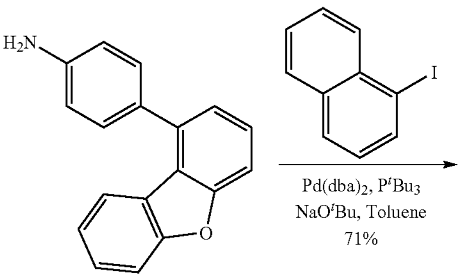

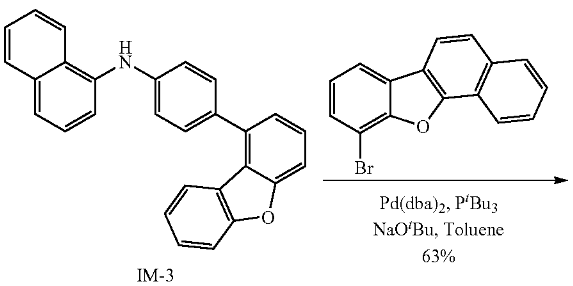

IM-3

-continued

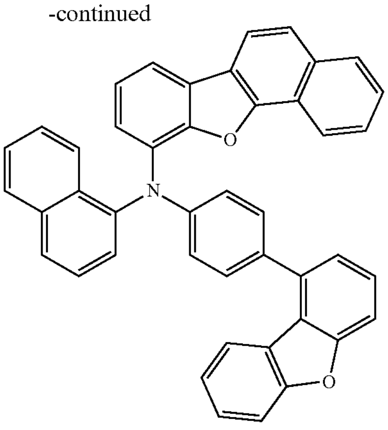

C3

Synthesis of Intermediate Compound IM-3

Under an argon atmosphere, to a 1000 mL, three-neck flask, 4-(dibenzo[b,d]furan-1-yl)aniline (10.00 g, 38.56 mmol), $Pd(dba)_2$ (1.11 g, 0.05 equiv, 1.93 mmol), $NaO^tBu$ (3.71 g, 1.0 equiv, 38.6 mmol), toluene (380 mL), 1-iodonaphthalene (9.80 g, 1.0 equiv, 38.6 mmol) and $P^tBu_3$ (1.56 g, 0.2 equiv, 7.71 mmol) were added in order, followed by heating at about 80° C. and stirring. After cooling to room temperature, water was added to the resultant reaction solution, and an organic layer was extracted therefrom. Then, toluene was added to the remaining aqueous layer, and another organic layer was further extracted therefrom. The organic layers were collected, washed with a saline solution, and dried over $MgSO_4$. $MgSO_4$ was filtered, an organic layer was concentrated, and the crude product thus obtained was separated to obtain Intermediate Compound IM-3 (10.51 g, yield 71%).

By measuring utilizing FAB-MS, a mass number of m/z=385 was observed as a molecular ion peak, and Intermediate Compound IM-3 was confirmed.

Synthesis of Compound C3

Under an argon atmosphere, to a 1000 mL, three-neck flask, Intermediate Compound IM-3 (10.51 g, 27.27 mmol), $Pd(dba)_2$ (0.78 g, 0.05 equiv, 1.4 mmol), $NaO^tBu$ (2.88 g, 1.1 equiv, 30.0 mmol), toluene (270 mL), 10-bromobenzo[b]naphtho[2,1-d]furan (8.10 g, 1.0 equiv, 27.3 mmol) and $P^tBu_3$ (1.10 g, 0.2 equiv, 5.45 mmol) were added in order, followed by heating, refluxing and stirring. After cooling to room temperature, water was added to the resultant reaction solution, and an organic layer was extracted therefrom. Then, toluene was added to the remaining aqueous layer, and another organic layer was further extracted therefrom. The organic layers were collected, washed with a saline solution, and dried over $MgSO_4$. $MgSO_4$ was filtered, an organic layer was concentrated, and the crude product thus obtained was separated to obtain Compound C3 (10.33 g, yield 63%).

By measuring utilizing FAB-MS, a mass number of m/z=601 was observed as a molecular ion peak, and Compound C3 was confirmed.

(4) Synthesis of Compound D10

Amine Compound D10 according to an embodiment may be synthesized, for example, by the steps of Reaction 4 below.

Reaction 4

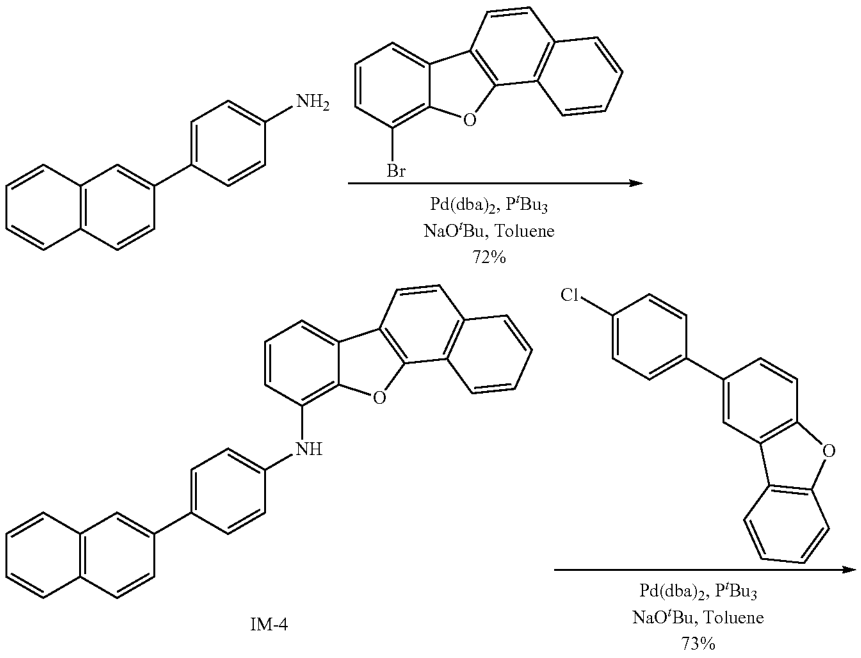

-continued

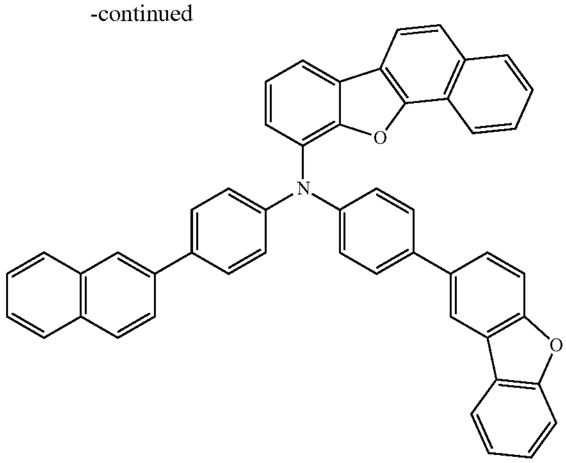

D10

Synthesis of Intermediate Compound IM-4

Under an argon atmosphere, to a 2000 mL, three-neck flask, 4-(naphthalen-2-yl)aniline (15.00 g, 68.40 mmol), Pd(dba)$_2$ (1.97 g, 0.05 equiv, 3.42 mmol), NaO$^t$Bu (6.57 g, 1.0 equiv, 68.4 mmol), toluene (680 mL), 10-bromonaphtho[1,2-b]benzofuran (20.33 g, 1.0 equiv, 68.40 mmol) and P$^t$Bu$_3$ (2.77 g, 0.2 equiv, 13.7 mmol) were added in order, followed by heating at about 100° C. and stirring. After cooling to room temperature, water was added to the resultant reaction solution, and an organic layer was extracted therefrom. Then, toluene was added to the remaining aqueous layer, and another organic layer was further extracted therefrom. The organic layers were collected, washed with a saline solution, and dried over $MgSO_4$. $MgSO_4$ was filtered, an organic layer was concentrated, and the crude product thus obtained was separated to obtain Intermediate Compound IM-4 (21.43 g, yield 72%).

By measuring utilizing FAB-MS, a mass number of m/z=435 was observed as a molecular ion peak, and Intermediate Compound IM-4 was confirmed.

Synthesis of Compound D10

Under an argon atmosphere, to a 1000 mL, three-neck flask, Intermediate Compound IM-4 (10.50 g, 24.11 mmol), Pd(dba)$_2$ (0.69 g, 0.05 equiv, 1.2 mmol), NaO$^t$Bu (2.55 g, 1.1 equiv, 26.5 mmol), toluene (240 mL), 2-(4-chlorophenyl)dibenzo[b,d]furan (6.72 g, 1.0 equiv, 24.1 mmol) and P$^t$Bu$_3$ (0.98 g, 0.2 equiv, 4.8 mmol) were added in order, followed by heating, refluxing and stirring. After cooling to room temperature, water was added to the resultant reaction solution, and an organic layer was extracted therefrom. Then, toluene was added to the remaining aqueous layer, and another organic layer was further extracted therefrom. The organic layers were collected, washed with a saline solution, and dried over $MgSO_4$. $MgSO_4$ was filtered, an organic layer was concentrated, and the crude product thus obtained was separated to obtain Compound D10 (11.98 g, yield 73%).

By measuring utilizing FAB-MS, a mass number of m/z=677 was observed as a molecular ion peak, and Compound D10 was confirmed.

(5) Synthesis of Compound E7

Amine Compound E7 according to an embodiment may be synthesized, for example, by the steps of Reaction 5 below.

Reaction 5

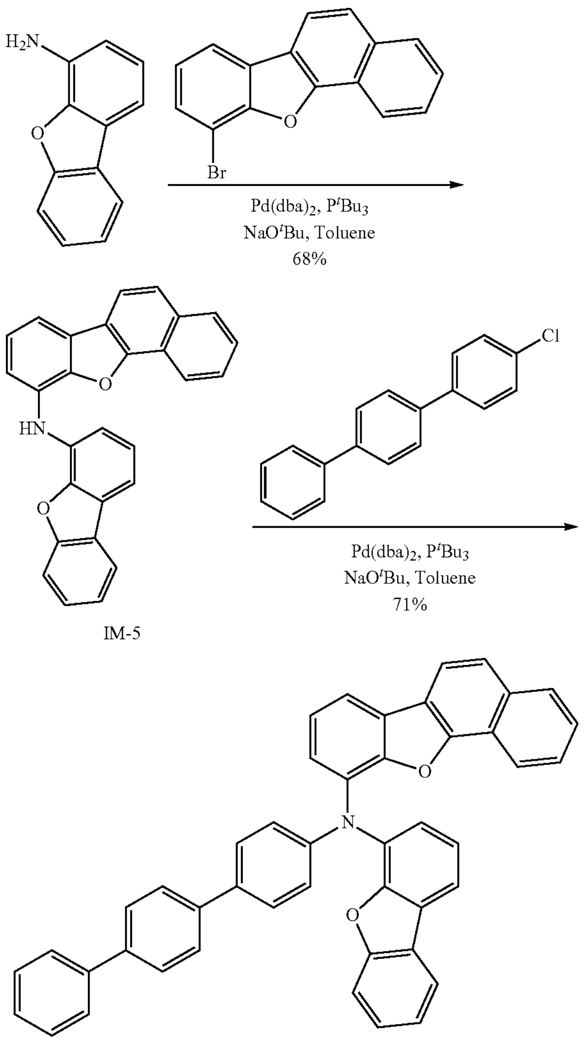

IM-5

E7

Synthesis of Intermediate Compound IM-5

Under an argon atmosphere, to a 2000 mL, three-neck flask, dibenzo[b,d]furan-4-amine (12.50 g, 68.23 mmol), $Pd(dba)_2$ (1.96 g, 0.05 equiv, 3.41 mmol), NaO$^t$Bu (6.56 g, 1.0 equiv, 68.2 mmol), toluene (680 mL), 10-bromonaphtho[1,2-b]benzofuran (20.27 g, 1.0 equiv, 68.23 mmol) and P$^t$Bu$_3$ (2.76 g, 0.2 equiv, 13.7 mmol) were added in order, followed by heating at about 100° C. and stirring. After cooling to room temperature, water was added to the resultant reaction solution, and an organic layer was extracted therefrom. Then, toluene was added to the remaining aqueous layer, and another organic layer was further extracted therefrom. The organic layers were collected, washed with a saline solution, and dried over $MgSO_4$. $MgSO_4$ was filtered, an organic layer was concentrated, and the crude product thus obtained was separated to obtain Intermediate Compound IM-5 (18.56 g, yield 68%).

By measuring utilizing FAB-MS, a mass number of m/z=399 was observed as a molecular ion peak, and Intermediate Compound IM-5 was confirmed.

Synthesis of Compound E7

Under an argon atmosphere, to a 1000 mL, three-neck flask, Intermediate Compound IM-5 (9.45 g, 23.7 mmol), $Pd(dba)_2$ (0.68 g, 0.05 equiv, 1.2 mmol), NaO$^t$Bu (2.50 g, 1.1 equiv, 26.0 mmol), toluene (240 mL), 4-chloro-1,1':4',1"-terphenyl (6.26 g, 1.0 equiv, 23.7 mmol) and P$^t$Bu$_3$ (0.96 g, 0.2 equiv, 4.7 mmol) were added in order, followed by heating, refluxing and stirring. After cooling to room temperature, water was added to the resultant reaction solution, and an organic layer was extracted therefrom. Then, toluene was added to the remaining aqueous layer, and another organic layer was further extracted therefrom. The organic layers were collected, washed with a saline solution, and dried over $MgSO_4$. $MgSO_4$ was filtered, an organic layer was concentrated, and the crude product thus obtained was separated to obtain Compound E7 (10.50 g, yield 71%).

By measuring utilizing FAB-MS, a mass number of m/z=627 was observed as a molecular ion peak, and Compound E7 was confirmed.

(6) Synthesis of Compound F6

Amine Compound F6 according to an embodiment may be synthesized, for example, by the steps of Reaction 6 below.

Reaction 6

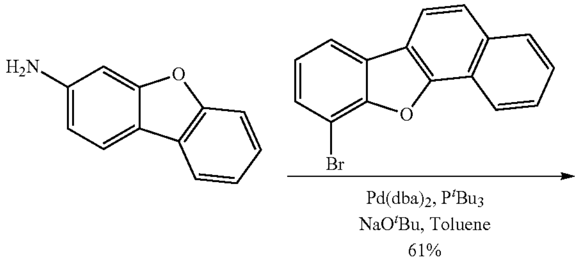

-continued

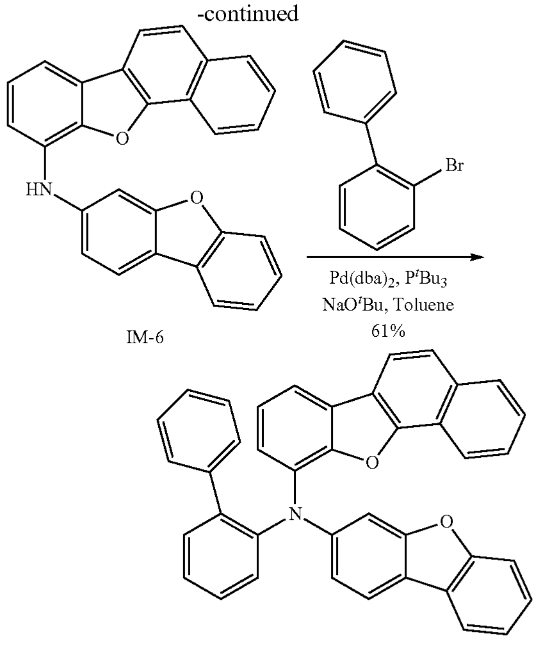

F6

Synthesis of Intermediate Compound IM-6

Under an argon atmosphere, to a 2000 mL, three-neck flask, dibenzo[b,d]furan-3-amine (9.25 g, 50.5 mmol), $Pd(dba)_2$ (1.45 g, 0.05 equiv, 2.52 mmol), NaO$^t$Bu (4.85 g, 1.0 equiv, 50.5 mmol), toluene (500 mL), 10-bromonaphtho[1,2-b]benzofuran (15.00 g, 1.0 equiv, 50.49 mmol) and P$^t$Bu$_3$ (2.04 g, 0.2 equiv, 10.1 mmol) were added in order, followed by heating, refluxing and stirring. After cooling to room temperature, water was added to the resultant reaction solution, and an organic layer was extracted therefrom. Then, toluene was added to the remaining aqueous layer, and another organic layer was further extracted therefrom. The organic layers were collected, washed with a saline solution, and dried over $MgSO_4$. $MgSO_4$ was filtered, an organic layer was concentrated, and the crude product thus obtained was separated to obtain Intermediate Compound IM-6 (15.51 g, yield 77%).

By measuring utilizing FAB-MS, a mass number of m/z=399 was observed as a molecular ion peak, and Intermediate Compound IM-6 was confirmed.

Synthesis of Compound F6

Under an argon atmosphere, to a 1000 mL, three-neck flask, Intermediate Compound IM-6 (15.51 g, 38.83 mmol), $Pd(dba)_2$ (1.12 g, 0.05 equiv, 1.94 mmol), NaO$^t$Bu (3.73 g, 1.0 equiv, 38.8 mmol), toluene (350 mL), 2-bromo-1,1'-biphenyl (10.86 g, 1.2 equiv, 46.59 mmol) and P$^t$Bu$_3$ (1.57 g, 0.2 equiv, 7.77 mmol) were added in order, followed by heating, refluxing and stirring. After cooling to room temperature, water was added to the resultant reaction solution, and an organic layer was extracted therefrom. Then, toluene was added to the remaining aqueous layer, and another organic layer was further extracted therefrom. The organic layers were collected, washed with a saline solution, and dried over $MgSO_4$. $MgSO_4$ was filtered, an organic layer was concentrated, and the crude product thus obtained was separated to obtain Compound F6 (13.08 g, yield 61%).

By measuring utilizing FAB-MS, a mass number of m/z=551 was observed as a molecular ion peak, and Compound F6 was confirmed.

2. Manufacture and Evaluation of Light Emitting Elements

The evaluation of the light emitting elements including the Example Compounds and Comparative Compounds in hole transport layers were conducted by a method described below. The manufacturing method of the light emitting elements for evaluating the elements is described below.

(1) Manufacture of Light Emitting Element

A glass substrate on which ITO having a thickness of about 150 nm was patterned, was washed with ultrasonic waves using isopropyl alcohol and pure water for about 5 minutes each. After the washing by ultrasonic waves, UV exposure for about 30 minutes and ozone treatment were performed. Then, 2-TNATA was deposited to a thickness of about 60 nm to form a hole injection layer.

After that, the Example Compound or Comparative Compound was deposited to a thickness of about 30 nm to form a hole transport layer. Then, an emission layer having a thickness of about 25 nm was formed by simultaneously depositing ADN and TBP in a weight ratio of about 97:3. Then, $Alq_3$ was deposited to a thickness of about 25 nm to form an electron transport layer, and LiF was deposited to a thickness of about 1 nm to form an electron injection layer.

After that, a second electrode was formed by depositing Al to a thickness of about 100 nm.

In the Examples, the hole injection layer, the hole transport layer, the emission layer, the electron transport layer, the electron injection layer and the second electrode were formed using a vacuum deposition apparatus.

The Example Compounds and Comparative Compounds used for the manufacture of light emitting elements are as follows.

Example Compounds

A2

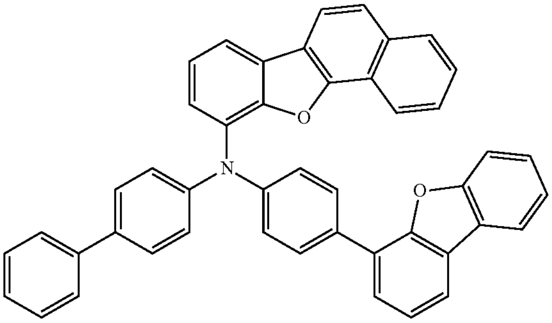

B5

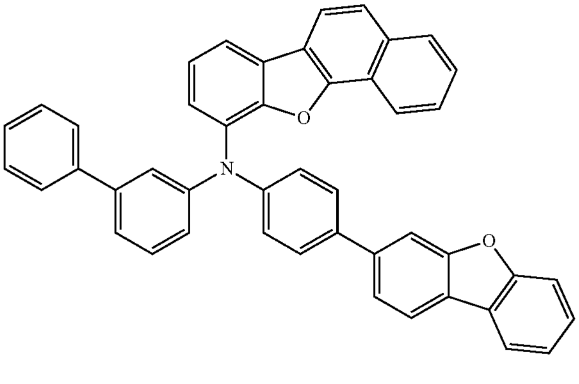

-continued

C3

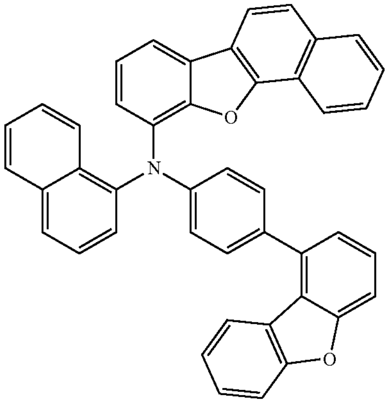

D10

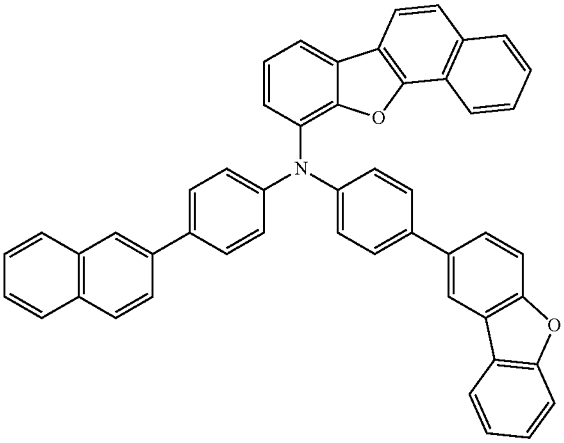

E7

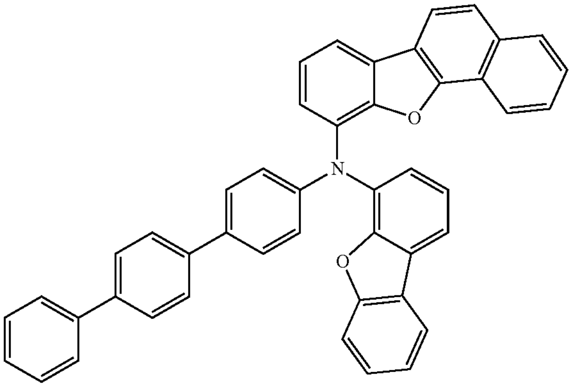

F6

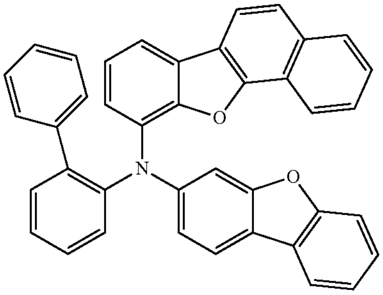

Comparative Compounds
R1
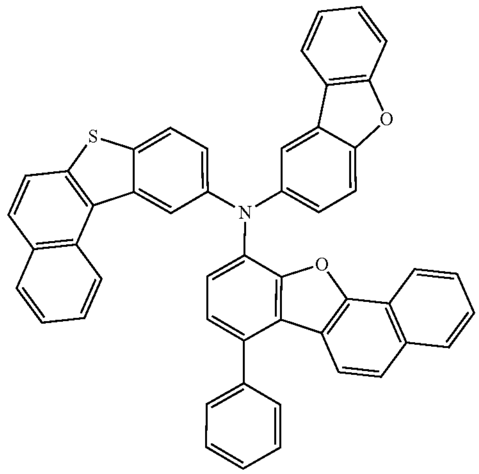
R2
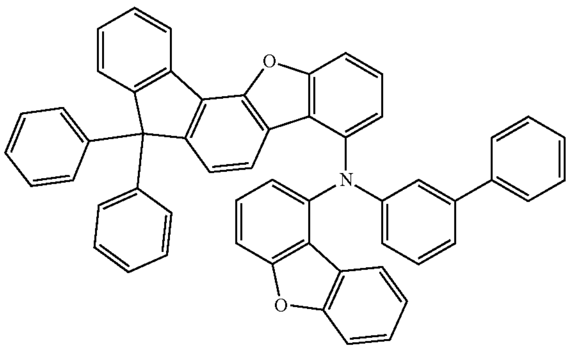
R3
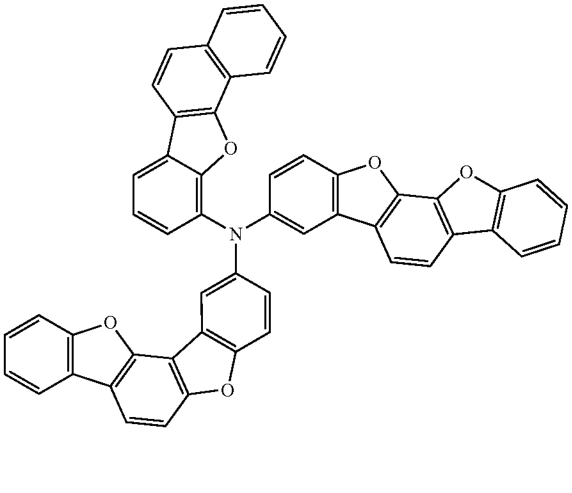
-continued
R4
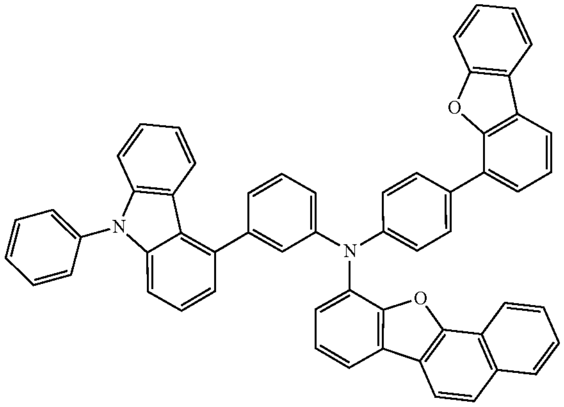
R5
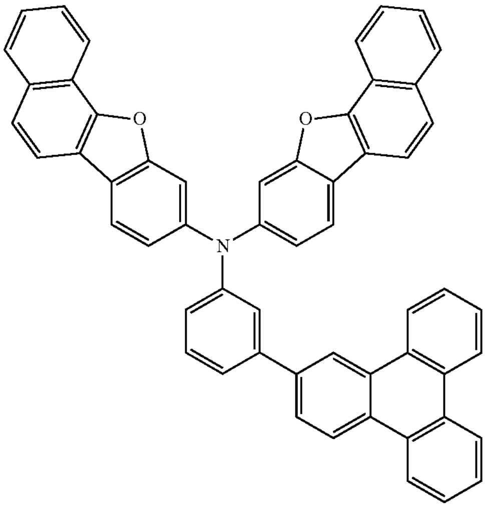
R6
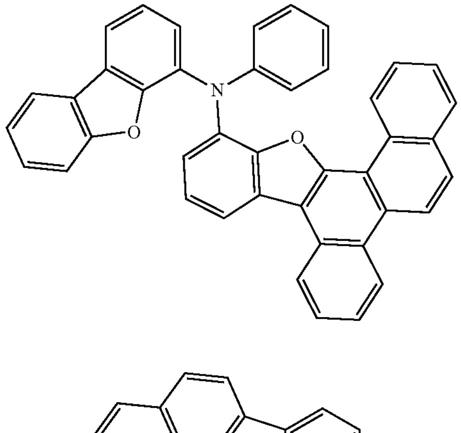
R7
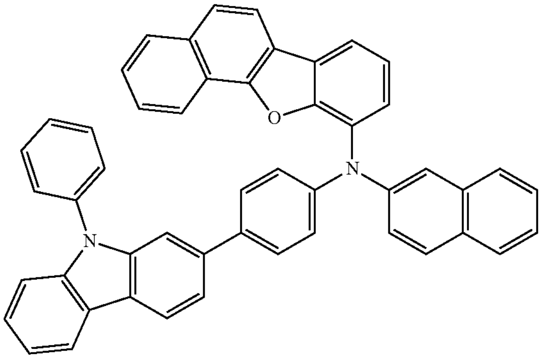

R8
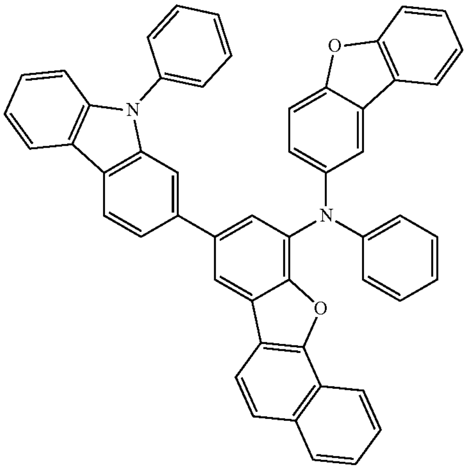
R9
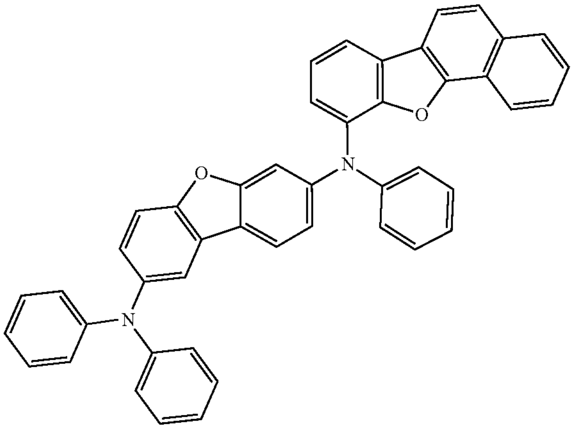
R10
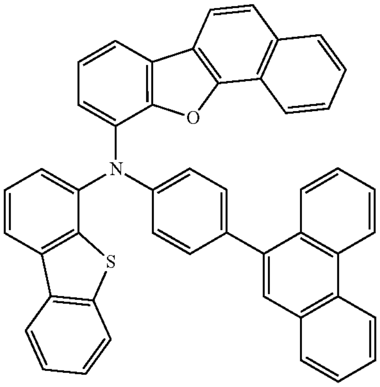
R11
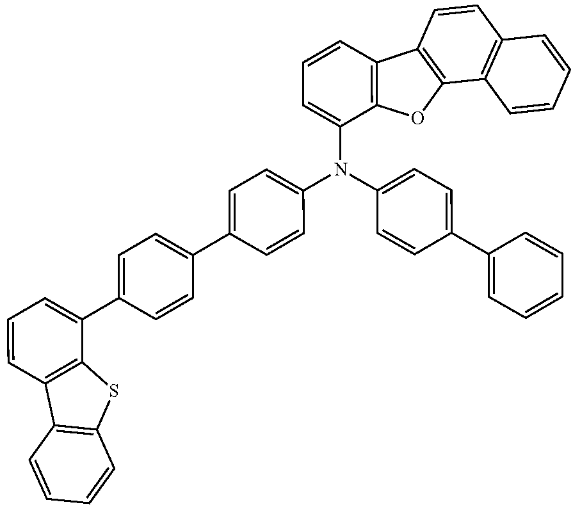
R12
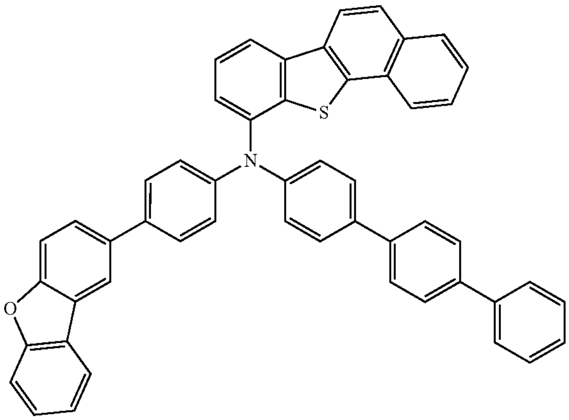
R13
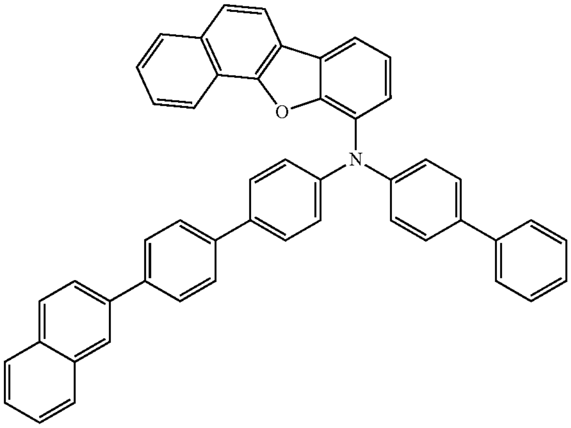

-continued
R14
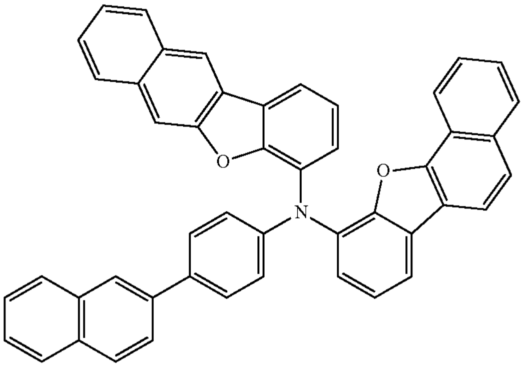
R15
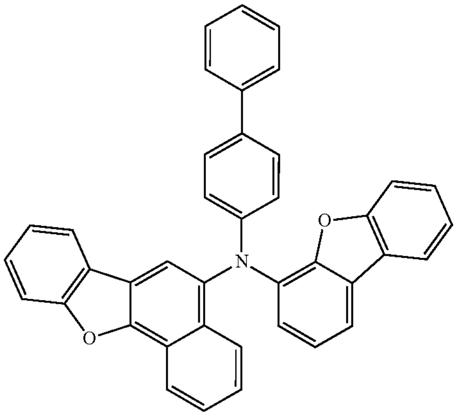
R16
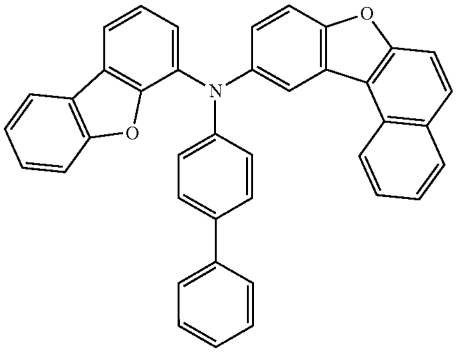
R17
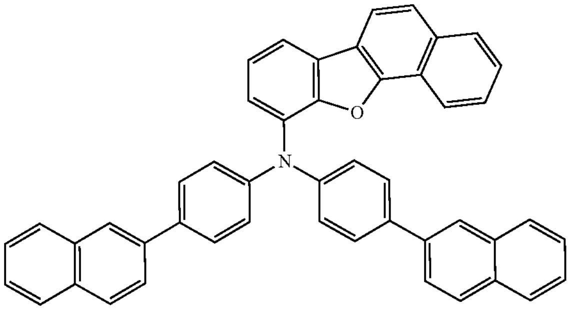
-continued
R18
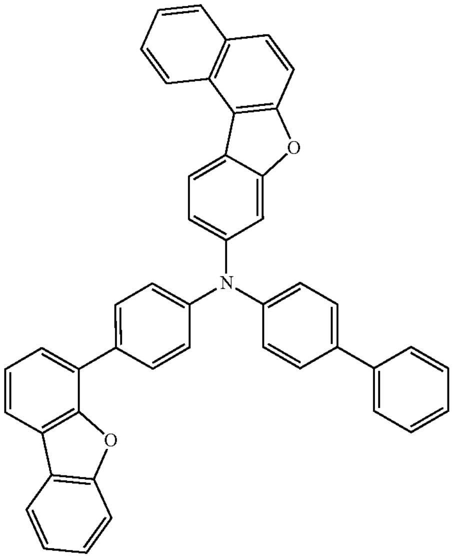
R19
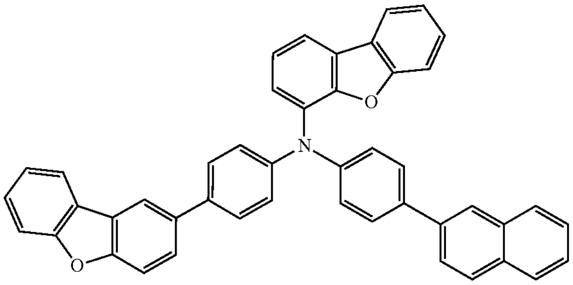
R20
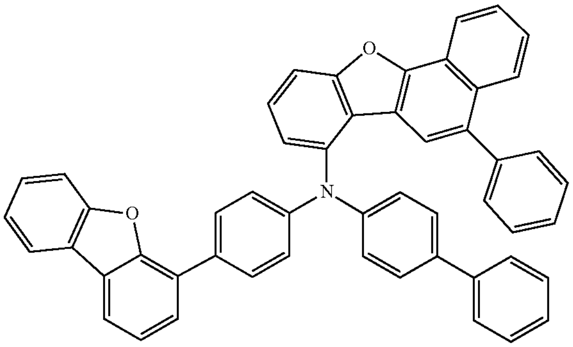

-continued

R21

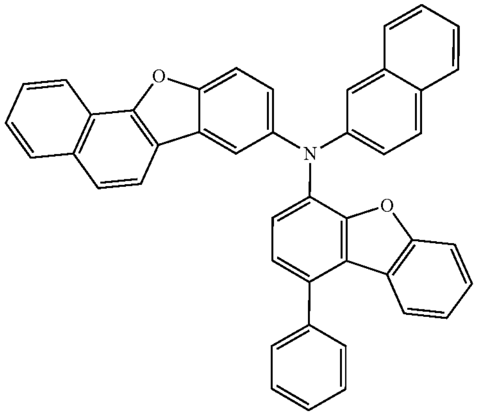

(2) Evaluation of Light Emitting Elements

Table 1 shows evaluation results of the light emitting elements of Examples 1 to 6, and Comparative Examples 1 to 21. In Table 1, the maximum emission efficiency and half-life of the light emitting elements manufactured are compared and shown. In the evaluation results of the properties of the Examples and Comparative Examples, shown in Tables 1, the emission efficiency shows the current efficiency values of about 10 $mA/cm^2$, and the half-life shows luminance half-life from an initial luminance of about 100 $cd/m^2$.

The evaluation of the current density and emission efficiency of the elements were performed using a product of Source Meter of a 2400 Series of Keithley Instruments Co., a luminance and color meter of CS-200 of Konica Minolta Co., Ltd., and a product of PC Program LabVIEW8.2 for measurement of Japanese National Instruments Co. Ltd., in a dark room.

The evaluation results of the Examples and Comparative Examples are shown as relative values on the basis of the maximum emission efficiency and half-life of Comparative Example 17. The maximum emission efficiency and half-life of Comparative Example 17 were set to 100%, and based on this, the maximum emission efficiency and half-life of the Examples and Comparative Examples are shown by %.

TABLE 1

| Division | Hole transport layer material | Maximum emission efficiency | Half life |
|---|---|---|---|
| Example 1 | Compound A2 | 123% | 145% |
| Example 2 | Compound B5 | 120% | 136% |
| Example 3 | Compound C3 | 118% | 128% |
| Example 4 | Compound D10 | 125% | 157% |
| Example 5 | Compound E7 | 128% | 142% |
| Example 6 | Compound F6 | 131% | 154% |
| Comparative Example 1 | Comparative Compound R1 | 110% | 81% |
| Comparative Example 2 | Comparative Compound R2 | 106% | 94% |
| Comparative Example 3 | Comparative Compound R3 | 112% | 56% |
| Comparative Example 4 | Comparative Compound R4 | 113% | 78% |
| Comparative Example 5 | Comparative Compound R5 | 103% | 61% |
| Comparative Example 6 | Comparative Compound R6 | 92% | 53% |
| Comparative Example 7 | Comparative Compound R7 | 105% | 78% |
| Comparative Example 8 | Comparative Compound R8 | 103% | 69% |
| Comparative Example 9 | Comparative Compound R9 | 108% | 74% |
| Comparative Example 10 | Comparative Compound R10 | 105% | 70% |
| Comparative Example 11 | Comparative Compound R11 | 102% | 96% |
| Comparative Example 12 | Comparative Compound R12 | 96% | 91% |
| Comparative Example 13 | Comparative Compound R13 | 98% | 107% |
| Comparative Example 14 | Comparative Compound R14 | 112% | 78% |
| Comparative Example 15 | Comparative Compound R15 | 109% | 88% |
| Comparative Example 16 | Comparative Compound R16 | 108% | 83% |
| Comparative Example 17 | Comparative Compound R17 | 100% | 100% |
| Comparative Example 18 | Comparative Compound R18 | 102% | 94% |
| Comparative Example 19 | Comparative Compound R19 | 110% | 95% |
| Comparative Example 20 | Comparative Compound R20 | 104% | 106% |
| Comparative Example 21 | Comparative Compound R21 | 107% | 81% |

Referring to the results of Table 1, Examples 1 to 6 of the present disclosure showed high efficiency and long-life characteristics when compared to Comparative Examples 1 to 21. The light emitting elements of the Examples including the amine compounds of embodiments, in which nitrogen is bonded at position 10 of benzo[b]naphtho[2,1-d]furan which is a benzonaphthofuran moiety, and which includes a dibenzofuran moiety, showed long-life and high efficiency characteristics at the same time. In the skeleton of the amine compound of an embodiment in which nitrogen was bonded at position 10 of benzo[b]naphtho[2,1-d]furan, an oxygen atom was positioned at an ortho position with respect to a nitrogen atom, and charge density in a compound was increased to improve hole transport capacity. At the same time, the neighborhood of lone electron pairs of the oxygen atom having high reactivity was crowded due to the naphthalene ring moiety of the benzo[b]naphtho[2,1-d]furan skeleton and the nitrogen atom, and effects of improving stability can be achieved. Accordingly, the amine compound of embodiments is thought to show high efficiency and long-life characteristics. In addition, because the amine compound of embodiments includes a dibenzofuran moiety having an oxygen atom, and hole transport capacity and the stability of a radical cation state were additionally improved.

Comparative Compounds used in Comparative Examples 1, 10, 11, and 12 include a sulfur atom. The sulfur atom is liable to be oxidized when compared to a carbon atom or an oxygen atom, and deterioration may arise during operation. Accordingly, Comparative Examples 1, 10, 11, and 12 are thought to show degraded element life characteristics when compared to Examples 1 to 6. In addition, the hole transport properties of an oxygen atom is better than a sulfur atom, and the light emitting elements of Examples 1 to 6 showed better emission efficiency when compared to the light emitting elements of Comparative Examples 1, 10, 11, and 12.

The Comparative Compounds used in Comparative Examples 2, 15, 16, 18, 19, 20 and 21 have different compound skeletons from the skeletons of the Examples Compounds having nitrogen-bonded skeletons at position 10 of benzo[b]naphtho[2,1-d]furan, and Comparative Examples 2, 15, 16, 18, 19, 20 and 21 showed degraded properties of emission efficiency and element life when compared to the light emitting elements of Examples 1 to 6. Without being limited to any particular mechanism or theory, it is thought that the Example Compounds used in the Examples of the present disclosure have structures in which nitrogen is bonded at position 10 of the benzo[b]naphtho[2,1-d]furan, and have improved hole transport capacity and stability, and accordingly, show better emission efficiency and half-life characteristics when compared to the Comparative Examples.

Comparative Compound R3 used in Comparative Example 3 has the skeleton of benzobisbenzofuran, and this is a fixed skeleton on a plane. If Comparative Compound R3 is used, the deposition temperature may increase. Due to such a high deposition temperature, the compound may be decomposed during the deposition, and due to the decomposed materials, element performance may be deteriorated. That is, Comparative Example 3 using Comparative Compound R3 having the benzobisbenzofuran skeleton showed degraded element life and efficiency properties when compared to Examples 1 to 6.

Comparative Compounds R4, R7, and R8 used in Comparative Examples 4, 7, and 8 include a carbazole group, and due to the carbazole group, the deposition temperature may increase. Due to such a high deposition temperature, element performance may be deteriorated by decomposed materials produced during the deposition. Accordingly, it is thought that Comparative Examples 4, 7, and 8 showed degraded element life and emission efficiency when compared to Examples 1 to 6.

Comparative Compound R5 used in Comparative Example 5 has a different bonding position of the benzonaphthofuran when compared to the amine compounds used in the Examples, and is different in including two benzonaphthofuran in one molecule of the compound. In the cases of the amine compounds of the Examples, the nitrogen atom of the amine is bonded at an ortho position with respect to the oxygen atom of the benzonaphthofuran, and a charge density increases to improve hole transport capacity. In comparison to this, the nitrogen atom of the amine is positioned at a meta position with respect to the oxygen atom of the benzonaphthofuran in Comparative Compound R5, and it is thought that hole transport capacity was degraded, and the emission efficiency of Comparative Example 5 was degraded. In addition, Comparative Compound R5 included two benzonaphthofuran in a molecule, and the deposition temperature was increased, and accordingly, element life was degraded by the decomposed materials due to the high deposition temperature.

Comparative Compound R6 used in Comparative Example 6 includes a chrysene moiety, and it is though that the life characteristics of Comparative Example 6 were markedly degraded when compared to Examples 1 to 6, due to the decomposed materials during deposition according to the increase of the deposition temperature. In addition, Comparative Compound R6 has a skeleton structure different from the Example Compounds, and accordingly, it is thought that Comparative Example 6 showed lower emission efficiency properties when compared to Examples 1 to 6.

Comparative Compound R9 used in Comparative Example 9 corresponds to a diamine compound. In the case of a diamine compound, hole transport capacity is high, but reactivity with neighboring molecules is high, and if used as a material of a light emitting element, deterioration may arise during driving. Accordingly, it is thought that the element life of the Comparative Example 9 was degraded when compared to Examples 1 to 6.

Comparative Compounds R13 and R17 used in Comparative Examples 13 and 17 are different in not including a dibenzofuran moiety from the amine compounds of the Examples. The cases of the amine compounds of embodiments of the present disclosure, include a structure in which both benzonaphthofuran and dibenzofuran are bonded to a nitrogen atom and can show improved hole transport capacity. For example, the amine compounds of embodiments include dibenzofuran having an oxygen atom and have improved hole transport capacity, and due to the oxygen atom, a radical cation state is stabilized, and improved properties of the stability of the compound can be shown. Accordingly, it is thought that Examples 1 to 6 showed improved element life and emission efficiency properties when compared to Comparative Example 13 and Comparative Example 17, including Comparative Compounds R13 and R17, which do not include a dibenzofuran moiety.

Comparative Compound R14 used in Comparative Example 14 includes two dibenzofuran groups in one molecule, and accordingly, Comparative Compound R14 requires the high deposition temperature, and decomposed materials may be produced during the deposition. It is thought that the life characteristics of Comparative Example 14 were degraded due to such decomposed materials by deposition when compared to Examples 1 to 6.

As shown in Table 1, it can be seen that Examples 1 to 6 showed improved emission efficiency and emission life at the same time, when compared to Comparative Examples 1 to 21. That is, it can be seen that by including the amine compound of an embodiment, in which nitrogen is bonded at position 10 of benzo[b]naphtho[2,1-d]furan, and having a sterically crowded structure by the naphthalene ring moiety of the benzo[b]naphtho[2,1-d]furan skeleton and the nitrogen atom, and having dibenzofuran, as a material of a light emitting element, the light emitting element of an embodiment showed improved element efficiency and element life at the same time.

That is, from the results of Table 1, it can be seen that if the amine compound of an embodiment of the present disclosure is used as a material of a hole transport layer, longer life and higher efficiency properties can be shown when compared to a case using the Comparative Compound as a material of a hole transport layer.

The amine compound of an embodiment has a structure in which the oxygen atom of benzonaphthofuran and the nitrogen atom of the amine are bonded at ortho relations, and includes a dibenzofuran moiety, and hole transport capacity is improved, and improved molecular stability may be shown. Accordingly, if the amine compound of an embodiment is used as the material of a light emitting element, the increase of life and efficiency of the light emitting element may be achieved.

The light emitting element of an embodiment includes an amine compound of an embodiment and may show high efficiency and long-life characteristics.

The amine compound of an embodiment may be used as a material for accomplishing improved properties of a light emitting element of high efficiency and long life.

Although embodiments of the present disclosure have been described, it is understood that the present disclosure should not be limited to these embodiments, but various changes and modifications can be made by one ordinary skilled in the art within the spirit and scope of the present disclosure as defined by the appended claims, and equivalents thereof.

What is claimed is:

1. A light emitting element, comprising:

a first electrode;

a second electrode on the first electrode; and at least one functional layer between the first electrode and the second electrode, and comprising an amine compound represented by the following Formula 1B:

Formula 1B

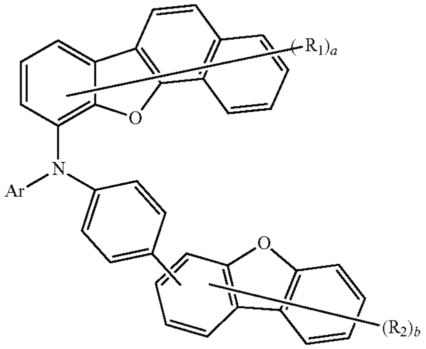

in Formula 1B,

Ar is a substituted or unsubstituted alkyl group of 1 to 20 carbon atoms, a substituted or unsubstituted alkenyl group of 2 to 20 carbon atoms, a substituted or unsubstituted alkynyl group of 2 to 20 carbon atoms, a substituted or unsubstituted oxy group, a substituted or unsubstituted aryl group of 6 to 40 ring-forming carbon atoms, or a substituted or unsubstituted oxygen-containing heteroaryl group of 5 to 40 ring-forming carbon atoms, Ar is not an unsubstituted biphenyl group, a is an integer of 0 to 9, b is an integer of 0 to 7, $R_1$ is a hydrogen atom, a deuterium atom, a substituted or unsubstituted alkyl group of 1 to 20 carbon atoms, a substituted or unsubstituted alkenyl group of 2 to 20 carbon atoms, a substituted or unsubstituted alkynyl group of 2 to 20 carbon atoms, or a substituted or unsubstituted oxy group, and $R_2$ is a hydrogen atom, a deuterium atom, a substituted or unsubstituted alkyl group of 1 to 20 carbon atoms, a substituted or unsubstituted alkenyl group of 2 to 20 carbon atoms, a substituted or unsubstituted alkynyl group of 2 to 20 carbon atoms, a substituted or unsubstituted oxy group, a substituted or unsubstituted aryl group of 6 to 40 ring-forming carbon atoms, or a substituted or unsubstituted heteroaryl group of 5 to 40 ring-forming carbon atoms, wherein the amine compound represented by Formula 1B optionally has at least one hydrogen atom substituted with a deuterium atom.

2. The light emitting element of claim 1, wherein the at least one functional layer comprises an emission layer, a hole transport region between the first electrode and the emission layer, and an electron transport region between the emission layer and the second electrode, and the hole transport region comprises the amine compound represented by Formula 1.

3. The light emitting element of claim 2, wherein the hole transport region comprises at least one selected from among a hole injection layer, a hole transport layer, and an electron blocking layer, and at least one selected from among the hole injection layer, the hole transport layer, and the electron blocking layer comprises the amine compound represented by Formula 1.

4. The light emitting element of claim 1, wherein Ar is a substituted or unsubstituted aryl group of 6 to 40 ring-forming carbon atoms.

5. The light emitting element of claim 1, wherein Ar is a substituted or unsubstituted phenyl group, a substituted biphenyl group, a substituted or unsubstituted terphenyl group, a substituted or unsubstituted naphthyl group, a substituted or unsubstituted phenanthrenyl group, or a substituted or unsubstituted dibenzofuranyl group.

6. The light emitting element of claim 1, wherein at least one selected from among Ar, $R_1$, and $R_2$ of Formula 1B comprises a deuterium atom, or a substituent comprising a deuterium atom.

7. The light emitting element of claim 1, wherein Ar, $R_1$, and $R_2$ do not comprise a substituted or unsubstituted amine group.

8. The light emitting element of claim 2, wherein the emission layer comprises a compound represented by the following Formula E-1:

Formula E-1

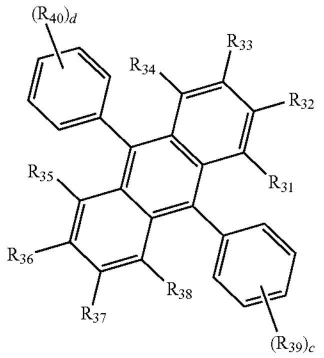

in Formula E-1, c and d are each independently an integer of 0 to 5, and $R_{31}$ to $R_{40}$ are each independently a hydrogen atom, a deuterium atom, a halogen atom, a substituted or unsubstituted silyl group, a substituted or unsubstituted thio group, a substituted or unsubstituted oxy group, a substituted or unsubstituted alkyl group of 1 to 10 carbon atoms, a substituted or unsubstituted alkenyl group of 2 to 10 carbon atoms, a substituted or unsubstituted aryl group of 6 to 30 ring-forming carbon atoms, or a substituted or unsubstituted heteroaryl group of 2 to 30 ring-forming carbon atoms, or combined with an adjacent group to form a ring.

9. The light emitting element of claim 1, wherein the amine compound represented by Formula 1B is represented by any one selected from among compounds in the following Compound Group 1:

Compound Group 1
A1
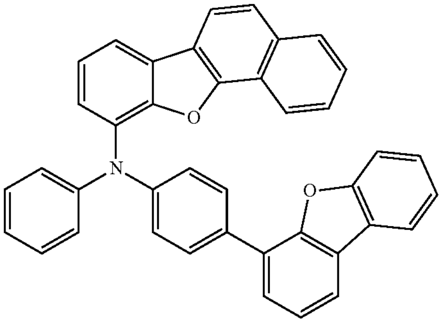
A3
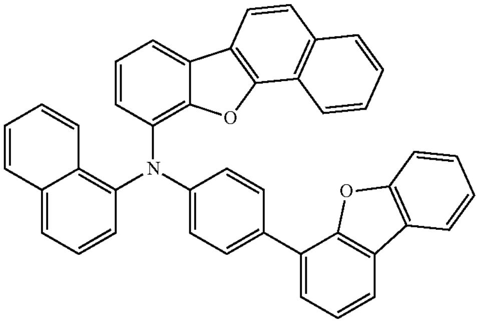
A4
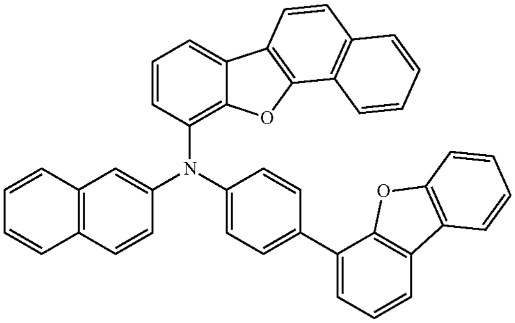
A7
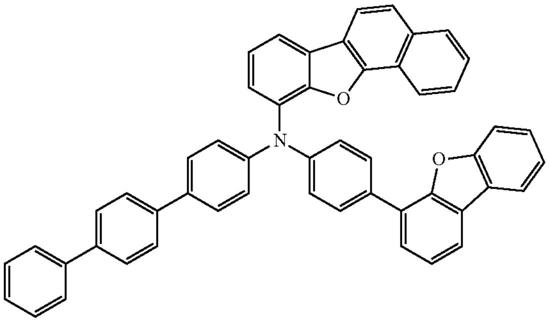
A8
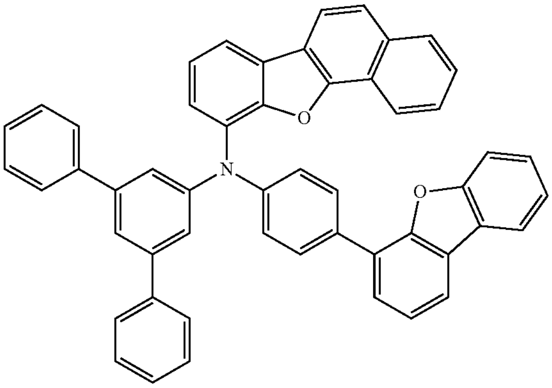
A9
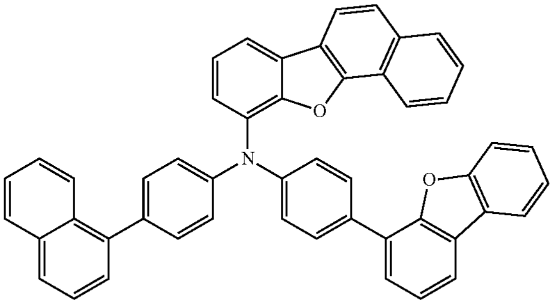
A10
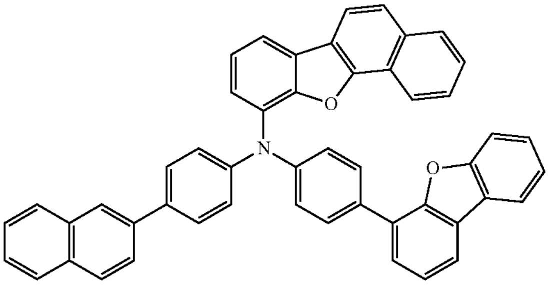

-continued
A11
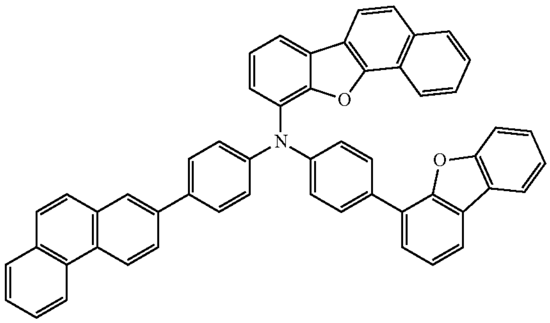
A12
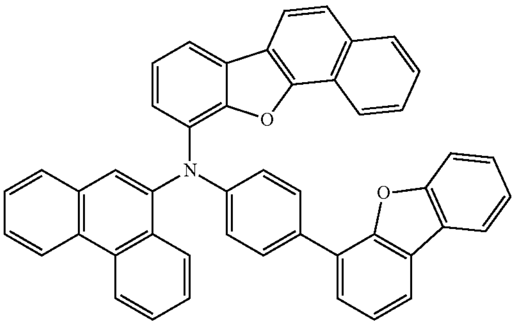
A13
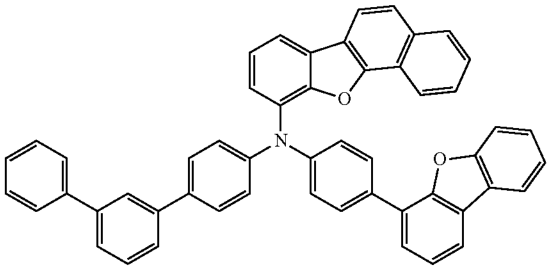
A14
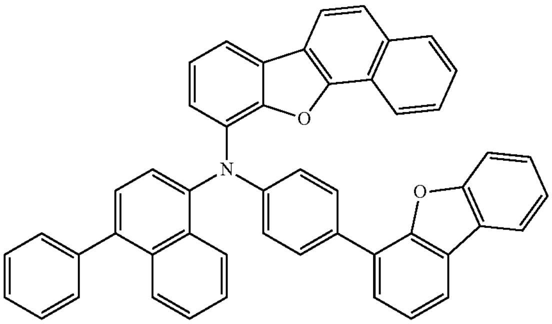
A15
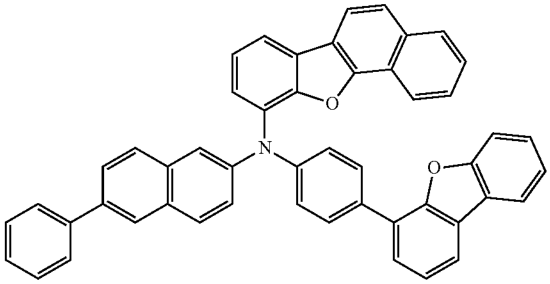
A16
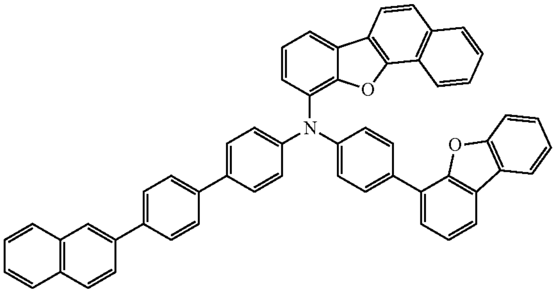
A17
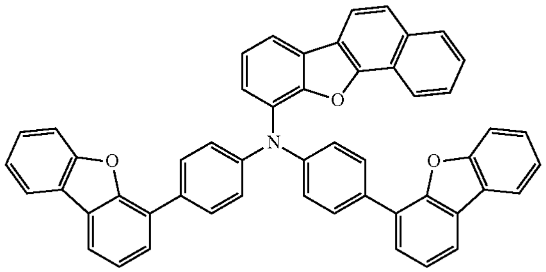
A19
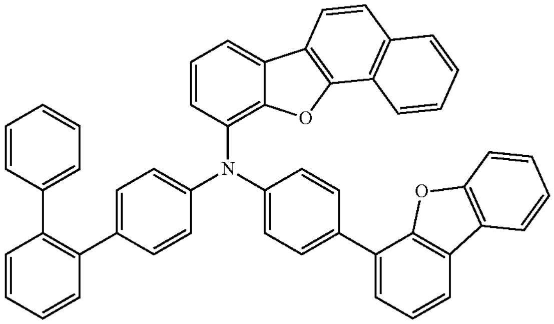

-continued
B1
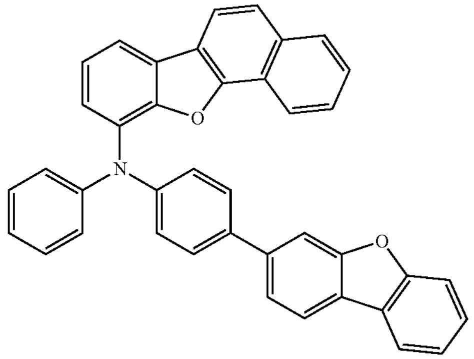
B3
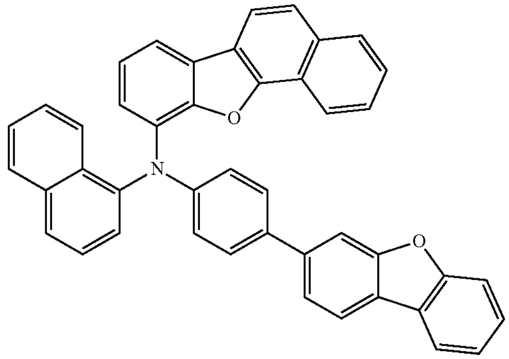
B4
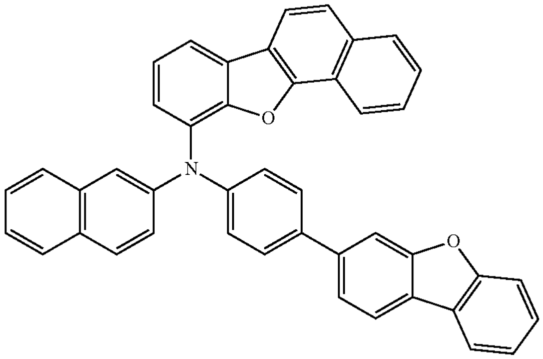
B7
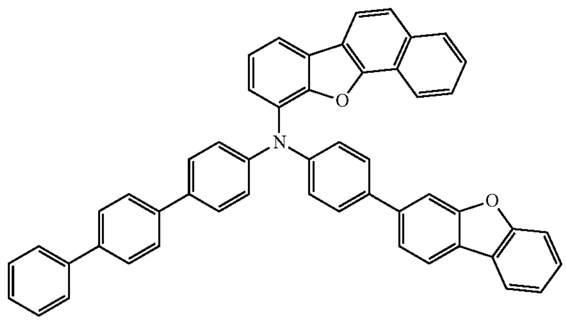
B8
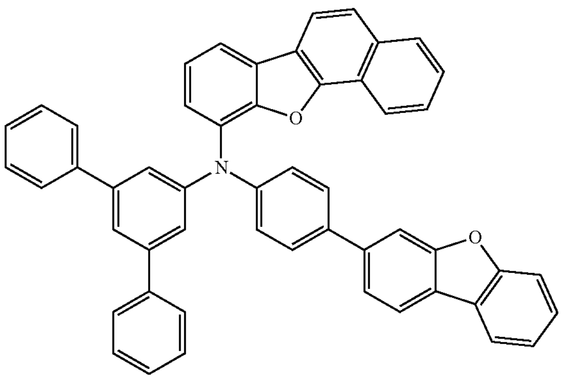
B9
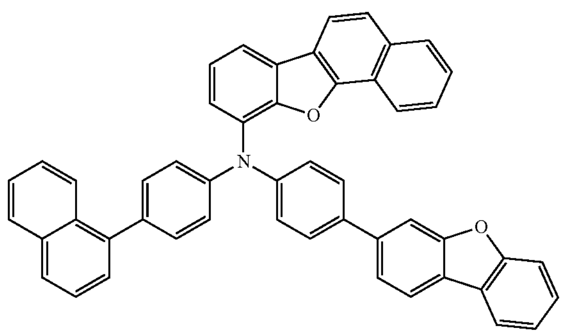
B10
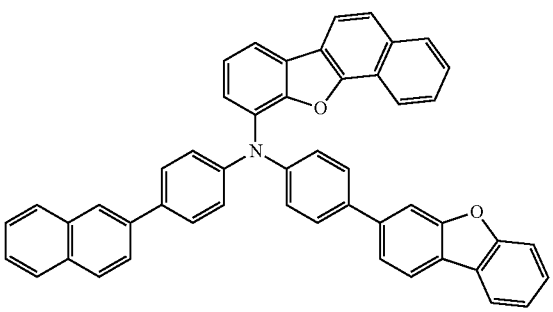

-continued
B11
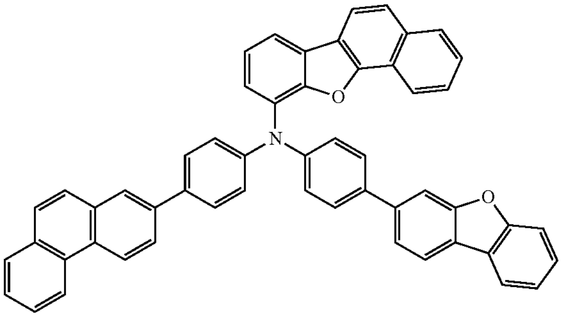
B12
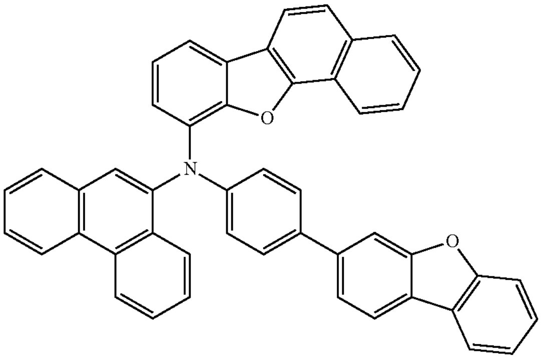
B13
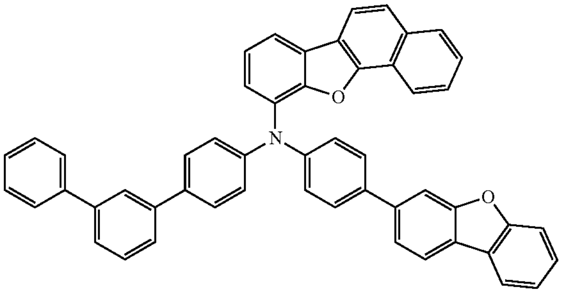
B14
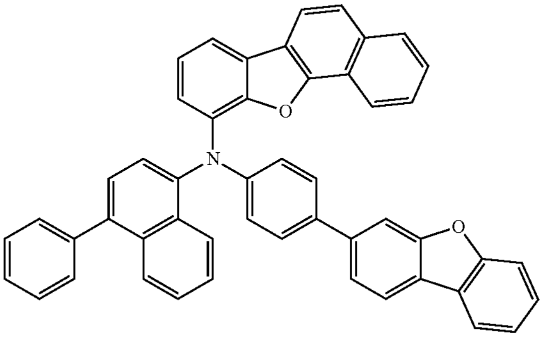
B15
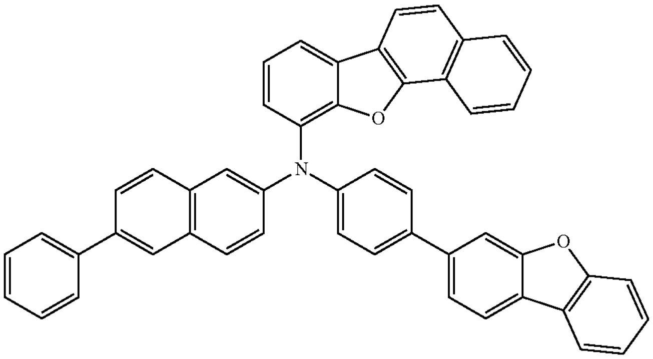
B16
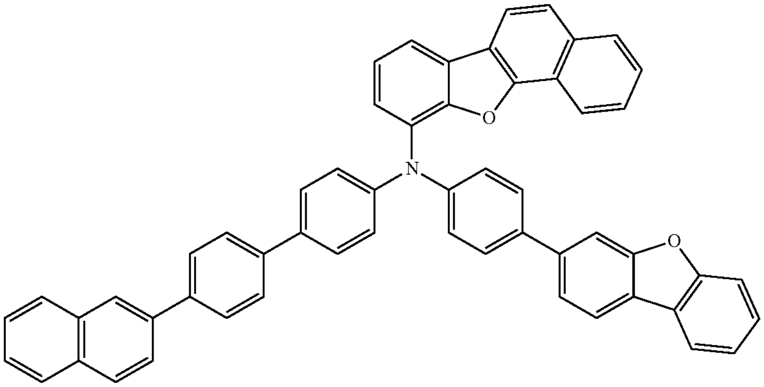

-continued
B17
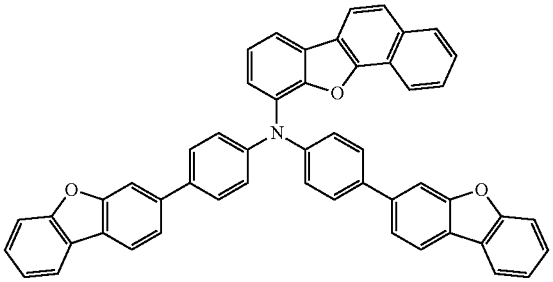
B19
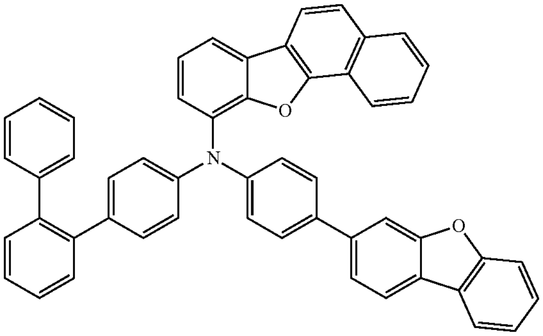
C1
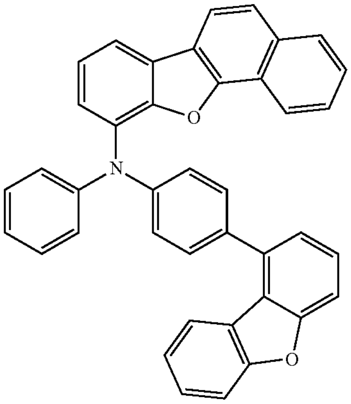
C3
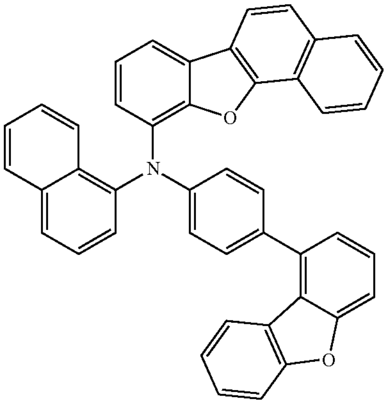
C4
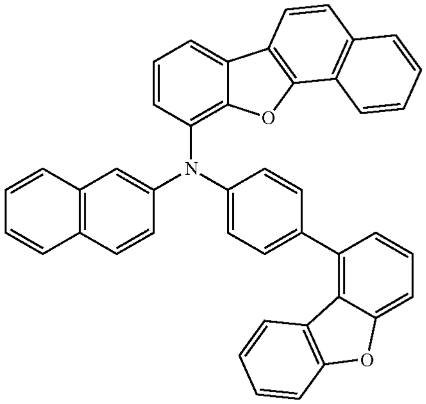

-continued
C7
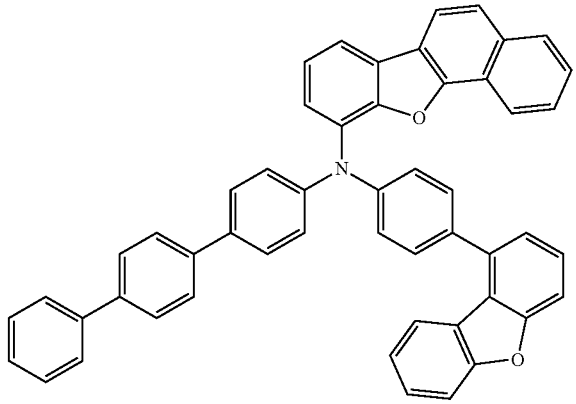
C8
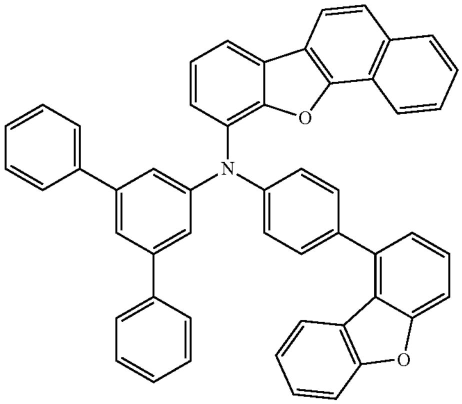
C9
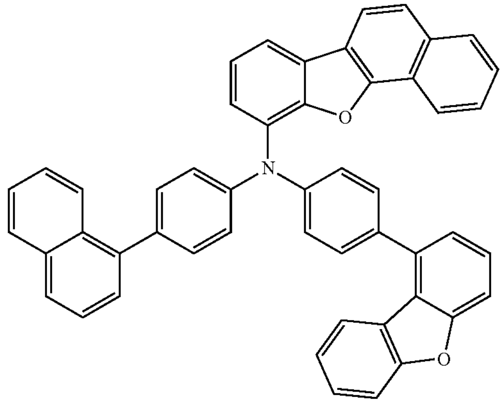
C10
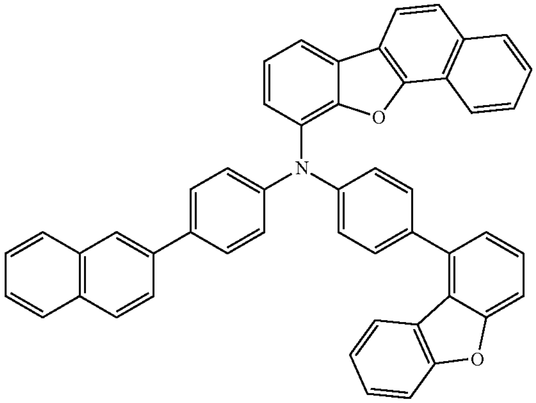
C11
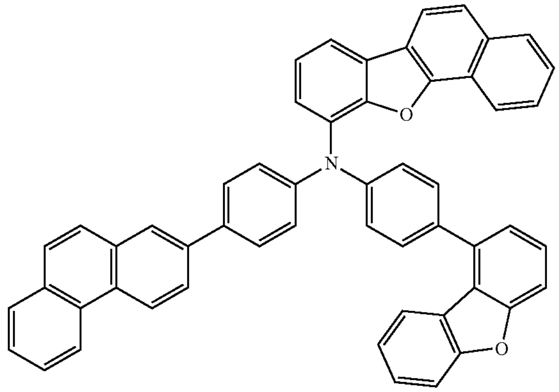
C12
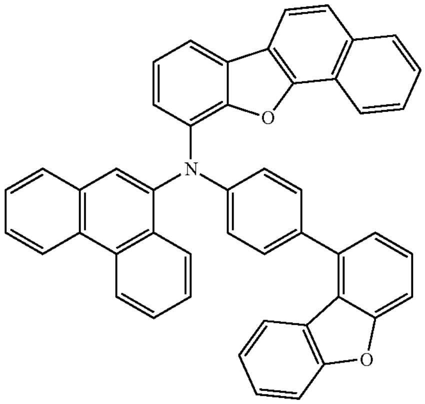

-continued
C13
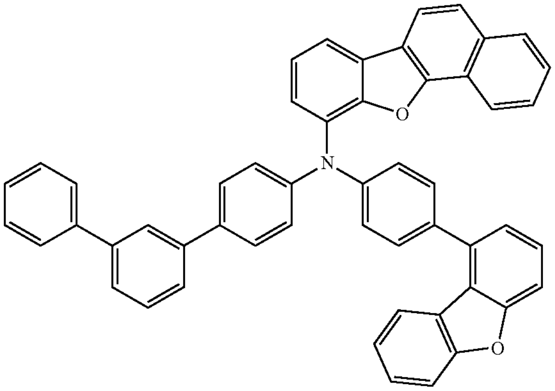
C14
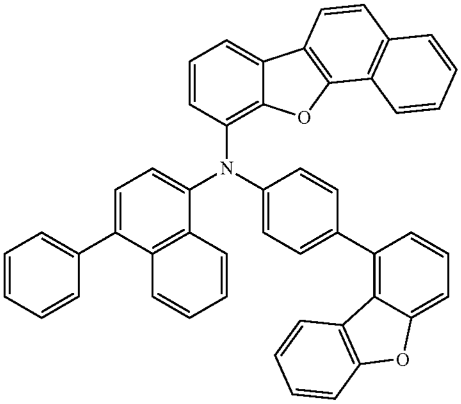
C15
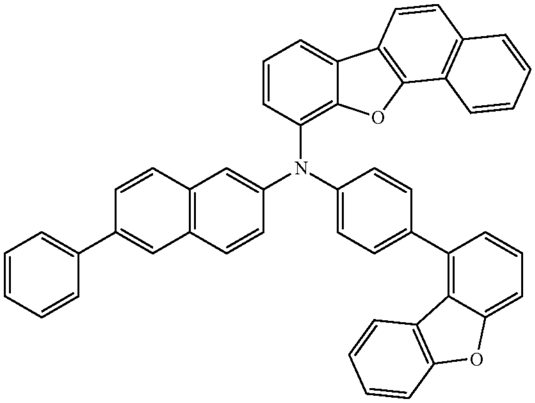
C16
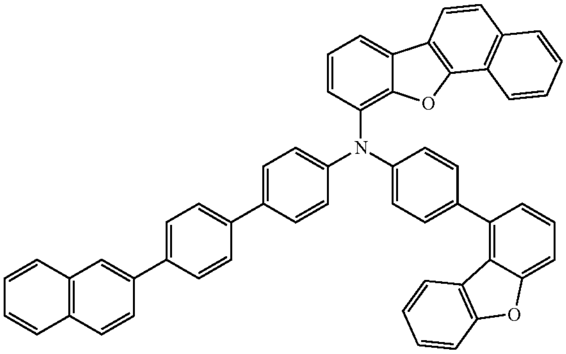
C17
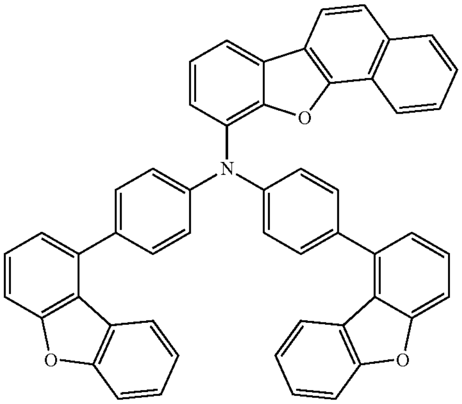

-continued
C19
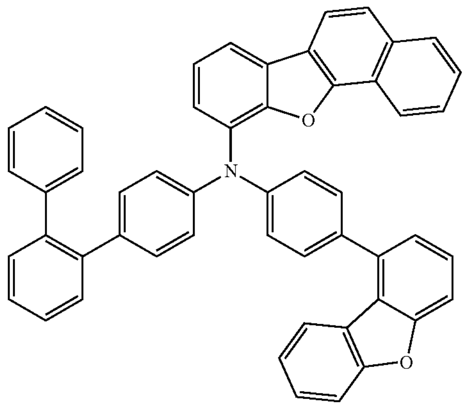
D1
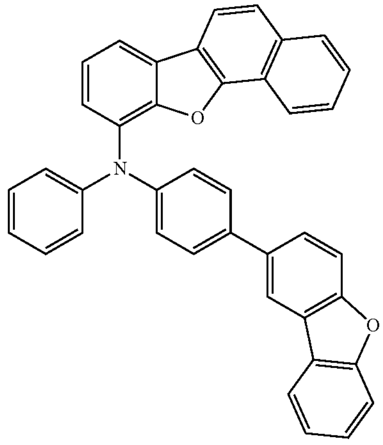
D3
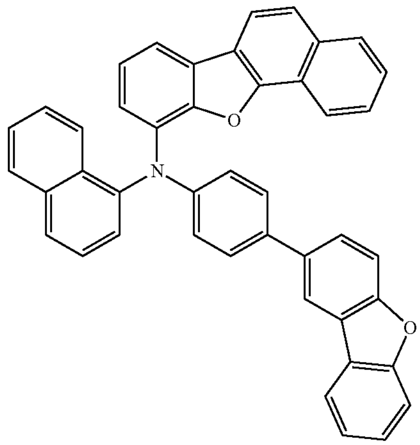
D4
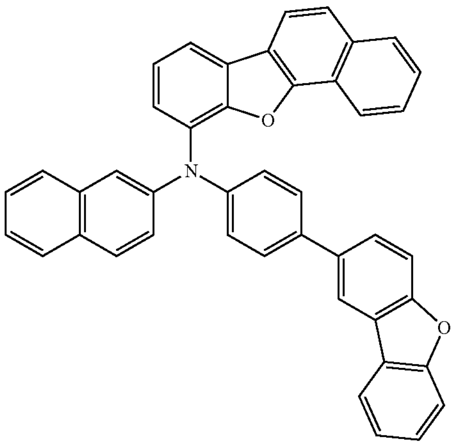

-continued
D7
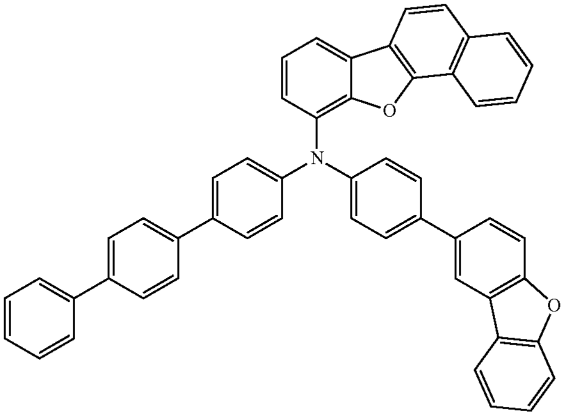
D8
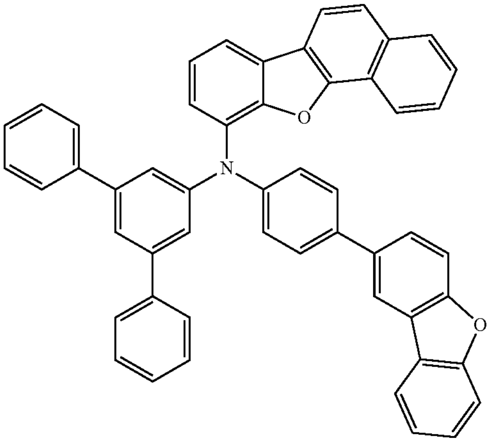
D9
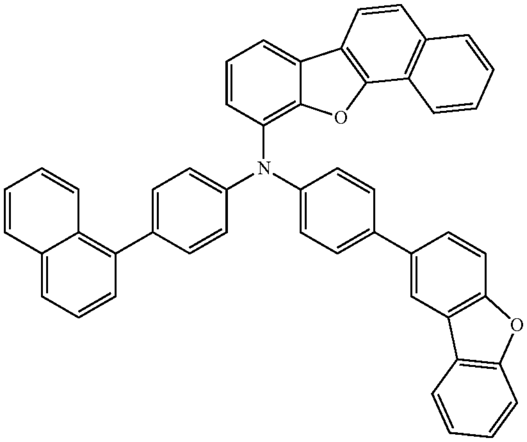
D10
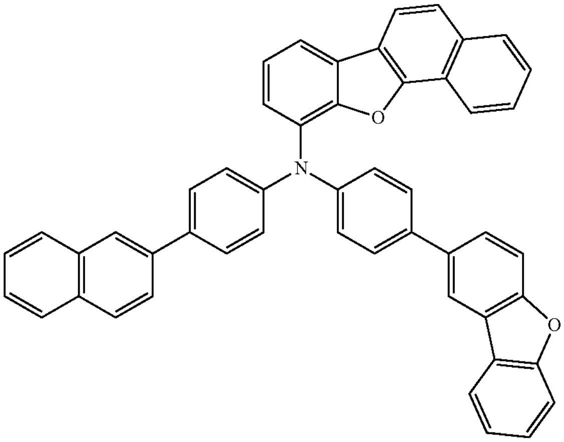
D11
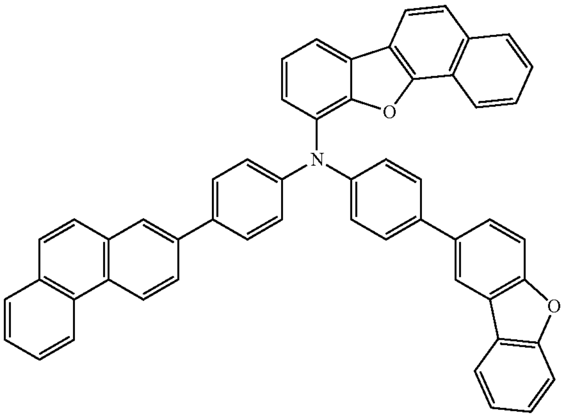
D12
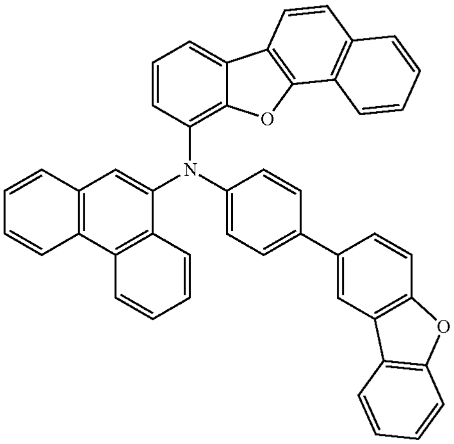

-continued
D13
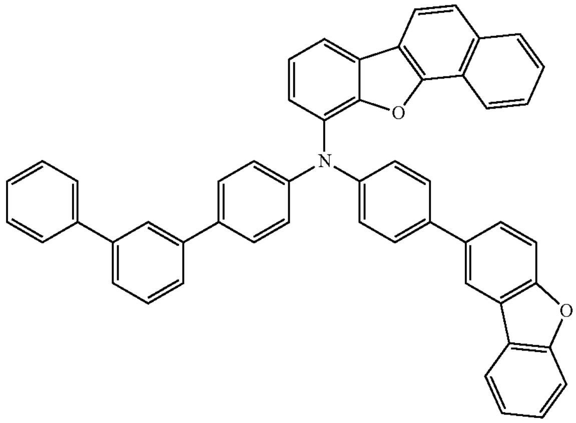
D14
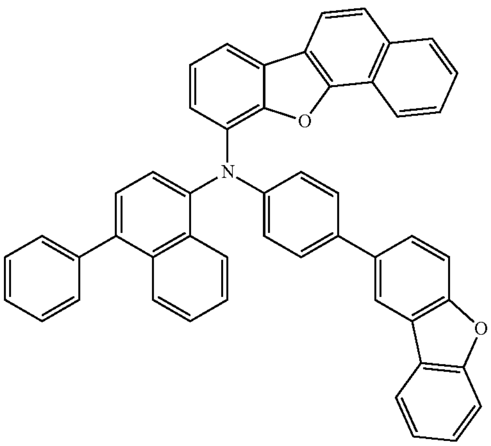
D15
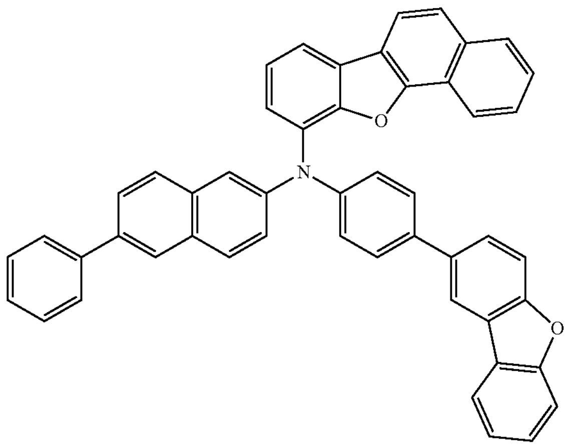
D16
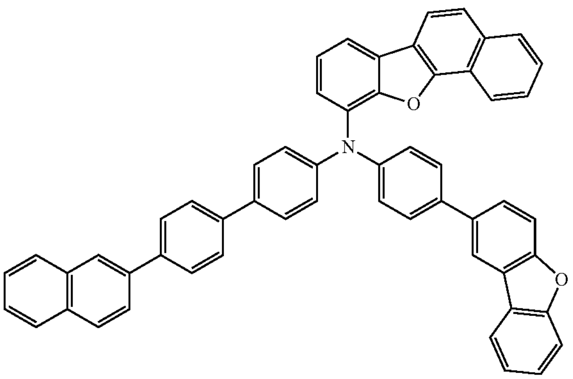
D17
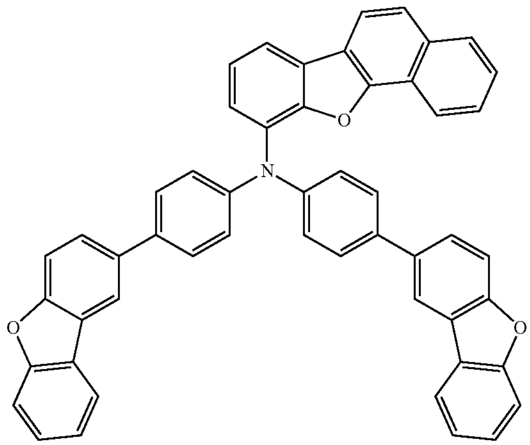
D19
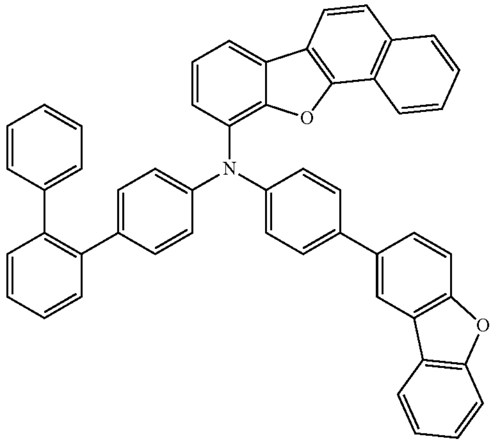
in Compound Group 1, D is a deuterium atom.
10. An amine compound represented by the following Formula 1B:

Formula 1B

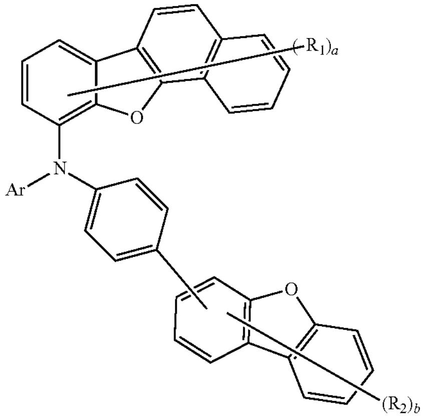

in Formula 1B

Ar is a substituted or unsubstituted alkyl group of 1 to 20 carbon atoms, a substituted or unsubstituted alkenyl group of 2 to 20 carbon atoms, a substituted or unsubstituted alkynyl group of 2 to 20 carbon atoms, a substituted or unsubstituted oxy group, a substituted or unsubstituted aryl group of 6 to 40 ring-forming carbon atoms, or a substituted or unsubstituted oxygen-containing heteroaryl group of 5 to 40 ring-forming carbon atoms, Ar is not an unsubstituted biphenyl group, a is an integer of 0 to 9, b is an integer of 0 to 7, $R_1$ is a hydrogen atom, a deuterium atom, a substituted or unsubstituted alkyl group of 1 to 20 carbon atoms, a substituted or unsubstituted alkenyl group of 2 to 20 carbon atoms, a substituted or unsubstituted alkynyl group of 2 to 20 carbon atoms, or a substituted or unsubstituted oxy group, and $R_2$ is a hydrogen atom, a deuterium atom, a substituted or unsubstituted alkyl group of 1 to 20 carbon atoms, a substituted or unsubstituted alkenyl group of 2 to 20 carbon atoms, a substituted or unsubstituted alkynyl group of 2 to 20 carbon atoms, a substituted or unsubstituted oxy group, a substituted or unsubstituted aryl group of 6 to 40 ring-forming carbon atoms, or a substituted or unsubstituted heteroaryl group of 5 to 40 ring-forming carbon atoms, wherein the amine compound represented by Formula 1B optionally has at least one hydrogen atom substituted with a deuterium atom.

11. The amine compound of claim 10, wherein Ar is a substituted or unsubstituted aryl group of 6 to 40 ring-forming carbon atoms.

12. The amine compound of claim 10, wherein Ar is a substituted or unsubstituted phenyl group, a substituted biphenyl group, a substituted or unsubstituted terphenyl group, a substituted or unsubstituted naphthyl group, a substituted or unsubstituted phenanthrenyl group, or a substituted or unsubstituted dibenzofuranyl group.

13. The amine compound of claim 10, wherein at least one selected from among Ar, $R_1$, and $R_2$ of Formula 1B comprises a deuterium atom, or a substituent comprising a deuterium atom.

14. The amine compound of claim 10, wherein the compound represented by Formula 1B is a monoamine compound.

15. An amine compound is represented by any one selected from among compounds in the following Compound Group 1:

Compound Group 1

A1

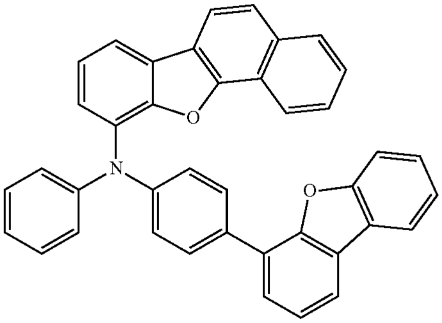

A2

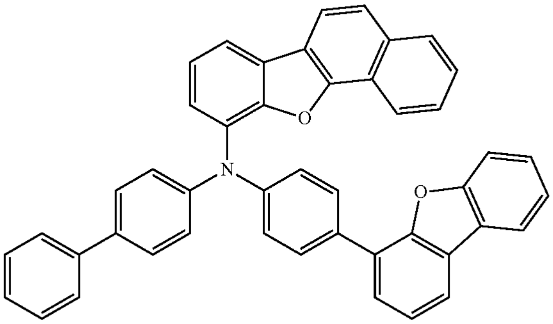

A3

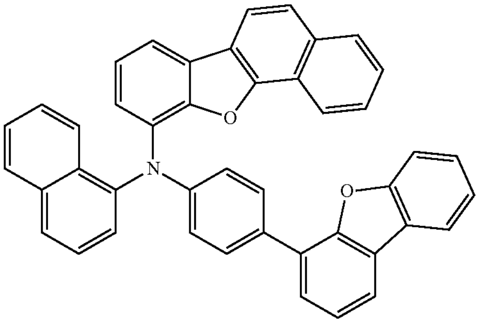

A4

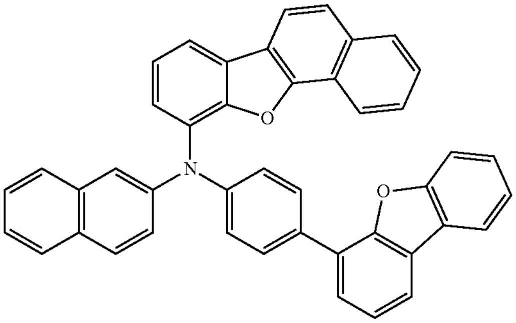

-continued
A6
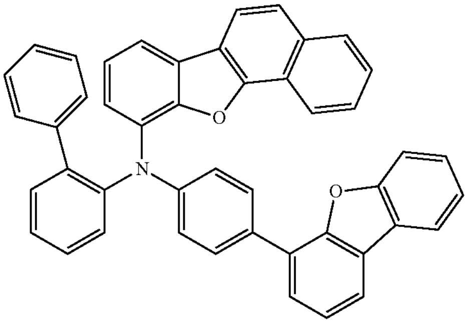
A7
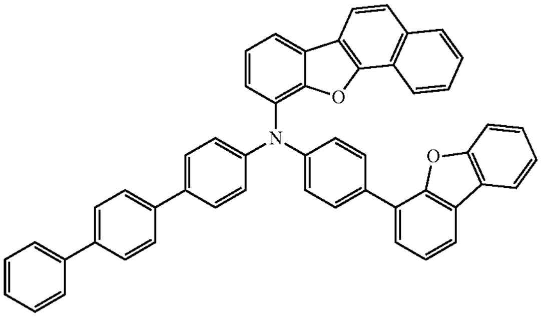
A8
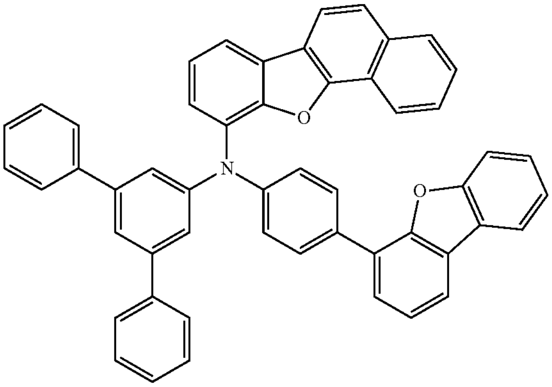
A9
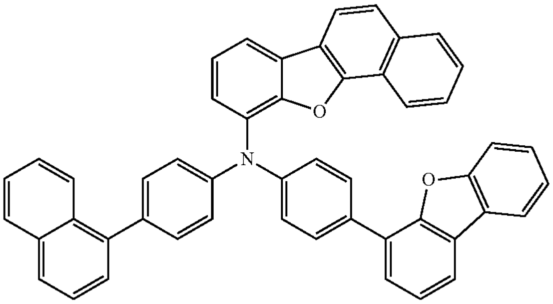
-continued
A10
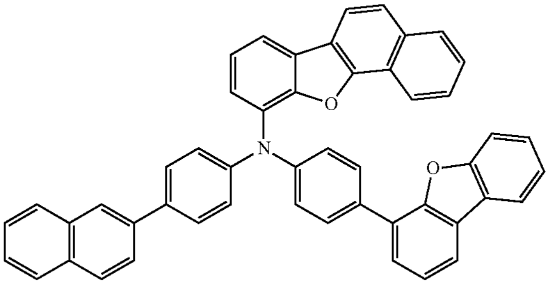
A11
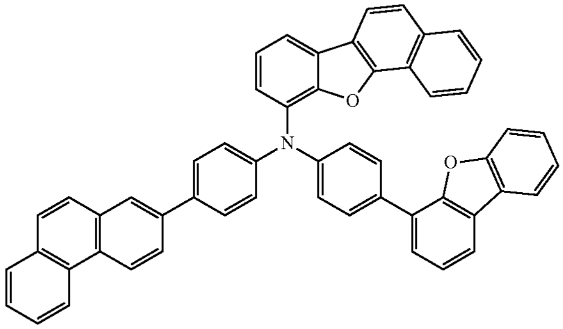
A12
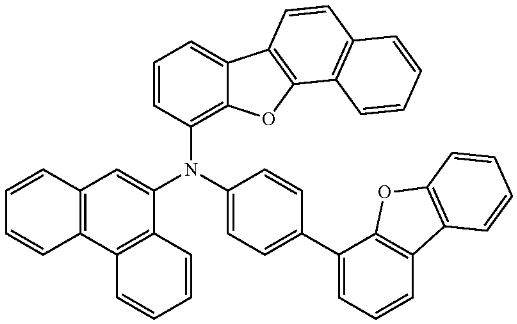
A13
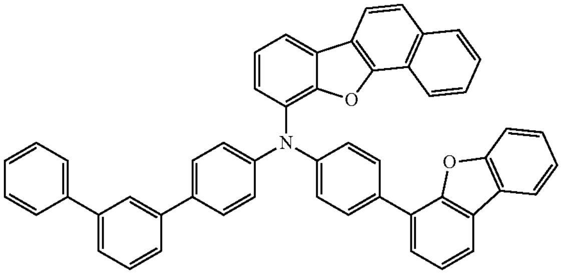

-continued
A14
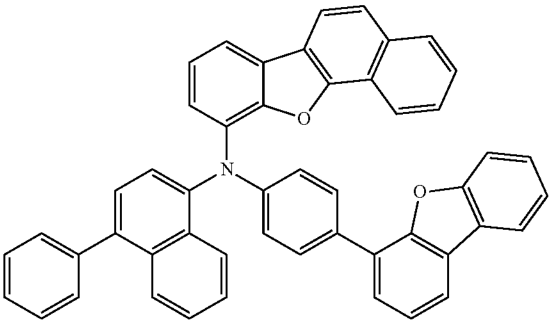
A15
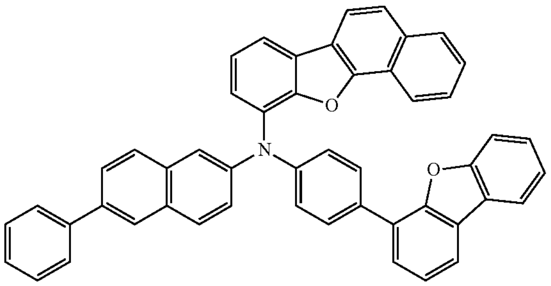
A16
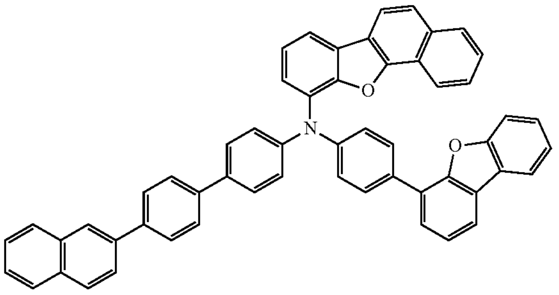
A17
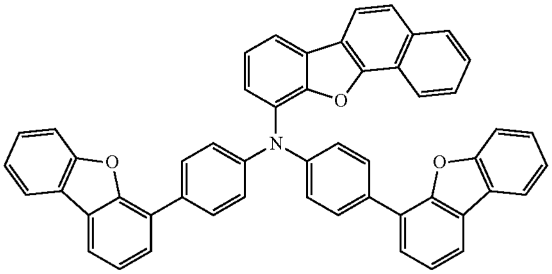
-continued
A18
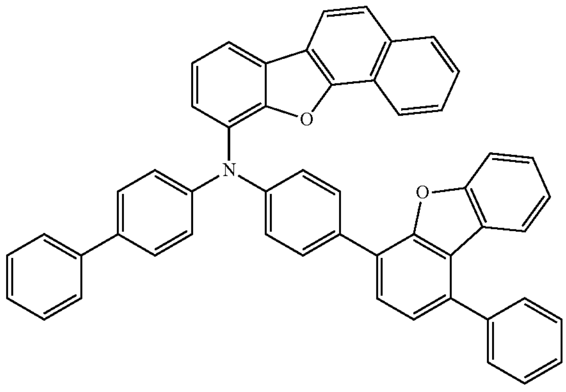
A19
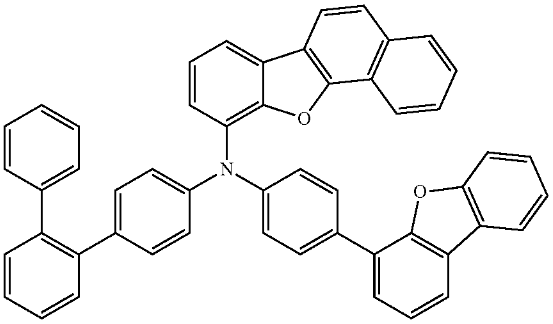
A20
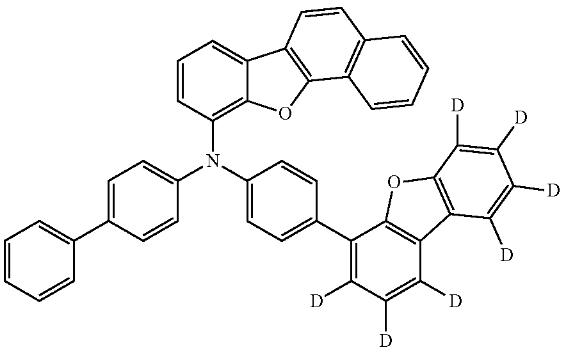
B1
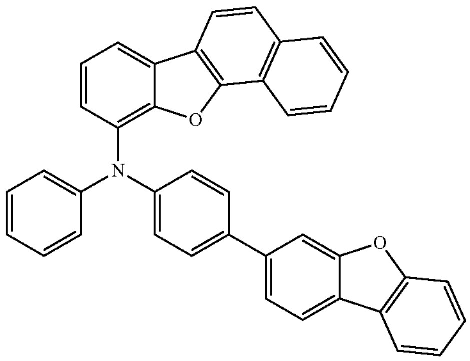

-continued
B2
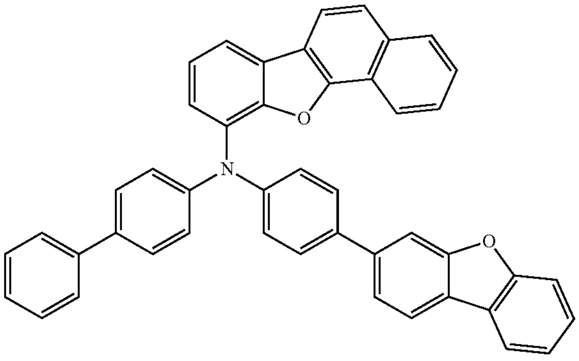
B3
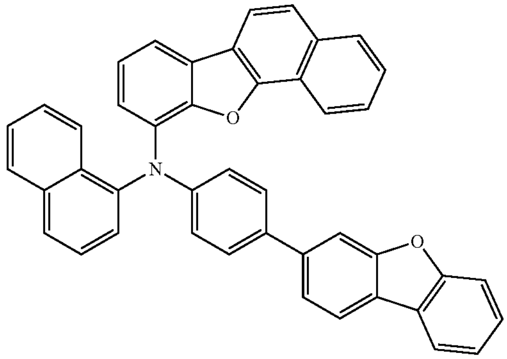
B4
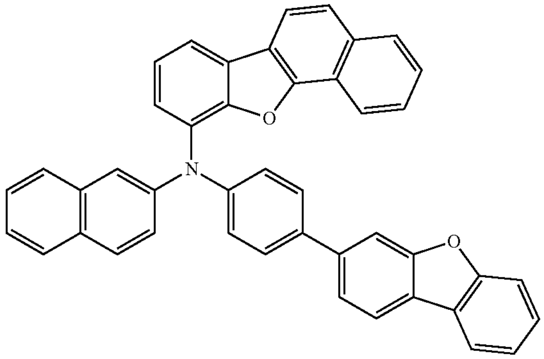
B5
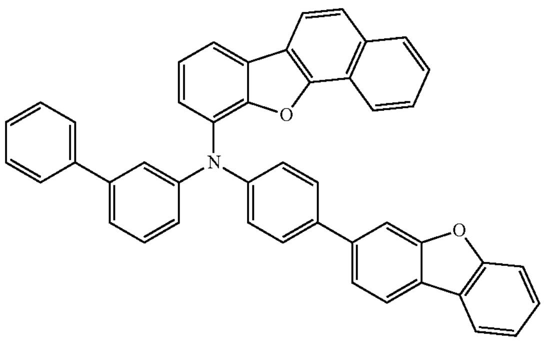
-continued
B6
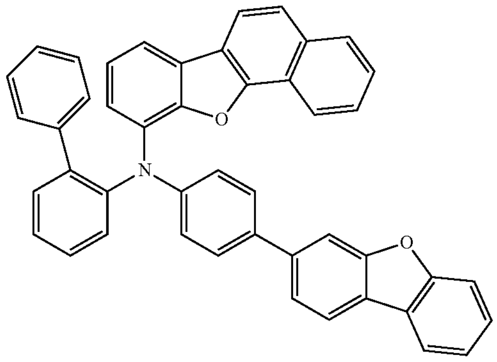
B7
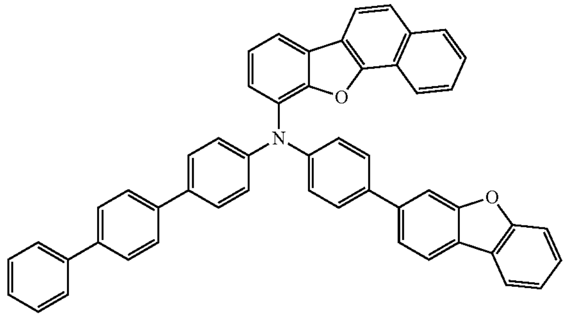
B8
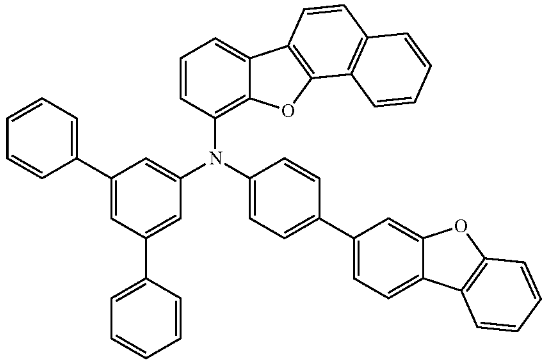
B9
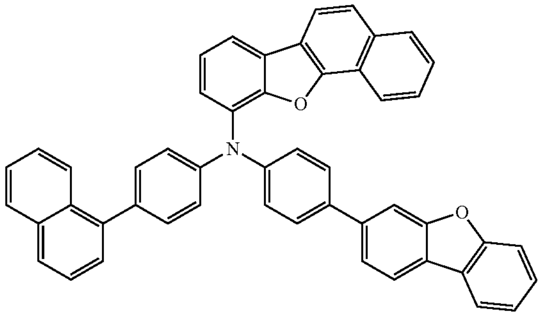

-continued
B10
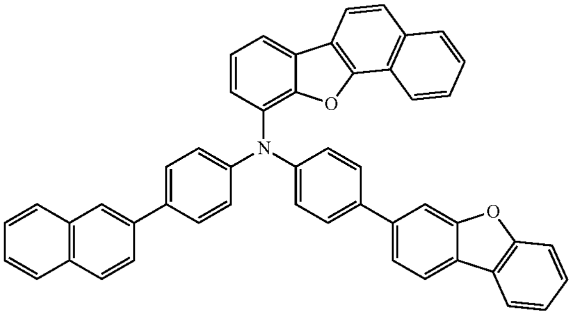
B11
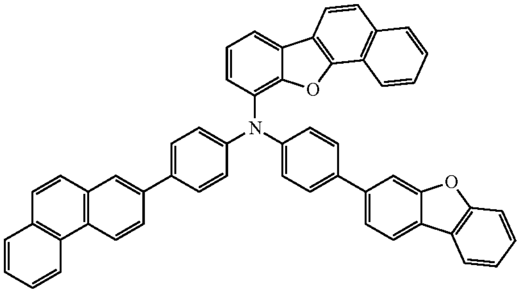
B12
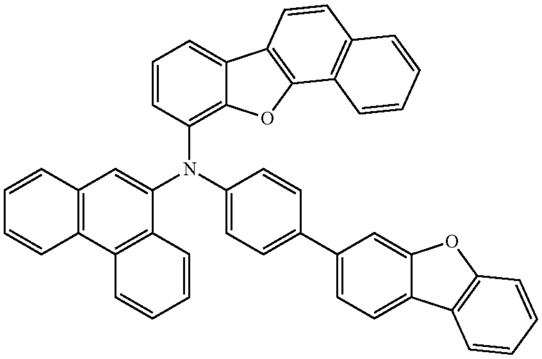
B13
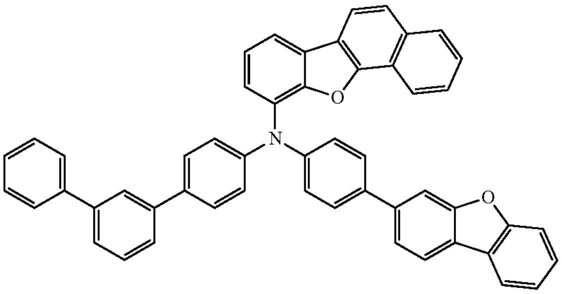
-continued
B14
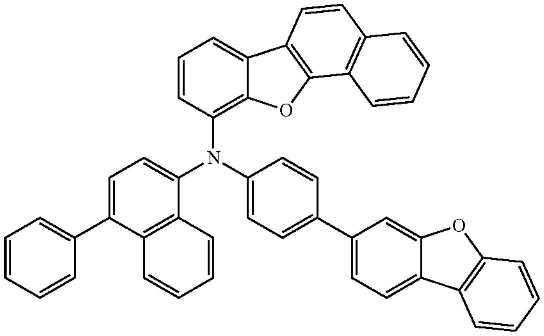
B15
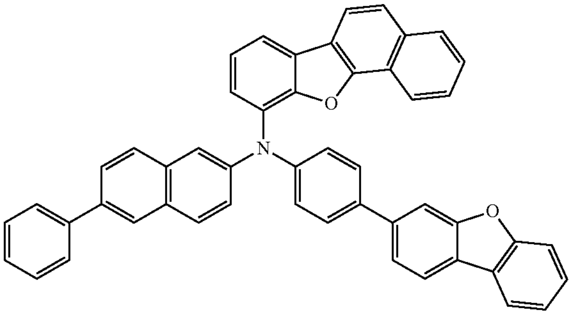
B16
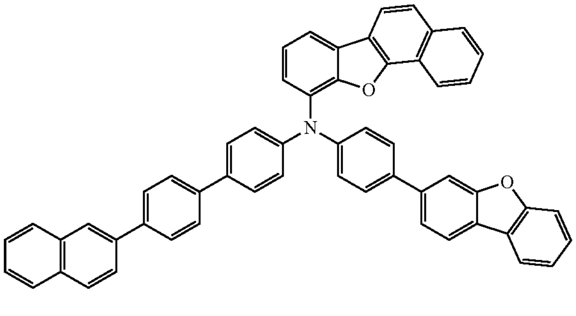
B17
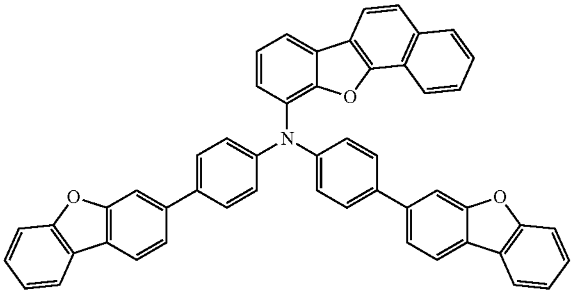

-continued
B18
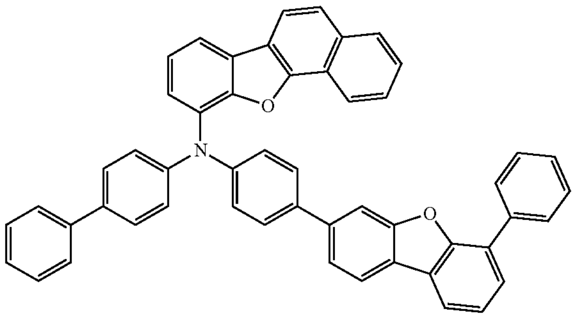
B19
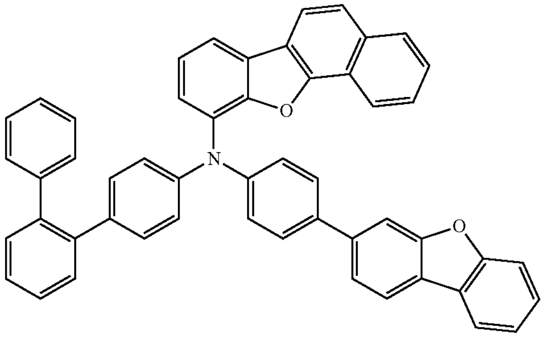
B20
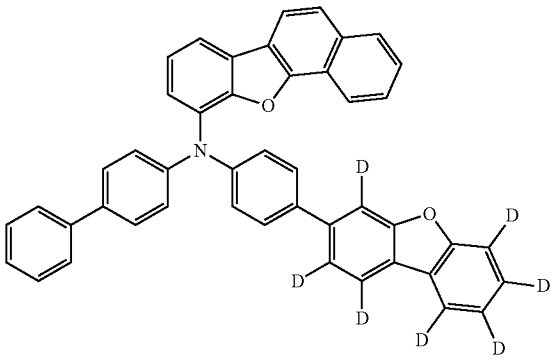
C1
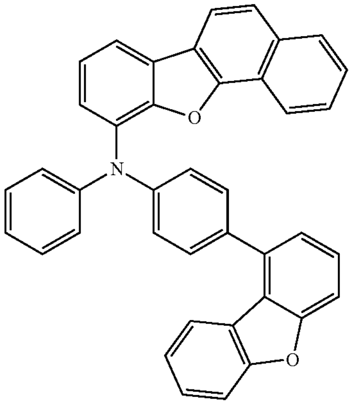
-continued
C2
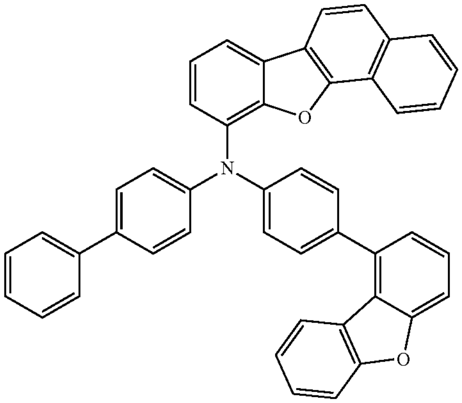
C3
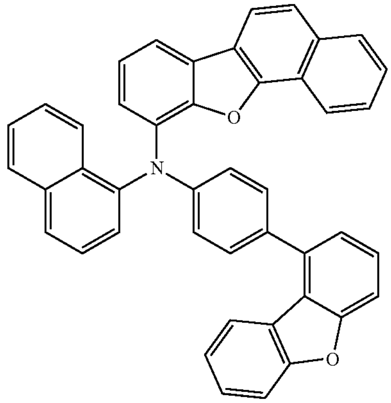
C4
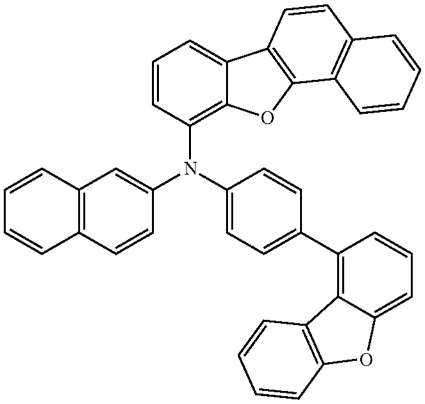
C5
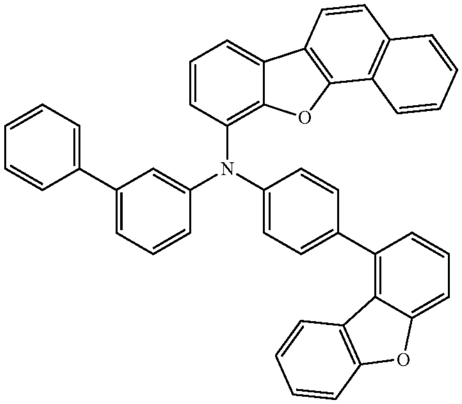

-continued
C6
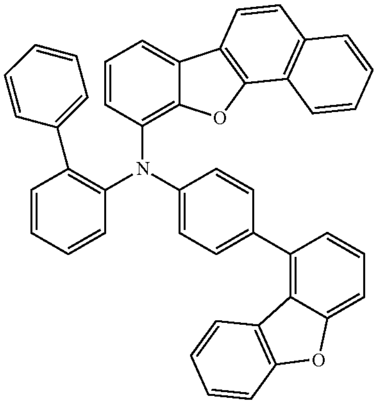
C7
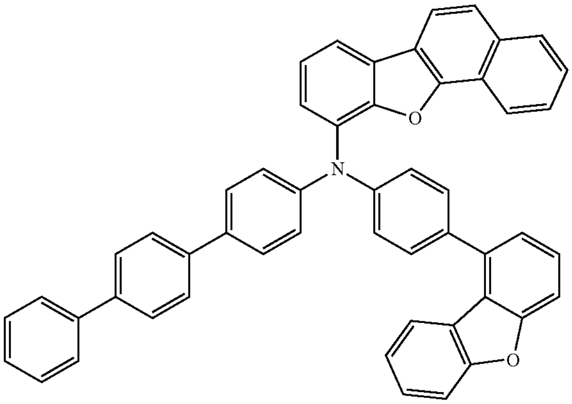
C8
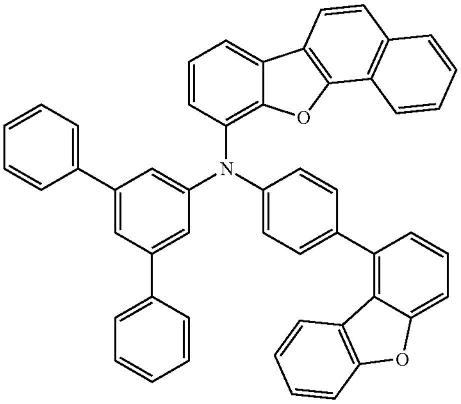
C9
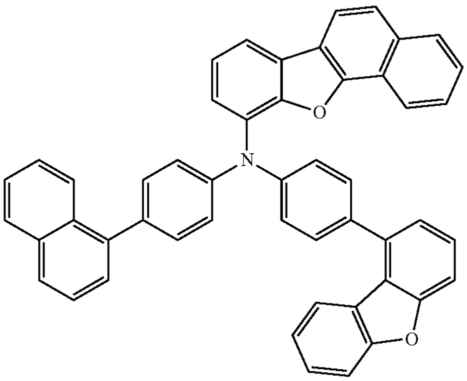
-continued
C10
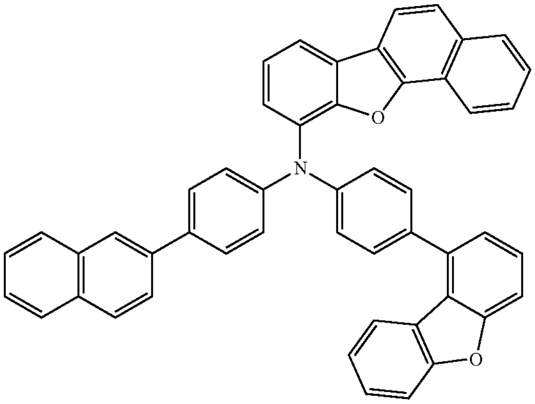
C11
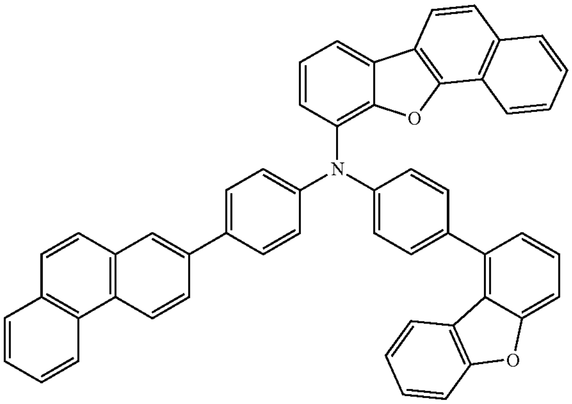
C12
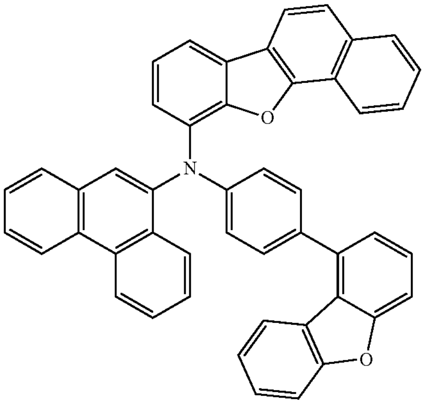

-continued
C13
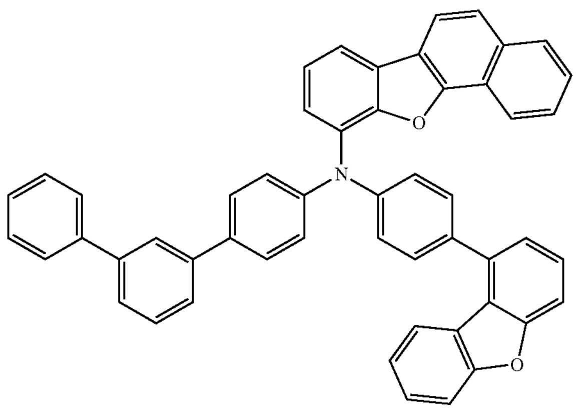
C14
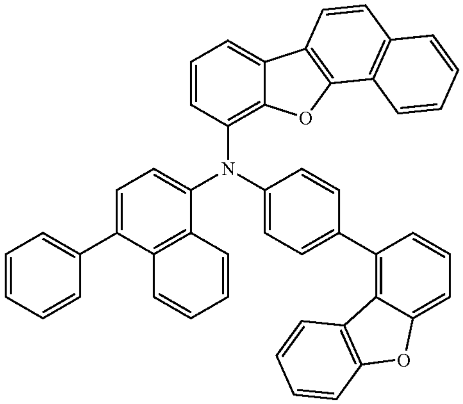
C15
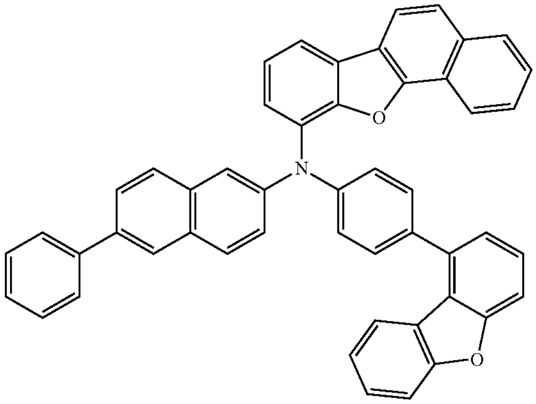
C16
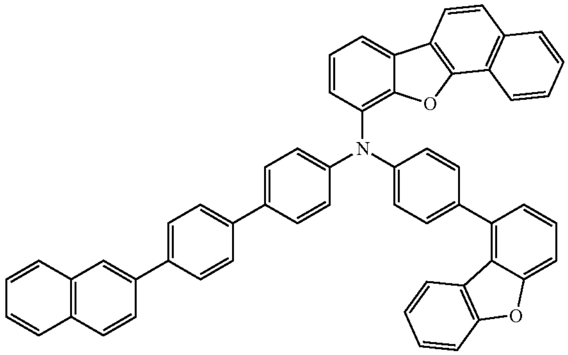
-continued
C17
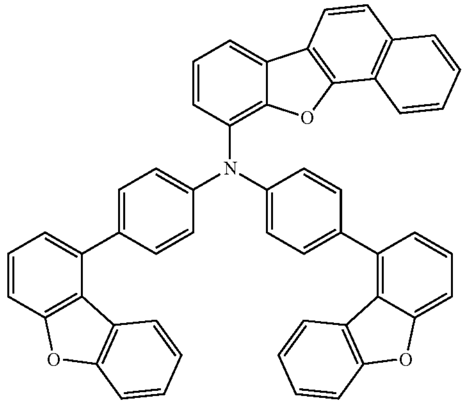
C18
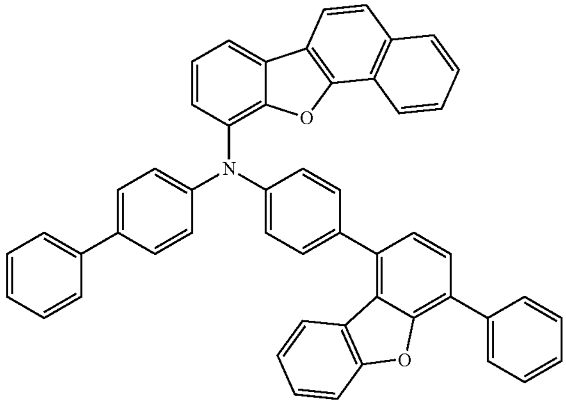
C19
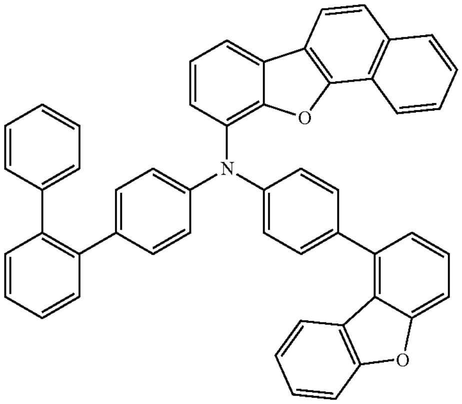

-continued
C20
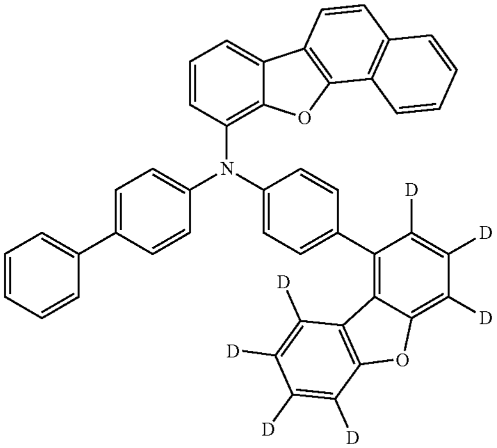
D1
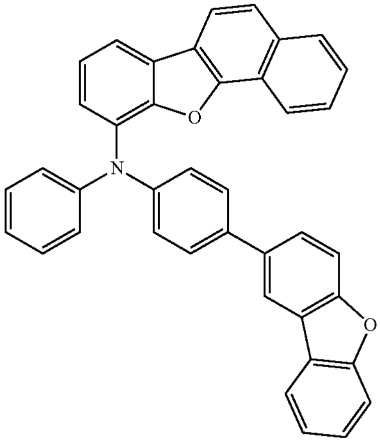
D2
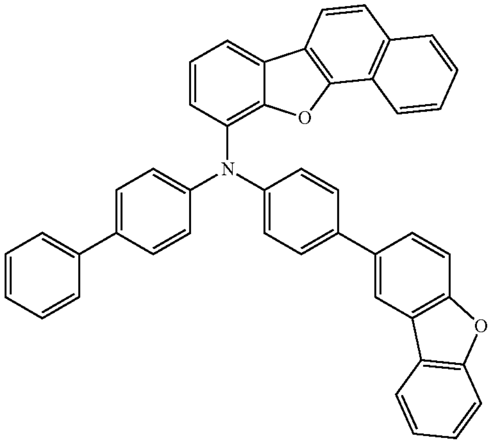
-continued
D3
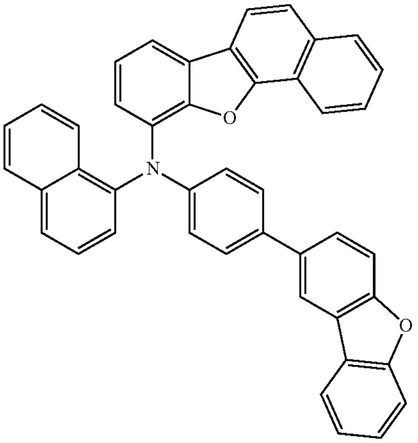
D4
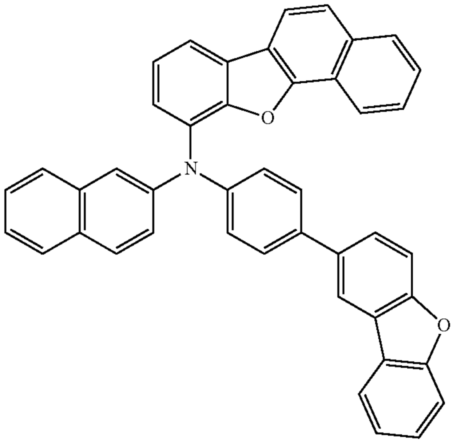
D5
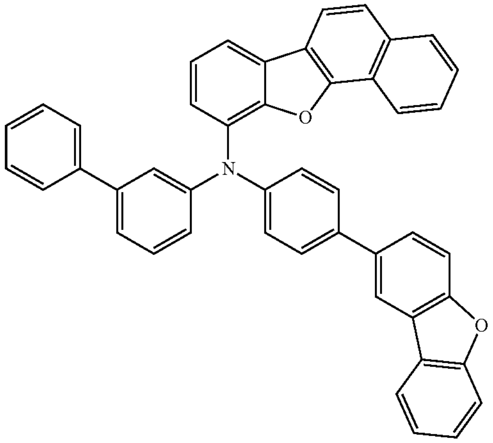

-continued
D6
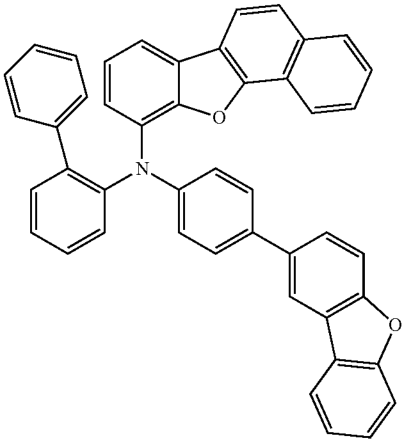
D7
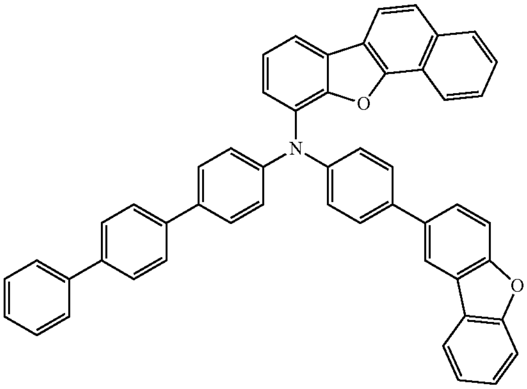
D8
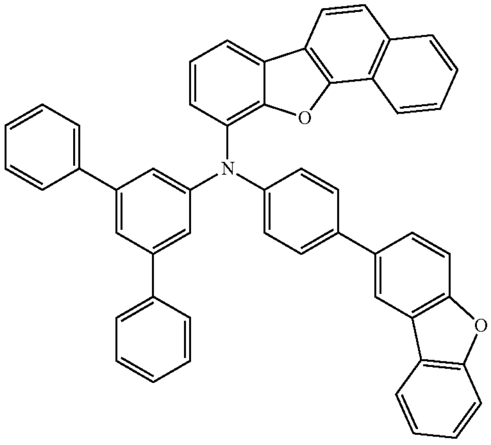
-continued
D9
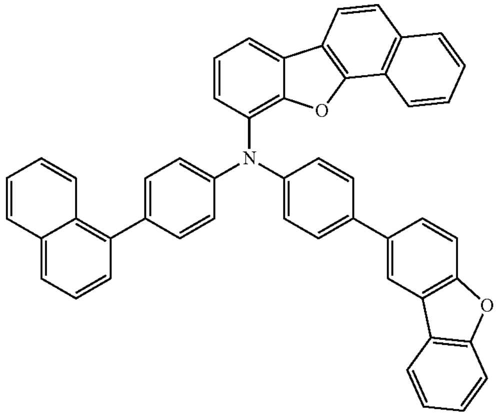
D10
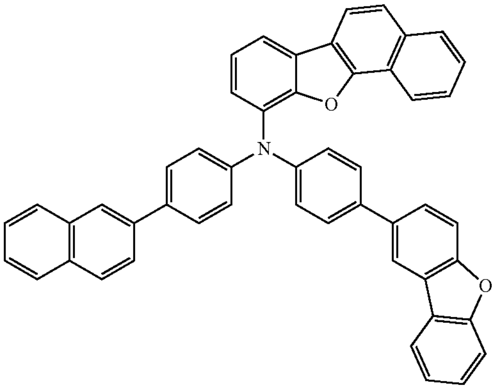
D11
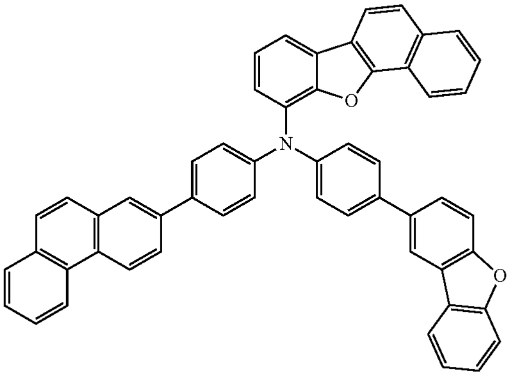
D12
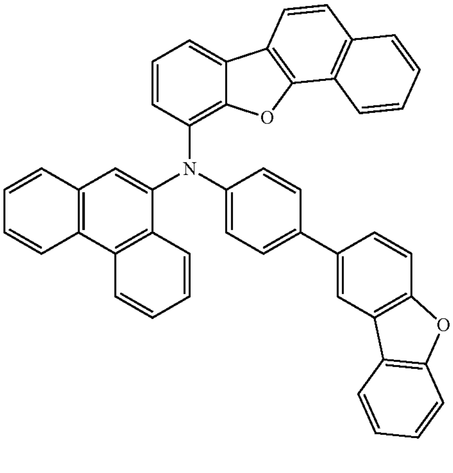

D13
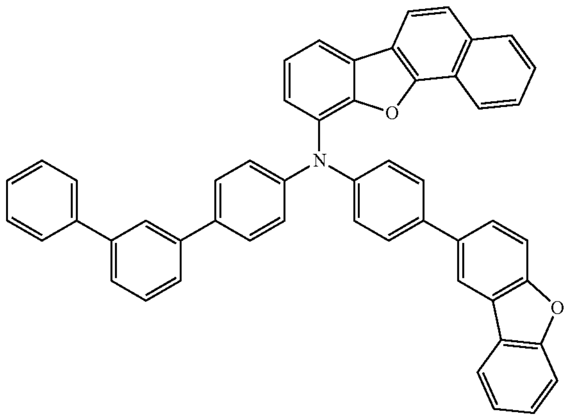
D14
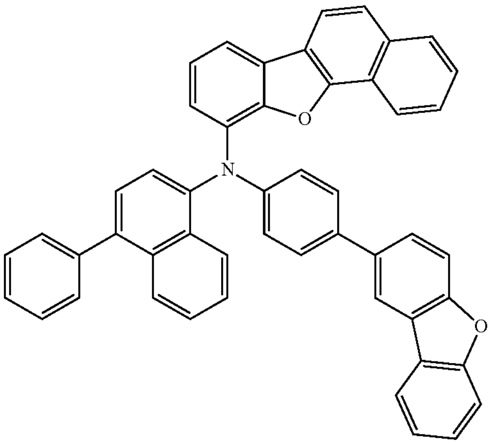
D15
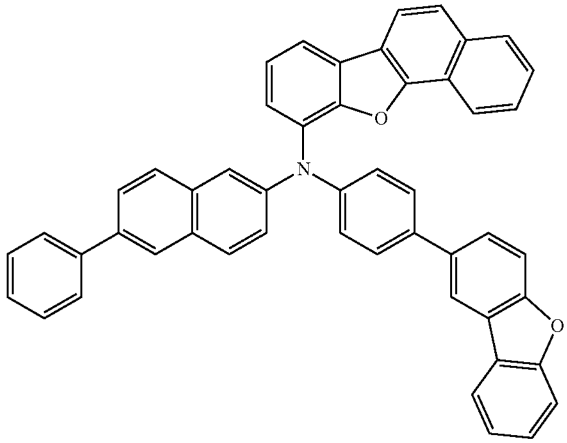
-continued
D16
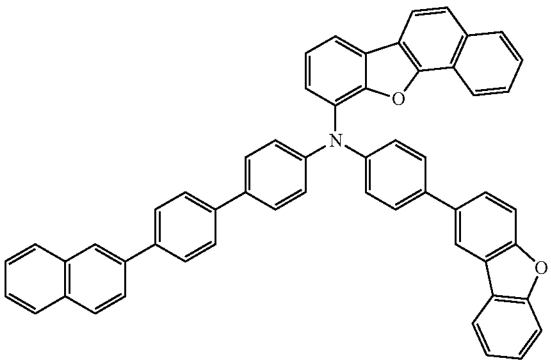
D17
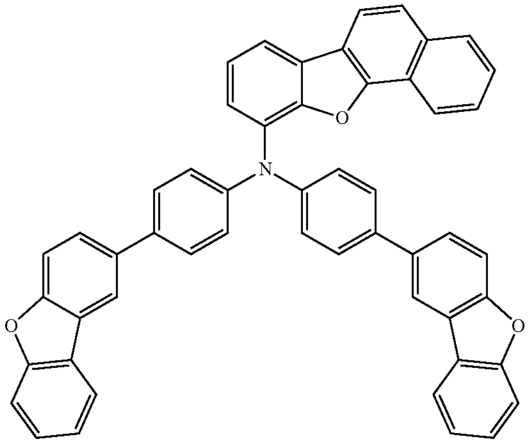
D18
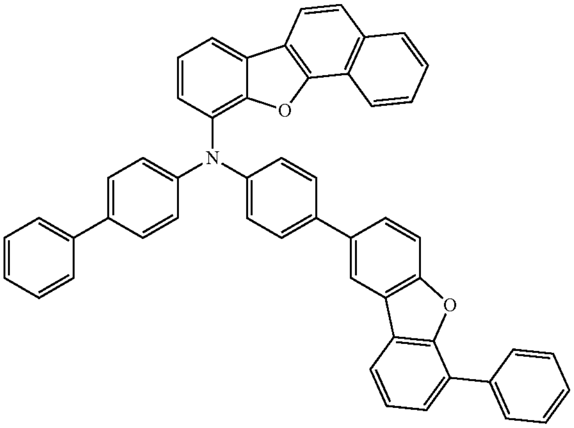

-continued
D19
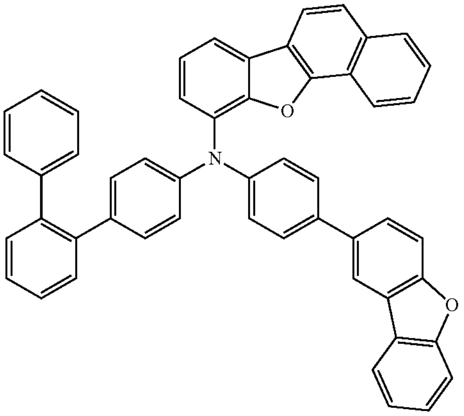
D20
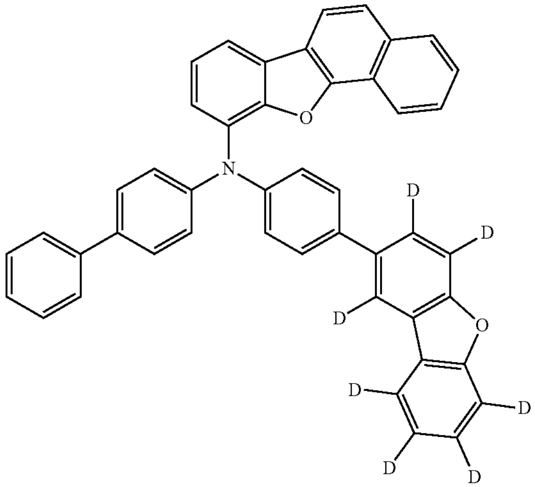
E1
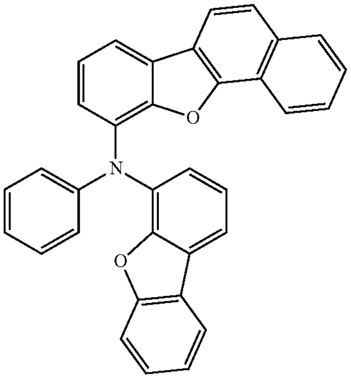
-continued
E2
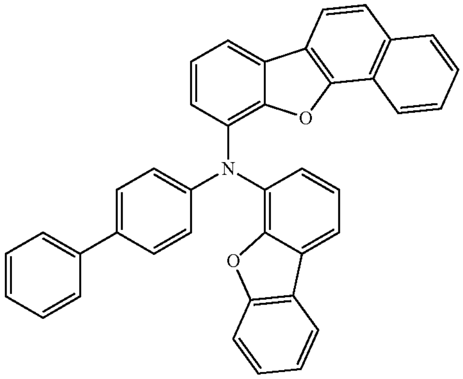
E3
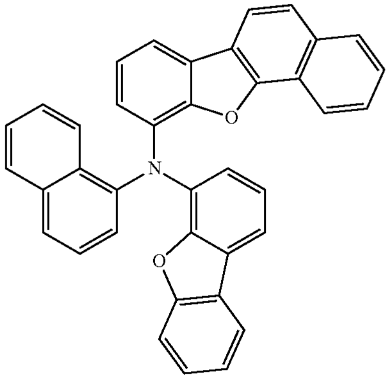
E4
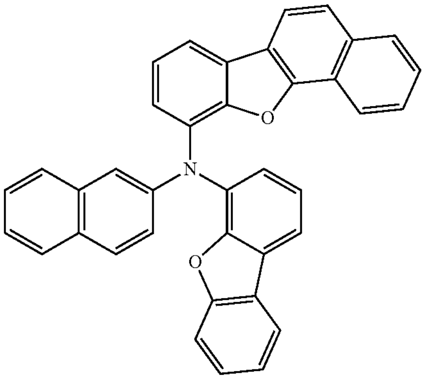
E5
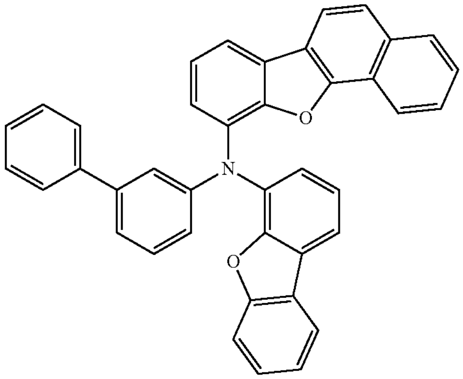

-continued
E6
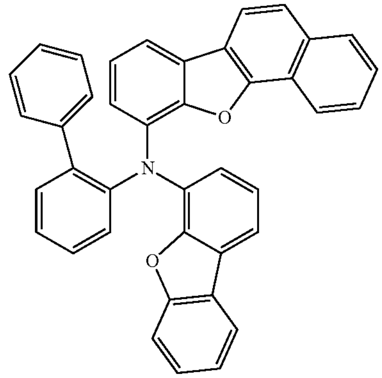
E7
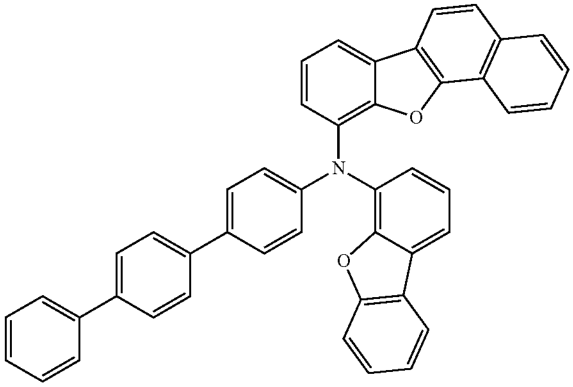
E8
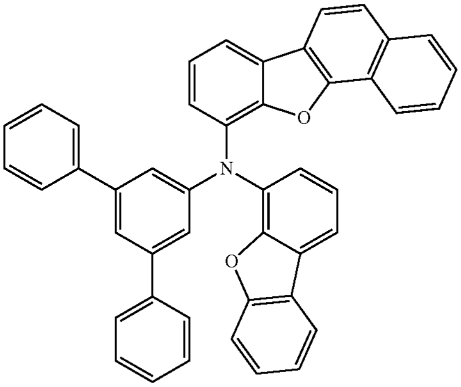
E10
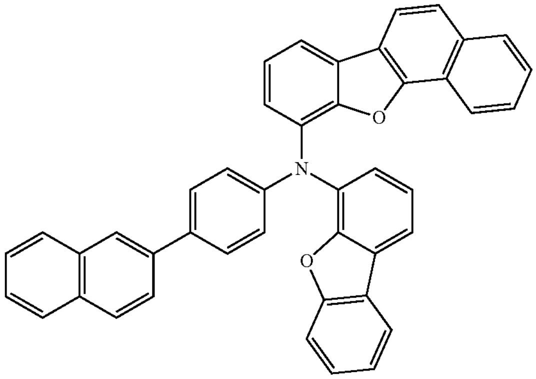
-continued
E11
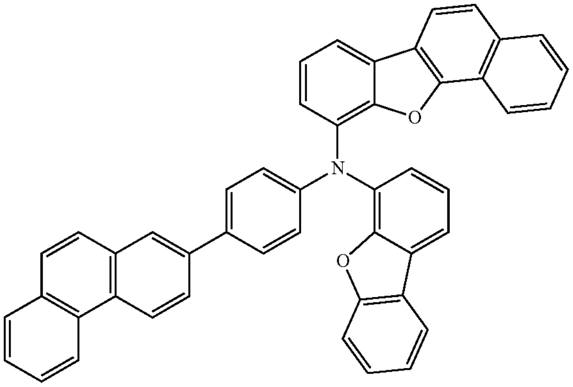
E12
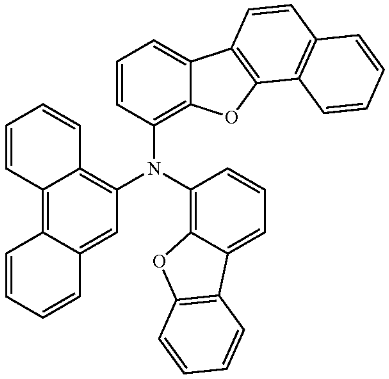
E13
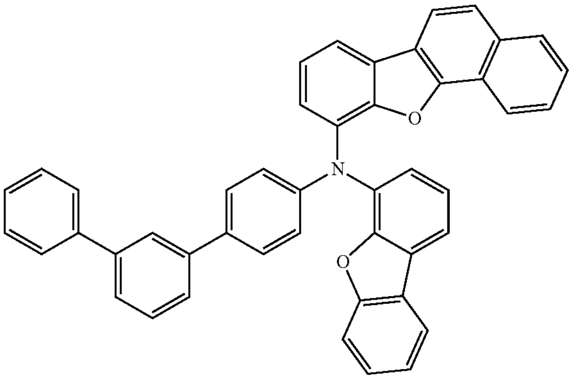
E14
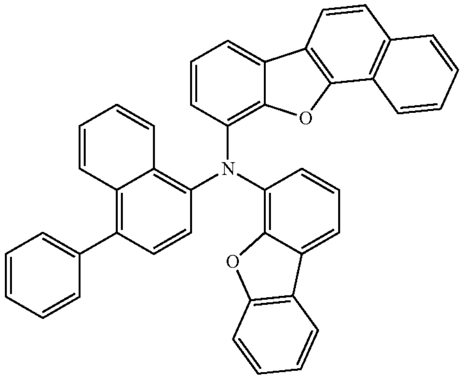

-continued
E15
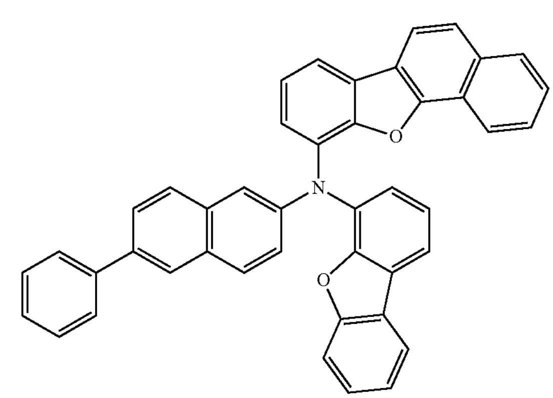
E16
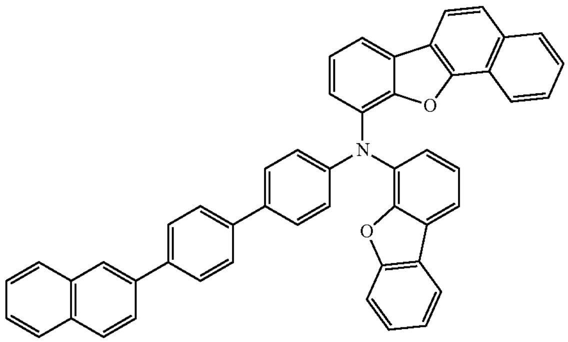
E17
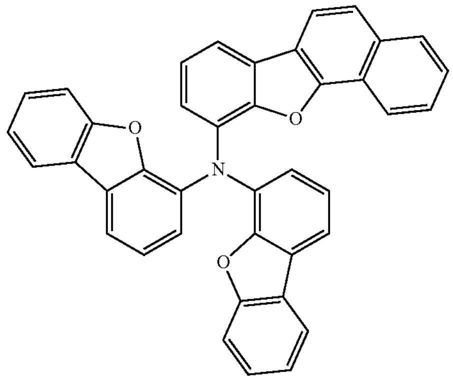
E18
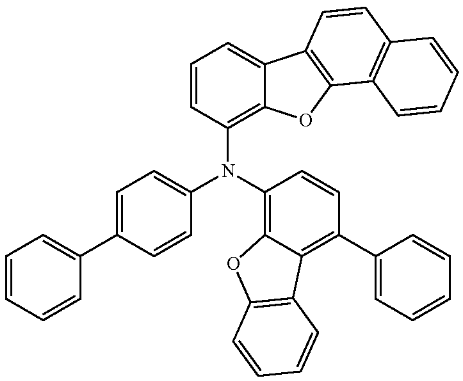
-continued
E19
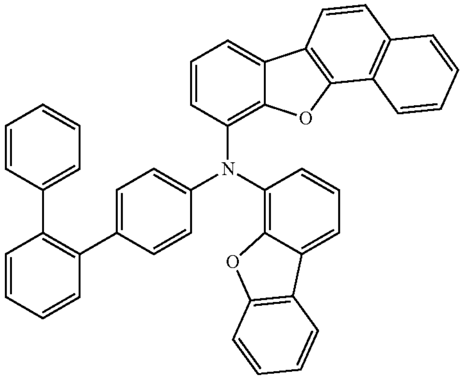
E20
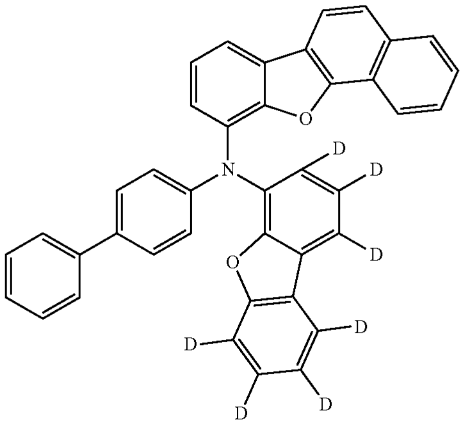
F2
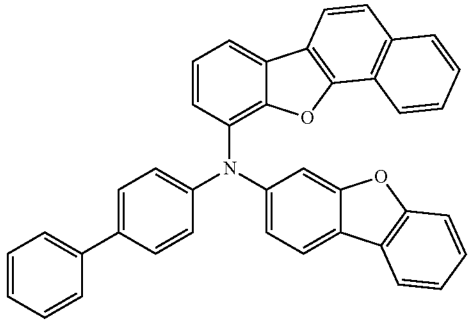
F3
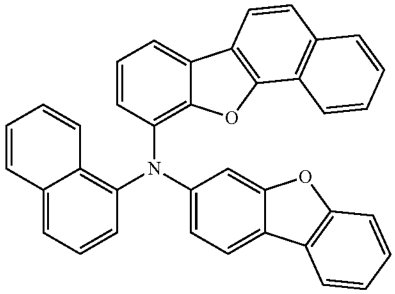

-continued
F4
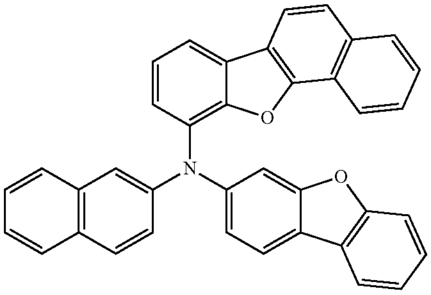
F5
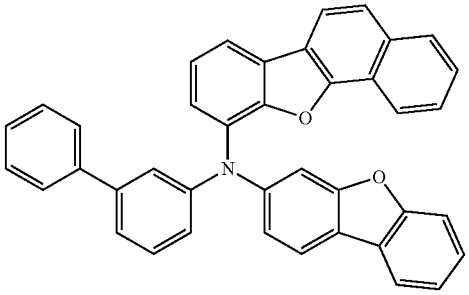
F7
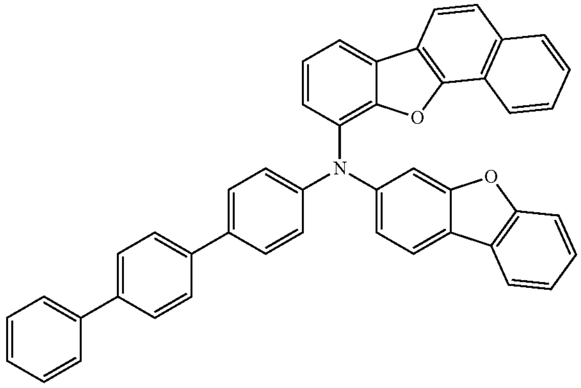
F8
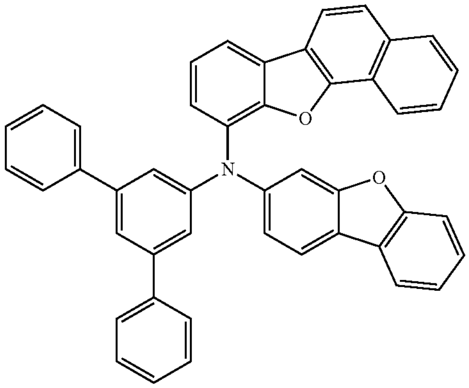
-continued
F9
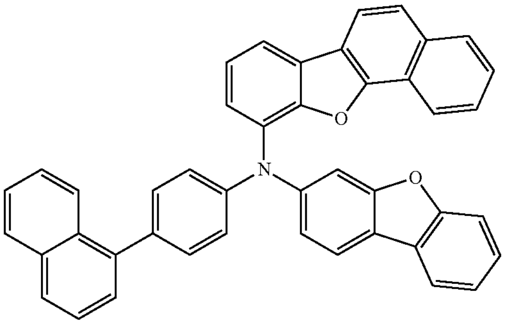
F10
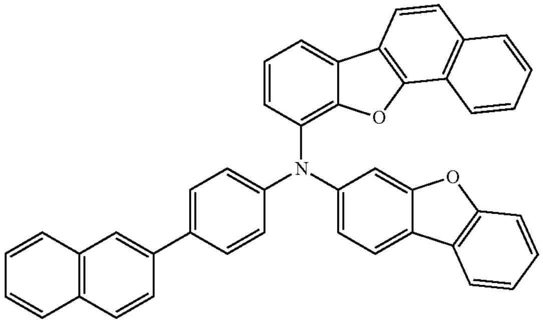
F11
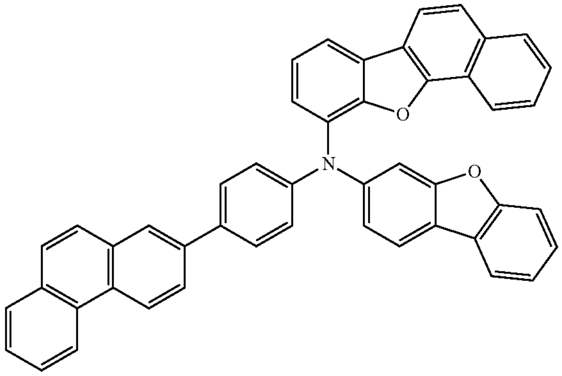
F12
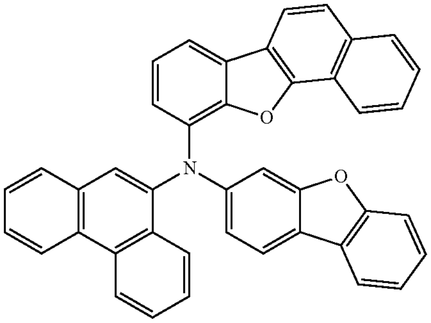

-continued
F13
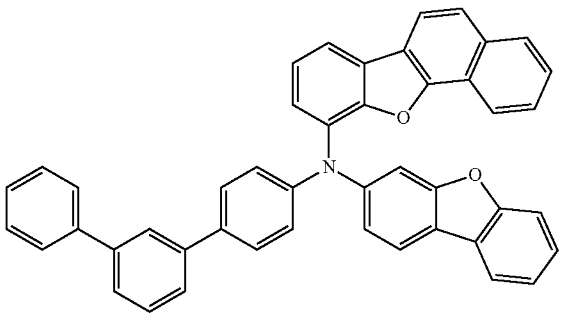
F14
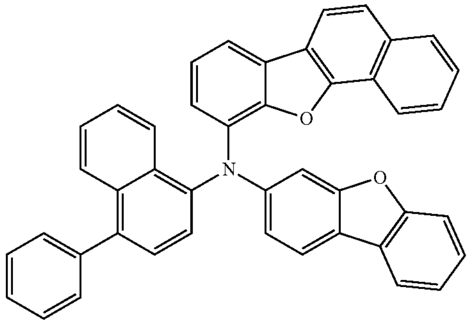
F15
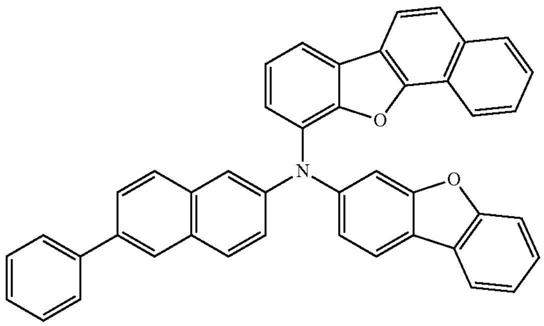
F16
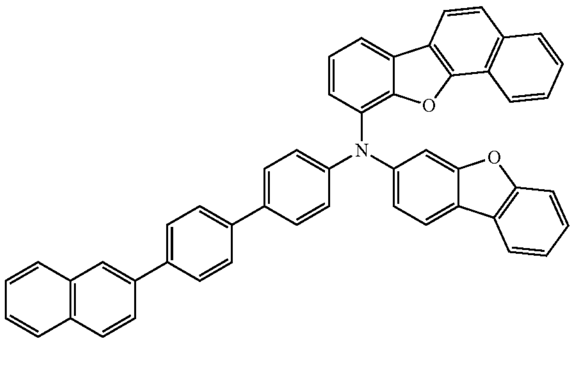
-continued
F17
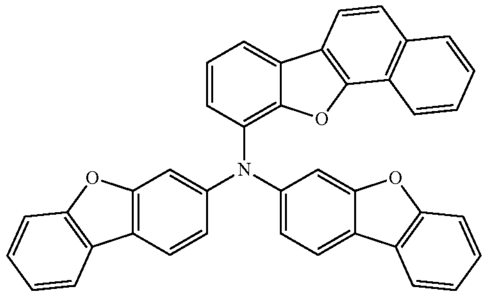
F18
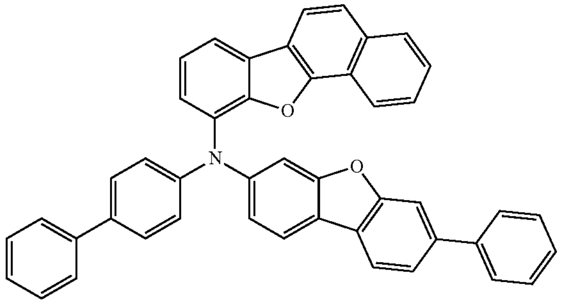
F20
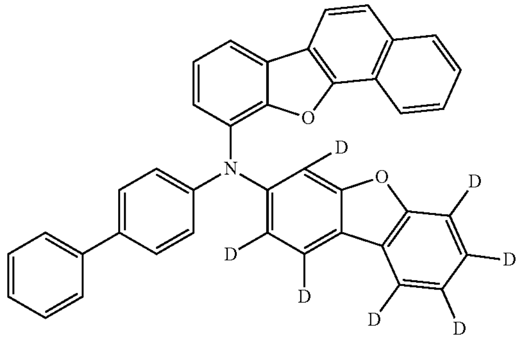
G1
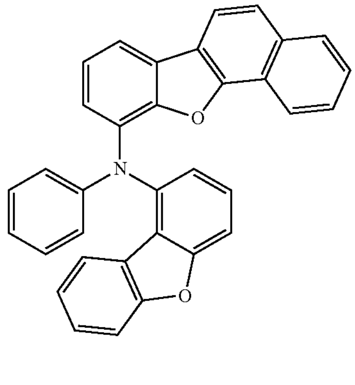

-continued
G2
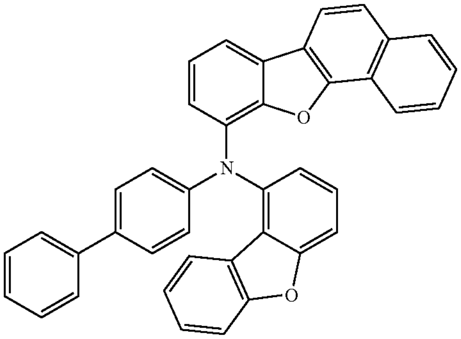
G3
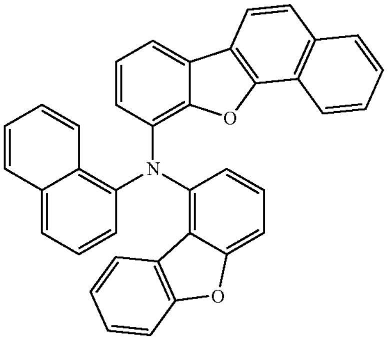
G4
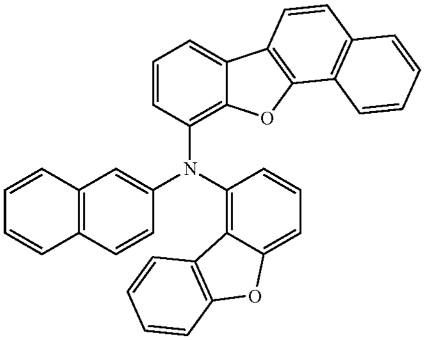
G5
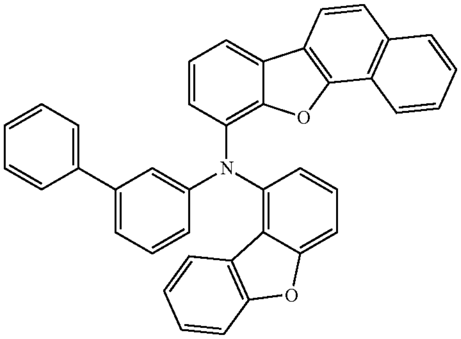
-continued
G6
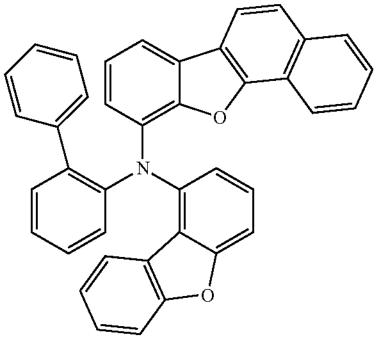
G7
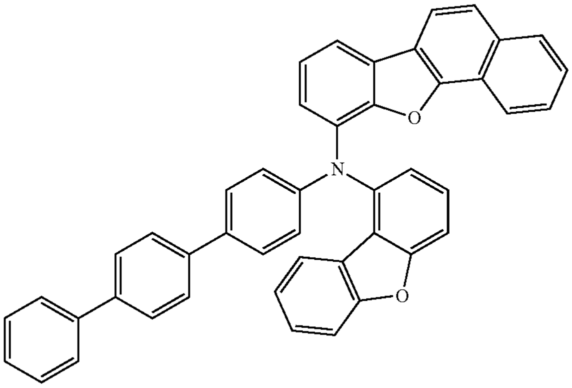
G8
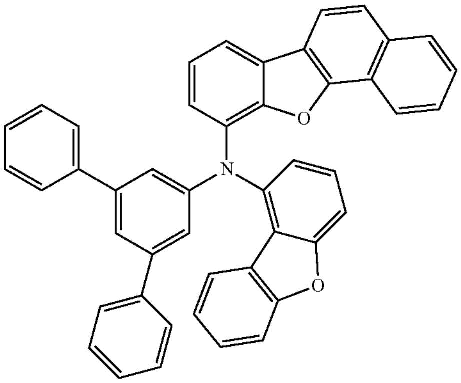
G10
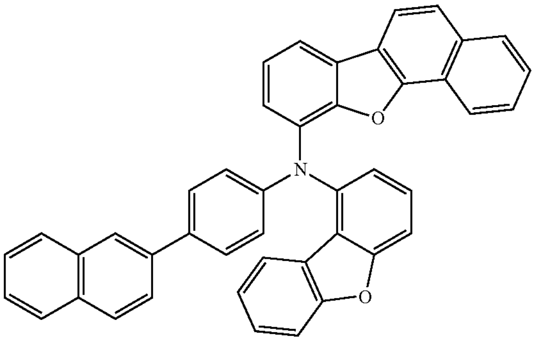

-continued
G11
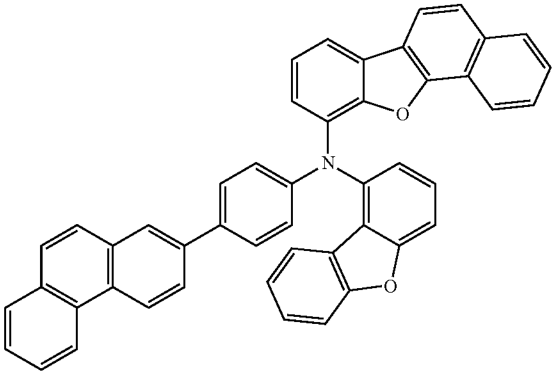
G12
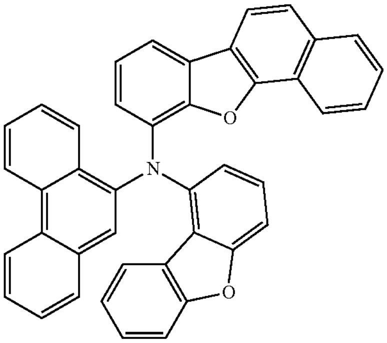
G13
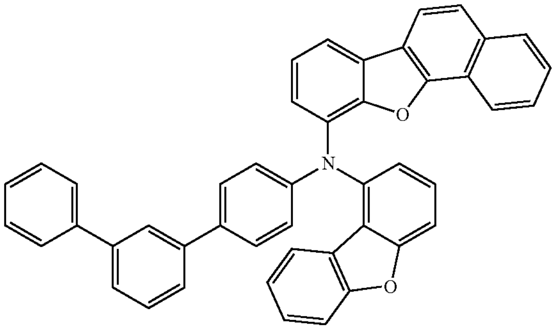
G14
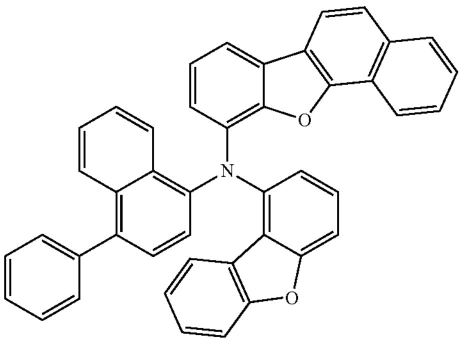
-continued
G15
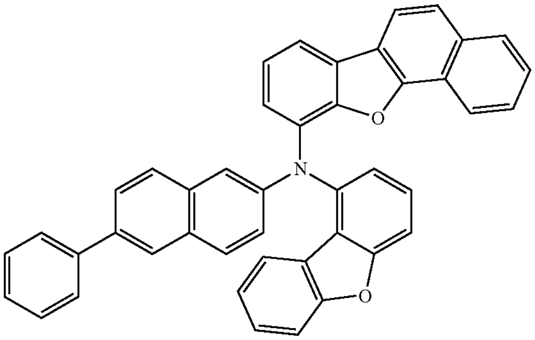
G16
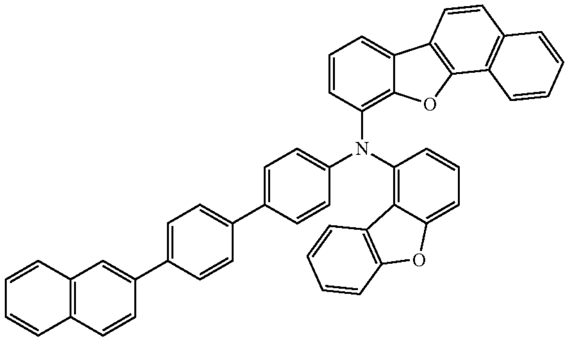
G17
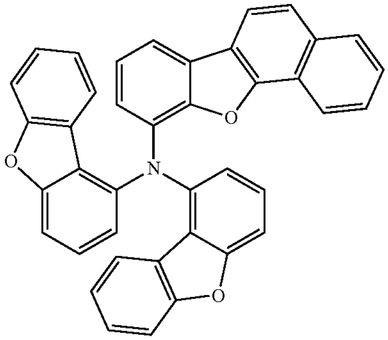
G18
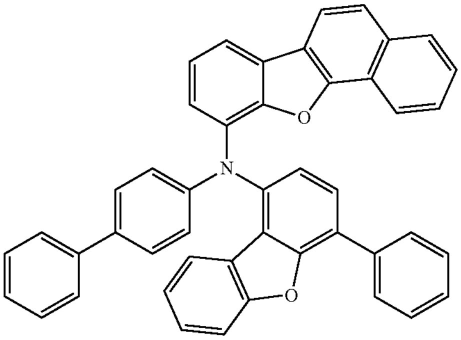

-continued
G20
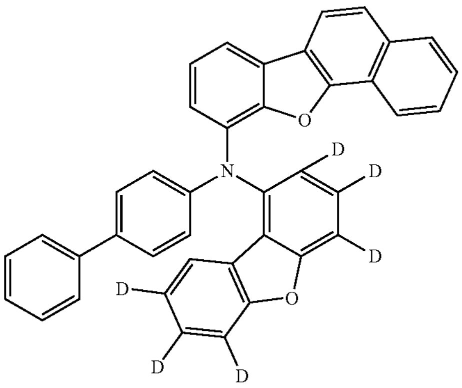
H2
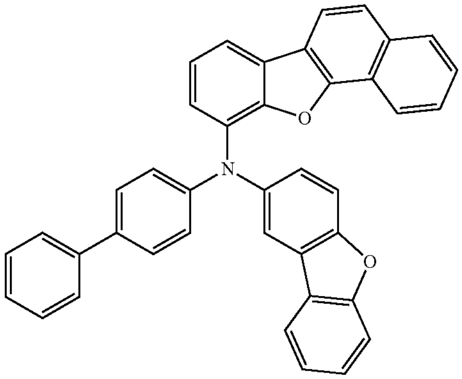
H3
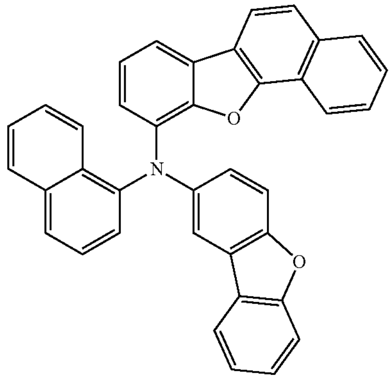
H4
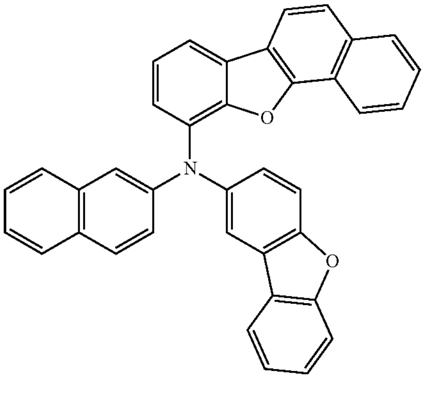
-continued
H5
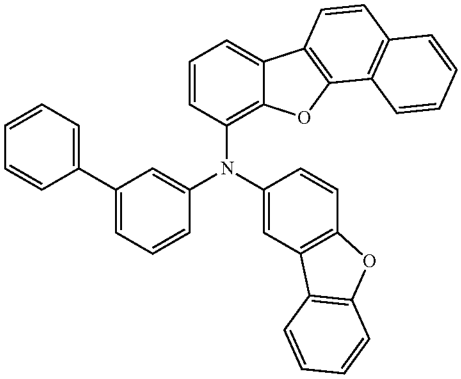
H6
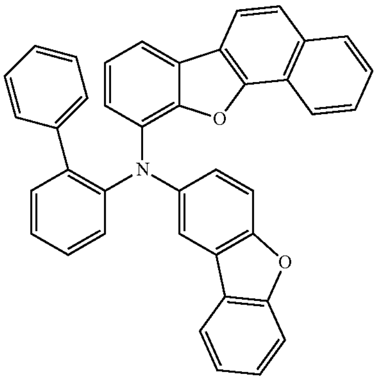
H7
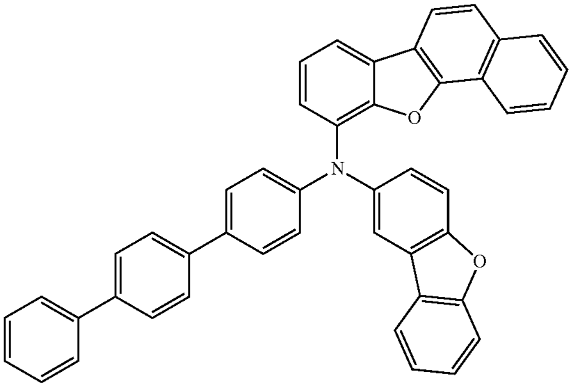
H8
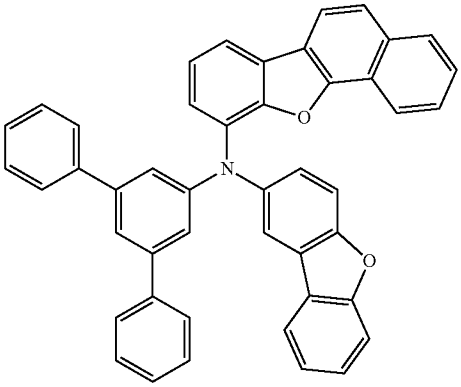

-continued
H9
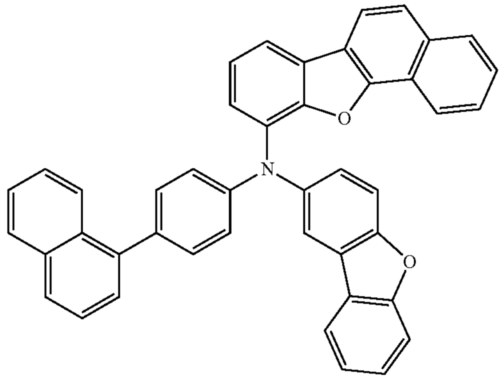
H10
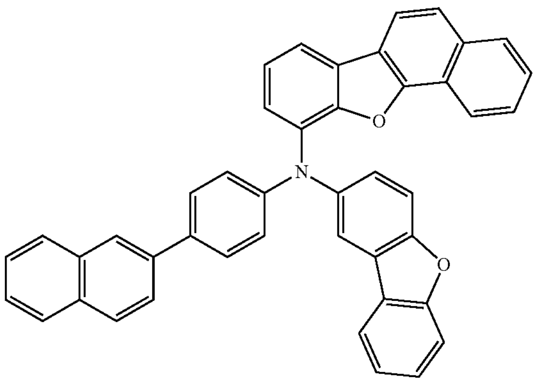
H11
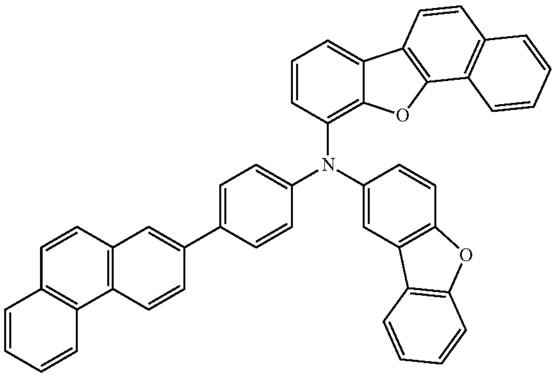
H12
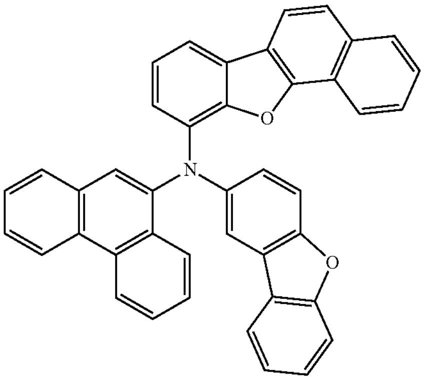
-continued
H13
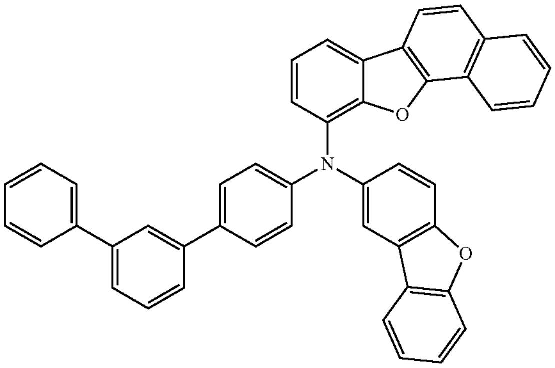
H14
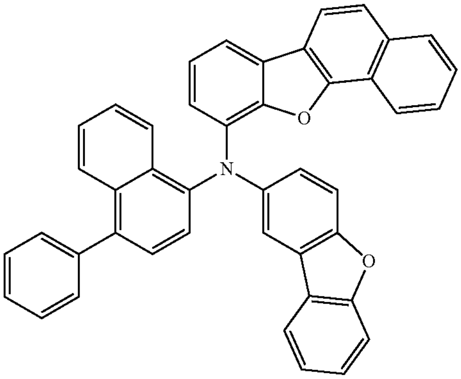
H15
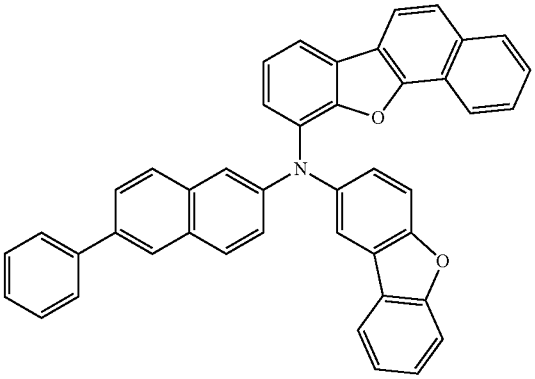
H16
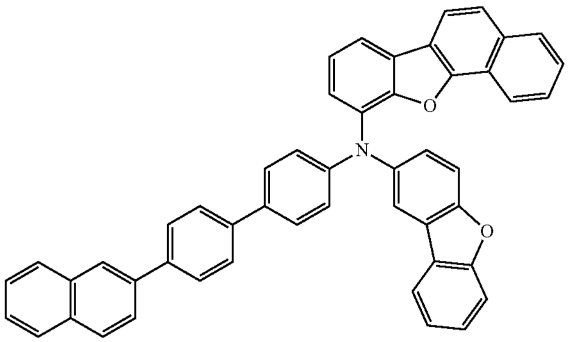

-continued
H17
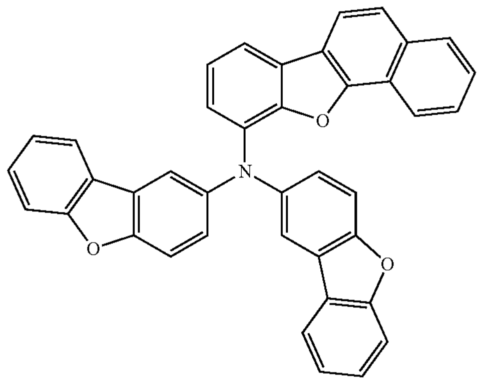
H18
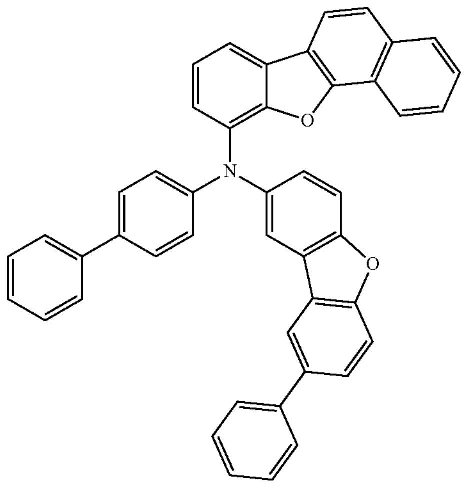
-continued
H19
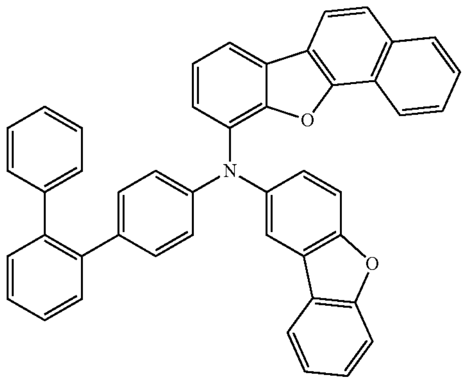
H20
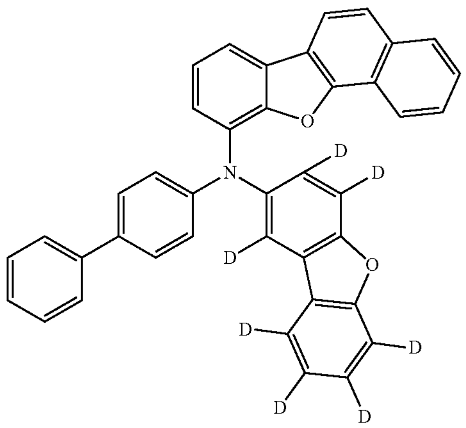
in Compound Group 1, D is a deuterium atom.
* * * * *